(12) United States Patent
Tsukuba et al.

(10) Patent No.: US 9,667,976 B2
(45) Date of Patent: *May 30, 2017

(54) IMAGE ENCODING DEVICE, IMAGE ENCODING METHOD, IMAGE DECODING DEVICE, IMAGE DECODING METHOD, PROGRAM, AND STORAGE MEDIUM

(71) Applicant: SHARP KABUSHIKI KAISHA, Osaka-shi, Osaka (JP)

(72) Inventors: Takeshi Tsukuba, Osaka (JP); Yasuaki Tokumo, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/848,010

(22) Filed: Sep. 8, 2015

(65) Prior Publication Data

US 2015/0381992 A1 Dec. 31, 2015

Related U.S. Application Data

(60) Continuation of application No. 14/109,444, filed on Dec. 17, 2013, now Pat. No. 9,161,037, which is a
(Continued)

(30) Foreign Application Priority Data

Jun. 29, 2007 (JP) ................................. 2007-173379
Oct. 15, 2007 (JP) ................................. 2007-268429

(51) Int. Cl.
*H04N 19/174* (2014.01)
*H04N 19/139* (2014.01)
(Continued)

(52) U.S. Cl.
CPC ......... *H04N 19/174* (2014.11); *H04N 19/103* (2014.11); *H04N 19/139* (2014.11);
(Continued)

(58) Field of Classification Search
CPC .................................................... H04N 19/159
(Continued)

(56) References Cited

U.S. PATENT DOCUMENTS 5,737,022 A 4/1998 Yamaguchi et al.
6,426,975 B1 7/2002 Nishi et al.
(Continued)

FOREIGN PATENT DOCUMENTS

JP 2005-528047 A 9/2005
JP 2005-529527 A 9/2005
(Continued)

OTHER PUBLICATIONS

Adaptive Multidirectional Intra Prediction, ITU—Telecommunications Standardization Sector, Study Group 16 Question 6, Video Coding Experts Group (VCEG), Oct. 20, 2007, 33rd Meeting, Shenzhen, China.
(Continued)

*Primary Examiner* — William C Vaughn, Jr.
*Assistant Examiner* — Luis Perez Fuentes
(74) *Attorney, Agent, or Firm* — Birch, Stewart, Kolasch & Birch, LLP

(57) ABSTRACT

A prediction set determining section selects a prediction set from a prediction set group including a plurality of prediction sets having different combinations of prediction modes corresponding to different prediction directions. Further, a prediction mode determining section selects a prediction mode from the prediction set thus selected. An entropy encoding section encodes the prediction set thus selected, the prediction mode thus selected, and residual data between
(Continued)

an input image and a predicted image formed on the basis of the prediction set and the prediction mode. This allows an image encoding device to carry out predictions from more various angles, thereby improving prediction efficiency.

2 Claims, 70 Drawing Sheets

Related U.S. Application Data division of application No. 12/667,004, filed as application No. PCT/JP2008/061672 on Jun. 26, 2008, now Pat. No. 8,644,382.

(51) Int. Cl.
| | |
|---|---|
| H04N 19/159 | (2014.01) |
| H04N 19/176 | (2014.01) |
| H04N 19/61 | (2014.01) |
| H04N 19/593 | (2014.01) |
| H04N 19/103 | (2014.01) |
| H04N 19/19 | (2014.01) |

(52) U.S. Cl.
CPC ......... *H04N 19/159* (2014.11); *H04N 19/176* (2014.11); *H04N 19/19* (2014.11); *H04N 19/593* (2014.11); *H04N 19/61* (2014.11)

(58) Field of Classification Search
USPC .................................................. 375/240.12
See application file for complete search history.

(56) References Cited

U.S. PATENT DOCUMENTS

| | | | | | |
|---|---|---|---|---|---|
| 7,161,982 | B2* | 1/2007 | Kimoto | ............... | H04N 19/176 375/240.13 |
| 7,369,707 | B2 | 5/2008 | Sakaguchi et al. | | |
| 7,469,070 | B2 | 12/2008 | Winger | | |
| 7,590,288 | B1 | 9/2009 | Alvarez et al. | | |
| 7,688,893 | B2* | 3/2010 | Morimoto | ............ | H04N 19/159 375/240.12 |
| 7,706,443 | B2 | 4/2010 | Chandramouly et al. | | |
| 7,782,955 | B2 | 8/2010 | Chen et al. | | |
| 8,000,390 | B2 | 8/2011 | Zhao et al. | | |
| 8,031,946 | B2 | 10/2011 | Nagori | | |
| 8,135,064 | B2 | 3/2012 | Tasaka et al. | | |
| 8,224,100 | B2 | 7/2012 | Jeong | | |
| 8,244,050 | B2 | 8/2012 | Kim | | |
| 8,331,448 | B2* | 12/2012 | Oguz | .................. | H04N 19/176 375/240.13 |
| 8,442,334 | B2 | 5/2013 | Drugeon et al. | | |
| 8,472,522 | B2* | 6/2013 | Matsuo | ................. | H04N 19/176 375/240.12 |
| 8,644,382 | B2* | 2/2014 | Tsukuba | ............... | H04N 19/159 375/240.12 |
| 8,711,950 | B2 | 4/2014 | Minamoto | | |
| 9,161,037 | B2* | 10/2015 | Tsukuba | ............... | H04N 19/159 |
| 9,313,496 | B2* | 4/2016 | Miyoshi | ................. | H04N 19/52 |
| 2001/0017942 | A1 | 8/2001 | Kalevo et al. | | |
| 2003/0059120 | A1 | 3/2003 | Boon et al. | | |
| 2003/0223495 | A1 | 12/2003 | Sun et al. | | |
| 2003/0223645 | A1* | 12/2003 | Sun | ...................... | H04N 19/197 382/239 |
| 2003/0231795 | A1 | 12/2003 | Karczewicz | | |
| 2004/0008771 | A1* | 1/2004 | Karczewicz | ......... | H04N 19/197 375/240.03 |
| 2005/0157797 | A1 | 7/2005 | Gaedke | | |
| 2006/0176962 | A1 | 8/2006 | Arimura et al. | | |
| 2007/0036215 | A1 | 2/2007 | Pan et al. | | |
| 2007/0121731 | A1* | 5/2007 | Tanizawa | ............ | H04N 19/176 375/240.24 |
| 2007/0133891 | A1 | 6/2007 | Jeong | | |
| 2008/0063071 | A1* | 3/2008 | Suzuki | ................. | H04N 19/176 375/240.16 |
| 2008/0159398 | A1 | 7/2008 | Murakami et al. | | |
| 2008/0175318 | A1 | 7/2008 | Sun et al. | | |
| 2008/0175319 | A1 | 7/2008 | Sun et al. | | |
| 2008/0175320 | A1 | 7/2008 | Sun et al. | | |
| 2008/0175321 | A1 | 7/2008 | Sun et al. | | |
| 2009/0110067 | A1* | 4/2009 | Sekiguchi | ............ | H04N 19/176 375/240.12 |
| 2009/0122864 | A1 | 5/2009 | Palfner et al. | | |
| 2009/0232206 | A1 | 9/2009 | Boon et al. | | |
| 2009/0268974 | A1 | 10/2009 | Takagi | | |
| 2009/0310677 | A1 | 12/2009 | Shiodera et al. | | |
| 2010/0195722 | A1 | 8/2010 | Boon et al. | | |
| 2010/0239002 | A1 | 9/2010 | Park et al. | | |
| 2013/0215960 | A1* | 8/2013 | Song | ................. | H04N 19/00569 375/240.03 |

FOREIGN PATENT DOCUMENTS

| | | | |
|---|---|---|---|
| JP | 2006-246431 A1 | 9/2006 | |
| JP | 2007-116351 A | 5/2007 | |
| JP | 2007-134810 A | 5/2007 | |
| JP | 2007-166617 A | 6/2007 | |
| WO | WO 03/105070 A1 | 12/2003 | |
| WO | WO 2007/055158 A1 | 5/2007 | |

OTHER PUBLICATIONS

Bazen et al., "Systematic methods for the computation of the directional fields and singular points of fingerprints", IEEE Transactions on Pattern Analysis and Machine Intelligence, vol. 24, No. 7, Jul. 2002, pp. 905-919.
Byeongdu La et al., Fast Mode Decision for Intra Prediction in H.264/AVC Encoder, IEEE International Conference on Image Processing, ICIP 2007, San Antonio, Sep. 16-19, 2007, part 3.
European Search Report mailed Nov. 10, 2010.
European Search Report mailed Nov. 12, 2010.
H. 264 (ISO/IEC 14496-10), ITU-T, "Advanced video coding for generic audiovisual services", May 2003.
International Search Report for International Application No. PCT/JP2008/061672 dated Oct. 7, 2008.
Taichiro Shiodera, et al. "Simulation results of Bidirectional Intra Prediction on KTA software V1.3", Telecommunications Standardization Sector Study Group 16 Question 6 Video Coding Experts Group (VCEG), 32nd Meeting: San Jose, CA, USA, Apr. 20-21, 2007.
US Advisory Action for U.S. Appl. No. 12/667,004 dated Aug. 21, 2013.
US Notice of Allowance for U.S. Appl. No. 12/667,004 dated Sep. 25, 2013.
US Notice of Allowance for U.S. Appl. No. 14/109,444 dated Jun. 5, 2015.
US Office Action for U.S. Appl. No. 12/667,004 dated Apr. 25, 2013.
US Office Action for U.S. Appl. No. 12/667,004 dated Oct. 5, 2012.
US Office Action for U.S. Appl. No. 14/109,444 dated Feb. 2, 2015.
US Office Action for U.S. Appl. No. 14/109,444 dated Sep. 12, 2014.

\* cited by examiner

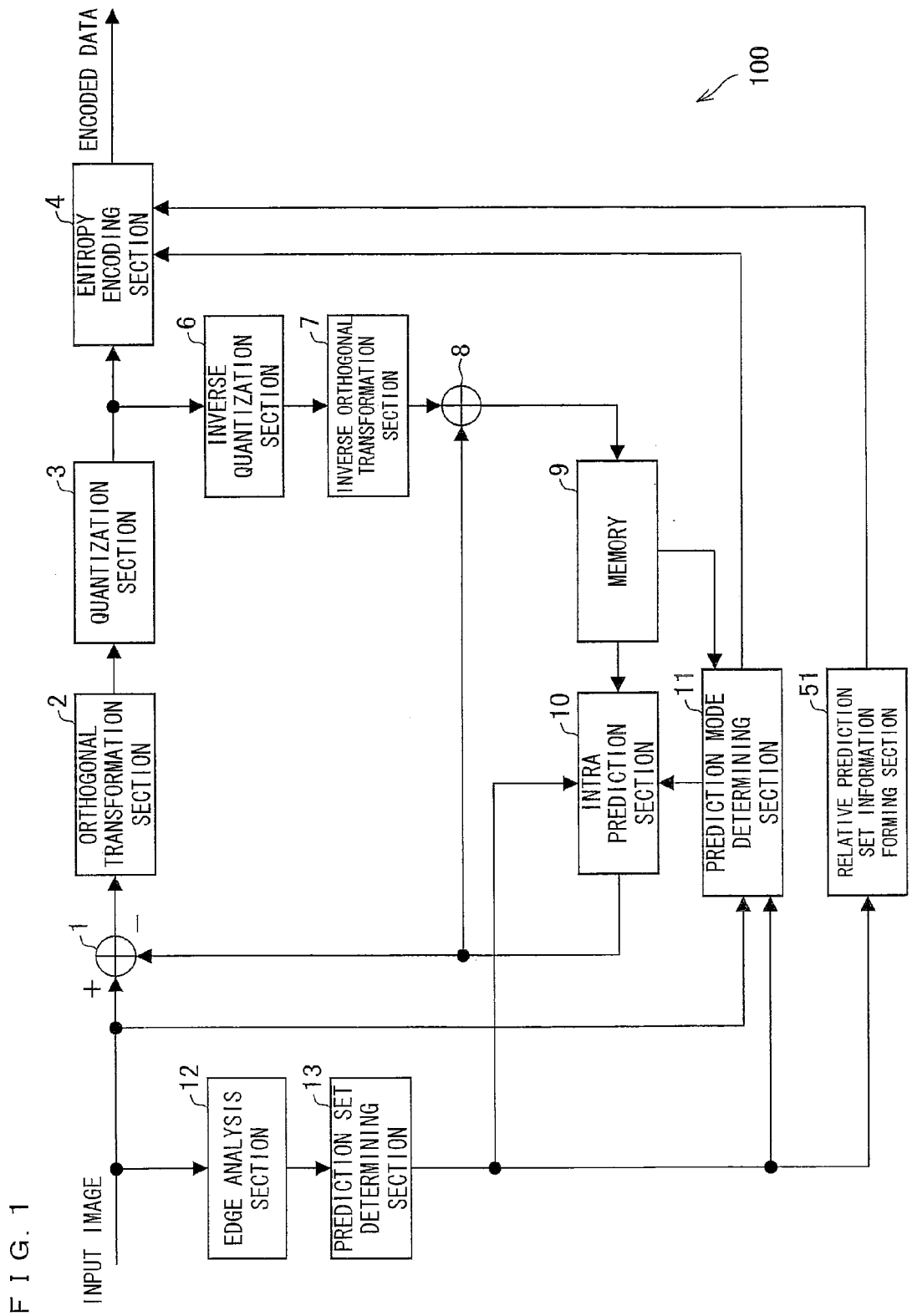
F I G. 1

F I G. 8
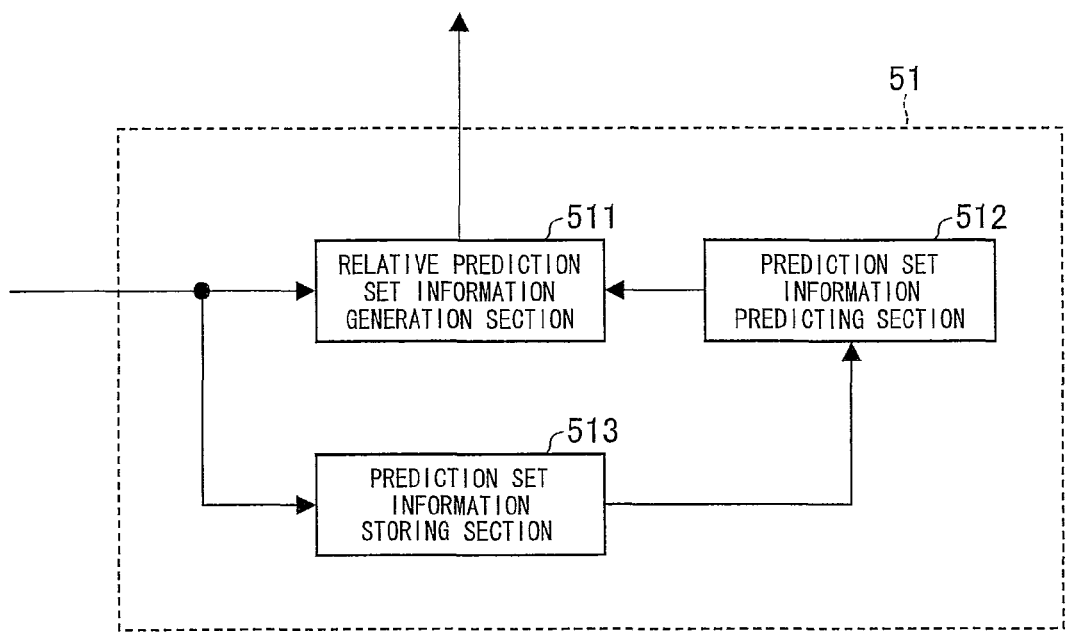

F I G. 1 1
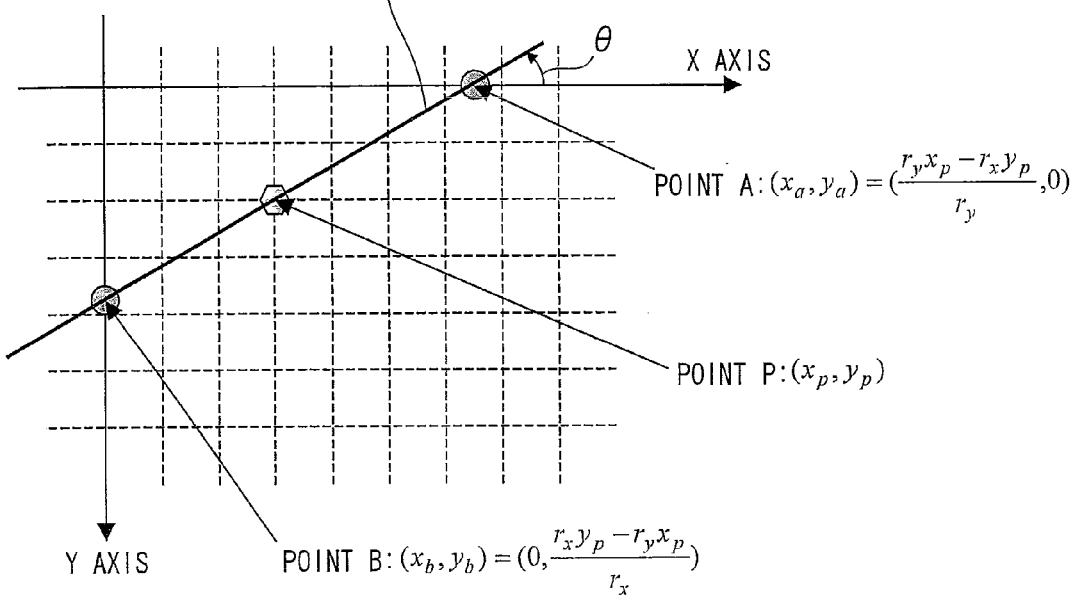

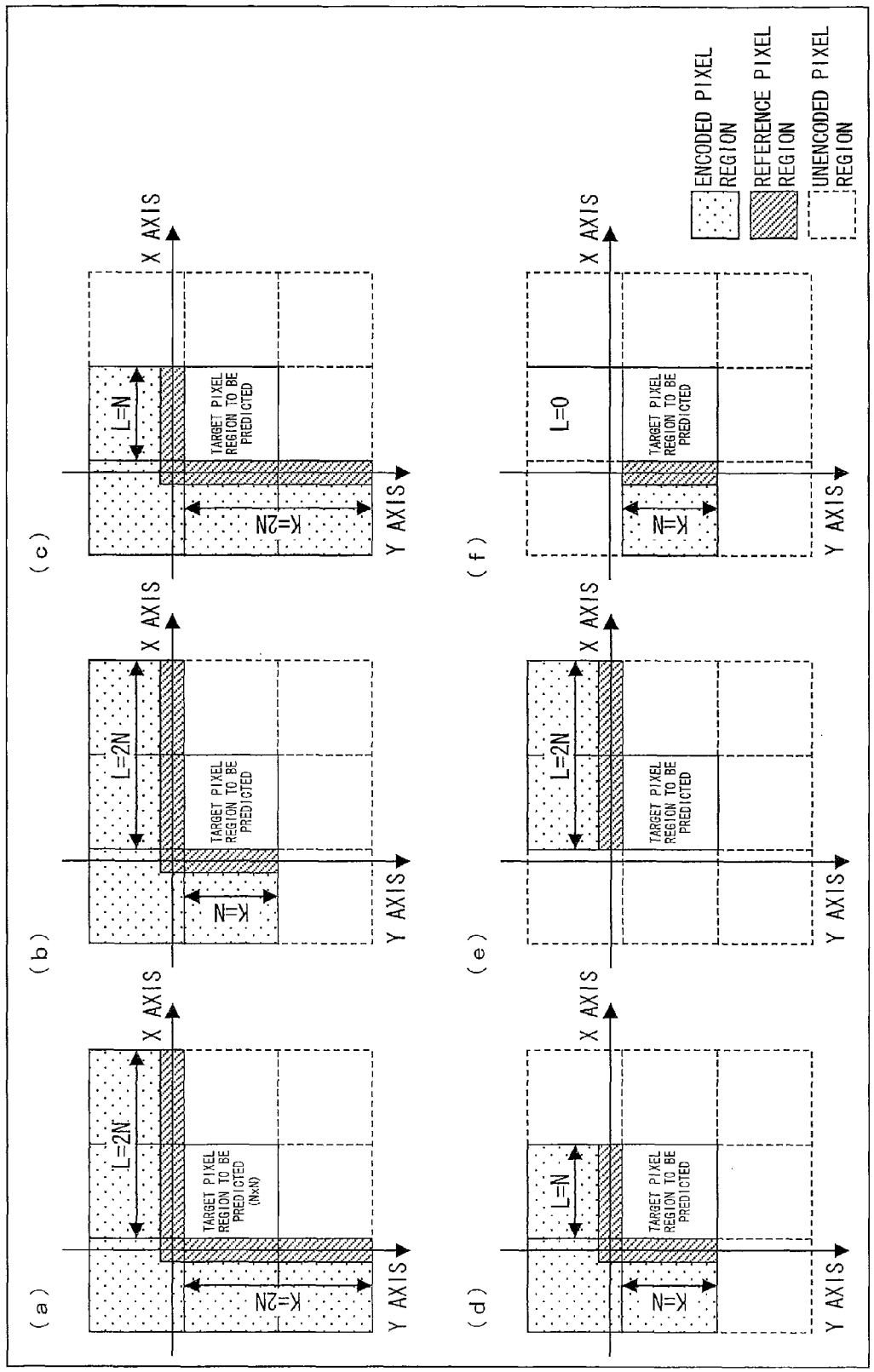

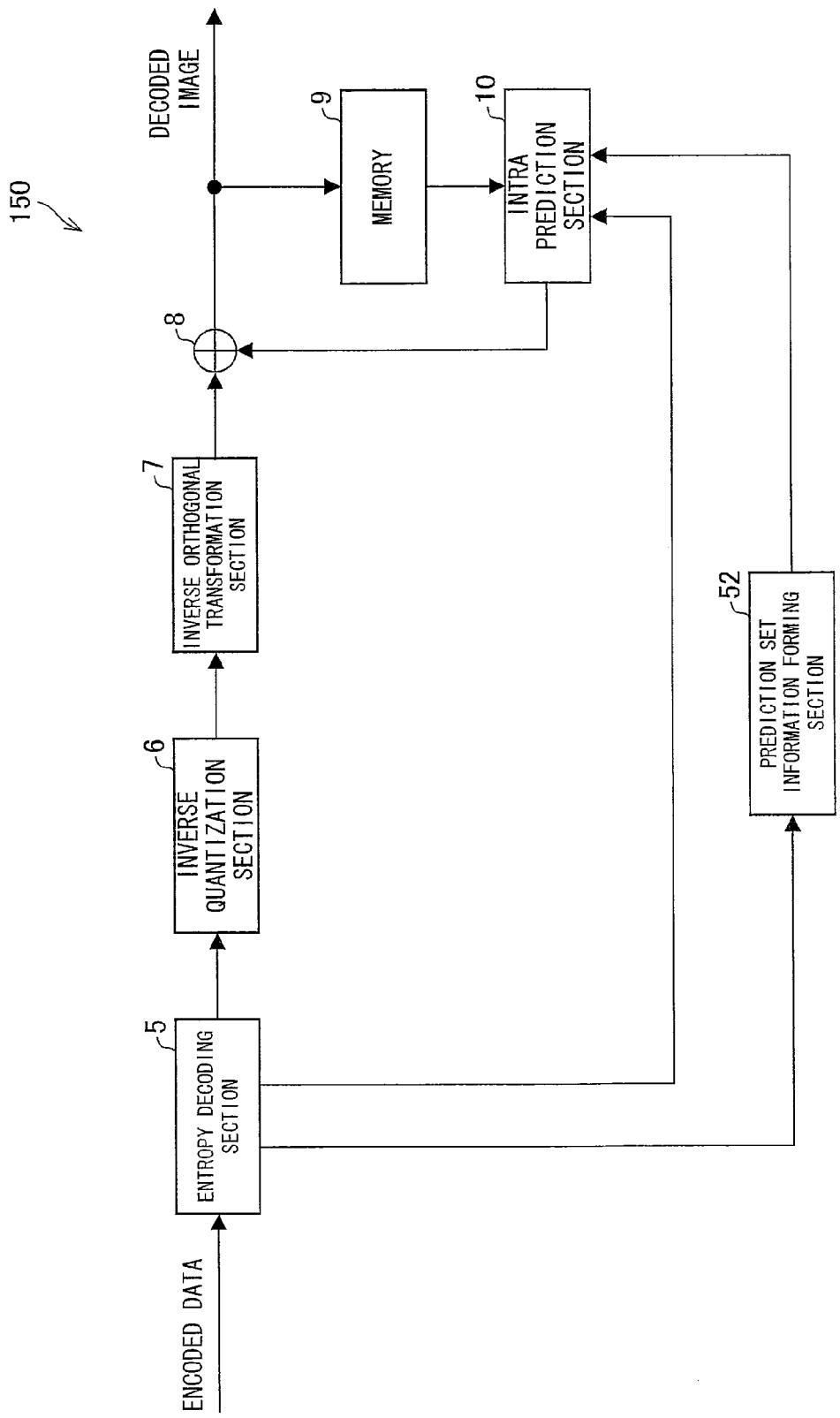
F I G. 1 4

F I G. 1 6
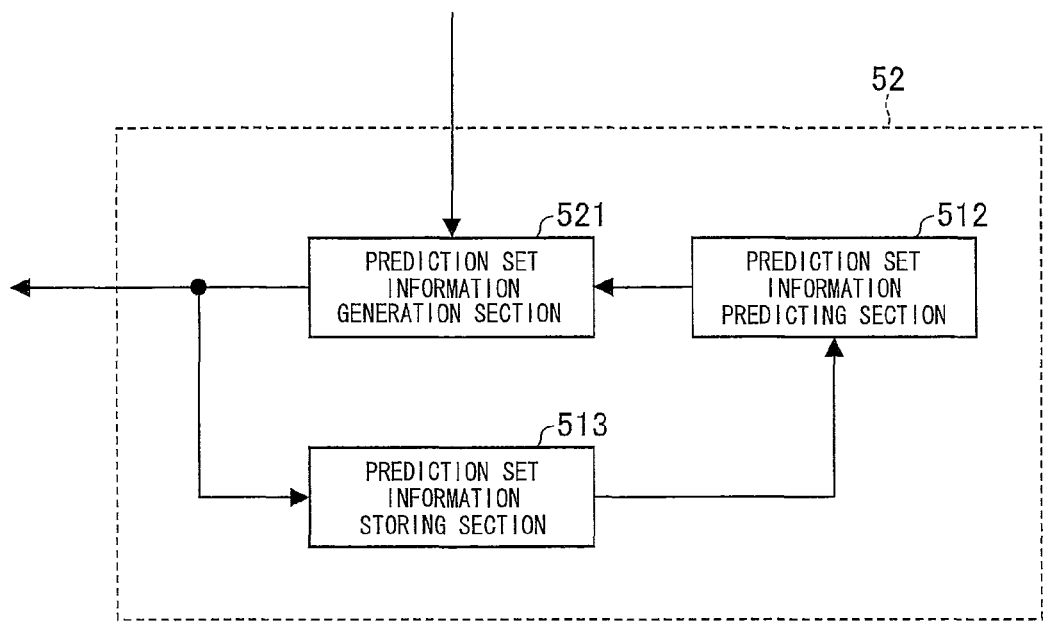

F I G. 2 0
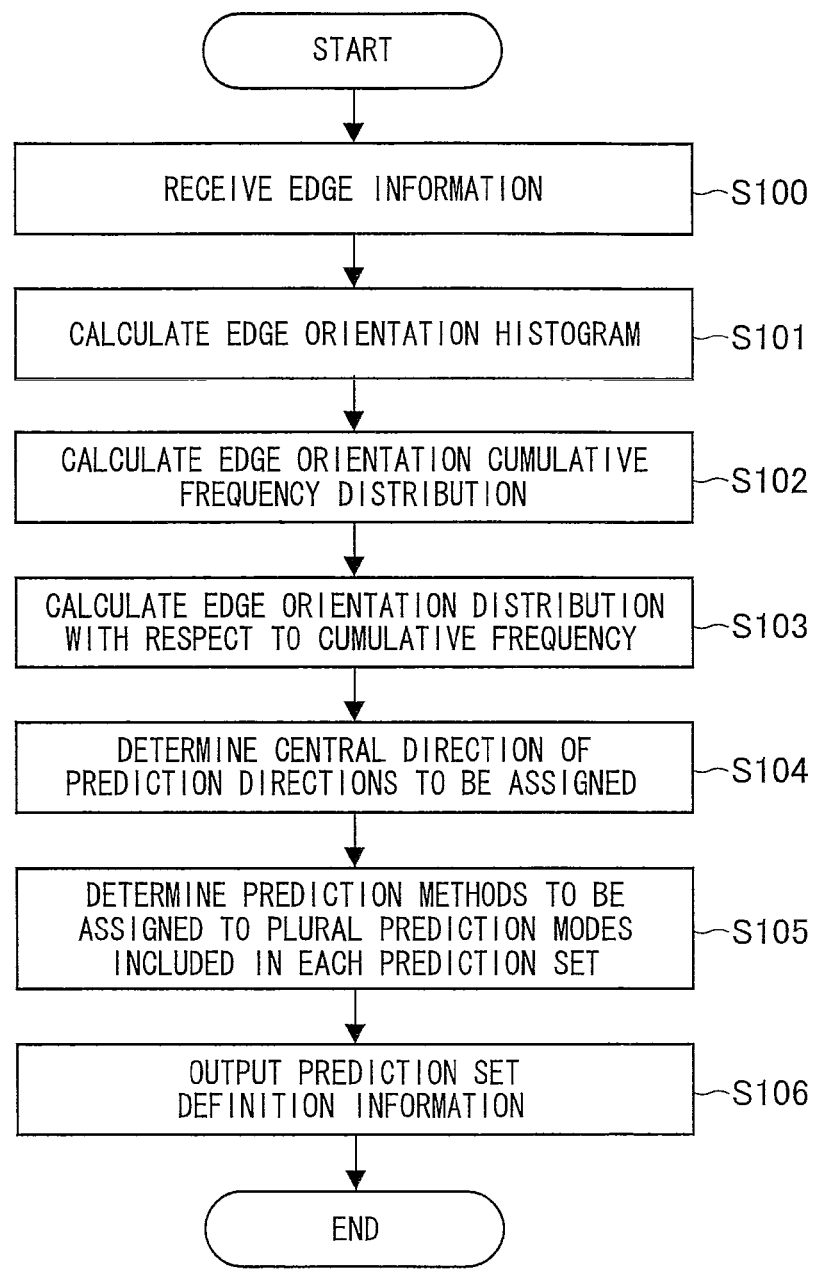

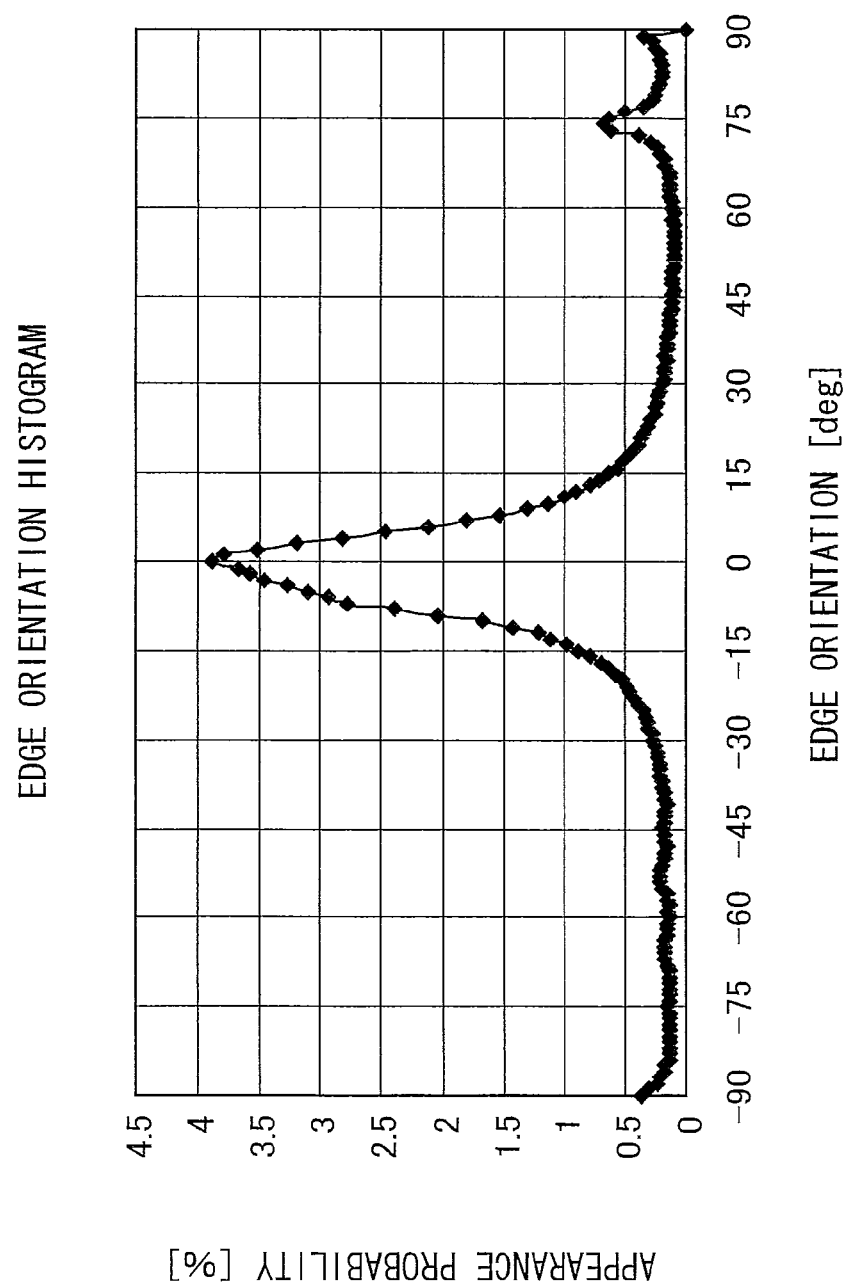
F I G . 2 1

F I G. 2 8
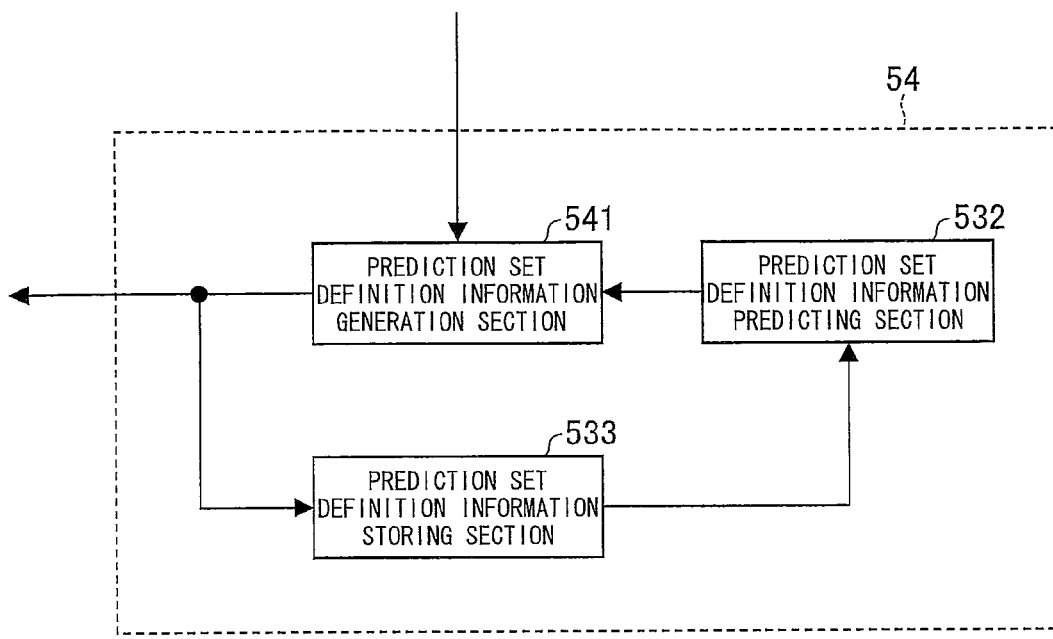

F I G . 3 4
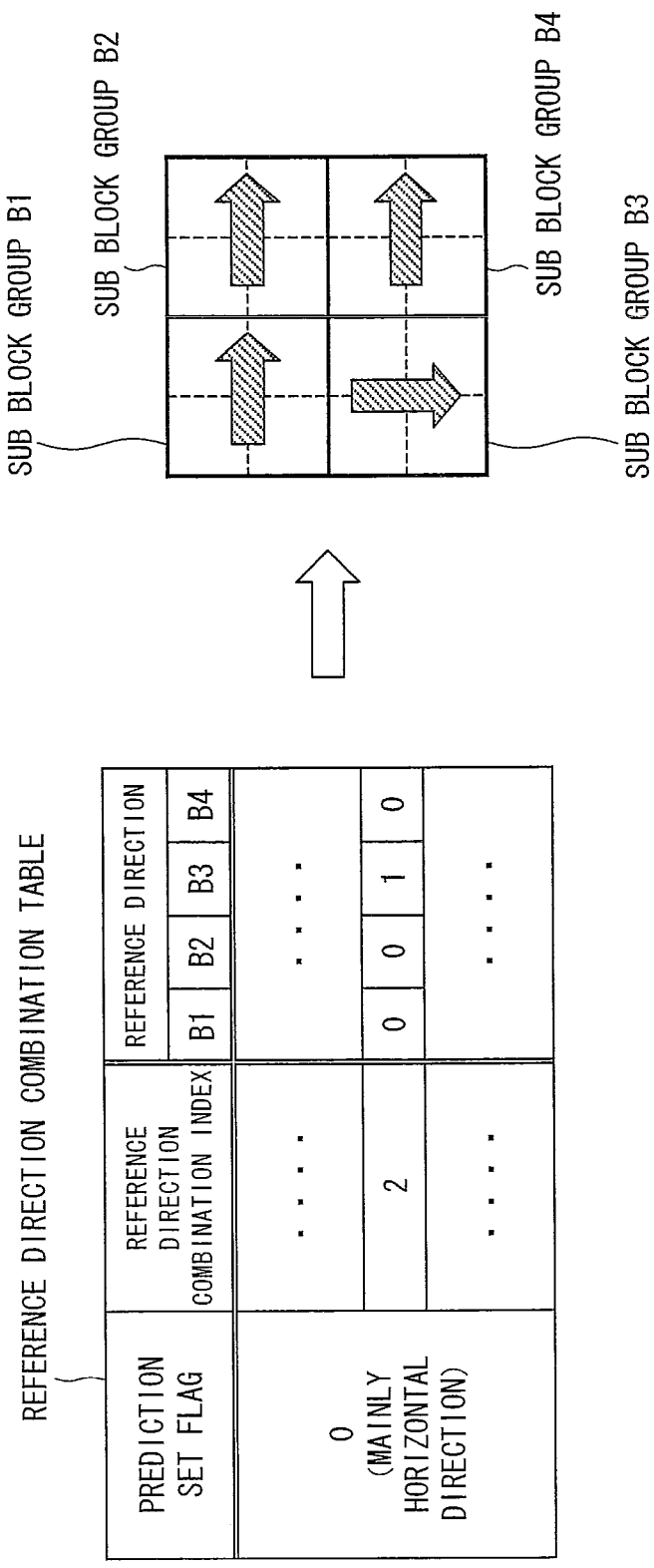

F I G. 3 6
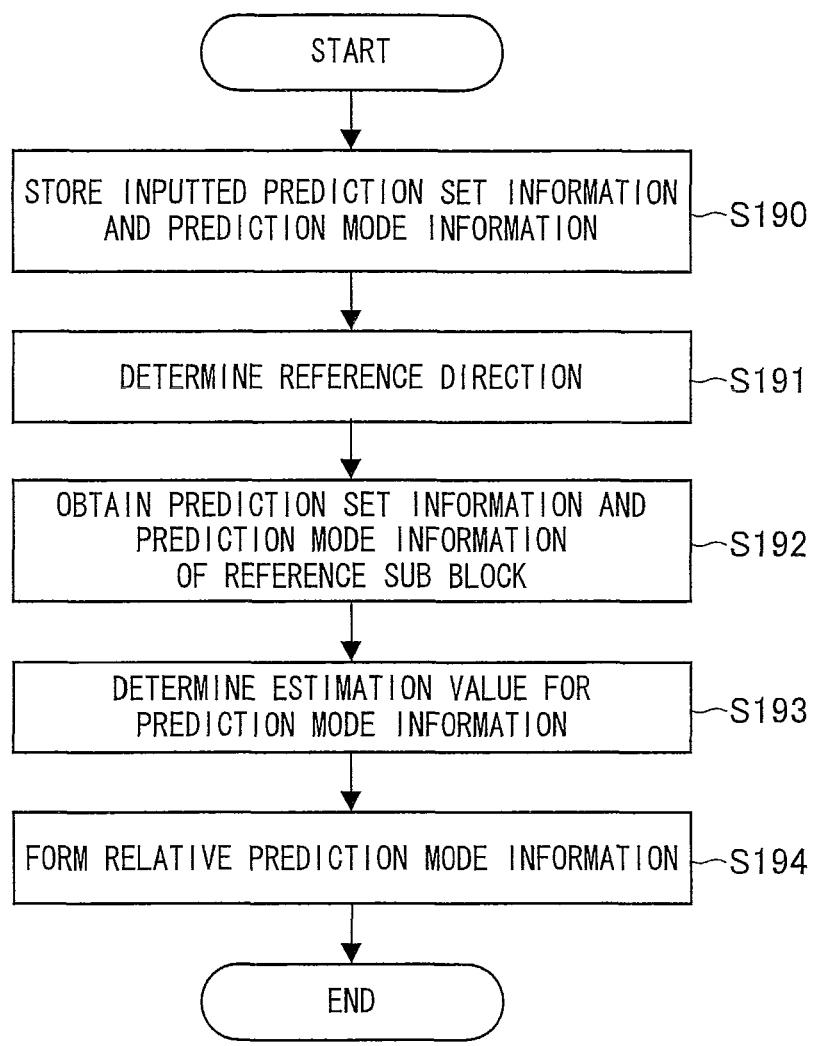

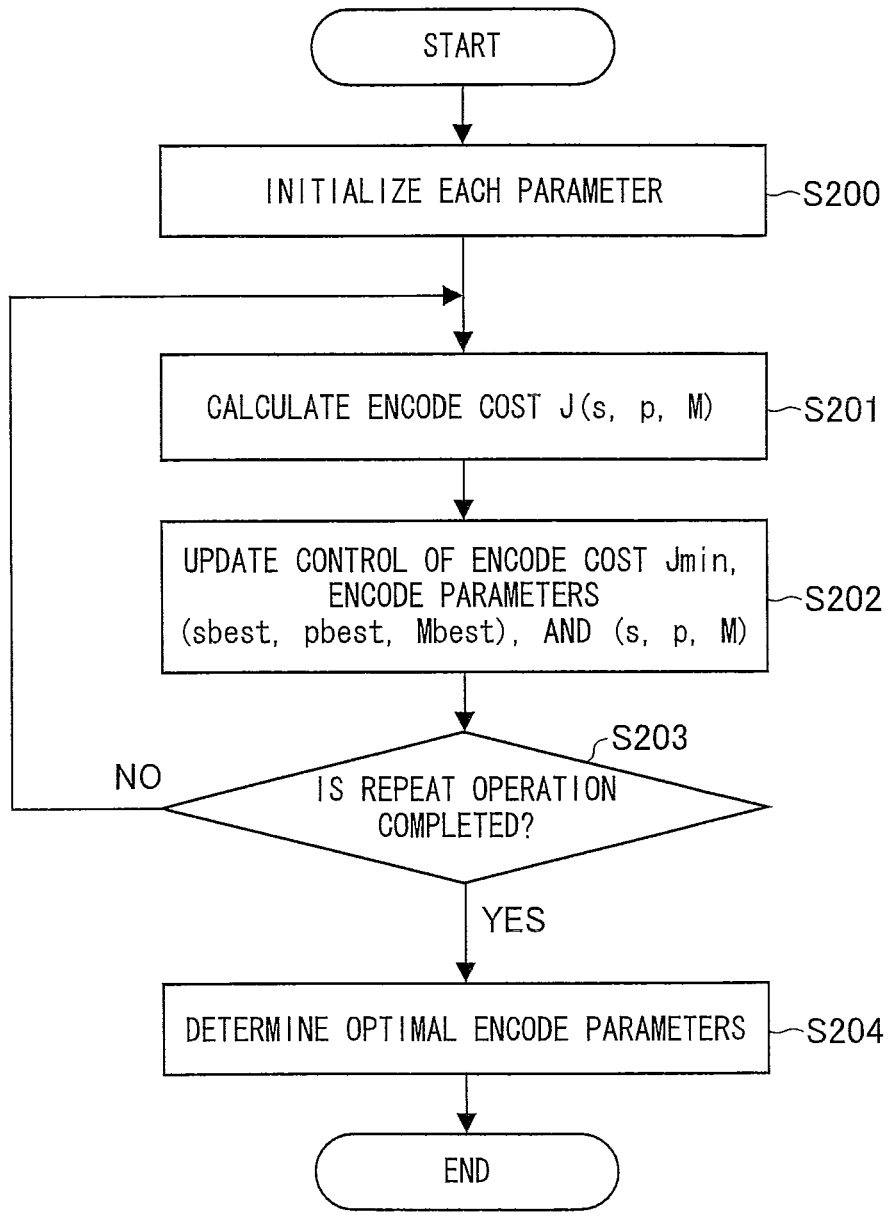
F I G. 3 7

F I G. 4 0
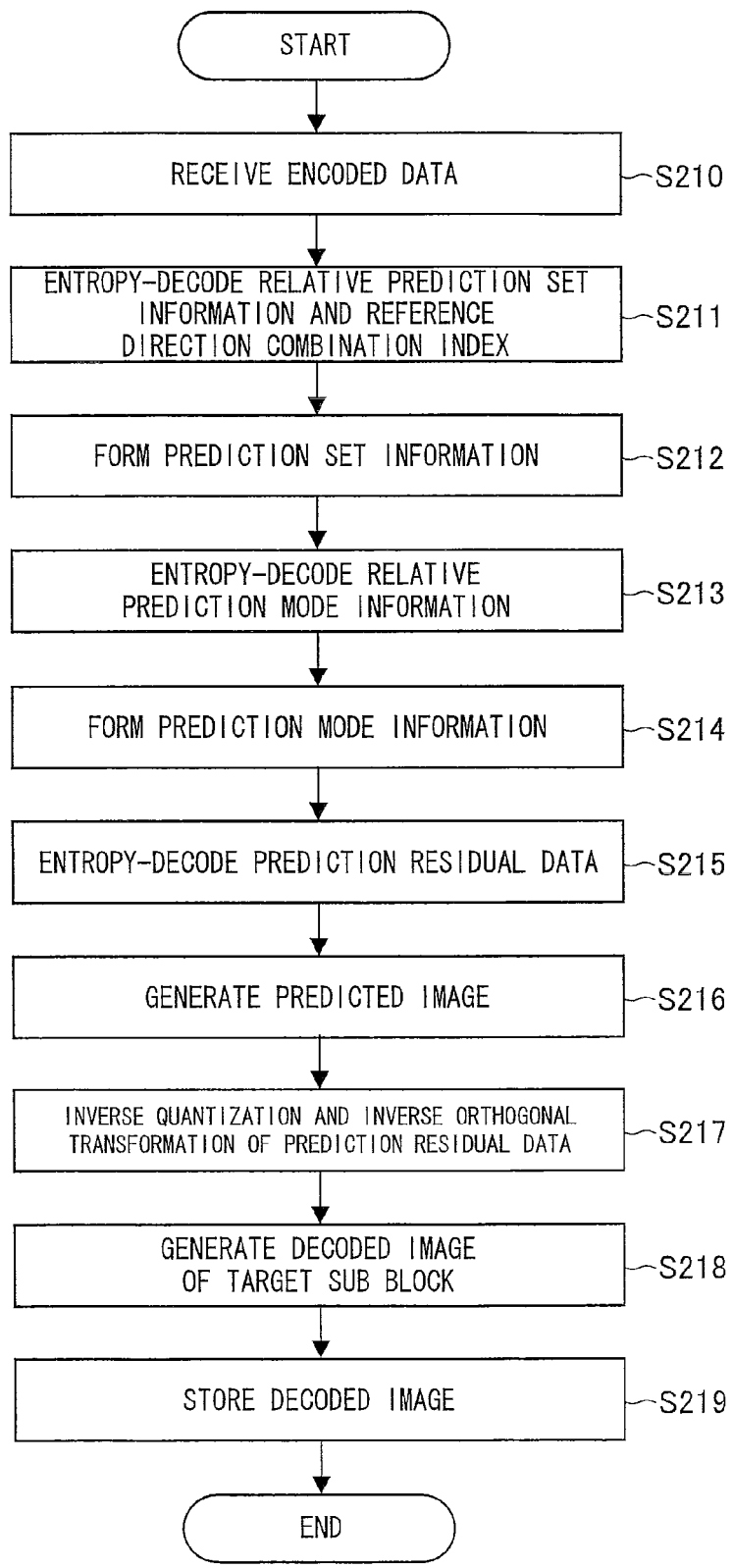

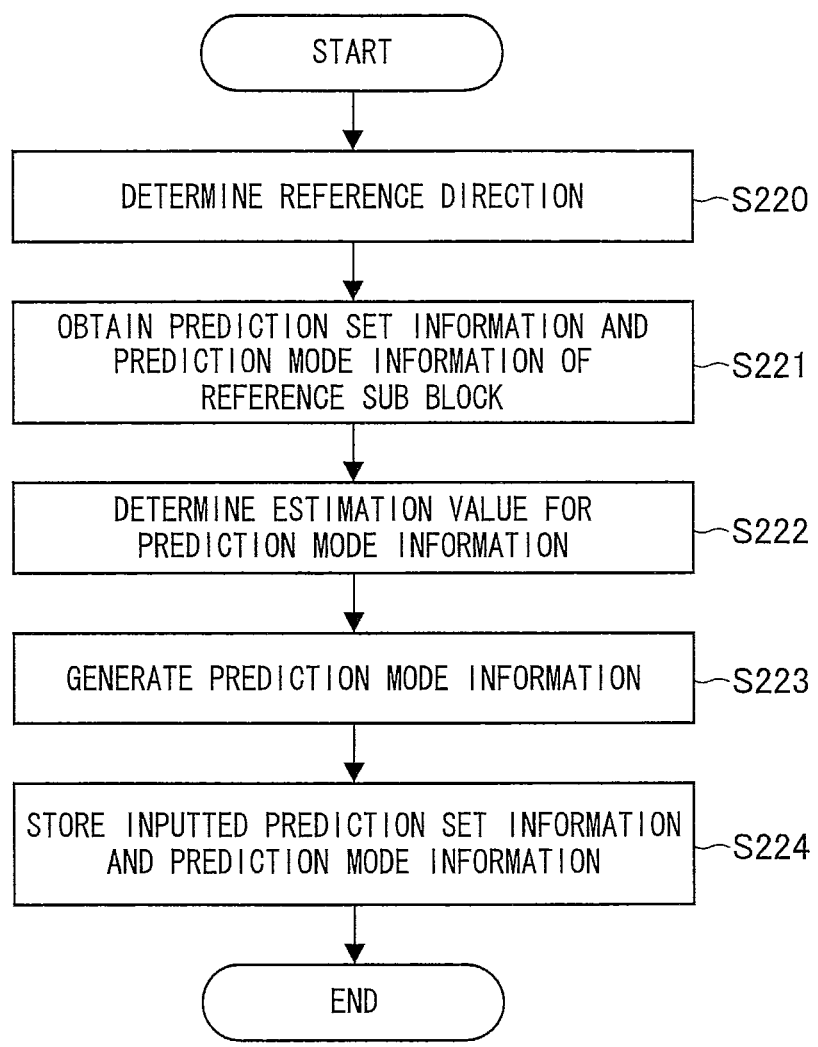
F I G. 4 1

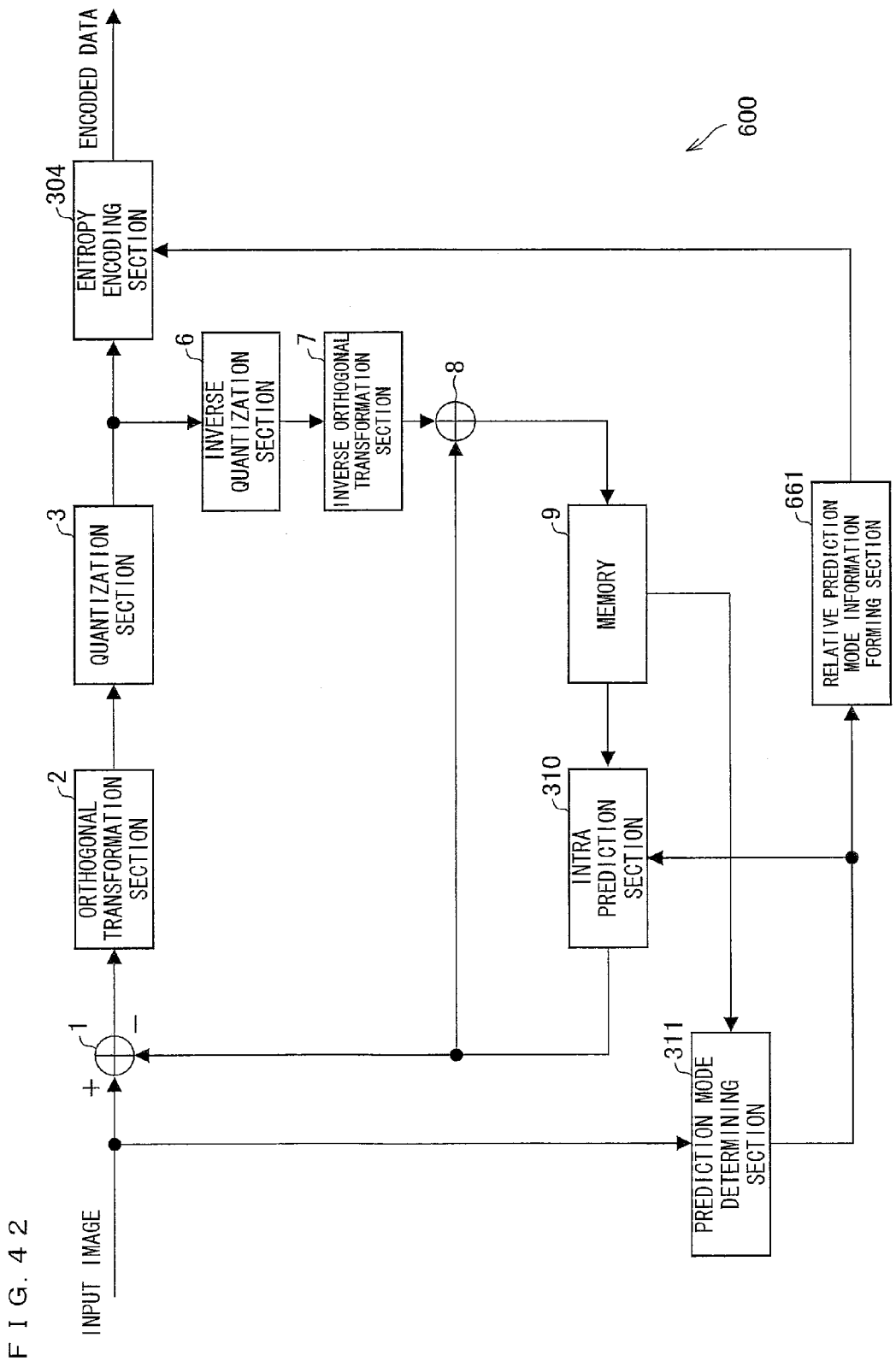

F I G. 4 4
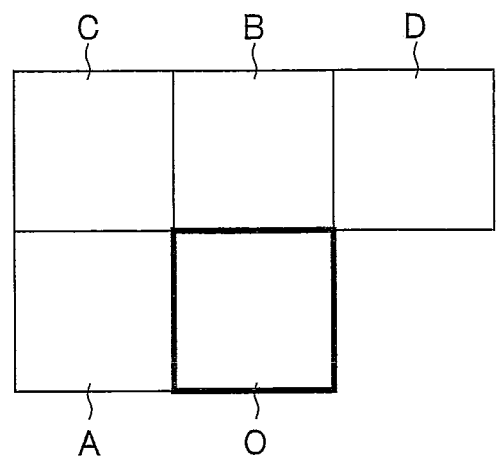

F I G. 4 5
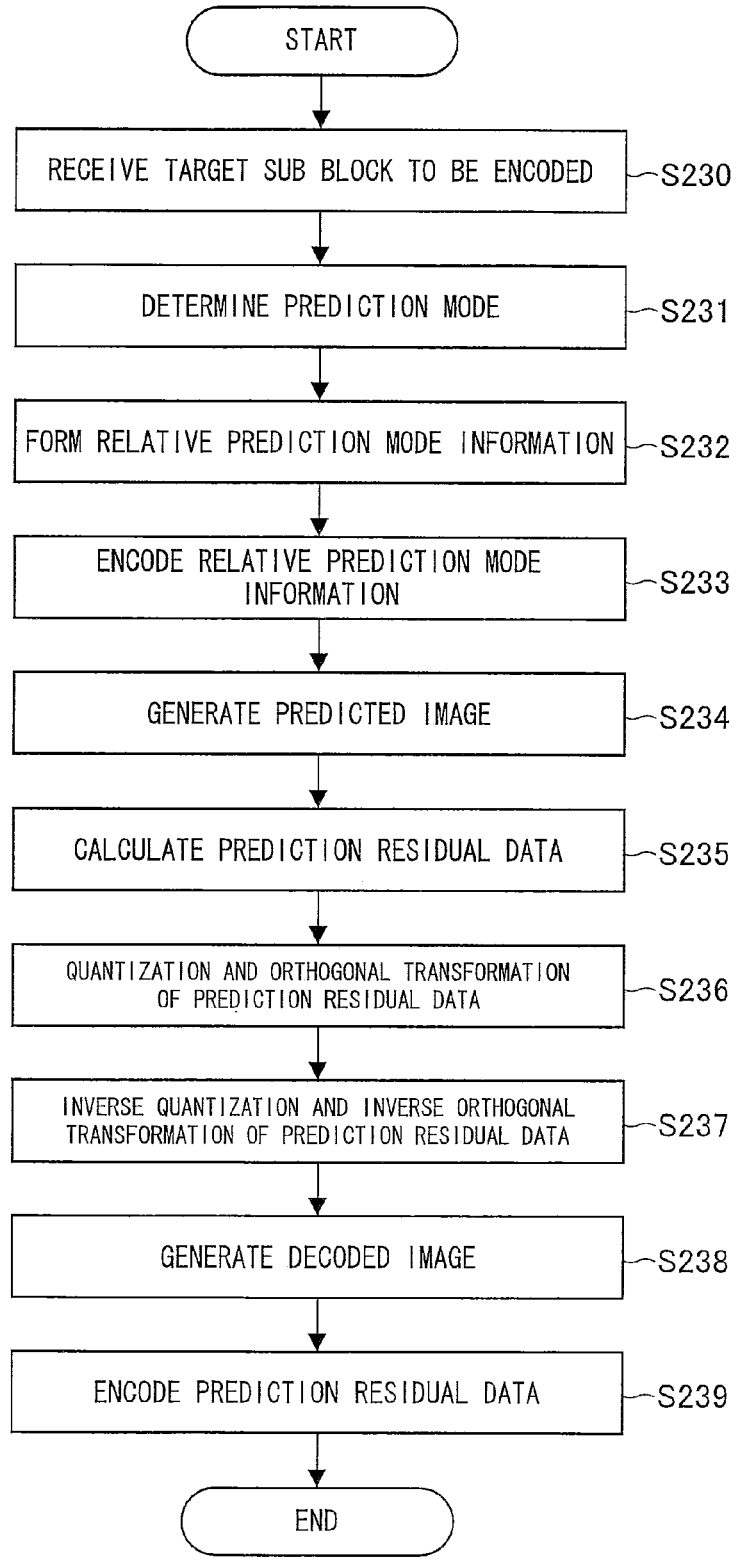

F I G. 4 7
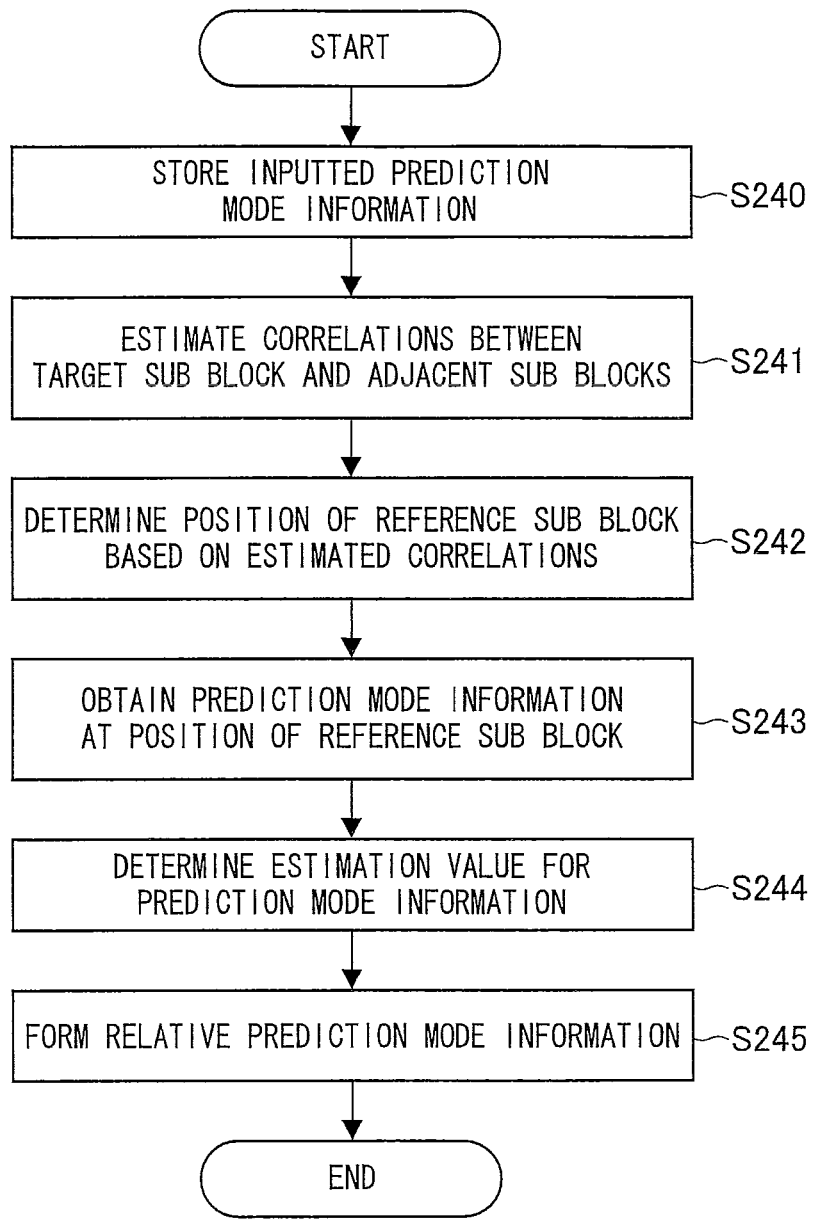

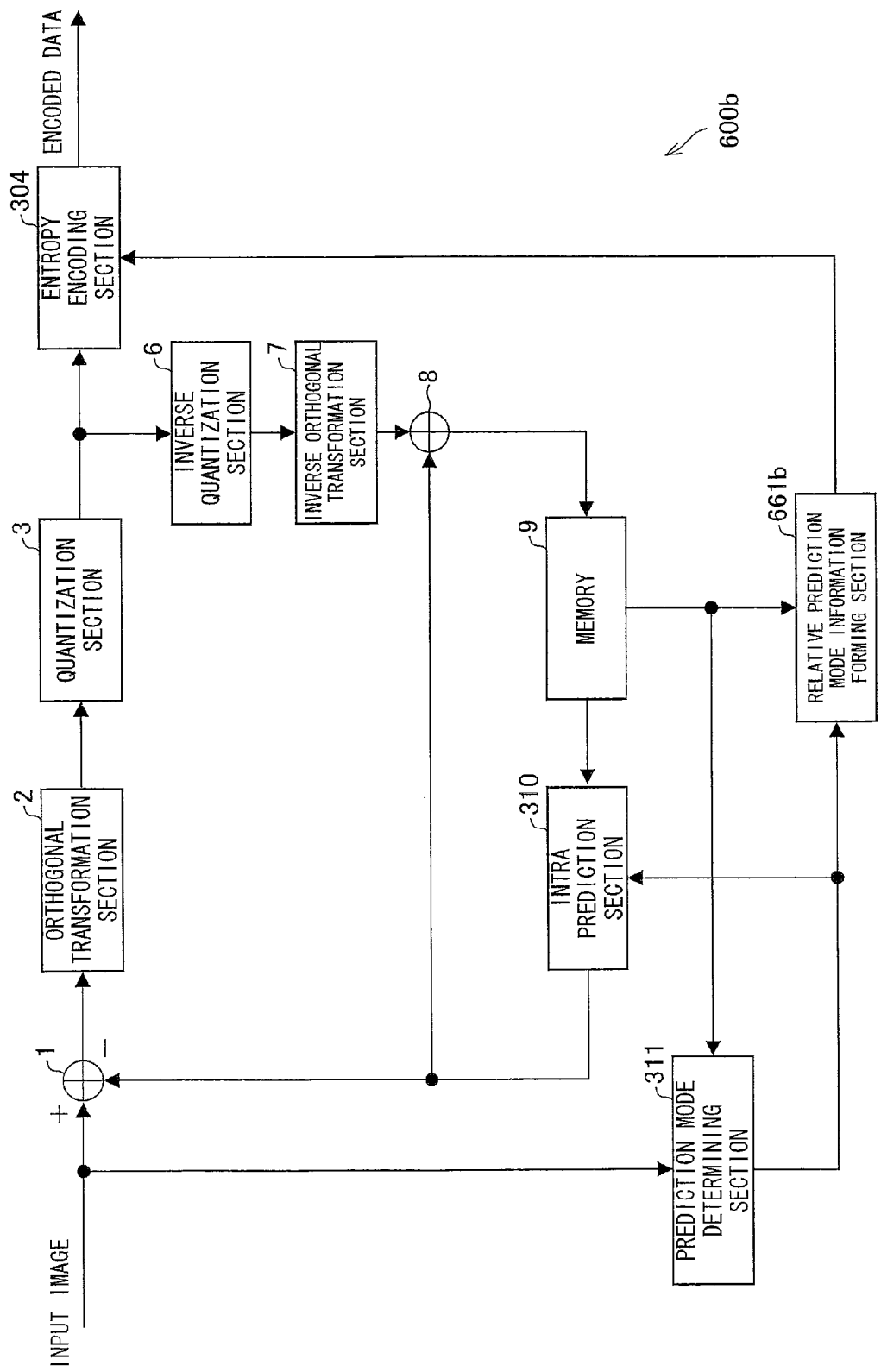
F I G. 4 8

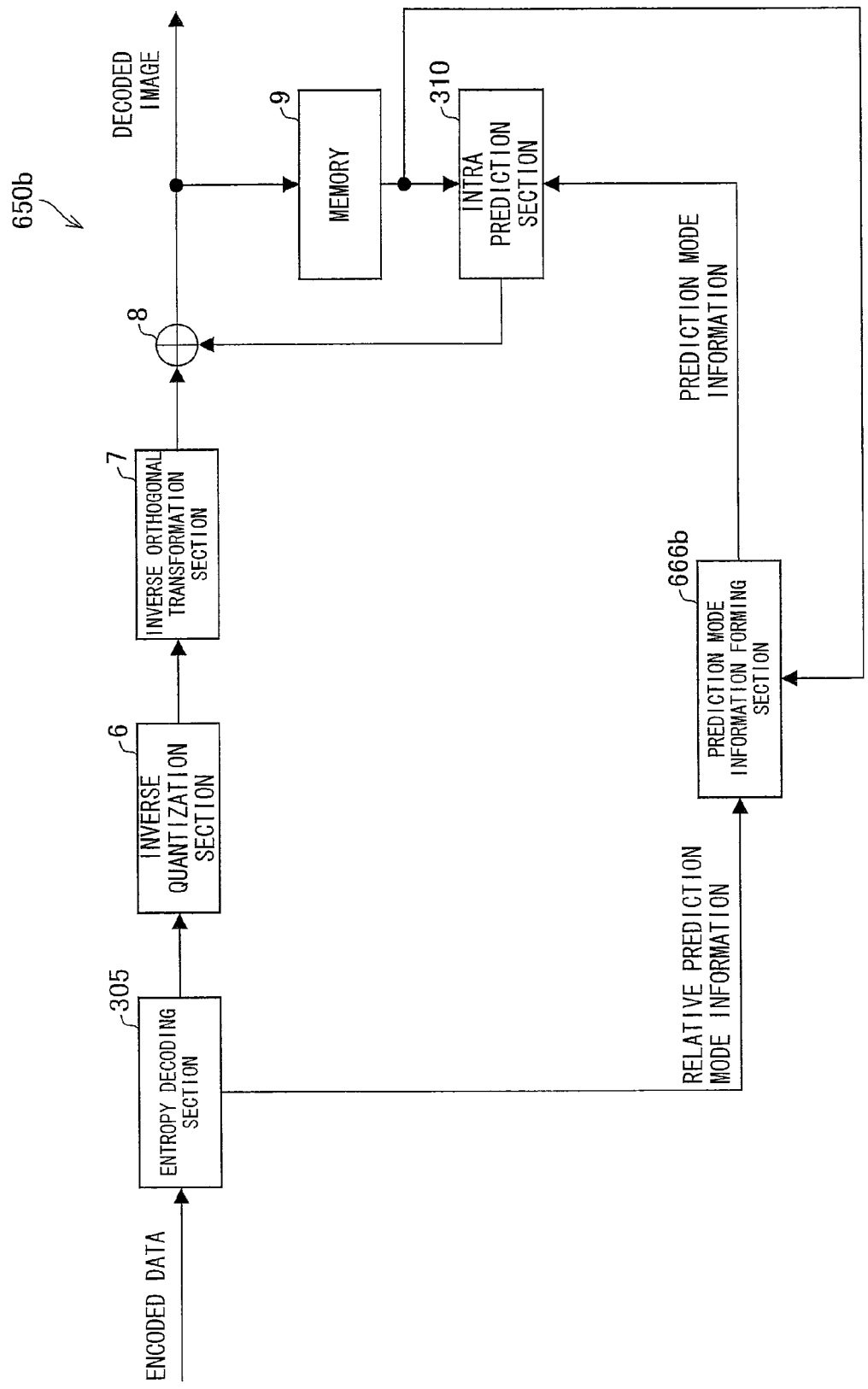
F I G. 5 4

F I G. 6 8
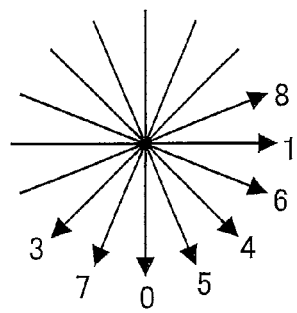
0: Vertical prediction
1: Horizontal prediction
2: DC prediction
3: Diagonal Down Left prediction
4: Diagonal Up Right prediction
5: Vertical Right prediction
6: Horizontal Down prediction
7: Vertical Left prediction
8: Horizontal Up prediction
F I G. 6 9
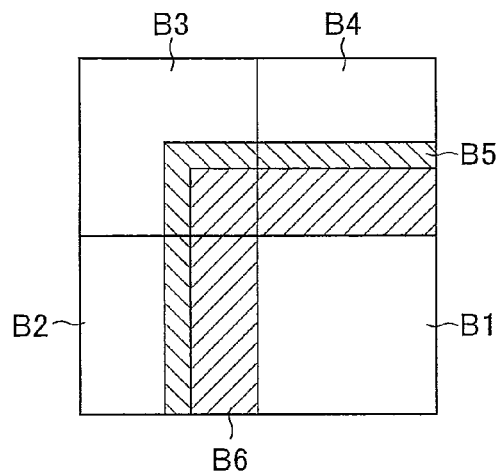
F I G. 7 0
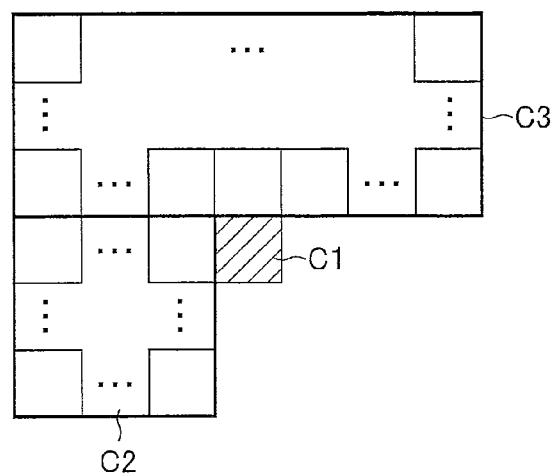

F I G. 7 3
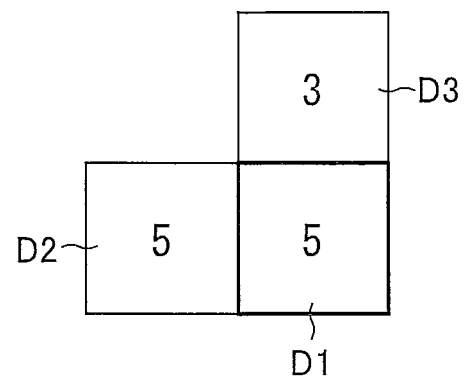

IMAGE ENCODING DEVICE, IMAGE ENCODING METHOD, IMAGE DECODING DEVICE, IMAGE DECODING METHOD, PROGRAM, AND STORAGE MEDIUM

CROSS-REFERENCE TO RELATED APPLICATIONS

This application is a continuation of application Ser. No. 14/109,444, filed on Dec. 17, 2013, which is a Divisional of application Ser. No. 12/667,004, filed on Dec. 28, 2009, which is a National Phase of PCT/JP2008/061672 filed on Jun. 26, 2008, and for which priority is claimed under 35 U.S.C. §120; and these applications claim priority of Application No. JP-2007-268429 filed in Japan on Oct. 15, 2007, and JP-2007-173379 filed in Japan on Jun. 29, 2007 under 35 U.S.C. §119; the entire contents of all are hereby expressly incorporated by reference into the present application.

TECHNICAL FIELD

The present invention relates to an image encoding device, an image encoding method, a program, and a storage medium, each for encoding an image. The present invention also relates to an image decoding device, an image decoding method, a program, and a storage medium, each for decoding an encoded image.

BACKGROUND ART

Image encoding techniques have been applied to many video devices that are familiarly used. Target products to which the techniques are applied may be, for example, DVD for enjoying video contents, such as movies, hard disk recorders in which video contents, such as TV broadcasts, are to be recorded, digital TV encoding systems, DVD cameras, and mobile phones that can carry out image processing. As such, the image encoding techniques are applied very widely.

Non Patent Literature 1 discloses (i) an image encoding device that encodes an image by use of a spatial correlation or a temporal correlation in the image, and (ii) an image decoding device that decodes encoded data that is encoded by the image encoding device. The following explains about techniques of these devices that use the spatial correlation, with reference to FIGS. 65 through 70.

(Arrangement of Image Encoding Device 300)

With reference to FIG. 65, the following describes an image encoding device 300 according to a conventional technique.

FIG. 65 is a block diagram showing essential part of an arrangement of the image encoding device 300 according to the conventional technique. The image encoding device 300 includes a difference computing section 1, an orthogonal transformation section 2, a quantization section 3, an entropy encoding section 304, an inverse quantization section 6, an inverse orthogonal transformation section 7, an addition computing section 8, a memory 9, an intra prediction section 310, and a prediction mode determining section 311 (FIG. 65). The following describes each of the constituent components of the image encoding device 300.

(Difference Computing Section 1)

The difference computing section 1 outputs prediction residual data, which is a difference between a target block to be encoded (M×M pixel block) and a predicted image generated from the intra prediction section 310.

(Orthogonal Transformation Section 2 and Inverse Orthogonal Transformation Section 7)

The orthogonal transformation section 2 carries out orthogonal transformation with respect to the prediction residual data received from the difference computing section 1, and then outputs the resultant. The inverse orthogonal transformation section 7 carries out inverse orthogonal transformation with respect to an orthogonal transform coefficient of the prediction residual data received from the inverse quantization section 6, and outputs the resultant. As a method of the orthogonal transformation and the inverse orthogonal transformation, discrete cosine transform, Hadamard transform, discrete Fourier transform, discrete sine transform, Haar transform, slant transform, or Karhunen-Loeve transform can be used.

(Quantization Section 3 and Inverse Quantization Section 6)

The quantization section 3 carries out quantization with respect to an orthogonal transformation coefficient of the prediction residual data received from the orthogonal transformation section 2, and then outputs the resultant. The inverse quantization section 6 carries out inverse quantization with respect to a quantization coefficient of the prediction residual data received from the quantization section 3, and then outputs the resultant. The quantization and the inverse quantization are carried out by use of scalar quantization or vector quantization.

(Entropy Encoding Section 304)

The entropy encoding section 304 carries out entropy encoding with respect to the prediction residual data and information on an encoding mode, such as a block type, prediction mode information, and a quantization parameter. The "entropy encoding" indicates: (a) variable length coding, such as arithmetic coding, Huffman coding, and Golomb coding; or (b) fixed length coding.

(Addition Computing Section 8)

The addition computing section 8 adds the prediction residual data subjected to the inverse quantization and the inverse orthogonal transformation, to a predicted image generated by the intra prediction section 310 so as to generate a locally decoded image. The addition computing section 8 then output the locally decoded image.

(Memory 9)

The memory 9 receives and then stores the locally decoded image therein.

(Intra Prediction Section 310)

The intra prediction section 310 carries out intra prediction indicated by prediction mode information, by use of a locally decoded image stored in the memory 9, and generates a predicted image. The "intra prediction" indicates prediction in a screen or prediction in a frame, that is, prediction carried out by use of a spatial correlation in the image. At this time, the intra prediction is carried out on a target block (M×M pixel block) to be encoded, by use of 9 types of predetermined prediction methods respectively indicated by Modes 0 Through 8. FIG. 66 shows examples of prediction modes. FIG. 66 shows prediction modes for use in the intra prediction according to the conventional technique. In the examples in FIG. 66, a block size is a 4×4 pixel block. Further, pixels A through M are pixels which have been already encoded and which are used for prediction of the target block to be encoded.

The following describes each of the modes more specifically. Mode 0 carries out a spatial prediction toward a vertical direction with the use of the pixels A through D. Mode 1 carries out the spatial prediction toward a horizontal direction with the use of the pixels I through L. Prediction Mode 2 carries out a DC prediction with the use of the pixels A through D and the pixels I through L. Mode 3 carries out the spatial prediction toward a diagonal down left direction with the use of the pixels A through H. Mode 4 carries out the spatial prediction toward a diagonal down right direction with the use of the pixels A through D and the pixels I through M. Mode 5 carries out the spatial prediction toward a vertical right direction with the use of the pixels A through D, the pixels I through K, and the pixel M. Mode 6 carries out the spatial prediction toward a horizontal down direction with the use of the pixels A through C and the pixels I through M. Mode 7 carries out the spatial direction toward a vertical left direction with the use of the pixels A through E. Mode 8 carries out the spatial prediction toward a horizontal up direction with the use of the pixels I, J, K, and L. The intra prediction section 310 generates prediction pixels by use of a prediction method corresponding to any one of the modes.

(Prediction Mode Determining Section 311)

The prediction mode determining section 311 determines which one of the plurality of prediction modes shown in FIG. 66 is to be used for prediction of the target block to be encoded, based on an inputted original image of the target block to be encoded and a locally decoded image received from the memory 9, and supplies information on a determined prediction mode (hereinafter referred to as prediction mode information) to the intra prediction section 310 and the entropy encoding section 304.

Generally, a method for evaluating a prediction residual cost (hereinafter referred to as a prediction residual cost minimization method) or a rate distortion optimization method is used for determining a prediction mode to be used.

The prediction residual cost minimization method is a method in which (i) a degree of similarity (hereinafter referred to as a prediction residual cost) is found between the inputted original image of the target block to be encoded and a predicted image corresponding to each of the prediction modes, generated on the basis of a locally decoded image received from the memory 9, and then (ii) a prediction mode having the smallest prediction residual cost is selected among the prediction modes. A measure S of the prediction residual cost is represented by any one of the followings: a sum of absolute values of prediction residual data; a square sum of prediction residual data; a sum of absolute values of transform coefficients of prediction residual data; and a square sum of transform coefficients of prediction residual data. These values are calculated by use of the following equations (1) through (4).

Math. 1

$$S = \sum_{i,j \in block} |f(x+i, y+j) - p(x+i, y+j)| \quad (1)$$

$$S = \sum_{i,j \in block} \{f(x+i, y+j) - p(x+i, y+j)\}^2 \quad (2)$$

$$S = \sum_{i,j \in block} |T\{f(x+i, y+j) - p(x+i, y+j)\}| \quad (3)$$

$$S = \sum_{i,j \in block} T\{f(x+i, y+j) - p(x+i, y+j)\}^2 \quad (4)$$

In the equations (1) through (4), f(x, y) indicates an original image, p(x, y) indicates a predicted image, x and y indicate a target block to be encoded, and i and j indicate a position of a pixel in the target block to be encoded. T{ } indicates an orthogonal transformation operation, such as discrete cosine transform, discrete sine transform, and Hadamard transform.

In the rate distortion optimization method, a prediction mode is selected according to the following steps. Initially, predicted images corresponding to the respective prediction modes are generated on the basis of a locally decoded image received from the memory 9. Then, prediction residual data is found from each of the predicted images thus generated and the inputted original image of the target block to be encoded. Subsequently, the prediction residual data thus obtained is temporarily encoded. Then, (a) a prediction error D between the original image of the target block and a decoded image of the target block and (b) an encoding amount R necessary for encoding the target block are calculated with respect to each of the prediction modes. Finally, a prediction mode that minimizes an encoding cost J calculated according to the following equation (5) based on D and R, is selected from the prediction modes.

Math. 2

$$J(mode|q) = D(mode|q) + \lambda(q) \cdot R(mode|q) \quad (5)$$

The prediction error D is an error between prediction residual data that has not been quantized and prediction residual data that has quantized. The encoding amount R is a total of an encoding amount of prediction residual data and an encoding amount of prediction mode information.

In the equation (5), "mode" indicates a prediction mode, and q indicates a quantization parameter. Further, $\lambda$ is a weighting factor dependent on the quantization parameter q, and is generally calculated according to the following equation (6):

Math. 3

$$\lambda(q) = 0.85 \times 2^{(q-12)/3} \quad (6)$$

(Encoding Process of Image Encoding Device 300)

The following describes how the image encoding device 300 operates.

Initially, a target image to be encoded (hereinafter referred to as a target block to be encoded), which is divided into blocks by a predetermined block size (M×M pixel block), is supplied to the image encoding device 300, as an input image.

The prediction mode determining section 311 determines a prediction mode to be used for prediction for the target block to be encoded, in accordance with the prediction residual cost minimization method or the rate distortion optimization method, based on the target block to be encoded and a locally decoded image of an adjacent block that has been already encoded, which locally decoded image is received from the memory 9. The prediction mode determining section 311 then supplies prediction mode information to the intra prediction section 310 and the entropy encoding section 304.

The intra prediction section 310 carries out intra prediction indicated by the prediction mode information thus received, based on the locally decoded image of the adjacent block that has been encoded, which locally decoded image is received from the memory 9, so as to generate a predicted image (M×M pixel block) of the target block to be encoded. The intra prediction section 310 then supplies the predicted image to the difference computing section 1.

Subsequently, the difference computing section 1 calculates prediction residual data that is a difference between the target block to be encoded and the predicted image thus generated, and supplies the prediction residual data to the orthogonal transformation section 2.

The prediction residual data from the difference computing section 1 is supplied to the orthogonal transformation section 2 and then to the quantization section 3 so as to be subjected to orthogonal transformation and then quantization. The prediction residual data is then supplied to the entropy encoding section 304 and to the inverse quantization section 6.

The prediction residual data thus subjected to the orthogonal transformation and the quantization is supplied to the inverse quantization section 6 and then to the inverse orthogonal transformation section 7 so as to be subjected to inverse quantization and inverse orthogonal transformation, respectively. The prediction residual data is then supplied to the addition computing section 8.

The addition computing section 8 combines the prediction residual data thus subjected to the inverse quantization and the inverse orthogonal transformation, with the predicted image corresponding to the prediction mode applied to the target block, so as to synthesize a locally decoded image (M×M pixel block) of the target block. The locally decoded image thus synthesized is then supplied to the memory 9.

The locally decoded image of the target block, which is supplied from the addition computing section 8, is stored in the memory 9, and is used for intra prediction of an adjacent block to be encoded subsequently to the target block.

The entropy encoding section 304 carries out an encoding process, such as variable length coding, with respect to encode parameters, such as the prediction mode information, received from the prediction mode determining section 311 and the prediction residual data subjected to the orthogonal transformation and the quantization. Subsequently, the entropy encoding section 304 outputs encoded data of the target block.

The image encoding device 300 repeats the above process with respect to all target blocks to be encoded, which constitute a target image to be encoded.

As described above, the image encoding device 300 selects a corresponding one of the 9 types of predetermined prediction methods from Modes 0 through 8 illustrated in FIG. 66, depending on a characteristic of an image. This can attain high encoding efficiency. More specifically, the DC prediction of Mode 2 is effective for prediction for a planar image region. Further, Modes 0, 1 , and 3 through 8 are effective for prediction for an image including an edge in a specific direction.

(a) and (b) of FIG. 67 illustrate concrete examples of the intra prediction in the image encoding device 300. (a) of FIG. 67 illustrates an example in which prediction residual data F43 is obtained as a difference between (i) an image F41 having vertical stripes in which edges are formed in a vertical direction and (ii) a predicted image F42 generated, based on a decoded image, according to a vertical direction prediction (Mode 0 in FIG. 66). Further, (b) of FIG. 67 illustrates an example in which prediction residual data F46 is obtained as a difference between (i) an image F44 having diagonal stripes in which edges are formed in a diagonal right direction and (ii) a predicted image F45 generated, based on a decoded image, according to a diagonal down right direction prediction (Mode 4 in FIG. 66).

In the cases of (a) and (b) of FIG. 67, the predicted images F42 and F45 respectively reproduce patterned parts in the images F41 and F44, which are the original images. Therefore, when a difference between the original image and the predicted image is calculated, the patterned part in the original image and the patterned part in the predicted image cancel each other out. As a result, pixels, in the original image, which cannot be subtracted by the predicted image remains as prediction residual data. In (a) and (b) of FIG. 67, a prediction direction is identical with a direction of the pattern in the original image. Consequently, it is possible to effectively reduce the prediction residual data.

(Predictive Encoding Method of Prediction Mode Information)

The following deals with a predictive encoding method of prediction mode information.

The intra prediction of a 4×4 pixel block or a 8×8 pixel block in the image encoding device using a spatial correlation, disclosed in Non Patent Literature 1, uses the 9 types of prediction modes as illustrated in FIG. 68. In Non Patent Literature 1, when prediction mode information of a target block (B1) is encoded, an estimation value is determined in such a manner that (a) a value of a prediction mode applied to a block B2, which is adjacently positioned on the left side of the block B1, and (b) a value of a prediction mode applied to a block B4, which is adjacently positioned on the upper side of the block B1, are compared, and the prediction mode having a smaller value between them is taken as the estimation value. Then, the estimation value is compared with a value of a prediction mode of the block B1. If the values are identical, a flag "1" is encoded. In the other cases, a flag "0" and relative prediction mode information indicative of which one of the remaining 8 types of prediction modes (i.e., the prediction modes except for the estimation value) corresponds to the prediction mode of the block B1 are encoded.

Further, in Patent Literature 1, when the prediction mode information of the target block is encoded, a prediction mode applied to the target block is estimated by use of an estimation value 1 determined by the after-mentioned first prediction means and an estimation value 2 determined by the after-mentioned second prediction means.

The first prediction means determines, as the estimation value 1, a prediction mode that is most used among prediction modes applied to (i) blocks in an encoded region C2 (for example, a macro block, a slice) which is positioned on the left side of a target block C1, or alternatively (ii) blocks in an encoded region C3 which is positioned on the upper side of the target block C1. Further, the second prediction means uses a decoded image in an L-shaped region B5 (a shaded part with diagonal down-right lines) on encoded blocks B2, B3 and B4 which are adjacent to a target block B1, as illustrated in FIG. 69. More specifically, predicted images corresponding to 9 types of intra prediction methods shown in FIG. 68 are generated with respect to a decoded image of an L-shaped region B6 (a shaded part with diagonal down-left lines), with the use of the decoded image of the L-shaped region B5. Then, a prediction mode whose difference between the decoded image of the L-shaped region B6 and the predicted image is smallest among those prediction modes is regarded as an estimation value 2.

(Arrangement of Image Decoding Device 350)

Finally, a conventional image decoding device is described as below with reference to FIG. 71. FIG. 71 is a block diagram showing an arrangement of a conventional image decoding device 350. The image decoding device 350 includes an inverse quantization section 6, an inverse orthogonal transformation section 7, an addition computing section 8, a memory 9, an entropy decoding section 305, and an intra prediction section 310 (FIG. 71). Among these constituent components, the inverse quantization section 6, the inverse orthogonal transformation section 7, the addition computing section 8, the memory 9, and the intra prediction section 310 have been described above. Therefore, the following deals with only the entropy decoding section 305.

(Entropy Decoding Section 305)

The entropy decoding section 305 carries out a decoding process (for example, a variable length decoding process) with respect to encoded data indicative of prediction residual data of a target block to be decoded and encode parameters, such as prediction mode information, of the target block to be decoded.

(Decoding Process of Image Decoding Device 350)

The following describes a decoding process of an image in the image decoding device 350. Initially, the entropy decoding section 305 carries out entropy decoding with respect to received encoded data of the target block to be decoded, and outputs prediction residual data of the target block to be decoded and encode parameters, such as prediction mode information, of the target block to be decoded. The prediction residual data thus decoded is supplied to the inverse quantization section 6 and then to the inverse orthogonal transformation section 7 so as to be subjected to inverse quantization and inverse orthogonal transformation, respectively.

Then, the intra prediction section 310 generates a predicted image (M×M pixel block) of the target block to be decoded with the use of a locally decoded image, stored in the memory 9, of an adjacent block that has been already decoded.

Subsequently, the addition computing section 8 adds the prediction residual data thus subjected to the inverse quantization and the inverse orthogonal transformation, to the predicted image generated by the intra prediction section 310, so as to generate a decoded image of the target block. The memory 9 stores the decoded image (M×M pixel block) thus generated therein. The stored decoded image is used for intra prediction of an adjacent block(s). The image decoding device 350 repeats the above process with respect to all target blocks to be decoded, which constitute a target image to be decoded.

CITATION LIST

Non Patent Literature 1

ISO/IEC 14496-10:2004 Advanced Video Coding

Non Patent Literature 2

Asker M. Bazen, Sabih H. Gerez. "Systematic Methods for the Computation of the Directional Fields and Singular Points of Fingerprints", IEEE Trans. On Pattern Analysis and Machine Intelligence, Vol. 24, No. 7 Jul. 2002

Patent Literature 1

Japanese Patent Application Publication, Tokukai, No. 2007-116351 A (Publication Date: May 10, 2007)

SUMMARY OF INVENTION

The intra prediction in the conventional image encoding device 300 causes a problem that efficiency in prediction decreases. The concrete examples of this problem are illustrated in (a) and (b) of FIG. 72. (a) of FIG. 72 illustrates an example in which prediction residual data F53 is obtained as a difference between an image F51 having vertical stripes and a predicted image F52 generated, based on a decoded image, according to a vertical direction prediction (Mode 0 in FIG. 66). Further, (b) of FIG. 72 illustrates an example in which prediction residual data F56 is obtained as a difference between (i) an image F54 having diagonal stripes in which edges are formed in a diagonal right direction and (ii) a predicted image F55 generated, based on a decoded image, according to a diagonal down right direction prediction (Mode 4 in FIG. 66).

In either of the cases of (a) and (b) of FIG. 72, the predicted image F52 or F55 reproduces only a part of a patterned part in the image F51 or F54, which is the original image. Further, pixels that are not formed in the original image are formed in the predicted image. Consequently, resultant prediction residual data includes not only pixels that cannot be subtracted by the prediction image, but also the pixels that are not formed in the original image.

A prediction residual cost of the prediction residual data F43 in (a) of FIG. 67 is "1275" according to the equation (1). On the other hand, a prediction residual cost of the prediction residual data F53 in (a) of FIG. 72 is "5355". That is, the latter one is larger.

Further, a prediction residual cost of the prediction residual data F43 in (b) of FIG. 67 is "765". On the other hand, a prediction residual cost of the prediction residual data F56 in (b) of FIG. 72 is "4845". That is, when these costs are compared by use of their sums of absolute values, it is found that the latter one is larger.

Generally, the more the prediction residual cost becomes, the more the encoding amount necessary for encoding the prediction residual data increases. As a result, in the cases of (a) and (b) of FIG. 72, the efficiency in prediction decreases.

More specifically, the conventional image encoding device has a problem that the efficiency in prediction decreases in cases where a direction of a pattern (edge) of a target image to be predicted is different from any of the prediction directions of the prediction methods Mode 0 through 8.

The present invention is accomplished in view of the above problem. A main object of the present invention is to provide an image encoding device, an image encoding method, a program, and a storage medium, each of which can carry out predictions from more various angles, thereby improving the efficiency in prediction. Further, another object of the present invention is to provide an image decoding device and an image decoding method, each of which decodes an image encoded by use of any of the image encoding device, the image encoding method, the program, and the storage medium.

In the case of Non Patent Literature 1, an estimation value of a prediction mode depends on which value is smaller between the values of the prediction modes of the adjacent blocks. Therefore, in FIG. 69, it cannot be arbitrarily determined which is selected as the estimation value for the target block B1, (a) the prediction mode of the left block B2 or (b) the prediction mode of the upper block B4, either of which is adjacent to the target block B1. As a result, the correlations between the target block B1 and the adjacent blocks B2 and B4 cannot be utilized sufficiently, and therefore prediction accuracy is low, which increases the encoding amount necessary for the prediction mode of the target block B1.

This problem is described below with reference to FIG. 73. More specifically, the problem is described with an example in which fixed length coding is carried out by 4 bits in total, that is, (i) 3 bits of relative prediction mode information indicative of which one corresponds to a prediction mode of a target block, among the remaining 8 types of prediction modes (the prediction modes except for the estimation value, in FIG. 68), and (ii) 1 bit of either a flag "1" if the prediction mode of the target block is identical with an estimation value or a flag "0" if the prediction mode is not identical with the estimation value.

FIG. 73 illustrates an example in which predictive encoding is carried out where a prediction mode of a target block D1 is "5", a prediction mode of an adjacent left block D2 is "5", and a prediction mode of an adjacent upper block D3 is "3". In FIG. 73, an estimation value of a prediction mode for the target block D1 is "3", which is a smaller value between the prediction modes of the left block D2 and the upper block D3. Since the estimation value is different from the prediction mode of the target block, encoding of the prediction mode "5" of the target block D1 requires 4 bits. However, if the prediction mode "5" of the left block D2 can be selected as the estimation value, the encoding amount is just 1 bit.

In Patent Literature 1, in order that the first prediction means determines an estimation value 1, it is necessary to store and retain all prediction modes that are used in the encoded region C2 or C3, illustrated in FIG. 70, which requires more memory. Moreover, as has been described above, in order that the second prediction means determines an estimation value 2, it is necessary to generate the predicted images again according to the intra prediction methods shown in FIG. 68 and to calculate differences between the predicted images and the decoded image. This causes a problem that a calculation amount increases.

The present invention is accomplished in view of these problems. A main object of the present invention is to provide an image encoding device, an image decoding device, an image encoding method, an image decoding method, a program, and a storage medium, each of which can efficiently reduce an encoding amount related to a prediction mode.

In order to achieve the above object, a first image encoding device according to the present invention is an image encoding device for encoding an input image and includes: first selecting means for selecting one prediction set per predetermined unit of the input image from a prediction set group including a plurality of prediction sets each including a plurality of different prediction modes corresponding to respective prediction directions and respective prediction methods; second selecting means for selecting one prediction mode per sub block in a predetermined unit from a plurality of prediction modes included in a prediction set selected by the first selecting means for the predetermined unit; predicting means for forming a predicted image per sub block by use of the prediction set thus selected for the predetermined unit and the prediction mode thus selected per sub block; and encoding means for encoding residual data between the input image and a predicted image, the prediction set thus selected for the predetermined unit, and the prediction mode thus selected per sub block.

In the arrangement, the image encoding device selects a prediction set and a prediction mode from a prediction set group including a plurality of prediction sets having different combinations of a plurality of prediction modes corresponding to different prediction directions. The image encoding device then encodes an image by use of the prediction set and prediction mode thus selected. The arrangement allows the image encoding device to carry out predictions from more various angles than the conventional technique, thereby successfully reducing an encoding amount of the image and improving image quality.

Further, in the image encoding device, a prediction mode is expressed in a hierarchical manner with prediction set information and prediction mode information. As a result, a prediction method can be selected in a more flexible manner, thereby making it advantageously possible to prevent an increase in an encoding amount necessary for the prediction method and to improve efficiency in prediction.

In order to achieve the above object, an image encoding method according to the present invention is an image encoding method for encoding an input image and includes: the first selecting step of selecting one prediction set per predetermined unit of the input image from a prediction set group including a plurality of prediction sets each including a plurality of different prediction modes corresponding to respective prediction directions and respective prediction methods; the second selecting step of selecting one prediction mode per sub block included in a predetermined unit from a plurality of prediction modes included in a prediction set selected for the predetermined unit in the first selecting step; the predicting step of forming a predicted image per sub block by use of the prediction set thus selected for the predetermined unit and the prediction mode thus selected per sub block; and the encoding step of encoding residual data between the input image and a predicted image, the prediction set thus selected for the predetermined unit, and the prediction modes thus selected per sub block.

With the arrangement, it is possible to obtain the same effects as the first image encoding device according to the present invention.

It is preferable that a second image encoding device according to the present invention further include calculating means for calculating edge information at least on an edge orientation of an edge per constituent image of the input image.

In the arrangement, the image encoding device calculates edge information per predetermine unit image constituting an image. As the edge information, an edge orientation of the image and/or an edge strength of the image, or distribution information thereof are/is calculated, for example. That is, the second image encoding device selects, from a prediction set group, a prediction set suited to the edge information thus calculated and then selects a prediction mode suited to the edge information from the prediction set thus selected. For example, in the case where the edge information indicates that the edge inclines in a horizontal direction, the second image encoding device carries out encoding by use of a prediction set that focuses on predictions in the horizontal direction. On the other hand, in the case where the edge orientation indicates that the edge inclines in a vertical direction, the second image encoding device carries out encoding by use of a prediction set that focuses on predictions in the vertical direction.

As such, the second image encoding device encodes an image by use of a prediction set most suited to edge information of the image. As a result, it is possible to carry out predictions from more various angles than the conventional technique, thereby successfully reducing an encoding amount of the image and improving image quality.

It is preferably that a second image encoding method according to the present invention further include the calculating step of calculating edge information at least on an edge orientation of an edge per constituent image of the input image.

With the arrangement, it is possible to obtain the same effects as the second image encoding device according to the present invention.

It is preferable a third image encoding device according to the present invention further include setting means for setting a prediction set and a prediction mode, based on the edge information, respectively from the plurality of prediction sets included in the prediction set group and from a plurality of different prediction modes included in the prediction set thus set; and encoding means for encoding information on a prediction direction and a prediction method corresponding to the prediction mode thus set in the prediction set thus set.

In the above arrangement, the image encoding device calculates edge information per constituent frame of an image. For example, as the edge information, an edge orientation of the image and/or an edge strength of the image, or distribution information thereof are/is calculated. The image encoding device determines a plurality of prediction directions efficiently approximate to the edge orientation based on the distribution information on the edge orientation, so as to determine a combination of prediction modes in each prediction set.

For example, in the case where the distribution information on the edge orientation indicates that edges are formed mainly in a horizontal direction, a plurality of prediction sets each having a combination of optimal prediction modes in which predictions in the horizontal direction are set finely and predictions in a vertical direction are set roughly are automatically determined. Then, the image encoding device encodes the image by changing a prediction set from the plurality of prediction sets suited to the predictions in the horizontal direction, depending on an edge orientation of a target block to be encoded. On the other hand, in the case where the distribution information on the edge orientation indicates that edges are formed mainly in a vertical direction, a plurality of prediction sets having a combination of optimal prediction modes in which predictions in the vertical direction are set finely and predictions in the horizontal direction are set roughly are automatically determined.

Then, the image encoding device can encode the image by changing a prediction set from the plurality of prediction sets suited to the predictions in the vertical direction, depending on an edge orientation of a target block to be encoded.

That is, the image encoding device forms a plurality of prediction sets by automatically combining prediction modes in each of the plurality of prediction sets according to an image so that the plurality of prediction sets are optimal to the image, and selects a prediction set suitable for an edge orientation of a target block to be encoded from the plurality of prediction sets. This makes it advantageously possible to more improve efficiency in prediction than a case where a predetermined prediction set is used.

It is preferable that a third image encoding method according to the present invention include: the setting step of setting a prediction set and a prediction mode, based on the edge information, respectively from the plurality of prediction sets included in the prediction set group and from a plurality of different prediction modes included in the prediction set thus set; and the encoding step of encoding information on respective prediction directions and respective prediction methods corresponding to the prediction modes thus set in the prediction set thus set.

With the arrangement, it is possible to obtain the same effects as the third image encoding device according to the present invention.

In order to achieve the above object, a first image decoding device according to the present invention is an image decoding device for decoding encoded data of an image and includes: decoding means for decoding, from the encoded data, (i) a prediction set per predetermined unit of the image according to prediction sets each including a plurality of prediction modes corresponding to different prediction directions and different prediction methods, and (ii) a prediction mode and residual data each per sub block included in a predetermined unit; predicting means for forming a predicted image per sub block by use of a prediction set decoded for the predetermined unit and the prediction mode thus decoded per sub block; and adding means for adding the residual data thus decoded per sub block and the predicted image thus formed per sub block.

In the arrangement, the image decoding device includes a prediction set group including a plurality of prediction sets having different combinations of a plurality of prediction modes corresponding to different prediction directions. The image decoding device decodes prediction set information indicative of which prediction set in a prediction set group is applied to a target block to be decoded, which is a constituent image of an image, from the prediction set group on the basis of relative prediction set information and prediction set information that has been already decoded. Then, the image decoding device carries out intra prediction with respect to a target sub block constituting the target block (the target block is subdivided into sub blocks), by use of a locally decoded image of a sub block adjacent to the target sub block. The intra prediction thus carried out is defined by the prediction set information to be applied to all the sub blocks in the target block and prediction mode information decoded for the target sub block. The image decoding device then generates a predicted image of the target sub block and combines the predicted image and decoded prediction residual data of the target sub block, so as to reconstruct an image of the target sub block.

For example, in the case where the prediction set information indicates a prediction set that focuses on predictions in a horizontal direction, it is possible to generate predicted images from more specific angles with the horizontal direction as a center. Further, in the case where the prediction set information indicates a prediction set that focuses on predictions in a vertical direction, it is possible to generate predicted images from more specific angles with the vertical direction as a center.

This arrangement allows the image decoding device to carry out a decoding process by use of predictions from more various angles than the conventional technique, thereby reproducing an edge portion more efficiently. As a result, it is advantageously possible to improve image quality.

Further, the image decoding device carries out prediction at two stages of a prediction set and a prediction mode, thereby realizing high accuracy in prediction and preventing an increase in an encoding amount.

In order to achieve the above object, a first image decoding method according to the present invention is an image decoding method for decoding encoded data of an image and includes: the decoding step of decoding, from the encoded data, (i) a prediction set per predetermined unit of the image according to prediction sets each including a plurality of prediction modes corresponding to different prediction directions and different prediction methods, and (ii) a prediction mode and residual data each per sub block included in a predetermined unit; the predicting step of forming a predicted image per sub block by use of a prediction set decoded for the predetermined unit and the prediction mode thus decoded per sub block; and the adding step of adding the residual data thus decoded per sub block and the predicted image thus formed per sub block.

With the arrangement, it is possible to obtain the same effects as the first image decoding device according to the present invention.

It is preferable that a second image decoding device according to the present invention further include: decoding means for decoding information on a prediction direction and a prediction method corresponding to the prediction mode thus decoded in the prediction set thus decoded; and setting means for setting the prediction direction thus decoded and the prediction method thus decoded to the prediction mode in the prediction set.

In the above arrangement, the image decoding device forms prediction set definition information indicative of prediction methods to be assigned to respective prediction modes in a plurality of prediction sets to be applied to a target frame to be decoded in encoded data of an image, on the basis of relative prediction set definition information and prediction set information that has been already decoded. Then, the image decoding device decodes a prediction set per block (M×M pixel block) in the target frame to be decoded. Further, the image decoding device carries out intra prediction with respect to a target sub block (N×N pixel block) in a target block, by use of a locally decoded image of a sub block adjacent to the target sub block and by referring to the prediction set definition information. The intra prediction is defined by prediction set information to be commonly applied to all sub blocks constituting the target block and prediction mode information decoded for the target sub block, and is carried out per sub block in the target block. Subsequently, the image decoding device generates a predicted image of the target sub block. Finally, the image decoding device combines the predicted image thus generated and decoded prediction residual data of the target sub block, so as to reconstruct an image of the target sub block.

As a result, in the case where the prediction set definition information indicates a prediction set definition that focuses on predictions in a horizontal direction, it is possible to generate predicted images from more specific angles with the horizontal direction as a center. Further, in the case where the prediction set definition information indicates a prediction set that focuses on predictions in a vertical direction, it is possible to generate predicted images from more specific angles with the vertical direction as a center.

As a result, the image decoding device can appropriately define prediction modes in a plurality of prediction sets in accordance with an image, and can carry out prediction optimal for an edge orientation of a target block to be encoded, from thus defined prediction modes. This makes it advantageously possible to more improve efficiency in prediction as compared to a case where a predetermined prediction set is used.

Further, a prediction method is expressed in a hierarchical manner with a prediction set and a prediction mode, thereby resulting in that the efficiency in prediction can be improved without increasing an encoding amount.

It is preferable that a second image decoding method according to the present invention further include the decoding step of decoding information on a prediction direction and a prediction method corresponding to the prediction mode thus decoded in the prediction set thus decoded; and the setting step of setting the prediction directions thus decoded and the prediction methods thus decoded to the prediction mode in the prediction set.

With the arrangement, it is possible to obtain the same effects as the second image decoding device according to the present invention.

It is preferable that a fourth image encoding device according to the present invention further include: first determining means for determining a reference direction in which an encoded adjacent sub block to be referred to at a time of estimating a prediction mode of a target sub block to be encoded is positioned; first estimating means for determining an estimation value of a prediction mode for the target sub block based on a selected prediction set of the target sub block and a prediction mode of an encoded adjacent sub block that is specified by the reference direction; generating means for generating relative information of the prediction mode of the target sub block with respect to the estimation value thus determined; and encoding means for encoding the relative information thus generated and the reference direction thus determined.

In the arrangement, the image encoding device selects a prediction set and a prediction mode from a prediction set group including a plurality of prediction sets having different combinations of a plurality of prediction modes corresponding to different prediction directions. The image encoding device then encodes an image by use of the prediction set thus selected and the prediction mode thus selected. This arrangement makes it possible to carry out predictions from more various angles than the conventional technique. As a result, it is advantageously possible to reduce an encoding amount of the image more, and to improve image quality.

Further, the arrangement allows the image encoding device to select an encoded adjacent sub block to be used for estimation of a prediction mode, thereby improving efficiency in estimation of a prediction mode and to efficiently reduce an encoding amount necessary for the prediction mode.

It is preferable that a fourth image encoding method according to the present invention further include: the first determining step of determining a reference direction in which an encoded adjacent sub block to be referred to at a time of estimating a prediction mode of a target sub block to be encoded is positioned the first estimating step of determining an estimation value of a prediction mode for the target sub block based on a selected prediction set of the target sub block and a prediction mode of an encoded adjacent sub block that is specified by the reference direction the generating step of generating relative information of the prediction mode of the target sub block with respect to the estimation value thus determined; and the encoding step of encoding the relative information thus generated and the reference direction thus determined.

With the above arrangement, it is possible to obtain the same effects as the fourth image encoding device according to the present invention.

It is preferable that a fourth image decoding device according to the present invention further include: decoding means for decoding relative information on a prediction mode and a reference direction indicative of a direction in which a decoded adjacent sub block to be referred to at a time of estimating a prediction mode of a target sub block to be decoded is positioned; first estimating means for determining an estimation value of a prediction mode for the target sub block based on a decoded prediction set of the target sub block and a prediction mode of an decoded adjacent sub block that is specified by the reference direction thus decoded; and decoding means for decoding a prediction mode to be applied to the target sub block on the basis of the estimation value thus determined and the decoded relative information on a prediction mode.

In the arrangement, the image decoding device includes a prediction set group including a plurality of prediction sets having different combinations of prediction modes corresponding to different prediction directions. The image decoding device decodes prediction set information indicative of which prediction set in the prediction set group is to be applied to a target block to be decoded in constituent blocks of an image, according to relative prediction set information and prediction set information that has been already decoded. Then, the image decoding device carries out intra prediction per sub block into which the target block is subdivided. The intra prediction is defined by the prediction set information to be commonly applied to all sub blocks in the target block and prediction mode information decoded for a target sub block, and carried out by use of a locally decoded image of a sub block adjacent to the target sub block, so as to generate a predicted image of the target sub block. Then, the image decoding device combines the predicted image and decoded prediction residual data of the target sub block, so as to reconstruct an image of the target sub block.

For example, in the case where the prediction set information indicates a prediction set that focuses on predictions in a horizontal direction, it is possible to generate predicted images from more specific angles with the horizontal direction as a center. Further, in the case where the prediction set information indicates a prediction set that focuses on predictions in a vertical direction, it is possible to generate predicted images from more specific angles with the vertical direction as a center.

This arrangement allows the image decoding device to carry out a decoding process with the use of predictions from more various angles than the conventional technique. As a result, it is possible to reproduce an edge portion more efficiently, thereby improving image quality.

Further, with the arrangement, the image decoding device can select a decoded adjacent sub block to be used for estimation of a prediction mode, thereby improving efficiency in estimation of a prediction mode and efficiently reducing an encoded amount of the prediction mode, which is to be decoded.

It is preferable that a fourth image decoding method according to the present invention further include: the decoding step of decoding relative information on a prediction mode and a reference direction indicative of a direction in which a decoded adjacent sub block to be referred to at a time of estimating a prediction mode of a target sub block to be decoded is positioned; the first estimating step of determining an estimation value of a prediction mode for the target sub block based on a decoded prediction set of the target sub block and a prediction mode of an decoded adjacent sub block that is specified by the reference direction thus decoded; and the decoding step of decoding the prediction mode to be applied to the target sub block on the basis of the estimation value thus determined and the decoded relative information on a prediction mode.

With the above arrangement, it is possible to obtain the same effects as the fourth image decoding device according to the present invention.

It is preferable that a fifth image encoding device according to the present invention further include third selecting means for selecting one prediction set group to be applied to a target block to be encoded, from a plurality of different prediction set groups based on a predetermined evaluation standard.

In the arrangement, the image encoding device includes a plurality of different prediction set groups each including a plurality of prediction set having different combinations of a plurality of prediction modes corresponding to different prediction directions, and selects a prediction set group, a prediction set, and a prediction mode from the plurality of different prediction set groups. The image encoding device then encodes an image by use of the selected prediction set group, the selected prediction set, and the selected prediction mode. This arrangement allows the image encoding device to carry out predictions from more various angles than the conventional technique, thereby advantageously possible to reduce an encoding amount of the image and to improve image quality.

It is preferable that a fifth image encoding method according to the present invention further include the third selecting step of selecting one prediction set group to be applied to a target block to be encoded, from a plurality of different prediction set groups based on a predetermined evaluation standard.

With the arrangement, it is possible to obtain the same effects as the fifth image encoding device according to the present invention.

It is preferable that a fifth image decoding device according to the present invention further include third selecting means for selecting one prediction set group to be applied to a target block to be decoded, from a plurality of different prediction set groups based on a predetermined evaluation standard.

In the arrangement, the image decoding device includes a plurality of different prediction set groups each including a plurality of prediction sets having different combinations of prediction modes corresponding to respective prediction directions different from each other. The image decoding device determines which prediction set group is to be applied to a target block to be decoded in an image, from the plurality of prediction set groups, based on a predetermined evaluation standard. The image decoding device determines a prediction set group per constituent block of the image. The image decoding device then decodes prediction set information indicative of which prediction set in the determined prediction set group is to be applied to the target block to be decoded, on the basis of relative prediction set information and prediction set information that has been already decoded. Subsequently, the image decoding device carries out intra prediction per sub block into which the target block is subdivided. The intra prediction is defined by the prediction set information to be commonly applied to all sub blocks in the target block and prediction mode information decoded for a target sub block, and is carried out by use of a locally decoded image of a sub block adjacent to the target sub block, so as to generate a predicted image of the target sub block. The image decoding device then combines the predicted image and decoded prediction residual data of the target sub block, so as to reconstruct an image of the target sub block.

This arrangement allows the image decoding device to carry out a decoding process with the use of predictions from more various angles, thereby making it possible to reproduce an edge portion more efficiently. As a result, it is advantageously possible to improve image quality.

It is preferable that a fifth image decoding method according to the present invention further include the third selecting step of selecting one prediction set group to be applied to a target block to be decoded, from a plurality of different prediction set groups based on a predetermined evaluation standard.

With the above arrangement, it is possible to obtain the same effects as the fifth image decoding device according to the present invention.

In order to achieve the above object, a sixth image encoding device according to the present invention is an image encoding device for encoding an input image and includes: first selecting means for selecting one prediction mode per sub block included in a predetermined unit of the input image, from one prediction set including a plurality of different prediction modes corresponding to respective prediction directions and respective prediction methods predicting means for forming a predicted image per sub block by use of the prediction set and the prediction mode thus selected per sub block; and encoding means for encoding residual data between the input image and a predicted image, and the prediction mode thus selected per sub block, the encoding means including: first determining means for determining, based on a predetermined evaluation standard, an encoded adjacent sub block to be used for estimation for the prediction mode thus selected per sub block; first estimating means for determining an estimation value of a prediction mode for a target sub block to be encoded, based on a prediction mode of the encoded adjacent sub block thus determined; generating means for generating relative information of the prediction mode thus selected per sub block, with respect to the estimation value thus determined; and encoding means for encoding the relative information thus generated.

The arrangement allows the image encoding device to estimate a prediction mode for a target sub block to be encoded, with the use of an encoded adjacent sub block that is most correlated with the target sub block. This improves efficiency in estimation of a prediction mode and efficiently reduces an encoding amount necessary for the prediction mode, thereby resulting in that efficiency in encoding is further improved as compared to the conventional technique.

In order to achieve the above object, a sixth image encoding method according to the present invention is an image encoding method for encoding an input image and includes: the first selecting step of selecting one prediction mode per sub block included in a predetermined unit from a plurality of different prediction modes included in one prediction set, the plurality of different prediction modes corresponding to respective prediction direction and respective prediction methods; the predicting step of forming a predicted image per sub block by use of the prediction set and the prediction mode thus selected per sub block; and the encoding step of encoding residual data between the input image and the predicted image thus formed per sub block and the prediction mode thus selected per sub block, the encoding step including: the first determining step of determining, based on a predetermined evaluation standard, an encoded adjacent sub block to be used for estimation for the prediction mode thus selected per sub block; the first estimating step of determining an estimation value of a prediction mode for a target sub block to be encoded, based on a prediction mode of the encoded adjacent sub block thus determined; the generating step of generating relative information of the prediction mode thus selected per sub block, with respect to the estimation value thus determined; and the encoding step of encoding the relative information thus generated.

With the arrangement, it is possible to obtain the same effects as the sixth image encoding device according to the present invention.

In order to achieve the above object, a sixth image decoding device according to the present invention is an image decoding device for decoding encoded data of an image and includes: decoding means for decoding, from the encoded data, a prediction mode and residual data each per sub block included in a predetermined unit of the image, according to one prediction set including a plurality of prediction modes corresponding to different prediction directions and different prediction methods predicting means for forming a predicted image per sub block by use of the prediction mode thus decoded per sub block; and adding means for adding the residual data thus decoded per sub block and the predicted image thus formed per sub block, the decoding means including: decoding means for decoding relative information on a prediction mode; first determining means for determining a decoded adjacent sub block to be used for estimation of the prediction mode, based on a predetermined evaluation standard; first estimating means for determining an estimation value of a prediction mode for a target sub block to be decoded, based on a prediction mode of the decoded adjacent sub block thus determined; and decoding means for decoding the prediction mode of the target sub block on the basis of the estimation value thus determined and the decoded relative information on a prediction mode.

The arrangement allows the image decoding device to estimate a prediction mode for a target sub block to be decoded, with the use of a decoded adjacent sub block that is most correlated with the target sub block, thereby improving efficiency in estimation of a prediction mode and efficiently reducing an encoded amount of the prediction mode, which is to be decoded. As a result, it is possible to further improve efficiency in decoding as compared to the conventional technique.

In order to achieve the above object, a sixth image decoding method according to the present invention is an image decoding method for decoding encoded data of an image and includes: the decoding step of decoding, from the encoded data, a prediction mode and residual data each per sub block included in a predetermined unit of the image, according to one prediction set including a plurality of prediction modes corresponding to different prediction directions and different prediction methods; the predicting step of forming a predicted image per sub block by use of the prediction mode thus decoded per sub block; and the adding step of adding the residual data thus decoded per sub block and the predicted image thus formed per sub block, the decoding step including: the adding step of adding the residual data thus decoded per sub block and the predicted image thus formed per sub block; the first determining step of determining a decoded adjacent sub block to be used for estimation of the prediction mode, based on a predetermined evaluation standard; the first estimating step of determining an estimation value of a prediction mode for a target sub block to be decoded, based on a prediction mode of the decoded adjacent sub block thus determined; and the decoding step of decoding the prediction mode of the target sub block on the basis of the estimation value thus determined and the decoded relative information on a prediction mode.

With the above arrangement, it is possible to obtain the same effects as the sixth image decoding device according to the present invention.

The image encoding device and the image decoding device may be realized by a computer. In this case, a program that realizes the image encoding device or the image decoding device in a computer by causing the computer to function as each means described above, and a computer-readable storage medium in which the program is stored are also included in the scope of the present invention.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 is a block diagram showing essential part of an arrangement of an image encoding device according to Embodiment 1.

FIG. 8 is a block diagram showing an arrangement of a relative prediction set information forming section in an image encoding device according to Embodiment 1.

FIG. 11 illustrates how to generate a predicted image from a prediction direction θ.

FIG. 12 illustrates examples of a reference pixel region to be used for generating a predicted image from a prediction direction θ. (a) of FIG. 12 illustrates a case where K=2 and L=2L, (b) of FIG. 12 illustrates a case where K=N and L=2N, (c) of FIG. 12 illustrates a case where K=2N and L=N, (d) of FIG. 12 illustrates a case where K=N and L=N, (e) of FIG. 12 illustrates a case where K=0 and L=2N, and (f) of FIG. 12 illustrates a case where K=N and L=0.

FIG. 14 is a block diagram showing essential part of an arrangement of an image decoding device according to Embodiment 2.

FIG. 16 is a block diagram showing an arrangement of a prediction set information forming section in an image decoding device according to Embodiment 2.

FIG. 20 is a flowchart specifically showing a process of determining prediction set information.

FIG. 21 shows an edge orientation histogram of a case where edges are oriented mostly in a horizontal direction.

FIG. 28 is a block diagram showing an arrangement of a prediction set definition information forming section in an image decoding device according to Embodiment 4.

FIG. 34 illustrates reference sub block directions according to a reference direction combination table.

FIG. 36 is a flowchart specifically showing a process of generating relative prediction mode information.

FIG. 37 is a flowchart showing a process of determining encode parameters (s, p, M).

FIG. 40 is a flowchart schematically showing an image decoding process according to Embodiment 6.

FIG. 41 is a flowchart specifically showing a process of generating prediction mode information.

FIG. 42 is a block diagram showing essential part of an arrangement of an image encoding device according to Embodiment 7.

FIG. 44 illustrates a target sub block and encoded sub blocks positioned around the target sub block.

FIG. 45 is a flowchart schematically showing an image encoding process according to Embodiment 7.

FIG. 47 is a flowchart specifically showing a process of generating relative prediction mode information.

FIG. 48 is a block diagram showing essential part of an arrangement of a modified example of an image encoding device according to Embodiment 7.

FIG. 54 is a block diagram illustrating essential part of an arrangement of a modified example of an image decoding device according to Embodiment 8.

FIG. 68 illustrates prediction modes in intra prediction for a 4×4 pixel block and a 8×8 pixel block.

FIG. 69 illustrates a positional relation between a target block and its adjacent blocks.

FIG. 70 illustrates a positional relation between a target block and encoded regions.

FIG. 73 illustrates a case where prediction encoding is carried out with respect to a prediction mode of a target block D1 on the basis of a prediction mode of an adjacent left block D2 and a prediction mode of an adjacent upper block D3.

REFERENCE SIGNS LIST

Figure 2:
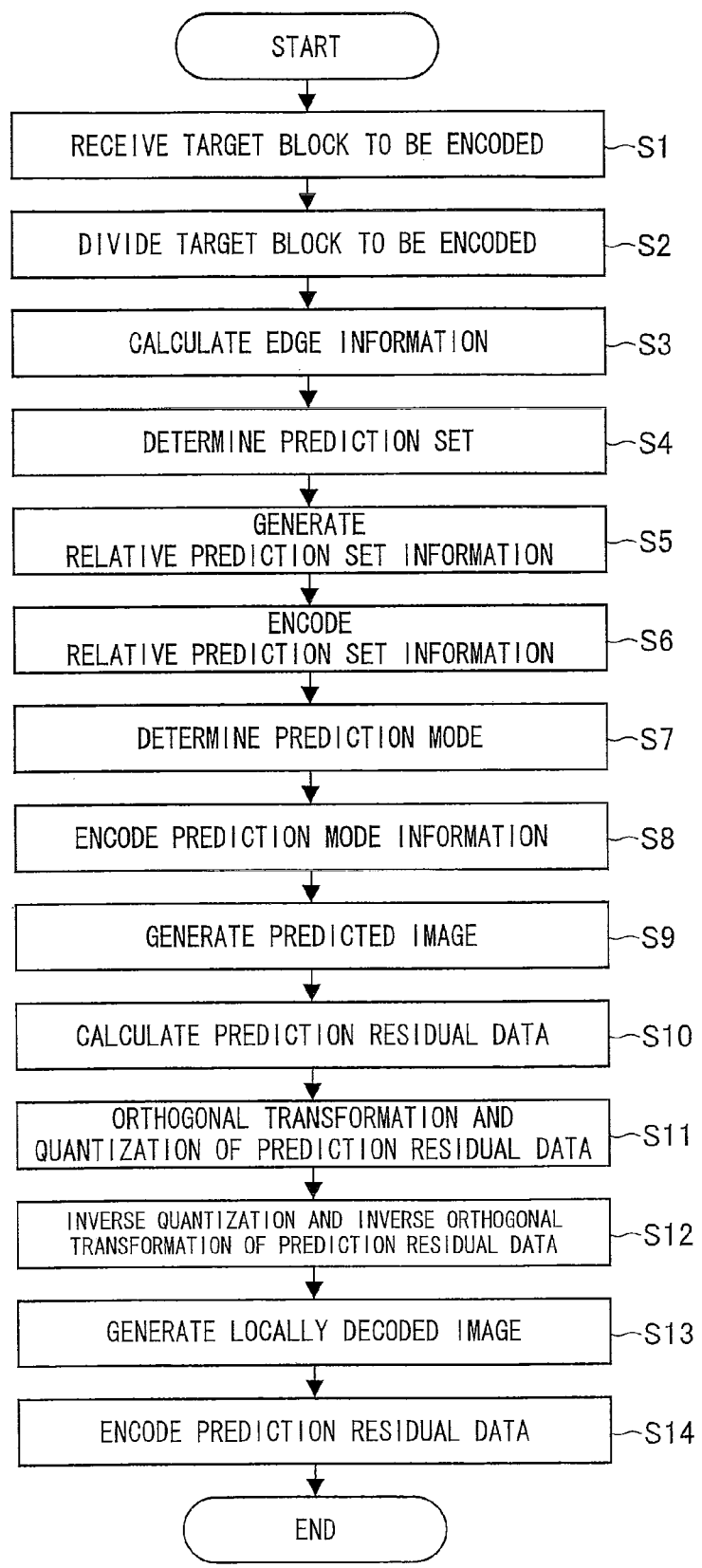
FIG. 2 is flowchart schematically showing an image encoding process according to Embodiment 1.

1 Difference Computing Section
2 Orthogonal Transformation Section
3 Quantization Section
4 Entropy Encoding Section (Encoding Means)
5 Entropy Decoding Section (Decoding Means)
6 Inverse Quantization Section
7 Inverse Orthogonal Transformation Section
8 Addition Computing Section
9 Memory
10 Intra Prediction Section (Encoding Means, Decoding Means)
11 Prediction Mode Determining Section (Second Selecting Means)
12 Edge Analysis Section (Calculating Means)
13 Prediction Set Determining Section (First Selecting Means)
14 Encode Parameter Determining Section (Selecting Means)
15 Prediction Set Group Selecting Section (Selecting Means)
51 Relative Prediction Set Information Forming Section (Encoding Means)
52 Prediction Set Information Forming Section (Decoding Means)
53 Relative Prediction Set Definition Information Forming Section (Encoding Means)
54 Prediction Set Definition Information Forming Section (Decoding Means)
61 Relative Prediction Mode Information Forming Section (Encoding Means)
62 Prediction Mode Information Forming Section (Decoding Means)
100 Image Encoding Device
150 Image Decoding Device
200 Image Encoding Device
204 Entropy Encoding Section (Encoding Means)
205 Entropy Decoding Section (Decoding Means)
210 Intra Prediction Section (Encoding Means, Decoding Means)
211 Prediction Mode Determining Section (Second Selecting Means)

212 Edge Analysis Section (Calculating Means)
213 Prediction Set Determining Section (First Selecting Means)
214 Prediction Set Definition Determining Section
250 Image Decoding Device
300 Image Encoding Device
304 Entropy Encoding Section (Encoding Means)
305 Entropy Decoding Section
310 Intra Prediction Section
311 Prediction Mode Determining Section
350 Image Decoding Device
500 Image Encoding Device
504 Entropy Encoding Section
505 Entropy Decoding Section
511 Relative Prediction Set Information Generation Section
512 Prediction Set Information Predicting Section
513 Prediction Set Information Storing Section
521 Prediction Set Information Generation Section
531 Relative Prediction Set Definition Information Generation Section
532 Prediction Set Definition Information Predicting Section
533 Prediction Set Definition Information Storing Section
541 Prediction Set Definition Information Generation Section
550 Image Decoding Device
600 Image Encoding Device
600b Image Encoding Device
650 Image Decoding Device
650b Image Decoding Device
661 Relative Prediction Mode Information Forming Section
661b Relative Prediction Mode Information Forming Section
662 Storing Section
663 Reference Position Determining Section
663b Reference Position Determining Section
664 Prediction Mode Information Estimating Section
665 Relative Prediction Mode Information Generation Section
666 Prediction Mode Information Forming Section
666b Prediction Mode Information Forming Section
667 Storing Section
668 Reference Position Determining Section
668b Reference Position Determining Section
669 Prediction Mode Information Estimating Section
670 Prediction Mode Information Generation Section
700 Image Encoding Device
710 Intra Prediction Section (Encoding Means, Decoding Means)
714 Encode Parameter Determining Section (Selecting Means)
750 Image Decoding Device
751 Relative Prediction Set Information Forming Section (Encoding Means)
752 Storing Means
753 Prediction Set Information Predicting Section
754 Relative Prediction Set Information Generation Section
755 Prediction Set Information Forming Section (Decoding Section)
756 Storing Section
757 Prediction Set Information Predicting Section
758 Prediction Set Information Generation Section

DESCRIPTION OF EMBODIMENTS

[Embodiment 1]

An image encoding device according to the present invention will be described below as Embodiment 1 with reference to FIG. 1 through FIG. 13.

(Arrangement of Image Encoding Device 100)

Initially, an arrangement of an image encoding device 100 according to the present embodiment will be described below with reference to FIG. 1. FIG. 1 is a block diagram showing the arrangement of the image encoding device 100 according to the present embodiment. The image encoding device 100 includes a difference computing section 1, an orthogonal transformation section 2, a quantization section 3, an entropy encoding section 4, an inverse quantization section 6, an inverse orthogonal transformation section 7, an addition computing section 8, a memory 9, an intra prediction section 10, a prediction mode determining section 11, an edge analysis section 12, a prediction set determining section 13, and a relative prediction set information forming section 51 (FIG. 1). The present embodiment describes below the entropy encoding section 4, the intra prediction section 10, the prediction mode determining section 11, the edge analysis section 12, the prediction set determining section 13, and the relative prediction set information forming section 51, which are constituent components that have not been described in the explanation about the conventional technique.

(Entropy Encoding Section 4)

The entropy encoding section 4 carries out entropy encoding with respect to prediction residual data, prediction mode information, relative prediction set information, and the like, and outputs encoded data.

(Intra Prediction Section 10)

The intra prediction section 10 carries out intra prediction indicated by prediction set information and prediction mode information, by use of a locally decoded image stored in the memory 9, and generates a predicted image. How to generate prediction pixels will be more specifically described later.

(Prediction Mode Determining Section 11)

The prediction mode determining section 11 receives an original image of a target block to be encoded and a locally decoded image that is supplied from the memory 9, and determines one prediction mode to be used for predicting the target block to be encoded, from a plurality of prediction modes indicated by prediction set information received from the prediction set determining section 13, based on the original image of the target block and the locally decoded image. The prediction mode determining section 11 then supplies prediction mode information indicative of the determined prediction mode to the intra prediction section 10 and the entropy encoding section 4. The prediction residual cost minimization method or the rate distortion optimization method can be used for determination of a prediction mode.

(Edge Analysis Section 12)

The edge analysis section 12 calculates an edge strength and an edge orientation from detected edges. More specifically, the edge analysis section 12 detects edges in each sub block (N×N pixel block), into which the target block (M×M pixel block) to be encoded is subdivided. Then, the edge analysis section 12 calculates the edge strength and the edge orientation from the edges thus detected.

(Prediction Set Determining Section 13)

The prediction set determining section 13 determines a prediction set to be applied to the target block to be encoded. More specifically, the prediction set determining section 13 determines a prediction set to be applied to the target block, from a predetermined prediction set group, based on the edge orientation and the edge strength of the target block, which are calculated by the edge analysis section 12. The prediction set determining section 13 then outputs prediction set information indicative of the determined prediction set. The prediction set (group) will be described later more specifically.

(Relative Prediction Set Information Forming Section 51)

The relative prediction set information forming section 51 predicts, based on encoded information indicative of a prediction set, the prediction set information indicative of the prediction set to be applied to the target block to be encoded, which prediction set information is determined by the prediction set determining section 13, and outputs information (relative prediction set information) that indicates the prediction set by a flag and a difference based on the prediction. The relative prediction set information forming section 51 will be more specifically described later.

(Overview of Image Encoding Process)

With reference to FIG. 2, an image encoding process in the image encoding device 100 is generally described below. FIG. 2 is a flowchart schematically showing the image encoding process in the image encoding device 100.

(Reception of Target Block to be Encoded and Calculation of Edge Information)

When the image encoding device 100 receives a target block (M×M pixel block) to be encoded (Step S1), the edge analysis section 12 subdivides the target block (M×M pixel block) into sub blocks (N×N pixel blocks, N≤M) (Step S2). Subsequently, the edge analysis section 12 calculates, as edge information, an edge strength and an edge orientation of each of the sub blocks constituting the M×M pixel block (Step S3). How to calculate the edge information will be descried later more specifically.

(Determination of Prediction Set and Encoding of Prediction Set Information)

The prediction set determining section 13 determines a prediction set to be applied to the target block to be encoded, based on the edge information calculated in Step S3, and supplies information (hereinafter also referred to as prediction set information) indicative of thus determined prediction set to the prediction mode determining section 11, the relative prediction set information forming section 51, and the intra prediction section 10 (Step S4). The relative prediction set information forming section 51 receives the prediction set information from the prediction set determining section 13, predicts prediction set information based on encoded information on a prediction set, and supplies relative prediction set information to the entropy encoding section 4 (Step S5). The entropy encoding section 4 carries out entropy encoding with respect to the relative prediction set information and outputs thus encoded relative prediction set information (Step S6). How to determine a prediction set, how to encode prediction set information, and a data structure of the prediction set information will be described later, more specifically.

(Determination of Prediction Mode and Encoding of Prediction Mode Information)

The prediction mode determining section 11 determines a prediction mode to be used for predicting a target sub block to be encoded, from a plurality of prediction modes indicated by the prediction set information received from the prediction set determining section 13, on the basis of a locally decoded image of an adjacent sub block that has been already encoded, which locally decoded image is supplied from the memory 9. The prediction mode determining section 11 then supplies thus determined prediction mode information to the intra prediction section 10 and the entropy encoding section 4 (Step S7). The entropy encoding section 4 carries out entropy encoding with respect to the received prediction mode information, and outputs encoded data of the prediction mode information (Step S8). Here, the sub block to be encoded indicates a sub block that is obtained by subdividing the target block to be encoded into N×N pixel blocks.

(Generation of Predicted Image)

The intra prediction section 10 carries out intra prediction defined by the prediction set determined in Step S4 and the prediction mode determined in Step S7, by use of a locally decoded image of adjacent sub blocks that have been already encoded, which locally decoded image is supplied from the memory 9, so as to generate a predicted image of the target sub block to be encoded. The intra prediction section 10 then supplies the predicted image to the difference computing section 1 and the addition computing section 8 (Step S9).

(Calculation of Prediction Residual Data)

The difference computing section 1 calculates prediction residual data (N×N pixel block), which is the difference between the inputted original image of the target sub block to be encoded and the predicted image generated in Step S9, and outputs the prediction residual data (Step S10).

(Orthogonal Transformation and Quantization)

The prediction residual data thus calculated in Step S10 is supplied to the orthogonal transformation section 2 and then to the quantization section 3, so as to be subjected to orthogonal transformation and quantization, respectively, and then supplied to the entropy encoding section 4 and the inverse quantization section 6 (Step S11).

(Inverse Orthogonal Transformation and Inverse Quantization)

The prediction residual data that has been subjected to the orthogonal transformation and the quantization is supplied to the inverse quantization 6 and then to the inverse orthogonal transformation section 7, so as to be subjected to inverse quantization and inverse orthogonal transformation, respectively, and then supplied to the addition computing section 8 (Step S12).

(Generation of Locally Decoded Image)

The addition computing section 8 adds the prediction residual data thus subjected to the inverse quantization and the inverse orthogonal transformation in Step S12, to the predicted image generated in Step S9, so as to generate a locally decoded image (N×N pixel block) (Step S13). Thus generated locally decoded image is stored in the memory 9.

(Encoding of Prediction Residual Data)

The entropy encoding section 4 carries out entropy encoding with respect to thus quantized prediction residual data of the target sub block, and outputs encoded data of the prediction residual data (Step S14).

The processes in Steps S7 through S14 are carried out with respect to all sub blocks constituting the target block to be encoded. Further, the processes in Steps S1 through S14 are carried out with respect to all blocks constituting a target image to be encoded.

(Additional Matters)

The present embodiment describes the encoding process in the image encoding device 100 in the order from Step S1 to Step S14. However, the order of the encoding process is not limited to this, and can be altered within a range in which the present invention can be carried out.

(Details of How Edge Analysis Section 12 Operates and Data Structure of Edge Information)

Table 1 shows a data structure of the edge information calculated in the edge analysis section 12. In Table 1, "bk" indicates a counter indicative of a position of a sub block in the target block to be encoded, and "end_bk" indicates the number of the last sub block positioned at the end of the target block to be encoded.

TABLE 1

| Parameter | Detail |
|---|---|
| edge_data( ){ for(bk=0; bk<=end_bk; bk++){ | Edge Information |
| edge_orientation[bk] | Indicative of Edge Orientation at Position bk in Sub Blocks |
| ege_strength[bk] | Indicative of Edge Strength at Position bk in Sub Blocks |
| } } | |

Figure 3:
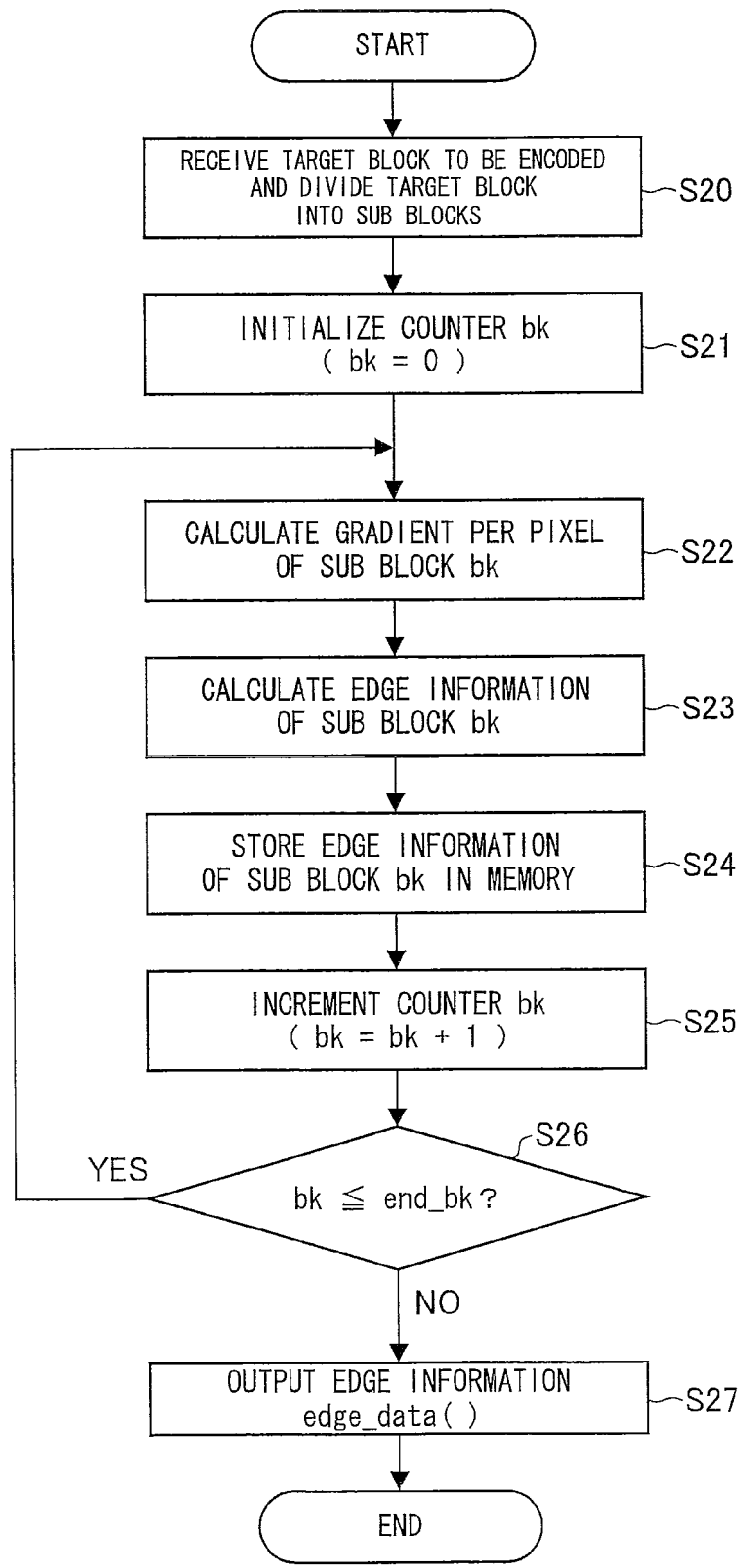
FIG. 3 is a flowchart specifically showing a determination process of edge information, according to Embodiment 1.

How the edge analysis section 12 operates is specifically described below with reference to FIG. 3. FIG. 3 is a flowchart specifically showing a determination process of the edge information.

In response to receiving a target block (M×M pixel block, M≥N) to be encoded, the edge analysis section 12 subdivides the received target block to be encoded into N×N pixel blocks (Step S20), and initializes a counter bk indicative of a position of a sub block in the target block to be encoded to 0 (Step S21).

Subsequently, the edge analysis section 12 calculates, by an operator, gradient vectors (a horizontal component, a vertical component) for all pixels in a sub block (hereinafter also referred to as a target sub block) indicated by the counter bk (Step S22). The operator that calculates the gradient vector may be, for example, a Sobel operator, a Prewitt operator, or the like. Further, the gradient vector may be calculated by a difference between values of pixels positioned on the left and right of a target pixel and a difference between values of pixels positioned on the top and bottom of the target pixel, as represented by the following equation (7).

Math. 4

$$G(x, y) = \begin{bmatrix} G_x(x, y) \\ G_y(x, y) \end{bmatrix} = \begin{bmatrix} I(x+1, y) - I(x-1, y) \\ I(x, y+1) - I(x, y-1) \end{bmatrix} \quad (7)$$

In the equation, I(x, y) indicates a pixel value at a pixel position (x, y) in the target sub block, and G(x, y) indicates a gradient vector at the pixel position (x, y).

The edge analysis section 12 calculates edge information from the gradient vectors of all the pixels in the target sub block calculated in Step S22 (Step S23). In the specification, the "edge information" indicates edge_orientation[bk], which is an edge orientation of the target sub block, and edge_strength[bk], which is an edge strength of the target sub block. How to calculate the edge orientation and the edge strength will be described later.

The edge analysis section 12 stores, in edge information edge_data( ) the edge orientation and the edge strength of the target sub block, which are calculated in Step S23 (Step S24), and increments the counter bk by 1 (Step S25).

Subsequently, the edge analysis section 12 determines whether or not a value of the counter bk is larger than a value of end_bk (Step S26). If the value indicated by the counter bk is not larger than the end_bk, which is of the last sub block in the target block to be encoded (Yes in Step S26), the edge analysis section 12 calculates gradient vectors of all pixels in a subsequent sub block. That is, the process returns to Step S22. If the value indicated by the counter bk is larger than the end_bk, which is of the last sub block in the target block to be encoded (No in Step S26), the edge analysis section 12 outputs the edge information edge_data( ) and completes the edge analysis operation with respect to the target block to be encoded (Step S27).

(Details of How to Calculate Edge Orientation and Edge Strength)

The following explains about a concrete example of how to calculate the edge orientation and the edge strength.

The edge strength indicates an average strength of the gradient vectors each per pixel in the target sub block, and can be calculated by the following equation (8) or (9). Here, Gx and Gy respectively indicates an x component and a y component in a gradient vector G(x, y).

Math. 5

$$P = \frac{1}{N^2} \sum_{x, y \in block} \{G_x^2(x, y) + G_y^2(x, y)\} \quad (8)$$

$$P = \frac{1}{N^2} \sum_{x, y \in block} \sqrt{G_x^2(x, y) + G_y^2(x, y)} \quad (9)$$

The edge orientation can be calculated by various methods and is not limited in any particular manner. The present embodiment describes how to calculate the edge orientation, by taking, as an example, a method disclosed in Non Patent Literature 2. Non Patent Literature 2 also discloses a technique for introducing the edge orientation for fingerprint detection.

Initially, a gradient vector at a pixel position in the target sub block is calculated by the following equation (10). In the equation (10), "sign( )" is a function represented by the following equation (11) in which if x is not less than 0, the function returns "1", and if x is negative, the function returns "−1". Then, a square gradient vector Gs(x, y) is calculated by use of the calculated gradient vector G(x, y) at the pixel position (x, y) in the target sub block, in accordance with the following equation (12). Furthermore, an average square vector in the target sub block is calculated by use of square gradient vectors of all the pixels in the target sub block, in accordance with the following equation (13).

Math. 6

$$G(x, y) = \begin{bmatrix} G_x(x, y) \\ G_y(x, y) \end{bmatrix} = \mathrm{sign}\left(\frac{\partial I(x, y)}{\partial x}\right) \begin{bmatrix} \frac{\partial I(x, y)}{\partial x} \\ \frac{\partial I(x, y)}{\partial y} \end{bmatrix} \quad (10)$$

$$\mathrm{sign}(x) = \begin{cases} 1 & \text{for } x \geq 0 \\ -1 & x < 0 \end{cases} \quad (11)$$

$$G_s(x, y) = \begin{bmatrix} G_{s,x}(x, y) \\ G_{s,y}(x, y) \end{bmatrix} = \begin{bmatrix} G_x(x, y)^2 - G_y(x, y)^2 \\ 2G_x(x, y)G_y(x, y) \end{bmatrix} \quad (12)$$

$$\bar{G}_s = \begin{bmatrix} \sum_{y=0}^{N-1}\sum_{x=0}^{N-1} G_{s,x}(x, y)/N^2 \\ \sum_{y=0}^{N-1}\sum_{x=0}^{N-1} G_{s,y}(x, y)/N^2 \end{bmatrix} \quad (13)$$

Subsequently, Gxx, Gyy, and Gxy are defined as the following equation (14). A direction φ of a gradient vector of the target sub block is calculated by use of thus defined Gxx, Gyy, and Gxy, in accordance with the following equation (15). Here, ∠(x, y) is defined by the following equation (16). Further, [rad] in the equation (16) is an angle unit in the circular measure.

Math. 7

$$G_{xx} = \sum_{y=0}^{N-1}\sum_{x=0}^{N-1} G_{s,x}(x,y)^2 / N^2 \quad (14)$$

$$G_{yy} = \sum_{y=0}^{N-1}\sum_{x=0}^{N-1} G_{s,y}(x,y)^2 / N^2$$

$$G_{xy} = \sum_{y=0}^{N-1}\sum_{x=0}^{N-1} G_{s,x}(x,y)G_{s,y}(x,y) / N^2$$

$$\phi = \frac{1}{2}\angle(G_{xx}^2 - G_{yy}^2, 2G_{xy})[rad] \quad (15)$$

$$\angle(u, v) = \begin{cases} \tan^{-1}(v/u)[rad] & u \geq 0 \\ \tan^{-1}(v/u) + \pi[rad] & \text{for } u < 0 \wedge v \geq 0 \\ \tan^{-1}(v/u) - \pi[rad] & u < 0 \wedge v < 0 \end{cases} \quad (16)$$

The edge orientation θ of the target sub block is perpendicular to a direction of the gradient of the target sub block, and therefore can be calculated by the following equation (17). If the edge orientation θ of the target sub block is expressed by the circular measure, it is possible to convert the edge orientation θ in accordance with the following equation (18). Here, [deg] in the equation (18) is an angle unit in the degree measure.

The aforementioned methods for calculating the edge orientation and the edge strength are applied to an edge analysis section 212 of an image encoding device 200 according to Embodiment 3, which will be described later.

Math. 8

$$\theta = \begin{cases} \phi + \frac{\pi}{2}[rad] & \text{for } \phi \leq 0 \\ \phi - \frac{\pi}{2}[rad] & \phi > 0 \end{cases} \quad (17)$$

$$\theta = \frac{180}{\pi} \times \theta[deg] \quad (18)$$

(Concrete Example of Edge Detection)

Figure 4:
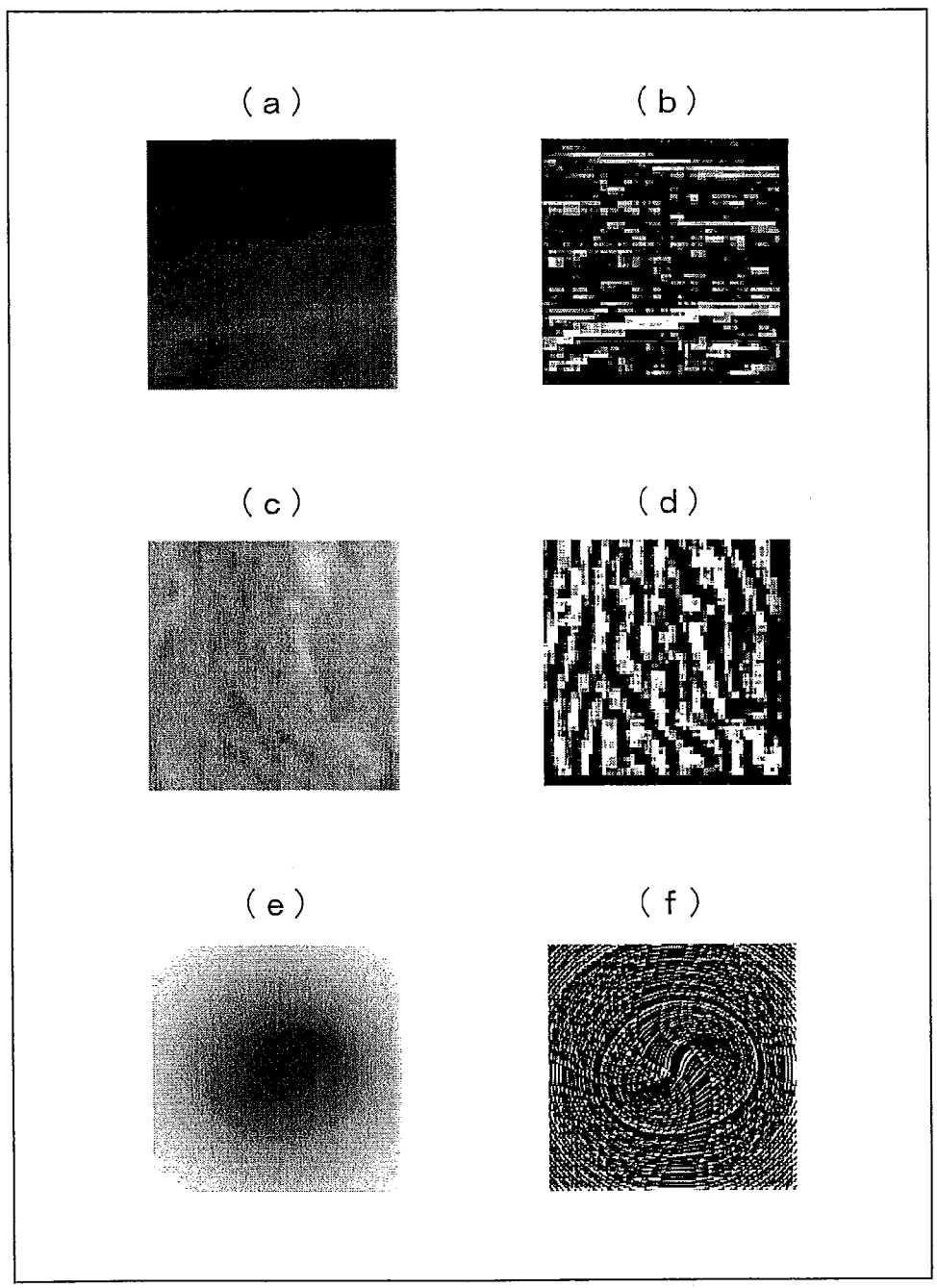
FIG. 4 illustrates concrete examples of edges detected by an edge analysis section. (a) of FIG. 4 is an original image in which horizontal stripes are formed, and (b) of FIG. 4 is an edge image detected therefrom; (c) of FIG. 4 is an original image in which vertical stripes are formed, and (d) of FIG. 4 is an edge image detected therefrom; and (e) of FIG. 4 is an original image in which a twist pattern is formed, and (f) of FIG. 4 is an edge image detected therefrom.

The following describes concrete examples of edges detected by the edge analysis section 12, with reference to (a) through (f) of FIG. 4. (a) through (f) of FIG. 4 illustrate concrete examples of edges detected by the edge analysis section 12. (a) of FIG. 4 is an original image in which horizontal stripes are formed, and (b) of FIG. 4 is an edge image detected therefrom; (c) of FIG. 4 is an original image in which vertical stripes are formed, and (d) of FIG. 4 is an edge image detected therefrom; and (e) of FIG. 4 is an original image in which a twist pattern is formed, and (f) of FIG. 4 is an edge image detected therefrom. In these edge images, a black part indicates a flat portion and a white part indicates an edge portion.

In the case of the horizontal stripes illustrated in (a) of FIG. 4, many edges in a horizontal direction are detected as illustrated in (b) of FIG. 4. In this case, an edge orientation distribution is like one illustrated in (a) of FIG. 5. In the case of the vertical stripes illustrated in (c) of FIG. 4, many edges in a vertical direction are detected as illustrated in (d) of FIG. 4. In this case, an edge orientation distribution is like one illustrated in (b) of FIG. 5. In the case of the twist pattern illustrated in (e) of FIG. 4, many edges in the horizontal direction and in the vertical direction are detected as illustrated in (f) of FIG. 4. In this case, an edge orientation distribution is like one illustrated in (c) of FIG. 5.

Figure 5:
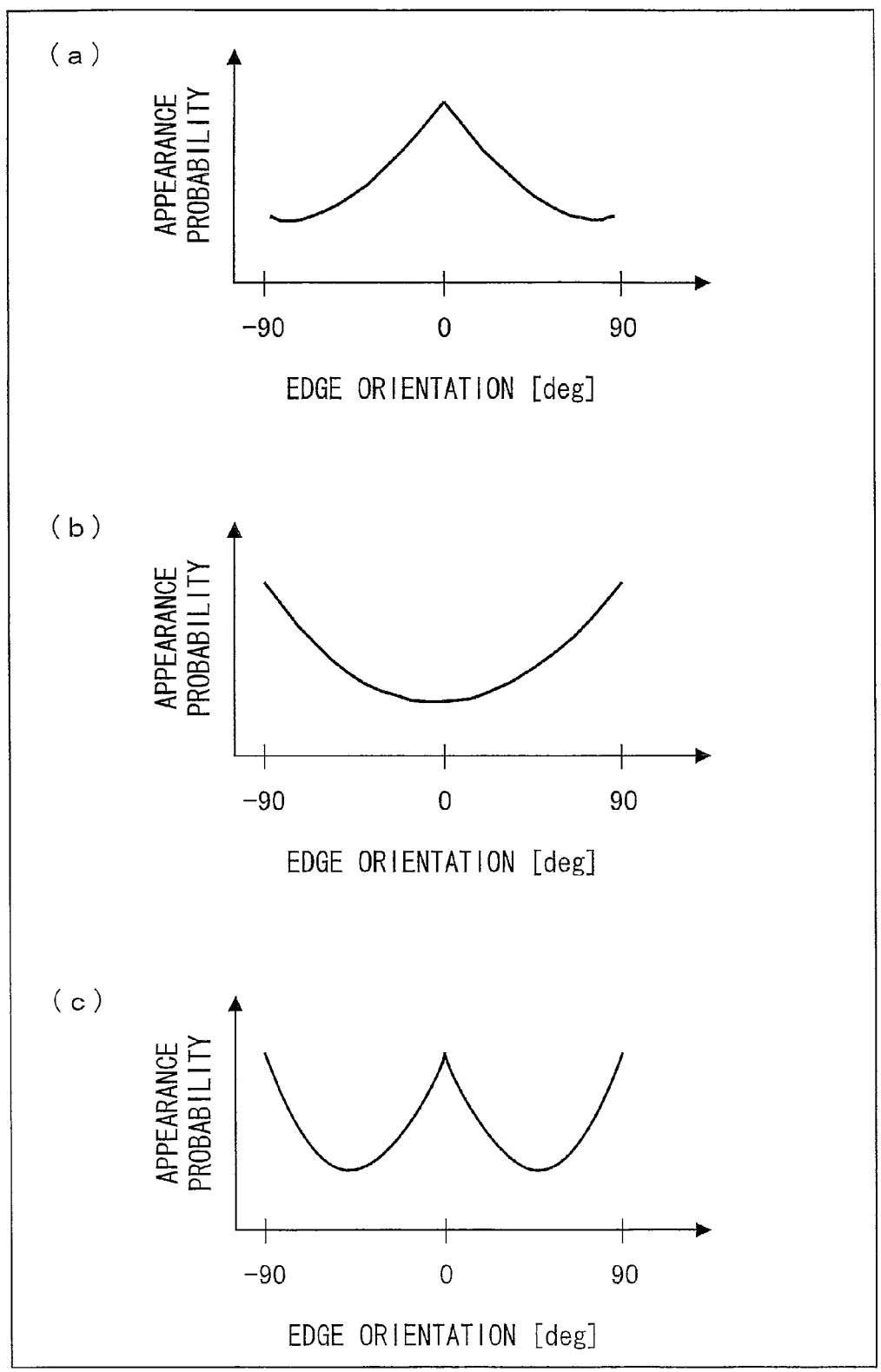
FIG. 5 illustrates edge orientation distributions of edge images detected by an edge analysis section. (a) of FIG. 5 shows a case where edges are oriented mostly in a horizontal direction. (b) of FIG. 5 shows a case where edges are oriented mostly in a vertical direction. (c) of FIG. 5 shows a case where edges are oriented mainly in a horizontal direction and in a vertical direction.

(a) through (c) of FIG. 5 respectively show edge orientation distributions of the edge images of (b), (d), and (f) of FIG. 4. (a) of FIG. 5 illustrates the edge orientation distribution of (b) of FIG. 4, (b) of FIG. 5 illustrates the edge orientation distribution of (d) of FIG. 4, and (c) of FIG. 5 illustrates the edge orientation distribution of (f) of FIG. 4.

(Details of How Prediction Set Determining Section 13 Operates and Details of Prediction Set)

How the prediction set determining section 13 operates and details of the prediction set will be described below, more specifically, with reference to FIG. 6 and FIG. 7. As described above, the prediction set determining section 13 mainly determines, from a prediction set group, a prediction set to be applied to the target block to be encoded, based on the edge information of the target block to be encoded, calculated by the edge analysis section 12.

(Details of Prediction Set)

In the specification, the prediction set group is a group including L pieces of prediction sets. Each prediction set i (0≤i≤L−1) in the prediction set group is a group including Ki pieces of prediction modes each defining a different prediction method. Here, i indicates the number for identifying a prediction set.

Further, the prediction methods in the prediction set may be a prediction method, such as a plane prediction, a frequency prediction, or template matching, besides the spatial prediction defined by a prediction direction (edge orientation) θ and the DC prediction. Further, the number Ki (0≤i≤L−1) of prediction modes may be different depending on the prediction set i (0≤i≤L−1).

(Concrete Examples of Prediction Set Group and Prediction Set)

Figure 6:
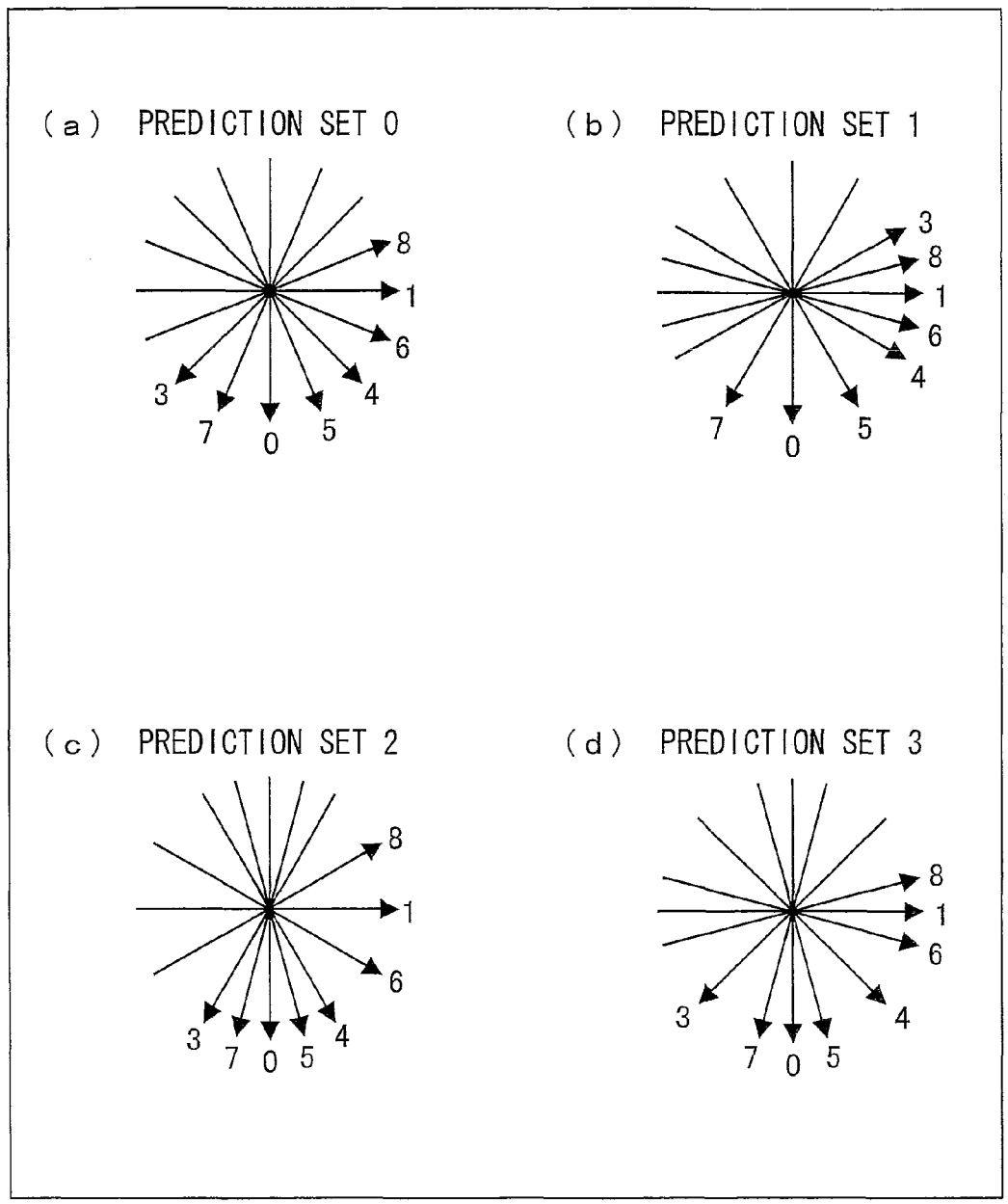
FIG. 6 shows prediction modes except for a DC prediction in prediction sets in Embodiment 1. (a) through (d) in FIG. 6 correspond to prediction sets 0 through 3, respectively.

The following describes concrete examples of the prediction set group and the prediction set, with reference to Table 2 and FIG. 6. Table 2 shows one example of the prediction set group where the number L of prediction sets is 4, and the number Ki of prediction modes is such that K0=K1=K2=K3=9. In the present embodiment, each of "0" [deg], "−90" [deg], "±15" [deg], "±22.5" [deg], "±30" [deg], "±45" [deg], "±67.5" [deg], and "±75" [deg] in Table 2 indicate spatial predictions each defined by a prediction direction θ, and "DC" indicates a DC prediction.

TABLE 2

|  |  | Prediction Set | | | |
|---|---|---|---|---|---|
|  |  | 0 | 1 | 2 | 3 |
| Prediction Mode | 0 | −90 | −90 | −90 | −90 |
|  | 1 | 0 | 0 | 0 | 0 |
|  | 2 | DC | DC | DC | DC |
|  | 3 | −45 | −30 | −60 | −45 |
|  | 4 | 45 | 30 | 60 | 45 |
|  | 5 | 67.5 | 60 | 75 | 75 |
|  | 6 | 22.5 | 15 | 30 | 15 |
|  | 7 | −67.5 | −60 | −75 | −75 |
|  | 8 | −22.5 | −15 | −30 | −15 |

(a) through (d) of FIG. 6 illustrate prediction modes except for DC prediction in the prediction sets shown in Table 2. (a) through (d) of FIG. 6 respectively correspond to prediction sets 0 through 3.

A prediction set 0 illustrated in (a) of FIG. 6 is the same as the intra prediction in the conventional technique, and therefore is not explained here.

Table 3 shows definitions of parameters used for explanation about the operation of the prediction set determining section 13.

TABLE 3

| Parameter | Meaning of Parameter |
|---|---|
| bk | Counter Indicative of Number of Sub Block in Target Block to be Encoded |
| end_bk | Number of Last Sub Block in Target Block to be Encoded |
| set_num | Counter Indicative of Number of Prediction Set |
| end_set_num | Number of Last Prediction Set |
| min_sum_of_delta_angle | Total Value of Minimum Values in Sums of Absolute Values of Delta Angles in All Sub Blocks |
| sum_of_delta_angle [set_num] | Sum of Ablsolute Values of Delta Angles in Prediction Set Number set_num |
| min_delta_angle | Minimum Value in Sums of Ablsolute Values of Delta Angles |
| delta_angle | Abvolute Value of Delta Angle |
| edge_angle [bk] | Edge Orientation of Sub Block Number bk in Target Block to be Encoded |
| pred_angle [set_num][mode_num] | Prediction Direction at Prediction Mode Number mode_num in Prediction Set Number set_num |
| mode_num | Counter Indicative of Prediction Mode Number |

A prediction set 1 illustrated in (b) of FIG. 6 is a prediction set which focuses on predictions in a horizontal direction and which is effective for a case where edges are formed in the horizontal direction (around 0 [deg]) in a collective manner, as illustrated in (a) of FIG. 5. An image in which edges are formed in the horizontal direction in a collective manner as such may be, for example, an image having horizontal stripes like the one illustrated in (a) of FIG. 4.

A prediction set 2 illustrated in (c) of FIG. 6 is a prediction set which focuses on predictions in a vertical direction and which is effective for a case where edges are formed in the vertical direction (around ±90 [deg]) in a collective manner, as illustrated in (b) of FIG. 5. An image in which edges are formed in the vertical direction in a collective manner as such may be, for example, an image having vertical stripes like the one illustrated in (c) of FIG. 4.

A prediction set 3 illustrated in (d) of FIG. 6 is a prediction set which focuses on predictions in a horizontal direction and in a vertical direction and which is effective for a case where edges are formed both in the horizontal direction (around ±90 [deg]) and in the vertical direction (around 0 [deg]) in a collective manner. An image in which edges are formed both in the vertical direction and in the horizontal direction in a collective manner as such may be, for example, an image having a twist pattern like the one illustrated in (e) of FIG. 4.

As described above, a plurality of prediction sets focusing on predictions in specific directions different from each other, like the prediction sets 0 through 3, are predetermined so that a prediction set is selected from the predetermined prediction sets according to each target block to be encoded. This makes it possible to carry out prediction in a direction in which a conventional image encoding device cannot carry out prediction.

(Details of Process of Determining Prediction Set Information)

Figure 7:
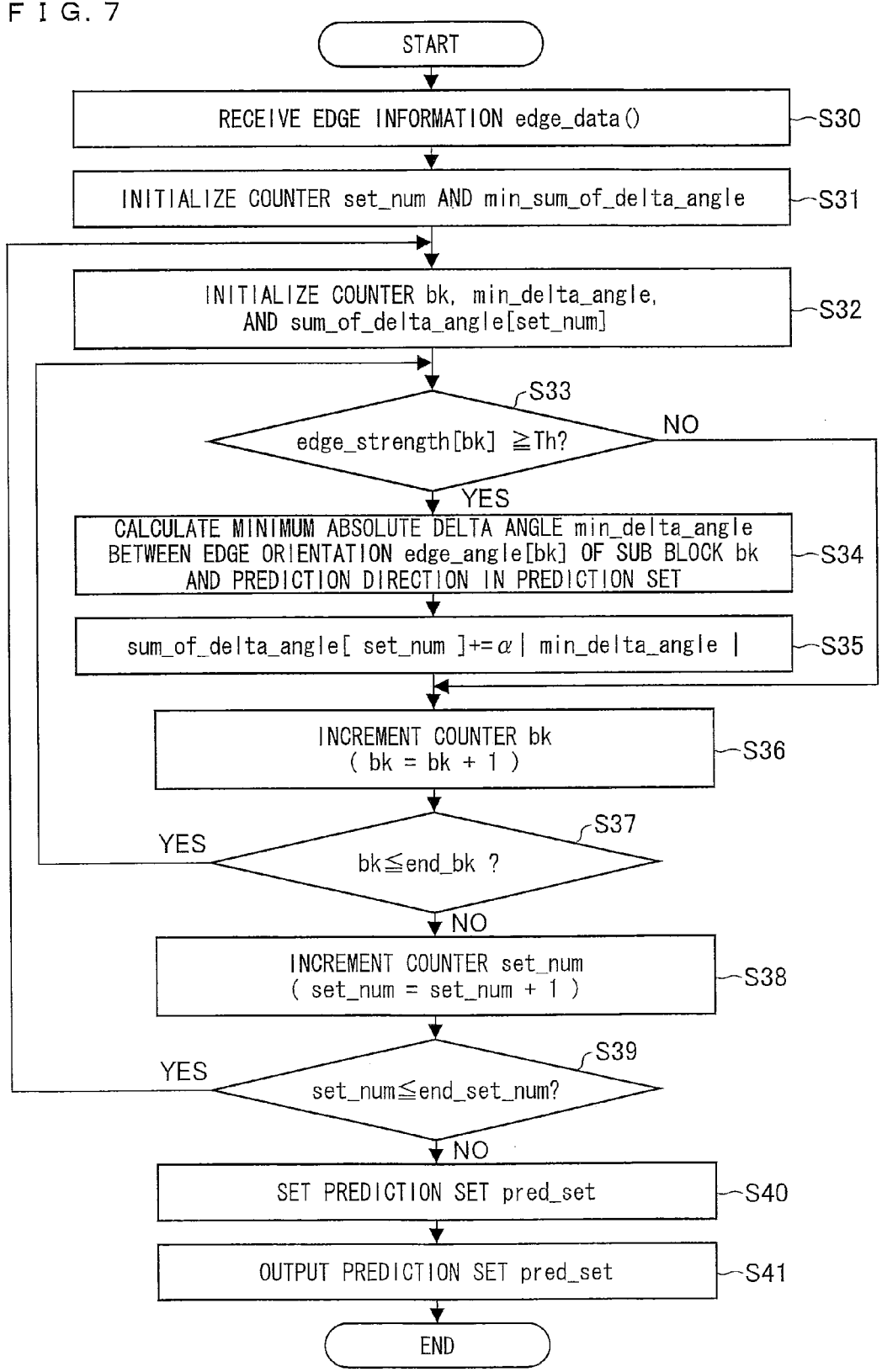
FIG. 7 is a flowchart specifically showing a process of determining prediction set information.

With reference to FIG. 7, the following describes a process of determining prediction set information, more specifically. FIG. 7 is a flowchart specifically showing how the prediction set determining section 13 operates. Further, The prediction set determining section 13 receives edge information edge_data( ) (Step S30), and sets a counter set_num to 0 and min_sum_of_delta_angle to an initial value, so as to initialize them (Step S31). Subsequently, the prediction set determining section 13 sets a counter bk and sum_of_delta_angle[set_num] to zero and min_delta_angle to an initial value, so as to initialize them (Step S32).

The prediction set determining section 13 determines whether or not an edge strength edge_strength[bk] of a sub block (hereinafter also referred to as a target sub block) in a target block to be encoded, indicated by the counter bk, is equal to or more than a threshold Th (Step S33). The threshold Th may be set in advance to a certain value, or may be set as needed.

If the edge_strength[bk] is equal to or more than the threshold Th (Yes in Step S33), the prediction set determining section 13 finds out, in a prediction set, a minimum value min_delta_angle (hereinafter referred to as a minimum absolute delta angle) among absolute values of delta angles between an edge orientation edge_angle[bk] in the target sub block and prediction directions pred_angle[set_num][mode_num] of respective prediction modes each indicated by a prediction mode number mode_num in the prediction set indicated by a prediction set number set_num (Step S34). The calculation is carried out in accordance with the following equation (19):

Math. 9

$$\text{min\_delta\_angle} = \min_{mode\_num \in set} \{|\text{edge\_angle}[bk] - \text{pred\_angle}[set\_num][mode\_num]|\} \quad (19)$$

In the equation (19), each of the values of the prediction directions indicated by the prediction modes in the prediction sets shown in Table 2 is substituted for the prediction direction pred_angle[set_num][mode_num]. For example, in the case of a prediction mode 6 (i.e., mode_num=6) in the prediction set 1 (i.e., set_num=1) in Table 2, the prediction direction is 15 [deg], and therefore, pred_angle[1][6] equals 15[deg].

After the prediction set determining section 13 finds out the minimum absolute delta angle min_delta_angle as such, the prediction set determining section 13 multiplies the obtained min_delta_angle by a constant α, and adds the resultant value to a cost sum_of_delta_angle[set_num] (Step S35). The constant α is a predetermined weighting factor according to a magnitude of an absolute delta angle.

Subsequently, the prediction set determining section 13 increments the counter bk by 1 so as to set a subsequent sub block number (Step S36). The prediction set determining section 13 determines whether or not a value of thus set counter bk is equal to or less than end_bk (Step S37). If the value of the counter bk is equal to or less than the end_bk, which is a number of a last sub block in the target block to be encoded (Yes in Step S37), the prediction set determining section 13 repeats the processes from Step S33. If the value of the counter bk is larger than the end_bk (No in Step S37), the prediction set determining section 13 increments the counter set_num by 1 so as to set a subsequent prediction set number (Step S38).

The processes from Steps S32 to S38 are processes for calculating a degree of similarity that indicates how much the prediction directions defined in the prediction set indicated by the prediction set number set_num are approximate to edge orientations of all sub blocks in the target block to be encoded. That is, the more the prediction directions defined in the prediction set are approximate to the edge orientations of all the sub blocks in the target block to be encoded, the smaller the value of the degree of similarity sum_of_delta_angle[set_num] becomes.

Subsequently, the prediction set determining section 13 determines which is larger, the prediction set indicated by the counter set_num or the last prediction set number end_set_num (Step S39). If the counter set_num is not larger than the end_set_num (Yes in Step S39), the processes from Step S32 are repeated. If the counter set_num is larger than the end_set_num (No in Step S39), the prediction set determining section 13 determines a prediction set indicated by the prediction set number set_num whose sum_of_delta_angle[set_num] is minimum among the prediction sets, as a prediction set pred_set to be applied to the target block to be encoded (Step S40). The prediction set determining section 13 outputs prediction set information indicative of the determined prediction set pred_set to the intra prediction section 10, the prediction mode determining section 11, and the relative prediction set information forming section 51 (Step S41). The prediction set pred_set is determined such that the number of the prediction set that takes minimum sum_of_delta_angle[set_num] among the prediction sets is found out in accordance with the following equation (20). In the equation (20), set_group indicates a prediction set group. A data structure of the prediction set information is shown in Table 4.

Math. 10

$$\text{pred\_set} = \arg\min_{set\_num \in set\_group} \{\text{sum\_of\_delta\_angle}[\text{set\_num}]\} \quad (20)$$

TABLE 4

| Syntax | Detail |
|---|---|
| prediction_set_data( ){ | Prediction Set Information |
| pred_set | Indicative of Any of Prediction Sets |
| } | |

(Process of Encoding Prediction Set Information)

The following deals with a process of encoding the prediction set information, more specifically. The relative prediction set information forming section 51 predicts, based on prediction set information that has been already encoded, prediction set information to be applied to the target block to be encoded, which prediction set information is determined by the prediction set determining section 13, and outputs, to the entropy encoding section 4, information (hereinafter referred to as relative prediction set information) in which the prediction set is indicated by a flag and a difference based on the prediction. The entropy encoding section 4 may carry out entropy encoding directly with respect to the prediction set information, instead of the relative prediction set information.

Table 5 shows a data structure of the relative prediction set information. In Table 5, probable_pred_set_flag in relative_prediction_set_data( ) is a flag indicative of whether or not the prediction set to be applied to the target block to be encoded is identical with the predicted prediction set. Further, rem_pred_set is information indicative of which one of the prediction sets except for a predicted prediction set probable_pred_set used for the prediction corresponds to the prediction set to be applied to the target block to be encoded. The relative prediction set information may be a value of the prediction set pred_set to be applied to the target block to be encoded, or a difference between the value of the prediction set pred_set to be applied to the target block to be encoded and a value of the probable_pred_set, which is a prediction value.

TABLE 5

| Syntax | Detail |
|---|---|
| relative_prediction_set_data( ) | Relative Prediction Set Information |
| probable_pred_set_flag | Flag Indicative of Whether or not Determined Prediction Set is Identical with Prediction Value of Prediction Set |
| if(probable_pred_set_flag !=1){ | If Determined Prediction Set is Different from Prediction Value of Prediction Set, Add the Following Information |
| rem_pred_set | Indicative of Which One of Prediction Sets Except for Prediction Value of Prediction Set Corresponds to Determined Prediction Set |
| } | |
| } | |

(Arrangement of Relative Prediction Set Information Forming Section 51)

The following describes an arrangement of the relative prediction set information forming section 51, with reference to FIG. 8, followed by explanation of how the relative prediction set information forming section 51 operates. FIG. 8 is a block diagram showing the arrangement of the relative prediction set information forming section 51. The relative prediction set information forming section 51 includes a relative prediction set information generation section 511, a prediction set information predicting section 512, and a prediction set information storing section 513. Each of the constituent components is described as follows.

(Relative Prediction Set Information Generation Section 511)

The relative prediction set information generation section 511 predicts prediction set information, based on a prediction value determined in the prediction set information section 512, and outputs relative prediction set information.

(Prediction Set Information Predicting Section 512)

The prediction set information predicting section 512 determines a prediction value of a prediction set, which is to be applied to the target block to be encoded, based on encoded prediction set information stored in the prediction set information storing section 513, and outputs the prediction value.

Figure 9:
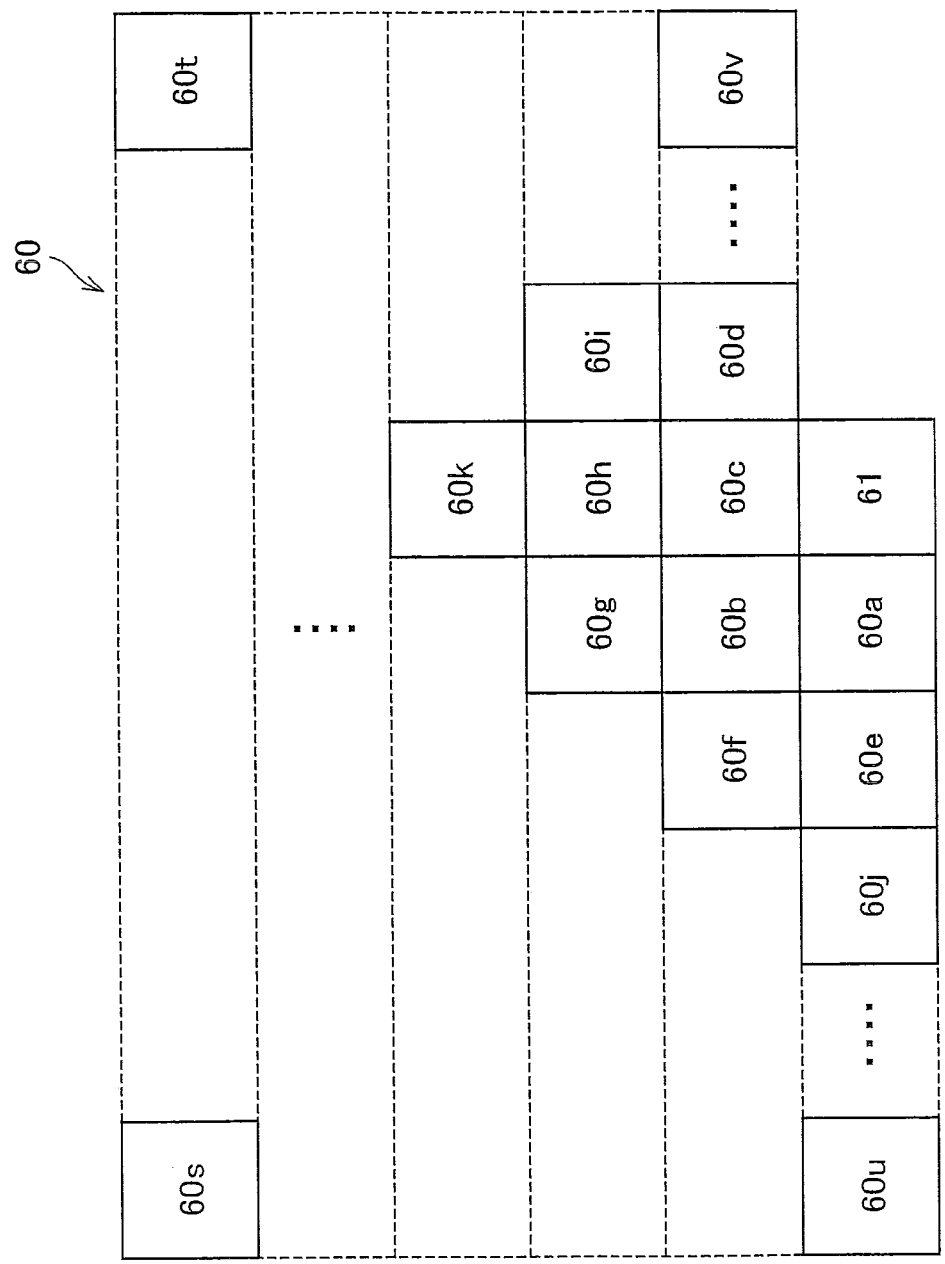
FIG. 9 illustrates one example of positions of encoded blocks to be used for prediction in a prediction set information predicting section.

The prediction value of a prediction set, which is to be applied to the target block to be encoded, is determined by any of the following methods (1) through (5). FIG. 9 illustrates positions of blocks used for predicting the prediction set information, for easy understanding of how the blocks are positioned in an image region.

(1) A prediction set that has the highest appearance frequency among prediction sets applied to blocks (60*a* through 60*k*) positioned in the vicinity of a target block 61 to be encoded, shown in FIG. 9, is taken as the prediction value.

(2) A median of prediction sets applied to blocks (60*a* through 60*c*, or 60*a*, 60*c*, and 60*d*) positioned in the vicinity of the target block 61 in FIG. 9 is taken as the prediction value.

(3) A prediction set applied to an encoded block (60*a*) positioned on the left of the target block 61 in FIG. 9 is taken as the prediction value.

(4) A prediction set applied to an encoded block (60*c*) positioned on the upper side of the target block 61 in FIG. 9 is taken as the prediction value.

(5) A prediction set that has the highest appearance frequency among prediction sets applied to blocks that have been already encoded in a target frame to be encoded, before the target block 61 is encoded, in FIG. 9, (that is, in FIG. 9, all blocks constituting an encoded image region 60, i.e., a region surrounded by encoded blocks 60*s*, 60*t*, 60*u*, 60*v*, 60*a*, 60*b*, 60*c*, and 60*d*) is taken as the prediction value.

If there is no prediction set information that has been already encoded, a predetermined prediction set is set as the probable_pred_set.

(Prediction Set Information Storing Section 513)

The prediction set information storing section 513 received prediction set information and stores it therein.

(Details of Process of Predicting Prediction Set Information)

Figure 10:
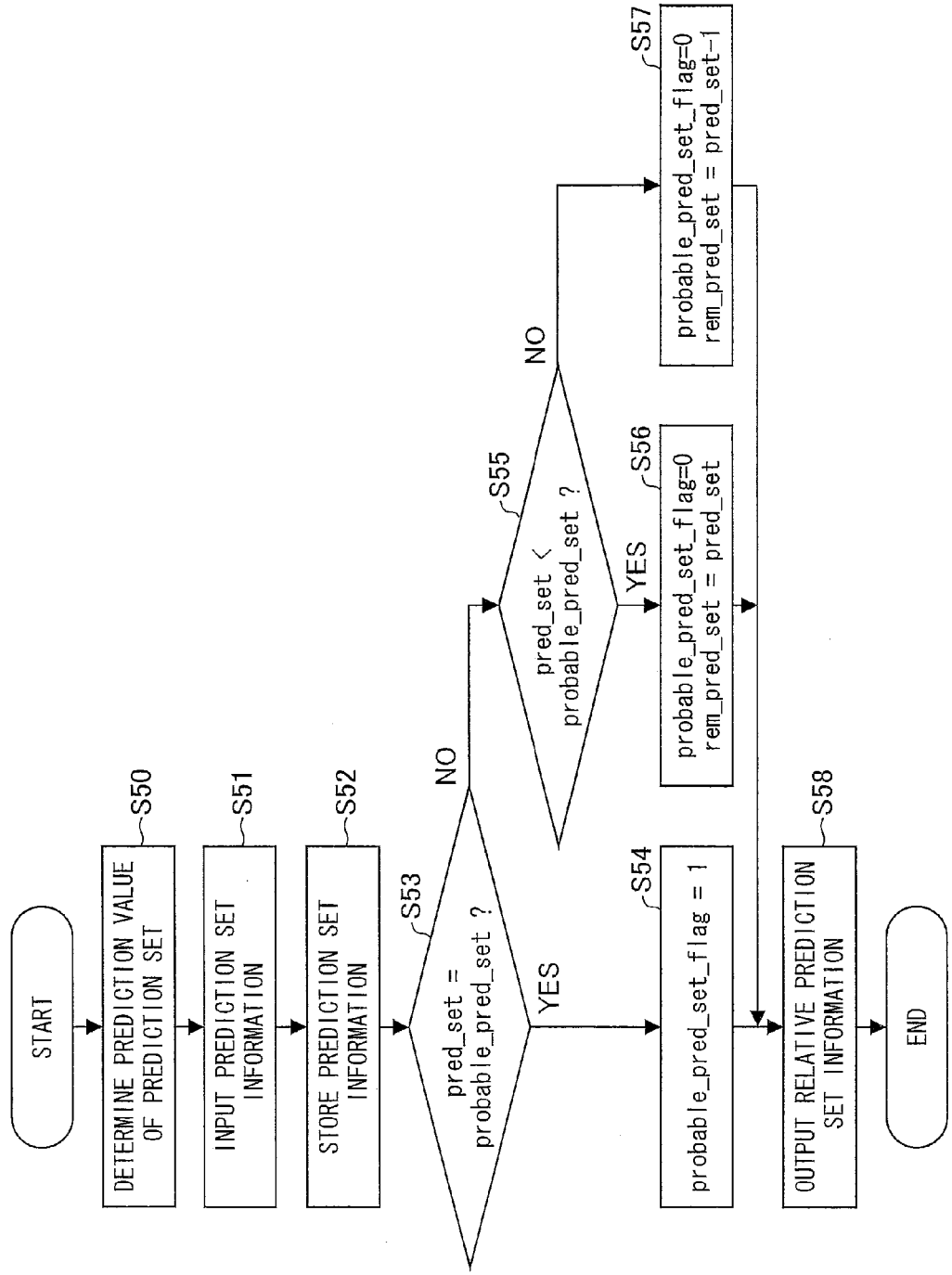
FIG. 10 is a flowchart showing a process of encoding prediction set information, in a relative prediction set information forming section.

With reference to FIG. 10, the following explains about a process of predicting prediction set information, more specifically. FIG. 10 is a flowchart showing the process of predicting prediction set information, in the relative prediction set information forming section 51.

The prediction set information predicting section 512 determines a prediction value of a prediction set, based on encoded prediction set information that has been already encoded and stored in the prediction set information storing section 513, and outputs the prediction value (Step S50). Subsequently, prediction set information received by the relative prediction set information forming section 51 is supplied to the prediction set information storing section 513 and the relative prediction set information generation section 511 (Step S51). The prediction set information storing section 513 stores the prediction set information therein (Step S52). The relative prediction set information forming section 511 compares the prediction set pred_set to be applied to the target block to be encoded and the prediction value probable_pred_set of a prediction set (Step S53). The prediction value is determined by any one of the above methods (1) through (5).

If the prediction set pred_set is identical with the prediction value probable_pred_set of a prediction set (Yes in Step S53), the relative prediction set information generation section 511 sets information indicative of "identical" as probable_pred_set_flag (probable_pred_set_flag=1) (Step S54), and outputs the information as relative prediction set information to the entropy encoding section 4 (Step S58).

If the prediction set pred_set is different from the prediction set probable_pred_set (No in Step S53), the relative prediction set information generation section 511 sets information indicative of "not identical" as probable_pred_set_flag (probable_pred_set_flag=0), and finds information (rem_pred_set) indicative of which one of the remaining prediction sets corresponds to the prediction set of the target block.

More specifically, the relative prediction set information generation section 511 compares a value of the pred_set and the prediction value probable_pred_set (Step S55). If the pred_set is smaller than the probable_pred_set (Yes in Step S55), the relative prediction set information generation section 511 sets "probable_pred_set_flag=0" and "rem_pred_set=pred_set" as relative prediction set information (Step S56), and outputs the relative prediction set information (Step S58). If the pred_set is not smaller than the probable_pred_set (No in Step S55), the relative prediction set information generation section 511 sets "probable_pred_set_flag=0" and "rem_pred_set=pred_set −1" as relative prediction set information (Step S57), and outputs the relative prediction set information (Step S58).

(Details of How to Generate Predicted Image from Prediction Direction θ)

The following describes how to generate a predicted image from a prediction direction θ, with reference to FIG. 11. FIG. 11 illustrates how a predicted image of an N×N pixel block is generated if a pixel value I(xp, yp) positioned on a point P(xp, yp) on a X-Y plane is predicted from a direction of a straight line 1 that passes through the point P. In FIG. 11, intersections of grids indicate positions of integer pixels and a region on X and Y axes indicates a reference pixel region.

Furthermore, on the X-Y plane, a region that satisfies $0<x \leq N$ and $0<y \leq N$ is regarded as a target pixel region to be predicted, and a region that satisfies (i) $0 \leq x \leq L$ and $y \leq 0$, (ii) $x \leq 0$ and $y \leq 0$, or (iii) $x \leq 0$ and $0 \leq y \leq K$ is regarded as an encoded pixel region, and the other region is considered as an unencoded pixel region. A reference pixel region is a region that satisfies (iv) $0 \leq x \leq L$ and $y=0$, (v) $x=0$ and $y=0$, or (vi) $x=0$ and $0 \leq y \leq K$, in the encoded pixel region.

Further, there are 2 cases as prediction from a prediction direction: (a) a case where a pixel value of the point P is predicted from a reference pixel region on a region ($0 \leq x \leq L$ and $y=0$); and (b) a case where the pixel value of the point P is predicted from a reference pixel region on a region ($x=0$ and $0 \leq y \leq K$).

The aforementioned "N", "L", and "K" are explained below with reference to (a) through (f) of FIG. 12. As illustrated in (a) through (f) of FIG. 12, "N" indicates a height and a width of a target pixel region to be predicted, and "L" and "K" indicate dimensions of a reference pixel region. More specifically, "K" indicates a height of a reference pixel region positioned on the left of the target pixel region to be predicted, and "L" indicates a width of a reference pixel region positioned on the upper side of the target pixel region to be predicted.

As illustrated (a) through (f) of FIG. 12, each of "L" and "K" takes any of 0, "N", and "2N". (a) through (f) of FIG. 12 illustrate examples of reference pixel regions in which "L" and "K" take any of 0, "N", and "2N", respectively. However, these examples are illustrative only, and "L" and "K" may take a combination of values other than the values exemplified above.

Where a direction vector R of a prediction direction θ is (rx, ry), an intersection A of the X axis and the straight line 1 and an intersection B of the Y axis and the straight line 1 are represented by the following equations (21) and (22), respectively.

Math. 11

$$\text{Point } A: (x_a, y_a) = \left(\frac{r_y x_p - r_x y_p}{r_y}, 0\right) \quad (21)$$

$$\text{Point } B: (x_b, y_b) = \left(0, \frac{r_x y_p - r_y x_p}{r_x}\right) \quad (22)$$

When the intersection A and the intersection B satisfy any of the following conditions (1) through (4), the intersection A or B is regarded as a prediction pixel for the point P: (1) when the prediction direction θ is such that $-\pi/2 \leq \theta \leq \phi$, the intersection A is regarded as the prediction pixel; (2) when the prediction direction θ is such that $\phi < \theta \leq 0$, the intersection B is regarded as the prediction pixel; (3) when the prediction direction θ is such that $0 < \theta < \pi/2$, and $x_a \geq 0$ and $y_b \leq 0$, the intersection A is regarded as the prediction pixel; and (4) when the prediction direction θ is such that $0 < \theta < \pi/2$, and $x_a < 0$ and $y_b \geq 0$, the intersection B is regarded as the prediction pixel. Here, φ satisfies $-\pi/2 < \phi < 0$.

A prediction pixel value IA at the intersection A and a prediction pixel value IB at the intersection B can be obtained by an interpolation process such as linear interpolation using adjacent pixels or three-dimensional interpolation. If the intersections A and B are positioned at integer pixels, a filtering process with the use of an n-tap filter, such as a 3-tap filter, may be carried out.

In the case where the linear interpolation and the 3-tap filter are used, the prediction pixel values IA and IB, respectively at the intersections A and B, can be represented by the following equations (23) and (24), respectively. In the equations (23) and (24), Irec(x, y) indicates a pixel value of a locally decoded image. Floor{x} is calculation for finding a maximum integer that is not larger than x, and Ceil{x} is calculation for finding a minimum integer that is not smaller than x. Z indicates a set of integers.

Math. 12

$$I_A = \begin{cases} \frac{I_{rec}(x_a - 1, 0) + 2I_{rec}(x_a, 0) + I_{rec}(x_a + 1, 0)}{4} & \text{for } x_a \in Z \\ (1 - \alpha)I_{rec}(\text{Floor}\{x_a\}, 0) + \alpha I_{rec}(\text{Ceil}\{x_a\}, 0) & \text{otherwise} \end{cases} \quad (23)$$

$$\alpha = x_a - \text{Floor}\{x_a\}$$

$$I_B = \begin{cases} \frac{I_{rec}(0, y_b - 1) + 2I_{rec}(0, y_b) + I_{rec}(0, y_b + 1)}{4} & \text{for } y_b \in Z \\ (1 - \beta)I_{rec}(0, \text{Floor}\{y_b\}) + \beta I_{rec}(0, \text{Ceil}\{y_b\}) & \text{otherwise} \end{cases} \quad (24)$$

$$\beta = y_b - \text{Floor}\{y_b\}$$

In the equations (23) and (24), if pixels positioned at (Ceil{xa}, 0), (xa+1, 0), (0, Ceil{yb}), and (0, yb+1) are placed in the unencoded pixel region, a pixel value positioned at (L, 0) is used instead of (Ceil{xa}, 0) and (xa+1, 0), and a pixel value positioned at (0, K) is used instead of (0, Ceil{yb}) and (0, yb+1).

By applying the generation method of the prediction pixel of the point P, which is in the target pixel region to be predicted, to all points positioned on integer pixels in the target pixel region to be predicted, it is possible to generate prediction pixels over the target pixel region to be predicted.

In the present embodiment, an encoding unit of the prediction set is an M×M pixel block. However, the encoding unit is not limited to this. For example, a macro block, a slice, a picture (frame), or a GOP (Group Of Picture) may be also used as the encoding unit of the prediction set. In the case where the prediction set is changed per slice unit, for example, it is necessary to encode information on a selected prediction set at a headmost part of the slice. The encoding unit of the prediction set may be determined, in advance, between an image encoding device and an image decoding device, or may be designated in a headmost piece of encoded data, a picture, or a GOP header. Alternatively, it is also possible to notify the encoding unit by use of external means, not by the image encoding device and the image decoding device.

Figure 13:
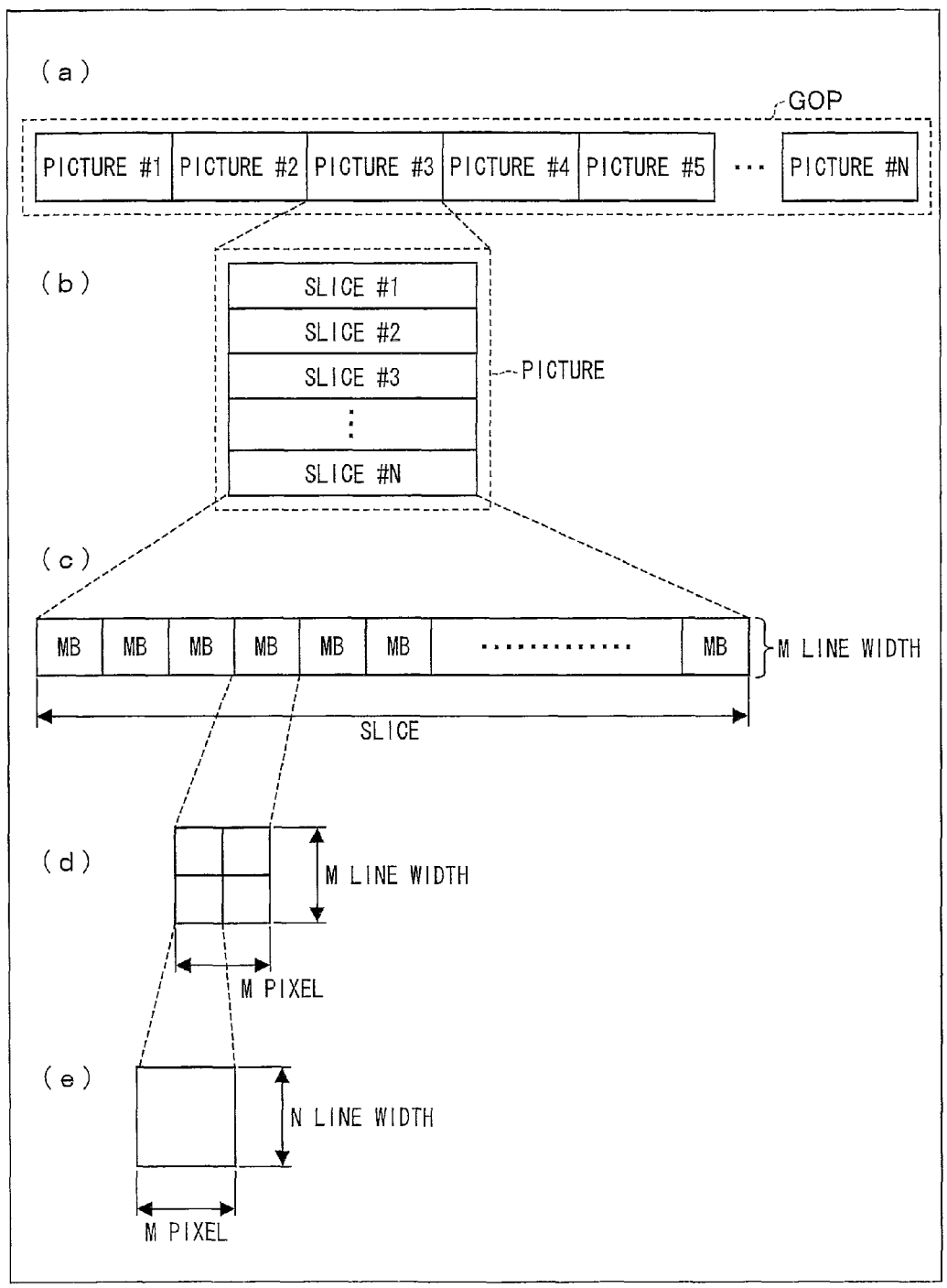
FIG. 13 schematically illustrates relations between encoding units according to the present invention. (a) of FIG. 13 illustrates a GOP, (b) of FIG. 13 illustrates a picture (frame), (c) of FIG. 13 illustrates a slice, (d) of FIG. 13 illustrates a macro block, and (e) of FIG. 13 illustrates a block.

Such a macro book, a slice, a picture (frame), and a GOP, in the specification, are illustrated in (a) through (e) of FIG. 13. (a) through (e) of FIG. 13 schematically illustrate relations between the encoding units according to the present invention. (a) of FIG. 13 illustrates the GOP, (b) of FIG. 13 illustrates the picture (frame), (c) of FIG. 13 illustrates the slice, (d) of FIG. 13 illustrates the macro block, and (e) of FIG. 13 illustrates a sub block. In FIG. 13, the sub block is set such that M=2N, but is not limited to this. For example, the sub block may be set such that M=N, 2N, 4N, 8N, 16N, or the like.

(Effects)

As described above, the image encoding device 100 calculates edge information of an image from each constituent block of the image. The image encoding device 100 calculates, for example, an edge orientation and an edge strength of the image, or distribution information thereof, as the edge information. The image encoding device selects a prediction set suitable to the calculated edge information from a prediction set group including a plurality of prediction sets having different combinations of a plurality of prediction modes corresponding to different prediction directions. The image encoding device then encodes the image by use of the prediction set thus selected. For example, in the case where the edge information indicates that edges are formed in a horizontal direction in a collective manner, the image encoding device encodes the image by use of a prediction set that focuses on predictions in the horizontal direction. On the other hand, in the case where the edge information indicates that edges are formed in a vertical direction in a collective manner, the image encoding device encodes the image by use of a prediction set that focuses on predictions in the vertical direction.

As such, the image encoding device 100 encodes an image by use of a prediction set optimal for the edge information of the image. This allows the image encoding device to carry out predictions from more various directions than the conventional technique, thereby making it possible to reduce an encoding amount of the image and to improve image quality.

Further, the image encoding device 100 can more flexibly select a prediction method because the prediction methods are expressed hierarchically by the prediction set information and the prediction mode information. As a result, it is possible to prevent that a necessary encoding amount for the prediction method increases and to improve efficiency in prediction.

(Additional Matters)

The present embodiment deals with a case where the number L of prediction sets is 4 and the number Ki of prediction modes is 9 (i=0, 1, 2, 3), as an example of the prediction set group. However, the prediction set group is not limited to this. For example, the prediction set group may be such that the number L of prediction sets may be 5 or 9, or an other natural number. Tables 6 and 7 show examples of the prediction set group and the prediction sets in which examples the numbers L of prediction sets are 5 and 9, respectively. Table 6 shows an example of the prediction set group and the prediction sets in which the number L of prediction sets is 5 and the number Ki of prediction modes is 9 ($0 \leq i < 5$, i∈integer). Table 7 shows an example of the prediction set group and the prediction in which the number L of prediction sets is 9 and the number Ki of prediction modes is 9 ($0 \leq i < 9$, i∈integer).

TABLE 6

|  |  | Prediction Set | | | | |
|---|---|---|---|---|---|---|
|  |  | 0 | 1 | 2 | 3 | 4 |
| Prediction Mode | 0 | −90 | −90 | −90 | −90 | −90 |
|  | 1 | 0 | 0 | 0 | 0 | 0 |
|  | 2 | DC | DC | DC | DC | DC |
|  | 3 | −45 | −30 | −60 | −15 | −75 |
|  | 4 | 45 | 30 | 60 | 15 | 75 |
|  | 5 | 67.5 | 60 | 75 | 30 | 60 |
|  | 6 | 22.5 | 15 | 30 | 7.5 | 82.5 |
|  | 7 | −67.5 | −60 | −75 | −30 | −60 |
|  | 8 | −22.5 | −15 | −30 | −7.5 | −82.5 |

TABLE 7

|  |  | Prediction Set | | | | | | | | |
|---|---|---|---|---|---|---|---|---|---|---|
|  |  | 0 | 1 | 2 | 3 | 4 | 5 | 6 | 7 | 8 |
| Prediction Mode | 0 | −90 | −90 | −90 | −90 | −90 | −90 | −90 | −90 | −90 |
|  | 1 | 0 | 0 | 0 | 0 | 0 | 0 | 0 | 0 | 0 |
|  | 2 | DC | DC | DC | DC | DC | DC | DC | DC | DC |
|  | 3 | −45 | −25 | −65 | −30 | −60 | −20 | −70 | −15 | −75 |
|  | 4 | 45 | 25 | 65 | 30 | 60 | 20 | 70 | 15 | 75 |
|  | 5 | 67.5 | 50 | 40 | 60 | 30 | 40 | 50 | 30 | 60 |
|  | 6 | 22.5 | 12.5 | 77.5 | 15 | 75 | 10 | 80 | 7.5 | 82.5 |
|  | 7 | −67.5 | −50 | −40 | −60 | −30 | −40 | −50 | −30 | −60 |
|  | 8 | −22.5 | −12.5 | −77.5 | −15 | −75 | −10 | −80 | −7.5 | −82.5 |

[Embodiment 2]

An image decoding device according to the present invention is described below as Embodiment 2, with reference to FIG. 14 through FIG. 17. The same constituent components as in Embodiment 1 have the same reference signs as in Embodiment 1, and are not explained here.

(Arrangement of Image Decoding Device 150)

An arrangement of an image decoding device 150 according to Embodiment 2 is explained below with reference to FIG. 14. FIG. 14 is a block diagram showing the arrangement of the image decoding device 150.

As shown in FIG. 14, the image decoding device 150 mainly includes an entropy decoding section 5, an inverse quantization section 6, an inverse orthogonal transformation section 7, an addition computing section 8, a memory 9, an intra prediction section 10, and a prediction set information forming section 52. In the present embodiment, only the entropy decoding section 5 and the prediction set information forming section 52, which have not been described yet, will be explained.

(Entropy Decoding Section 5)

The entropy decoding section 5 carries out entropy decoding with respect to encoded data, such as prediction residual data, prediction mode information, and relative prediction set information, and outputs decoded data.

(Prediction Set Information Forming Section 52)

The prediction set information forming section 52 forms prediction set information of a target block on the basis of the entropy-decoded relative prediction set information and prediction set information that has been already decoded. An arrangement and operation of the prediction set information forming section 52 will be described later.

(Overview of Image Decoding Process)

Figure 15:
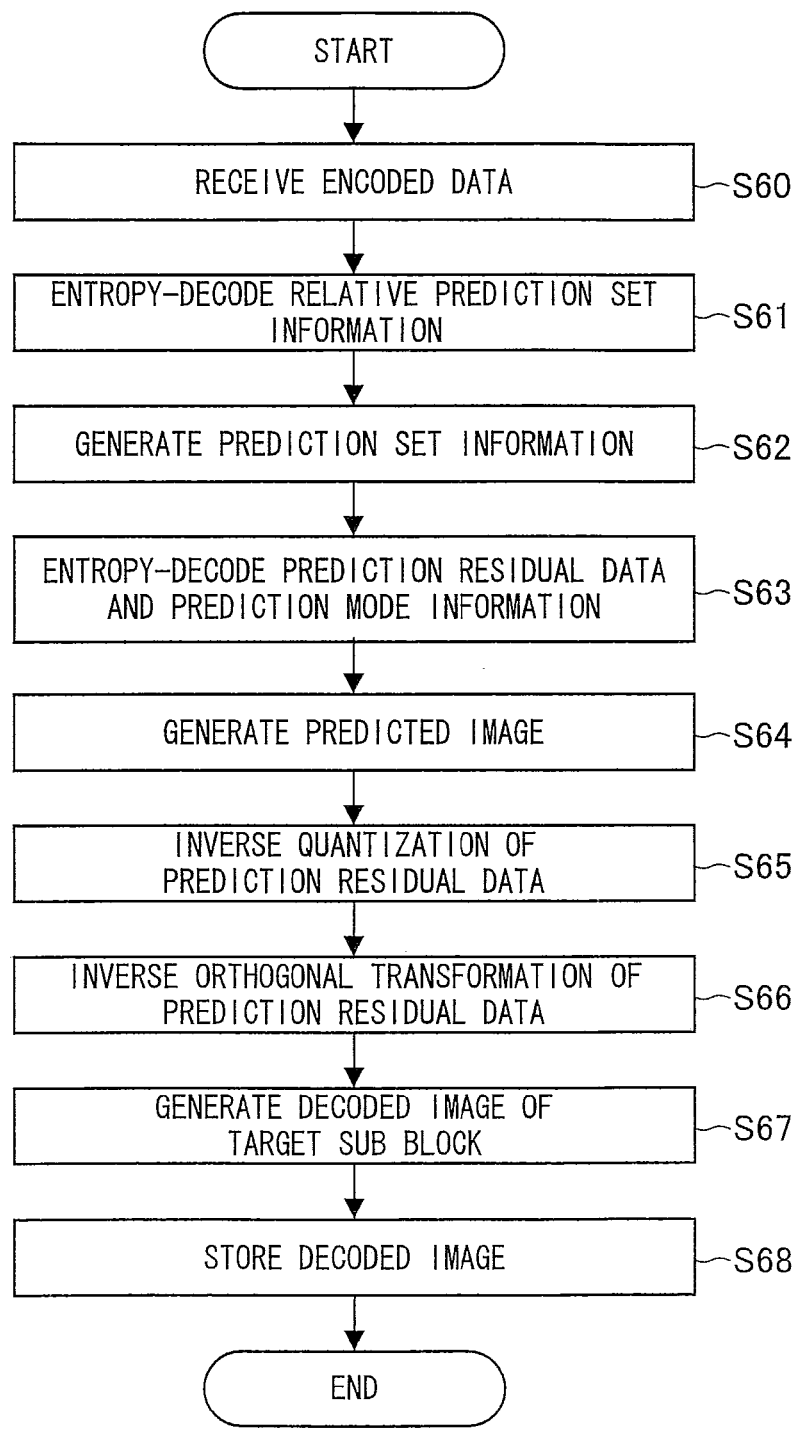
FIG. 15 is a flowchart schematically showing an image decoding process according to Embodiment 2.

The following generally explains about an image decoding process in the image decoding device 150, with reference to FIG. 15. FIG. 15 is a flowchart schematically showing the image decoding process in the image decoding device 150.

(Reception of Encoded Data and Formation of Prediction Set Information)

When the image decoding device 150 receives encoded data (M×M pixel blocks) (Step S60), the entropy decoding section 5 carries out entropy decoding with respect to relative prediction set information, in the received encoded data, on a prediction set to be applied to a target image to be decoded (an M×M pixel block, hereinafter referred to a target block to be decoded) (Step S61). Then, the prediction set information forming section 52 forms prediction set information of a target block to be decoded, on the basis of the entropy-decoded relative prediction set information and prediction set information that has been already decoded (Step S62). A detailed process of forming the prediction set information in the prediction set information forming section 52 will be described later.

(Decoding of Prediction Residual Data and Prediction Mode Information)

The entropy decoding section 5 further carries out entropy decoding with respect to prediction mode information and a quantization value of prediction residual data of each target sub block to be decoded (Step S63). The target sub block to be decoded has a predetermined block size (N×N pixel block) by which the target block is subdivided.

(Generation of Predicted Image)

The intra prediction 10 carries out intra prediction by use of a locally decoded image of decoded adjacent sub blocks, which is stored in the memory 9, and generates a predicted image (N×N pixel block) according to the prediction set information thus formed (decoded) and a prediction mode to be applied to the target sub block to be decoded, which prediction mode is indicated by the prediction mode information thus decoded (Step S64). How to generate the predicted image by intra prediction has been described in Embodiment 1, and therefore is not explained here.

(Inverse Quantization and Inverse Orthogonal Transformation)

The inverse quantization 6 carries out inverse quantization with respect to the prediction residual data thus decoded in Step S63, and supplies the prediction residual data to the inverse orthogonal transformation section 7 (Step S65). The inverse orthogonal transformation section 7 carries out inverse orthogonal transformation with respect to the prediction residual data thus inverse-quantized, and supplies the prediction residual data to the addition computing section 8 (Step S66).

(Generation of Decoded Image of Target Sub Block)

The addition computing section 8 adds the predicted image generated in Step S64 to the prediction residual data received in Step S66, so as to generate a decoded image (N×N pixel block) of the target sub block, and outputs the decoded image (Step S67).

The memory 9 receives and then stores the outputted decoded image of the target sub block therein (Step S68).

(Additional Matters)

The image decoding device 150 repeats Steps S63 to S68 with respect to all sub blocks constituting the target block to be decoded, and also repeats Steps S60 to S68 with respect to all blocks constituting the target image to be decoded.

(Details of Prediction Set Information Forming Section 52)

The following deals with the prediction set information forming section 52, more specifically.

The prediction set information forming section 52 carries out a process reverse to the process carried out by the relative prediction set information forming section 51. More specifically, the prediction set information forming section 52 forms prediction set information from the relative prediction set information and the prediction set information that has been already decoded.

(Arrangement of Prediction Set Information Forming Section 52)

An arrangement of the prediction set information forming section 52 is described below with reference to FIG. 16. FIG. 16 is a block diagram showing the arrangement of the prediction set information forming section 52. The prediction set information forming section 52 includes a prediction set information generation section 521, a prediction set information predicting section 512, and a prediction set information storing section 513. The following describes the prediction set information generation section 521, which has not been described yet.

(Prediction Set information Generation Section 521)

The prediction set information generation section 521 generates prediction set information based on the relative prediction set information entropy-decoded by the entropy decoding section 5 and a prediction value determined by the prediction set information predicting section 512, and then outputs the prediction set information.

(Details of Process of Forming Prediction Set Information)

Figure 17:
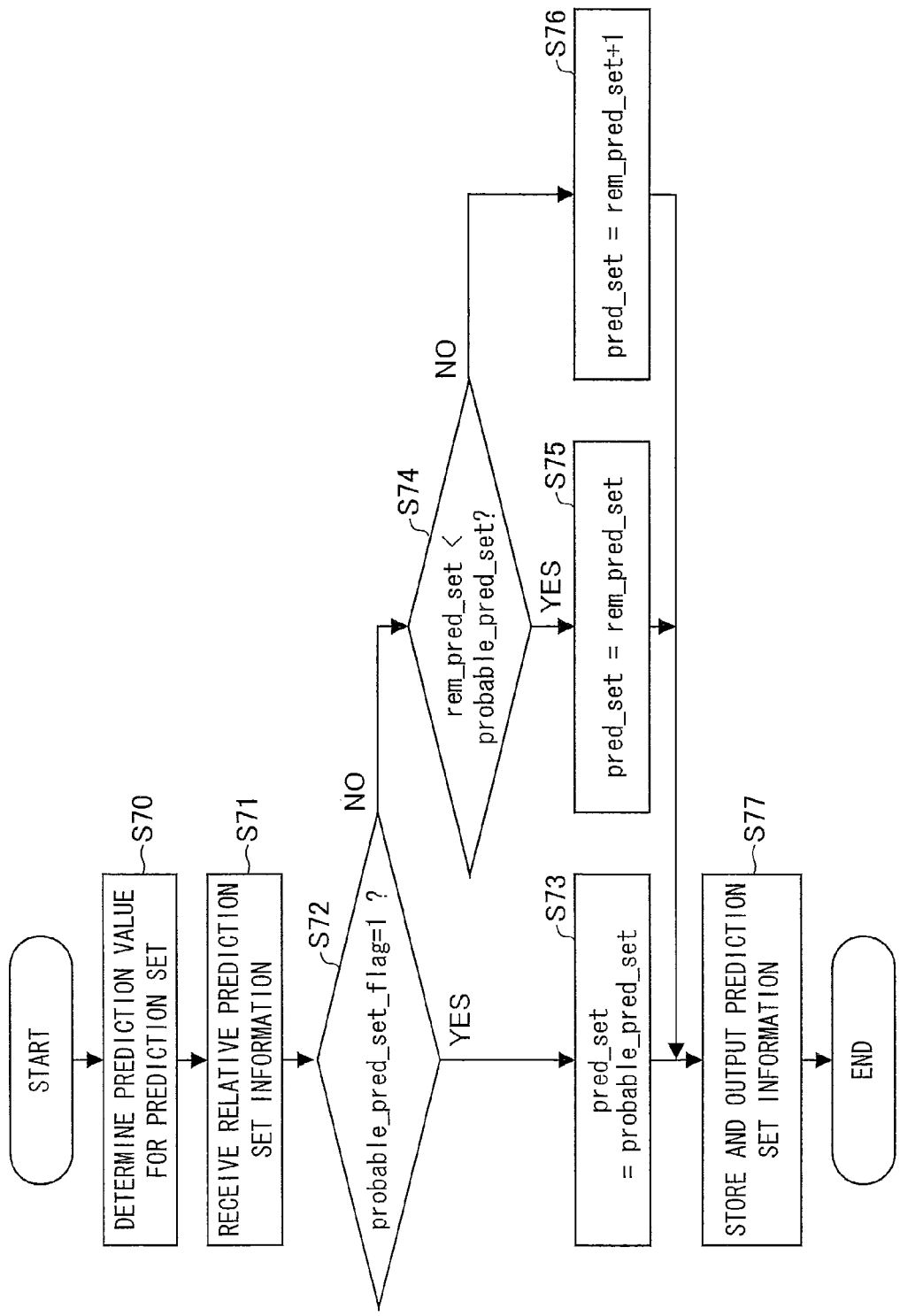
FIG. 17 is a flowchart showing a process of forming prediction set information, in a prediction set information forming section.

A process of forming the prediction set information is more specifically described below with reference to FIG. 17. FIG. 17 is a flowchart showing the process of forming the prediction set information, in the prediction set information forming section 52.

The prediction set information predicting section 512 determines a prediction value probable_pred_set of a prediction set, which is to be applied to the target block to be decoded, on the basis of the prediction set information that has been already decoded and stored in the prediction set information storing section 513, and outputs the determined prediction value (Step S70). The prediction value of a prediction set to be applied to the target block to be decoded is determined in the same manner as in the determination of the prediction value of a prediction set in the image encoding device 100 of Embodiment 1, and therefore is not described here.

Then, the relative prediction set information is supplied to the prediction set information generation section 521 (Step S71). The prediction set information generation section 521 determines whether a value of probable_pred_set_flag in the relative prediction set information thus received is "1" or not (Step S72). If the value of probable_pred_set_flag is "1" (Yes in Step S72), the prediction set information generation section 521 sets the prediction value probable_pred_set as a value of pred_set in prediction set information prediction_set_data( ) indicative of the prediction set to be applied to the target block to be decoded, and outputs the value of the pred_set (Step S73). That is, in this case, the pred_set equals to the probable_pred_set.

If the value of the probable_pred_set_flag is "0" (No in Step S72), the prediction set information generation section 521 sets a value of the pred_set based on rem_pred_set and the probable_pred_set, and outputs the value of the pred_set. More specifically, the prediction set information generation section 521 compares a value of the rem_pred_set with the prediction value probable_pred_set (Step S74). If the rem_pred_set is smaller than the probable_pred_set (Yes in Step S74), the pred_set is set such that pred_set=rem_pred_set (Step S75). If the rem_pred_set is not smaller than the probable_pred_set (No in Step S74), the pred_set is set such that pred_set=rem_pred_set+1 (Step S76).

Subsequently, the prediction set information storing section 513 stores the prediction set information prediction_set_data( ) thus decoded, and outputs the prediction set information thus decoded (Step S77).

In the present embodiment, a decoding unit of the prediction set is an M×M pixel block. However, the decoding unit is not limited to this. For example, a macro block, a slice, a picture (frame), or a GOP (Group Of Picture) may be also used as the decoding unit of the prediction set. If the prediction set is changed per slice unit, for example, it is necessary to decode information on a selected prediction set at a headmost part of the slice. The decoding unit of the prediction set may be determined, in advance, between an image encoding device and an image decoding device, or may be designated in a headmost piece of encoded data, a picture, or a GOP header. Alternatively, it is also possible to notify the decoding unit by use of external means, not by the image encoding device and the image decoding device.

Further, in the present embodiment, encoded data of the relative prediction set information is entropy-decoded, and the prediction set information is formed from the relative prediction set information thus decoded. However, it is also possible that, instead of the relative prediction set information, encoded data of prediction set information may be entropy-decoded and the prediction set may be changed in accordance with the prediction set information thus decoded.

(Effects)

As described above, the image decoding device 150 includes a prediction set group including a plurality of prediction sets having different combinations of a plurality of prediction modes corresponding to different prediction directions. The image decoding device 150 decodes prediction set information to be applied to a target block to be decoded in blocks constituting an image, by use of relative prediction set information and prediction set information that has been already decoded. Then, the image decoding device 150 carries out intra prediction with respect to a target sub block by use of a locally decoded image of an adjacent sub block. The intra prediction is carried out on respective sub blocks into which the target block to be decoded is subdivided. Finally, the image decoding device 150 combines a generated predicted image with decoded prediction residual data of the target sub block, so as to reconstruct an image of the target sub block.

In the arrangement, in the case where the prediction set information thus decoded indicates a prediction set that focuses on predictions in a horizontal direction, it is possible to generate a predicted image from more specific angles with the horizontal direction as a center direction. Further, in the case where the prediction set information thus decoded indicates a prediction set that focuses on predictions in a vertical direction, it is possible to generate a predicted image from more specific angles with the vertical direction as a center direction. That is, the arrangement allows the image decoding device 150 to carry out a decoding process using predictions from more various angles than the conventional technique, thereby making it possible to reproduce an edge portion more efficiently. This allows reconstructing of an image having improved image quality.

Moreover, the image decoding device 150 carries out prediction at two stages of the prediction set and the prediction mode, thereby making it possible to prevent an increase in an encoding amount and to realize high accuracy in prediction.

[Embodiment 3]

Another embodiment of the image encoding device according to the present invention is explained below as Embodiment 3, with reference to FIG. 18 through FIG. 25. The same constituent components as in Embodiments 1 and 2 have the same reference signs as in Embodiments 1 and 2, and are not explained here. Embodiment 1 describes an image encoding device in which the prediction set is changed per predetermined pixel block unit according to an edge orientation of a target block to be encoded, so that the image encoding device can carry out more various predictions than the conventional technique. Embodiment 3 deals with an image encoding device (i) which forms prediction sets in each of which a combination of prediction modes is automatically determined in accordance with an image and (ii) which selects a prediction set from the prediction sets thus formed, according to an edge orientation of a target block to be encoded, so that the image encoding device can further improve efficiency in prediction.

(Arrangement of Image Encoding Device 200)

Figure 18:
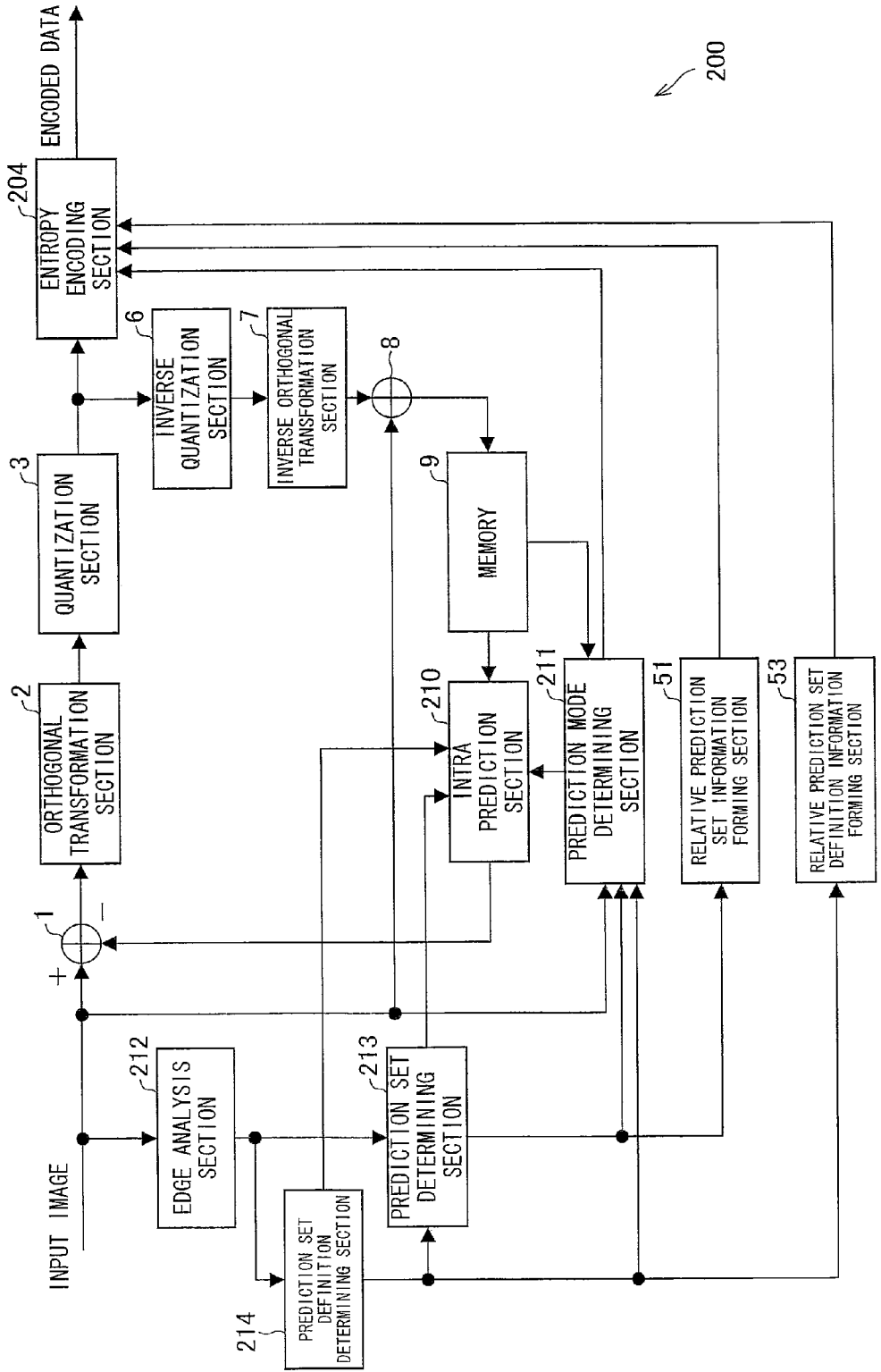
FIG. 18 is a block diagram showing essential part of an arrangement of an image encoding device according to Embodiment 3.

An arrangement of an image encoding device 200 according to the present embodiment, with reference to FIG. 18. FIG. 18 is a block diagram showing the arrangement of the image encoding device 200 according to the present embodiment. As shown in FIG. 18, the image encoding device 200 mainly includes a difference computing section 1, an orthogonal transformation section 2, a quantization section 3, an inverse quantization section 6, an inverse orthogonal transformation section 7, an addition computing section 8, a memory 9, an intra prediction section 210, a prediction mode determining section 211, an entropy encoding section 204, an edge analysis section 212, a prediction set determining section 213, a relative prediction set information forming section 51, a prediction set definition determining section 214, and a relative prediction set definition information forming section 53. The present embodiment describes only the entropy encoding section 204, the prediction mode determining section 211, the edge analysis section 212, the prediction set determining section 213, the prediction set definition determining section 214, and the relative prediction set definition information forming section 53, which have not been described in Embodiments 1 and 2.

(Edge Analysis Section 212)

The edge analysis section 212 calculates an edge strength and an edge orientation (hereinafter collectively referred to as edge information). More specifically, the edge analysis section 212 calculates edge information per sub block (an inputted target frame to be encoded is subdivided into sub blocks, each an N×N pixel block), and outputs pieces of edge information of all sub blocks constituting the inputted target frame to be encoded.

(Prediction Set Definition Determining Section 214)

The prediction set definition determining section 214 determines definitions (prediction modes included in each prediction set) of a plurality of prediction sets to be applied to the target frame to be encoded, based on the edge information of the target frame, calculated in the edge analysis section 212. The prediction set definition determining section 214 then updates a table (Table 2) of prediction modes and prediction sets, which table is referred to by the intra prediction section 210, the prediction mode determining section 211, and the prediction set determining section 213. Subsequently, the prediction set definition determining section 214 outputs prediction set definition information prediction_method_data( ) indicative of the table of the prediction modes and prediction sets.

(Relative Prediction Set Definition Information Forming Section 53)

The relative prediction set definition information forming section 53 predicts, from prediction set definition information that has been already encoded, definition information of the prediction sets to be applied to the target frame to be encoded, which is determined by the prediction set definition determining section 214, and outputs relative prediction set definition information.

(Entropy Encoding Section 204)

The entropy encoding section 204 carries out entropy encoding with respect to prediction residual data, prediction mode information, relative prediction set information, and the relative prediction set definition information, and outputs thus encoded data.

(Prediction Set Determining Section 213)

The prediction set determining section 213 determines, based on the edge information received from the edge analysis section 212, a prediction set to be applied to a target block to be encoded, from the plurality of prediction sets in the prediction set definition information received from the prediction set definition determining section 214. The prediction set determining section 213 then outputs prediction set information indicative of the prediction set thus determined. How to determine the prediction set is the same as in Embodiment 1, and therefore is not explained in the present embodiment.

(Prediction Mode Determining Section 211)

The prediction mode determining section 211 determines one prediction mode to be used for prediction of the target block to be encoded, from the plurality of prediction modes defined by the prediction set definition information and the prediction set information thus received, based on an original image of the target block to be encoded and a locally decoded image supplied from the memory 9. The prediction mode determining section 211 then supplies prediction mode information indicative of the prediction mode thus determined to the intra prediction section 210 and the entropy encoding section 204. How to determine the prediction mode is the same as in Embodiment 1, and therefore is not described in the present embodiment.

(Intra Prediction Section 210)

The intra prediction section 210 carries out intra prediction indicated by the prediction set information, the prediction set definition information, and the prediction mode information, with the use of the locally decoded image stored in the memory 9, so as to generate a predicted image.

(Overview of Image Encoding Process)

Figure 19:
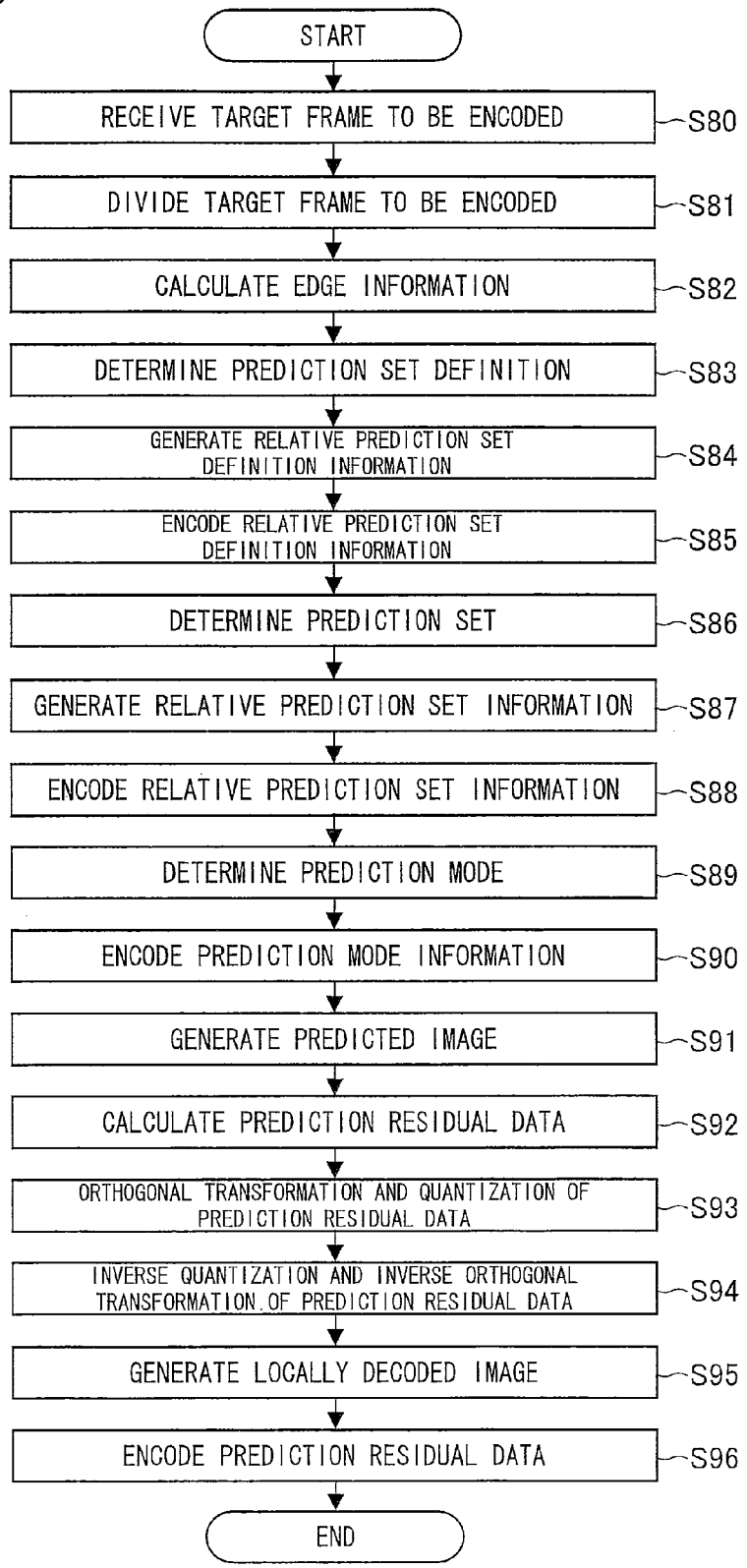
FIG. 19 is a flowchart schematically showing an image encoding process according to Embodiment 3.

The following generally describes an image encoding process in the image encoding device 200, with reference to FIG. 19. FIG. 19 is a flowchart schematically showing the image encoding process in the image encoding device 200.

(Reception of Target Frame to be Encoded and Calculation of Edge Information)

When the image encoding device 200 receives a frame (hereinafter referred to as a target frame to be encoded) constituted by a plurality of M×M pixel blocks (Step S80), the edge analysis section 212 subdivides the target frame to be encoded into sub blocks (N×N pixel blocks, N≤M) (Step S81), and calculates edge information for each of the sub blocks constituting the target frame to be encoded (Step S82).

(Determination of Prediction Set Definition Information and Encoding of Prediction Set Definition Information)

Subsequently, the prediction set definition determining section 214 determines, based on the edge information calculated in Step S82, respective prediction methods to be assigned to a plurality of prediction modes included in prediction sets to be applied to the target frame to be encoded, and updates the table of prediction modes and prediction sets. Then, the prediction set definition determining section 214 supplies information (hereinafter referred to as prediction set definition information) indicative of combinations of the prediction modes thus determined of the prediction sets to the intra prediction section 210, the prediction mode determining section 211, the prediction set determining section 213, and the relative prediction set definition information forming section 53 (Step S83). How to determine the prediction set definition will be described later, more specifically. The prediction methods encompass a DC prediction, template matching, and a prediction method based on a prediction direction.

The relative prediction set definition information forming section 53 predicts prediction set definition information on the basis of prediction set definition information that has been already encoded, and outputs relative prediction set definition information (Step S84). An arrangement of the relative prediction set definition information forming section 53 and a process of predicting the prediction set definition information will be described later, more specifically.

The entropy encoding section 204 carries out encoding entropy with respect to the relative prediction set definition information received from the relative prediction set definition information forming section 53, and outputs encoded data of the relative prediction set definition information (Step S85).

(Determination of Prediction Set and Encoding of Prediction Set Information)

The prediction set determining section 213 determines a prediction set to be applied to each of the M×M pixel blocks (hereinafter referred to as a target block to be encoded) constituting the target frame to be encoded, based on the edge information calculated in Step S82, and supplies information (hereinafter also referred to as prediction set information) indicative of the prediction set thus determined to the prediction mode determining section 211, the relative prediction set information forming section 51, and the intra prediction section 210 (Step S86).

The relative prediction set information forming section 51 receives the prediction set information from the prediction set determining section 213, predicts prediction set information based on prediction set information that has been already encoded, and supplies relative prediction set information to the entropy encoding section 204 (Step S87). The entropy encoding section 204 carries out entropy encoding with respect to the relative prediction set information, and outputs thus encoded data of the relative prediction set information (Steps S88). How to determine the prediction set, how to encode the prediction set information, and a data structure of the prediction set information are the same as in Embodiment 1.

(Determination of Prediction Mode and Encoding of Prediction Mode Information)

The prediction mode determining section 211 subdivides the target block to be encoded into N×N pixel blocks, so as to obtain sub blocks (hereinafter referred to as a target sub block to be encoded). The prediction mode determining section 211 receives, from the memory 9, a locally decoded image of adjacent sub blocks that have been already encoded, and determines, based on the locally decoded image thus received, an optimal prediction mode to be applied to the target sub block to be encoded, from prediction modes in the prediction set indicated by the prediction set information received from the prediction set determining section 213. The prediction mode determining section 211 determines the optimal prediction mode with reference to the prediction set definition information updated by the prediction set definition determining section 214. Then, the prediction mode determining section 211 supplies prediction mode information to the intra prediction section 210 and the entropy encoding section 204 (Step S89).

The entropy encoding section 204 carries out entropy encoding with respect to the prediction mode information thus received, and outputs encoded data of the prediction mode information (Step S90).

(Generation of Predicted Image)

The intra prediction section 210 receives, from the memory 9, a locally decoded image of adjacent sub blocks that have been already encoded. The intra prediction section 210 then carries out intra prediction defined by the prediction set information determined in Step S86 and the prediction mode information determined in Step S89, with the use of the locally decoded image thus received and with reference to the prediction set definition information determined in Step S83, so as to generate a predicted image of the target sub block to be encoded. The intra prediction section 210 supplies the predicted image to the difference computing section 1 and the addition computing section 8 (Step S91).

(Calculation of Prediction Residual Data)

The difference computing section 1 calculates prediction residual data (N×N pixel block), which is a difference between the received target sub block to be encoded and the predicted image thus generated in Step S91, and outputs the prediction residual data (Step S92).

(Orthogonal Transformation and Quantization)

The prediction residual data thus calculated in Step S92 is supplied to the orthogonal transformation section 2 and then to the quantization section 3 so as to be subjected to orthogonal transformation and quantization, respectively.

The prediction residual data is then supplied to the entropy encoding section 204 and the inverse quantization section 6 (Step S93).

(Inverse Orthogonal Transformation and Inverse Quantization)

The prediction residual data thus subjected to the orthogonal transformation and the quantization is supplied to the inverse quantization section 6 and then to the inverse orthogonal transformation section 7 so as to be subjected to inverse quantization and inverse orthogonal transformation, respectively. The prediction residual data is then supplied to the addition computing section 8 (Step S94).

(Generation of Locally Decoded Image)

The addition computing section 8 adds the prediction residual data thus subjected to the inverse quantization and the inverse orthogonal transformation in Step S94, to the predicted image generated in Step S91, so as to generate a locally decoded image of the N×N pixel block (Step S95). The locally decoded image thus generated is then stored in the memory 9.

(Encoding of Prediction Residual Data)

The entropy encoding section 204 carries out entropy encoding with respect to the quantized prediction residual data of the target sub block, and outputs encoded data of the prediction residual data (Step S96).

(Reception of Edge Information)

The edge analysis section 212 supplies edge information of the target frame to be encoded to the prediction set definition determining section 214 (Step S100).

(Calculation of Edge Orientation Histogram)

The prediction set definition determining section 214 calculates, based on the received edge information, an edge orientation histogram $f(\theta)$ of blocks (N×N pixel blocks) each having an edge strength that is not less than a predetermined threshold Th, and then finds edge orientation histogram information histogram_data( ) (Step S101). The threshold Th may be set to a certain value in advance, or may be set as necessary. Further, the edge orientation histogram shows appearance frequency of edge orientations in angles from −90 [deg] to 89 [deg] where the edge orientation is expressed by an angle unit 1 [deg], for example. FIG. 21 shows an edge orientation histogram obtained when edges are formed in a horizontal direction in a collective manner, as an example. Further, Table 8 shows a data structure of the edge orientation histogram information, more specifically. In Table 8, angle_idx indicates an index indicative of an angel of an edge orientation, and total_angel_idx indicates an index indicative of the number of partitions of angles.

TABLE 8

| Syntax | Detail |
|---|---|
| histogram_data( ){ | Edge Orientation Historgarm Information |
| total_block_number | Total Number of N x N Pixel Blocks Constituting Target Slice to be Encoded |
| nonplane_block_number | Total Number of N x N Pixel Blocks Having Edge Strength Which is not Less than Predetermined Threshold |
| for(angel_idx=0; angle_idx<total_angle_idx; angle_idx++){ | |
| histogram_of_edge_orientation[angle_idx] | Appearance Frequency of Edge Orientation for angle_idx |
| } | |
| } | |

The processes from Step S89 to Step S96 are carried out with respect to all sub blocks constituting an M×M pixel block. Further, the processes from Step S86 to Step S96 are carried out with respect to all blocks constituting the target frame to be encoded. Furthermore, the processes from Step S80 to Step S96 are carried out with respect to all frames constituting the target image to be encoded.

(Additional Matters)

In the present embodiment, the encoding process of the image encoding device 200 is explained in the order from Step S80 to Step S96. However, the order of the steps is not limited to this, and can be altered as long as the present invention can be carried out.

(Details of How to Determine Prediction Set Definition)

The following deals with how the prediction set definition determining section 214 operates, more specifically. The prediction set definition determining section 214 determines respective prediction methods to be assigned to prediction modes in each of a plurality of prediction sets to be applied to the target frame to be encoded, based on the edge information calculated by the edge analysis section 212. The prediction set definition determining section 214 then outputs prediction set definition information indicative of the prediction methods thus assigned.

How to determine the prediction set definition information is more specifically described below with reference to FIG. 20. FIG. 20 is a flowchart specifically showing a determination process of the prediction set definition information.

(Calculation of Edge Orientation Cumulative Frequency Distribution)

Figure 22:
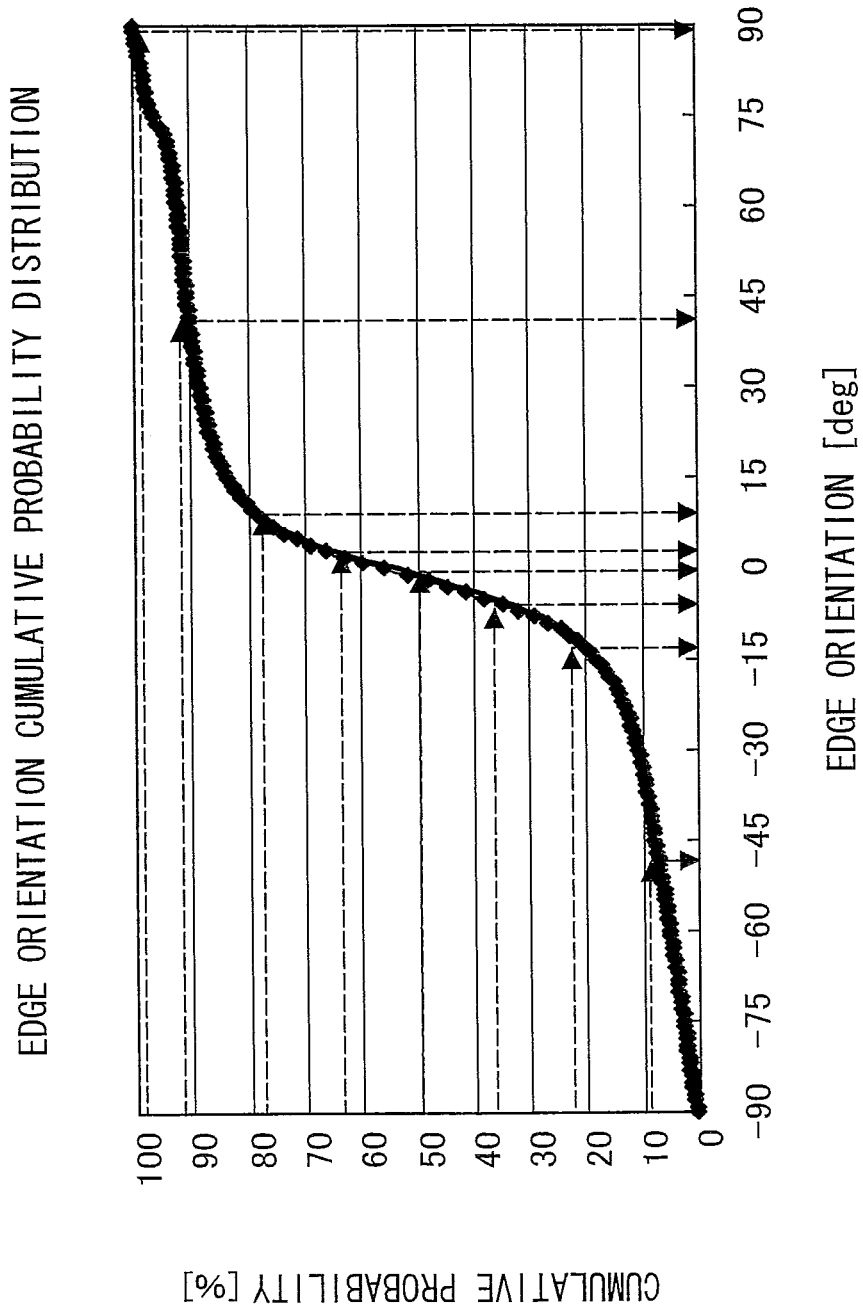
FIG. 22 shows an edge orientation cumulative frequency distribution obtained from an edge orientation histogram in which edges are oriented mainly in a horizontal direction.

The prediction set definition determining section 214 calculates an edge orientation cumulative frequency distribution based on the edge orientation histogram information thus found in Step S101 (Step S102). For example, when the edge orientation is expressed by the angle unit 1 [deg], the edge orientation cumulative frequency distribution in a range from −90 [deg] to an edge orientation θ [deg] is calculated by the following equation (25). By calculating edge orientation cumulative frequency with respect to all edge orientations from −90 [deg] to 89 [deg], an edge orientation cumulative frequency distribution F(θ) can be obtained. As such, the edge orientation cumulative frequency distribution shown in FIG. 22 can be obtained from the edge orientation histogram shown in FIG. 21. FIG. 22 is a graph that is normalized by the number of blocks having an edge strength that is not less than a predetermined threshold.

Math. 13

$$F(\theta) = \sum_{\phi=-90}^{\theta} f(\phi) \quad (25)$$

(Calculation of Edge Orientation Distribution with Respect to Cumulative Frequency)

The prediction set definition determining section 214 then calculates a distribution (inverse function of the edge orientation cumulative frequency distribution) G(x) of edge orientations with respect to the cumulative frequencies, with the use of the edge orientation cumulative frequency distribution thus calculated in Step S102 (Step S103).

(Determination of Central Direction in Prediction Directions to be Assigned)

The prediction set definition determining section 214 then determines which direction is to be set as a central direction in assigning prediction directions, with the use of the edge orientation cumulative frequency distribution calculated in Step S102 (Step S104). More specifically, the prediction set definition determining section 214 determines which direction is to be set as the central direction, a horizontal direction (0 [deg]) or a vertical direction (−90 [deg]), so as to determine prediction directions, on the basis of an edge concentration degree S(θc, Δθ) expressed by the following equation (26). The edge concentration degree S(θc, Δθ) indicates appearance frequency of an edge orientation appearing in a range of ±Δθ [deg] with an edge orientation θc [deg] as a center of the range. Further, F(θ) indicates an edge orientation cumulative frequency in the edge orientation θ.

Math. 14

$$S(\theta_c, \Delta\theta) = F(\theta_c + \Delta\theta) - F(\theta_c - \Delta\theta) \quad (26)$$

In cases where an edge concentration degree S(0, Δθ) of a horizontal direction is not less than an edge concentration degree S(−90, Δθ) of a vertical direction, prediction directions with the horizontal direction (0 [deg]) as a central direction are assigned. In the other cases, prediction directions with the vertical direction (−90 [deg]) as a central direction are assigned.

(Determination of Prediction Methods to be Assigned to Respective Prediction Modes)

The prediction set definition determining section 214 determines respective prediction methods to be assigned to respective prediction modes, based on (i) the edge orientations with respect to the cumulative frequencies, calculated in Step S103, (ii) the center θc [deg] of the prediction directions determined in Step S104, and (iii) a predetermined prediction method table (Table 10) (Step S105).

Figure 23:
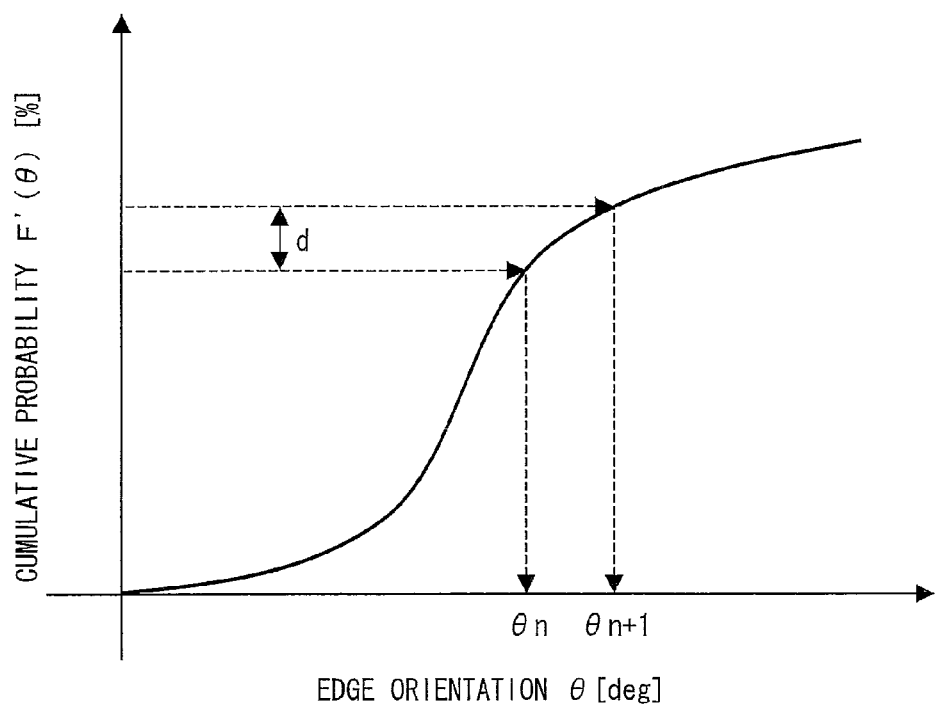
FIG. 23 illustrates a positional relation between a prediction direction θn and a prediction direction θn+1.

More specifically, a prediction direction θn [deg] having an angle larger than the center θc [deg] in the prediction directions is determined by the following recurrence equation (27) and a prediction direction θn [deg] having an angle smaller than the center θc [deg] in the prediction directions is determined by the following recurrence equation (28), in such a manner that a difference (threshold) between edge orientation cumulative frequencies of adjacent prediction directions (θn and θn+1) becomes d. When n=0, θ0 is set such that θ0=θc, and d is a value obtained by dividing a maximum value in the cumulative frequencies by the total number of the prediction directions. A positional relation between θn and θn+1 is shown in FIG. 23. θn satisfies the following expression (29). Further, a cumulative probability F'(θ) of an edge orientation is one obtained by normalizing the cumulative frequency F(θ) of the edge orientation.

Math. 15

$$\theta_{n+1} = G(F(\theta_n) + d) \quad (n+1 > 0) \quad (27)$$

$$\theta_{n-1} = G(F(\theta_n) - d) \quad (n-1 < 0) \quad (28)$$

$$-90[deg] \leq \theta_n < 90[deg], \theta_n \neq \theta_m (n \neq m) \quad (29)$$

The following deals with an example of how to determine a prediction direction θn in the edge orientation cumulative frequency distribution in FIG. 22. In this example, the number L of prediction sets is 3; the number K of prediction modes is 9; 0 [deg], −90 [deg], and DC prediction are assigned, in advance, respectively to mode numbers 0, 1, and 2 in each of the prediction sets; and prediction directions (18 directions) to be assigned to the remaining mode numbers 3 through 8 in the prediction sets are to be determined.

In FIG. 22, since many edges are formed in a horizontal direction (0 [deg]), prediction directions are determined so that a difference (threshold) between edge orientation cumulative probabilities of prediction directions becomes even with the horizontal direction (0 [deg]) as a center. In this case, taking into consideration that the number of prediction directions to be determines is 18 and there are 2 predetermined prediction directions 0 [deg] and −90 [deg], the difference (threshold) d between the edge orientation cumulative probabilities of the prediction directions is set to 5.0 [%] (=100/(18+2)). Subsequently, angles that cause the difference between the cumulative probabilities of the prediction directions to be 5.0 [%] when an initial value is set to an angle 0 [deg] are calculated in accordance with the edge orientation distribution with respect to the cumulative frequency, and the above equations (27) and (28). In this way, the prediction direction θn is obtained as shown in Table 9.

TABLE 9

(a)

| n | 1 | 2 | 3 | 4 | 5 | 6 | 7 | 8 | 9 |
|---|---|---|---|---|---|---|---|---|---|
| θn [deg] | 0.5 | 1 | 2 | 4 | 8 | 12 | 15 | 40 | 72 |

(b)

| n | −1 | −2 | −3 | −4 | −5 | −6 | −7 | −8 | −9 |
|---|---|---|---|---|---|---|---|---|---|
| θn [deg] | −1 | −2 | −4 | −7 | −11 | −15 | −20 | −38 | −60 |

Based on Table 10 showing how to assign prediction directions θn, the positive prediction directions θn ((a) of Table 9) thus obtained are assigned to mode numbers 3, 5, and 7 in each of the prediction sets, in the ascending order. Further, the negative prediction directions θn ((b) of Table 9) thus obtained are assigned to mode numbers 4, 6, and 8 in each of the prediction sets, in the descending order. An example of the definitions of the prediction sets obtained as such is shown in Table 11. Further, the determined definitions of the prediction sets are stored in a data structure of prediction set definition information prediction_method_data( ) shown in Table 12. In Table 12, total_set indicates the total number of prediction sets, and total_mode indicates the total number of prediction modes included in a prediction set. The prediction sets and the prediction modes in Table 11 are referred to by the intra prediction section 210, the prediction mode determining section 211, and the prediction set determining section 214. A prediction method number in a table, shown in Table 13, that defines a prediction method in advance may be set to a prediction method pred_method[set_idx][mode_idx] to be assigned to a prediction mode mode_idx in a prediction set set_idx in the prediction set definition information. In Table 13, prediction methods, such as a plane prediction, a frequency-domain prediction, or template matching, may be defined. The prediction set definition information may be information on prediction sets and prediction modes in which prediction methods are partially altered. An example of the prediction set definition information may be information on prediction directions θn of the mode numbers 3 through 8 in the prediction set numbers 0 through L−1 in Table 10. Further, the prediction set definition information may be such that the total number of prediction sets used per predetermined unit is variable. In this case, the prediction set definition information also includes information on the number of prediction sets.

TABLE 10

|  |  | Prediction Set | | | | |
|---|---|---|---|---|---|---|
|  |  | 0 | 1 | 2 | ... | 4 |
| Prediction Mode | 0 | 0 | 0 | 0 | ... | 0 |
|  | 1 | −90 | −90 | −90 |  | −90 |
|  | 2 | DC | DC | DC |  | DC |
|  | 3 | $\theta_1$ | $\theta_2$ | $\theta_3$ |  | $\theta_L$ |
|  | 4 | $\theta_{-1}$ | $\theta_{-2}$ | $\theta_{-3}$ |  | $\theta_{-L}$ |
|  | 5 | $\theta_{L+1}$ | $\theta_{L+2}$ | $\theta_{L+3}$ |  | $\theta_{2L}$ |
|  | 6 | $\theta_{-L-1}$ | $\theta_{-L-2}$ | $\theta_{-L-3}$ |  | $\theta_{-2L}$ |
|  | 7 | $\theta_{2L+1}$ | $\theta_{2L+2}$ | $\theta_{2L+3}$ |  | $\theta_{3L}$ |
|  | 8 | $\theta_{-2L-1}$ | $\theta_{-2L-2}$ | $\theta_{-2L-3}$ |  | $\theta_{-3L}$ |

TABLE 11

|  |  | Prediction Set | | |
|---|---|---|---|---|
|  |  | 0 | 1 | 2 |
| Prediction Mode | 0 | 0 | 0 | 0 |
|  | 1 | −90 | −90 | −90 |
|  | 2 | DC | DC | DC |
|  | 3 | 0.5 | 1 | 2 |
|  | 4 | −1 | −2 | −4 |
|  | 5 | 4 | 8 | 12 |
|  | 6 | −7 | −11 | −15 |
|  | 7 | 15 | 40 | 72 |
|  | 8 | −20 | −38 | −60 |

TABLE 12

| Syntax | Detail |
|---|---|
| prediction_method_data( ){ for(set_idx=0; set_idx<total_set;set++){ for(mode_idx=0; mode_idx<total_mode; mode++){ | Prediction Set Definition Information Add Following Information about All Prediction Sets Add Following information about All Prediction Modes |
| pred_method[set_idx] } } } | Indicative of Prediction Method Applied to Mode mode_idx in Prediction Set |

TABLE 13

| Prediction Method Number | Prediction Direction [deg] | Direction Vector | |
|---|---|---|---|
|  |  | X Component | Y Component |
| 0 | DC Prediction | — | — |
| 1 | −90 | 0 |  |
| 2 | −87.5 | cos(−87.5) | sin(−87.5) |
| 3 | −85 | cos(−85) | sin(−85) |
| . | . | . | . |
| . | . | . | . |
| . | . | . | . |

TABLE 13-continued

| Prediction Method Number | Prediction Direction [deg] | Direction Vector | |
|---|---|---|---|
|  |  | X Component | Y Component |
| K | 180(K − 1)/ (L − 1) − 90 | cos(180(K − 1)/ (L − 1) − 90) | sin(180(K − 1)/ (L − 1) − 90) |
| . | . | . | . |
| . | . | . | . |
| . | . | . | . |
| 71 | 85 | cos(85) | sin(85) |
| 72 | 87.5 | cos(87.5) | cos(87.5) |

(Output of Prediction Set Definition Information)

The prediction set definition determining section 124 outputs the prediction set definition information thus determined in S105 (Step S106).

As such, it is possible to determine more specific prediction directions with respect to a direction in which edges are formed in a collective manner.

(Process of Encoding Prediction Set Definition Information)

The following describes a process of encoding the prediction set definition information, more specifically. The relative prediction set definition information forming section 53 predicts, based on prediction set definition information that has been already encoded, information (prediction set definition information) indicative of definitions of prediction sets to be applied to the target frame to be encoded, which definitions are determined by the prediction set definition determining section 214. The relative prediction set definition information forming section 53 forms relative prediction set definition information, accordingly. The entropy encoding section 204 may carry out entropy encoding directly with respect to the prediction set definition information instead of the relative prediction set definition information.

(Arrangement of Relative Prediction Set Definition Information Forming Section 53)

Figure 24:
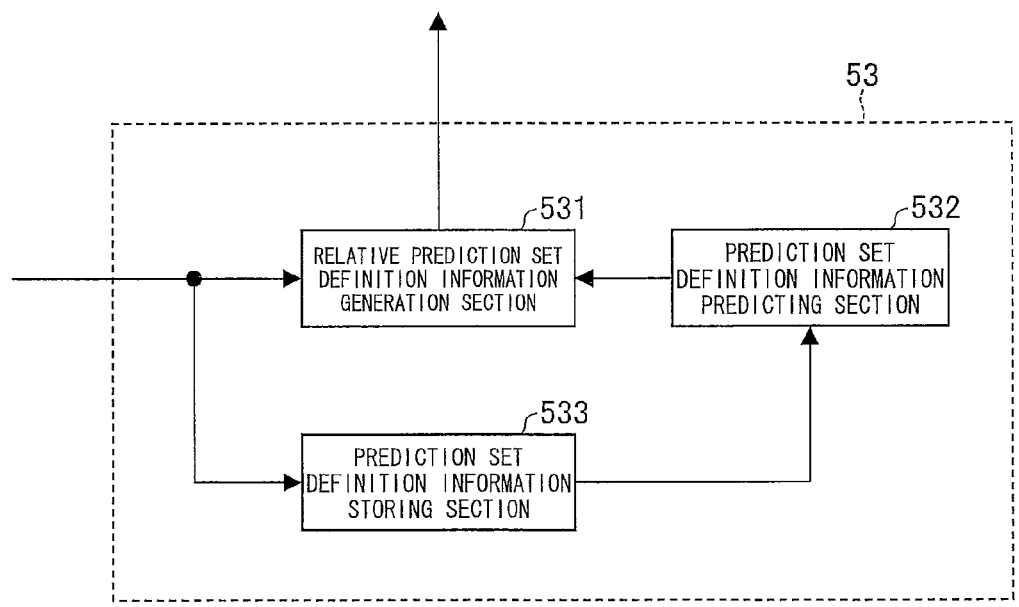
FIG. 24 is a block diagram showing an arrangement of a relative prediction set definition information forming section in an image encoding device according to Embodiment 3.

Initially explained is an arrangement of the relative prediction set definition information forming section 53 with reference to FIG. 24. FIG. 24 is a block diagram showing the arrangement of the relative prediction set definition information forming section 53. The relative prediction set definition information forming section 53 includes a relative prediction set definition information generation section 531, a prediction set definition information predicting section 532, and a prediction set definition information storing section 533 (FIG. 24).

(Relative Prediction Set Definition Information Generation Section 531)

The relative prediction set definition information generation section 531 predicts received prediction set definition information based on prediction values (determined by the prediction set definition information predicting section 532) that are determined based on prediction set definition information that has been already encoded, and outputs relative prediction set definition information. A data structure of the relative prediction set definition information is shown in Table 14.

TABLE 14

| Syntax | Detail |
|---|---|
| relative_prediction_method_data( ) | Relative Prediction Set Definition Information |
| for(set_idx=0; set_idx<total_set; set_idx++){ | Add Following Information about All Prediciton Sets |
| for(mode_idx=0; mode idx<total_mode; mode_idx++){ | Add Following information about All Prediction Modes |
| probable_pred_method_flag[set_idx][mode_idx] | Flag Indicative of Whether or not Determined Prediction Method is Identical with Prediction Value of Prediction Method |
| if(probable_pred_method_flag[set_idx][mode_idx]!=1){ | If Determined Prediction Method is Different from Prediction Value of Prediction Method, Add Following Information |
| rem_pred_method[set_idx][mode_idx] | Indicative of Which One of Prediction Methods Except for Prediction Value of Prediction Method Corresponds to Determined Prediction Method |
| } | |
| } | |
| } | |
| } | |
| } | |

Other than the above data structure, the relative prediction set definition information may be: values of prediction methods pred_method[set_idx][mode_idx] indicated by the prediction modes mode_idx in each of the prediction sets set_idx to be applied to the target frame to be encoded; or different values each between a prediction value probable_pred_method[set_idx][mode_idx] and a value of a prediction method pred_method[set_idx][mode_idx] indicated by a prediction mode mode_idx in each of the prediction sets set_idx to be applied to the target frame to be encoded.

(Prediction Set Definition Information Predicting Section 532)

The prediction set definition information predicting section 532 determines prediction values of prediction set definition information, which are to be applied to the target frame to be encoded, base on prediction set definition information that has been already encoded and stored in the prediction set definition information storing section 533, and outputs the prediction values thus determined.

The predicting of the prediction set definition information to be applied to the target frame to be encoded employs any of the following methods (1) through (3).
(1) Prediction methods having the highest appearance frequency in prediction modes used for encoding frames that have been already encoded before the target frame, are taken as the prediction values.
(2) Prediction methods of prediction modes in each prediction set applied to a frame that has been encoded just before the target frame are taken as the prediction values.
(3) Prediction methods assigned to respective prediction modes in a plurality of predetermined prediction sets are taken as the prediction values.

If there is no prediction set definition information that has been already encoded, initial values of prediction values probable_pred_method[set_idx][mode_idx] of prediction mode numbers mode_idx are set to prediction values of prediction methods shown in Table 15. In this case, probable_pred_method[set_idx][mode_idx] equals to init_pred_method[mode_idx].

TABLE 15

| | | init_pred_method (K = 9) Prediction Method |
|---|---|---|
| Prediction Mode | 0 | 0 [deg] |
| | 1 | −90 [deg] |
| | 2 | DC Prediction |
| | 3 | 45 [deg] |
| | 4 | −45 [deg] |
| | 5 | 67.5 [deg] |

TABLE 15-continued

| | init_pred_method (K = 9) Prediction Method |
|---|---|
| 6 | −67.5 [deg] |
| 7 | 22.5 [deg] |
| 8 | −22.5 [deg] |

(Prediction Set Definition Information Storing Section 533)

The prediction set definition information storing section 533 receives prediction set definition information and stores it therein.

(Details of Process of Predicting Prediction Set Definition Information)

Figure 25:
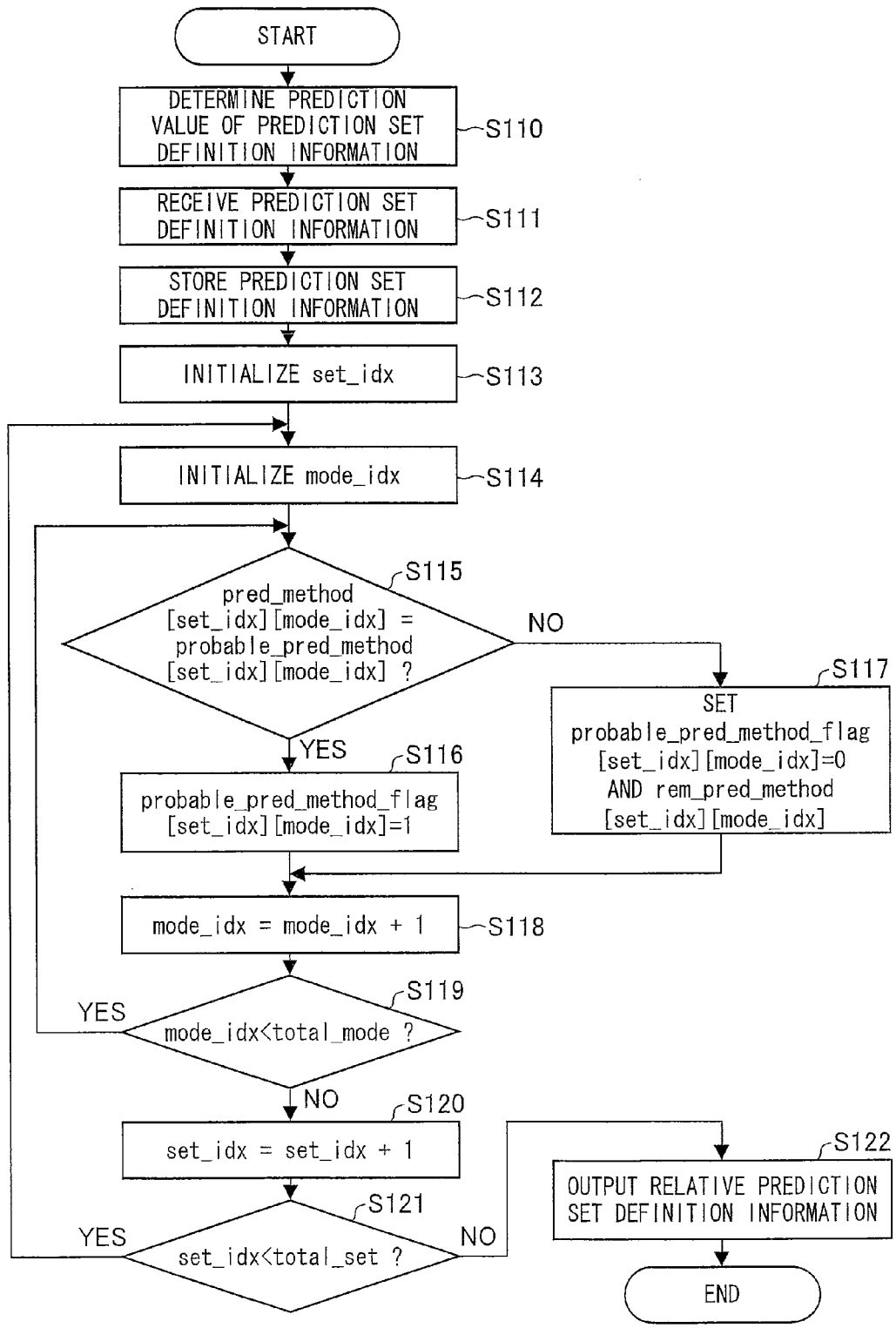
FIG. 25 is a flowchart showing a process of encoding prediction set definition information, in a relative prediction set definition information forming section.

The following describes a process of predicting prediction set definition information, more specifically, with reference to FIG. 25. FIG. 25 is a flowchart specifically showing how to predict prediction set definition information.

The prediction set definition information predicting section 532 determines a prediction value of a prediction set based on prediction set definition information that has been already encoded and stored in the prediction set definition information storing section 533, and outputs the prediction value (Step S110).

The prediction set definition information storing section 533 and the relative prediction set definition information generation section 531 receive prediction set definition information (Step S111). The prediction set definition information storing section 533 stores the prediction set definition information (Step S112). The relative prediction set definition information generation section 531 initializes a counter set_idx indicative of a prediction set number (set_idx=0) (Step S113), and initializes a counter mode_idx indicative of a prediction mode number (mode_idx=0) (Step S114). The relative prediction set definition information generation section 531 then compares a prediction method pred_method[set_idx][mode_idx] indicated by a prediction mode mode_idx in a prediction set set_idx to be applied to the target frame, with a prediction value probable_pred_method[set_idx][mode_idx] of a prediction method corresponding to the prediction mode mode_idx in the prediction set pred_set (Step S115). The prediction value is determined by any one of the aforementioned methods (1) through (3) (Step S115).

If the prediction method in the prediction mode mode_idx is identical with the prediction value (Yes in Step S115), the relative prediction set definition information generation section 531 sets "1" indicative of "identical" as probable_pred_method_flag[set_idx][mode_idx] (Step S116). If the prediction method in the prediction mode mode_idx is different from the prediction value (No in Step S115), the relative prediction set definition information generation section 531 sets "0" indicative of "not identical" as the probable_pred_method_flag[set_idx][mode_idx], and also sets information indicative of which one of remaining prediction methods corresponds to the prediction method, as rem_pred_method[set_idx][mode_idx] (Step S117). The value of the rem_pred_method[set_idx][mode_idx] is set based on the followings (1) and (2). (1) If the pred_method[set_idx][mode_idx] is smaller than the probable_pred_method[set_idx][mode_idx], the rem_pred_method[set_idx][mode_idx] is set such that rem_pred_method[set_idx][mode_idx]=pred_method[set_idx][mode_idx]. (2) If the pred_method[set_idx][mode_idx] is not smaller than the probable_pred_method[set_idx][mode_idx], the rem_pred_method[set_idx][mode_idx] is set such that rem_pred_method[set_idx][mode_idx]=pred_method[set_idx][mode_idx]−1.

Subsequently, the relative prediction set definition information generation section 531 increments the counter mode_idx by 1 (Step S118), and compares the counter mode_idx with the number total_mode of prediction modes (Step S119).

If the counter mode_idx is smaller than the number total_mode of prediction modes (Yes in Step S119), the relative prediction set definition information generation section 531 repeats the processes from Step S115. If the counter mode_idx is not smaller than the number total_mode of prediction modes (No in Step S119), the relative prediction set definition information generation section 531 increments the counter set_idx by 1 (Step S120), and compares the counter set_idx with the number total_set of prediction sets (Step S121). If the counter set_idx is smaller than the number total_set of prediction sets (Yes in Step S121), the relative prediction set definition information generation section 531 repeats the processes from Step S114. If the counter set_idx is not smaller than the number total_set of prediction sets (No in Step S121), the relative prediction set definition information generation section 531 outputs encoded data of relative prediction set definition information relative_prediction_method_data( ) (Step S122).

In the present embodiment, an encoding unit of the prediction set definition information is a frame unit, but is not limited to this. For example, the encoding unit of the prediction set definition information may be a macro block, a slice, a picture (frame), or a GOP (Group Of Picture). If the prediction set definition information is formed per slice unit, for example, it is necessary to encode newly updated prediction set definition information at a headmost part of the slice and to update a table (Table 11) of prediction sets and prediction modes. Further, when the encoding unit is set smaller, it is possible to form a prediction set suitable to a characteristic of a local image, thereby improving efficiency in prediction. The encoding unit of the prediction set may be determined, in advance, between an image encoding device and an image decoding device, or may be designated in a headmost piece of encoded data, or a headmost part of a picture or a GOP. Alternatively, it is also possible to notify the encoding unit by use of external means.

In Embodiment 3, a prediction set is selected per block unit. However, the prediction set may be selected per macro block unit, per predetermined number of blocks, or the like, and not particularly limited to per block unit. By setting a unit for selecting a prediction set to be variable, it is possible to select a prediction set more suitable to a characteristic of an image.

As described above, when the encoding unit of the prediction set definition information and the unit for selecting a prediction set are set smaller, it is possible to carry out prediction more suitable to a local characteristic of an image. However, to set the encoding unit and the unit for selection smaller causes an increase in an encoding amount for encoding these units. Therefore, it is not necessarily optimal to set these units smaller, from the viewpoint of efficiency in encoding.

On this account, by expressing the prediction methods in a hierarchical manner with the prediction set definition information, the prediction set information, and the prediction mode information, it is possible to select a prediction method more flexibly than the conventional technique, and to improve efficiency in prediction while preventing an increase in the encoding amount.

(Effects)

As described above, the image encoding device 200 calculates edge information of each constituent frame of an image. For example, as the edge information, an edge orientation and an edge strength of the image, or distribution information thereof are/is calculated. The image encoding device 200 determines a plurality of prediction directions that are efficiently approximate to edge orientations, on the basis of the distribution information on the edge orientations, and determines a combination of prediction modes constituting each prediction set.

For example, in the case where the distribution information on the edge orientations indicates that edges are formed in a horizontal direction in a collective manner, a plurality of prediction sets each having an optimal combination of prediction modes in which predictions in the horizontal direction are more finely set and predictions in a vertical direction are roughly set are automatically determined. Accordingly, the image is encoded by selecting a prediction set suitable to an edge orientation in a target block to be encoded, from the plurality of prediction sets that are optimal for the predictions in the horizontal direction. On the other hand, in the case where the distribution information on the edge orientations indicates that edges are formed in a vertical direction in a collective manner, a plurality of prediction sets each having an optimal combination of prediction modes in which predictions in the vertical direction are more finely set and predictions in the horizontal direction are roughly set are automatically determined. Accordingly, the image is encoded by selecting a prediction set suitable to an edge orientation in a target block to be encoded, from the plurality of prediction sets that are optimal for the predictions in the vertical direction.

As such, the image encoding device 200 forms a plurality of prediction sets optimal for an image, by automatically combining prediction modes in each of the plurality of prediction sets, and selects a prediction set suitable to an edge orientation of a target block to be encoded, from the plurality of prediction sets. This arrangement allows improving efficiency in prediction more than a case where predetermined prediction sets are used.

[Embodiment 4]

Another embodiment of the image decoding device according to the present invention is explained below as Embodiment 4, with reference to FIG. 26 through FIG. 29. The same constituent components as in Embodiments 1 through 3 have the same reference signs as in Embodiments 1 through 3, and are not explained here.

Embodiment 2 dealt with an image decoding device that selects a prediction set to be applied to a target block to be decoded, which is a predetermined pixel block unit, from a plurality of predetermined prediction sets, thereby allowing predictions from more various angles than the conventional technique. The present embodiment deals with an image decoding device in which a plurality of prediction sets in each of which prediction modes are automatically combined are formed in conformity with encoded data and a prediction set to be applied to a target block to be decoded is selected from the plurality of prediction sets, so that predictions can be carried out from further more various angles.

(Arrangement of Image Decoding Device 250)

Figure 26:
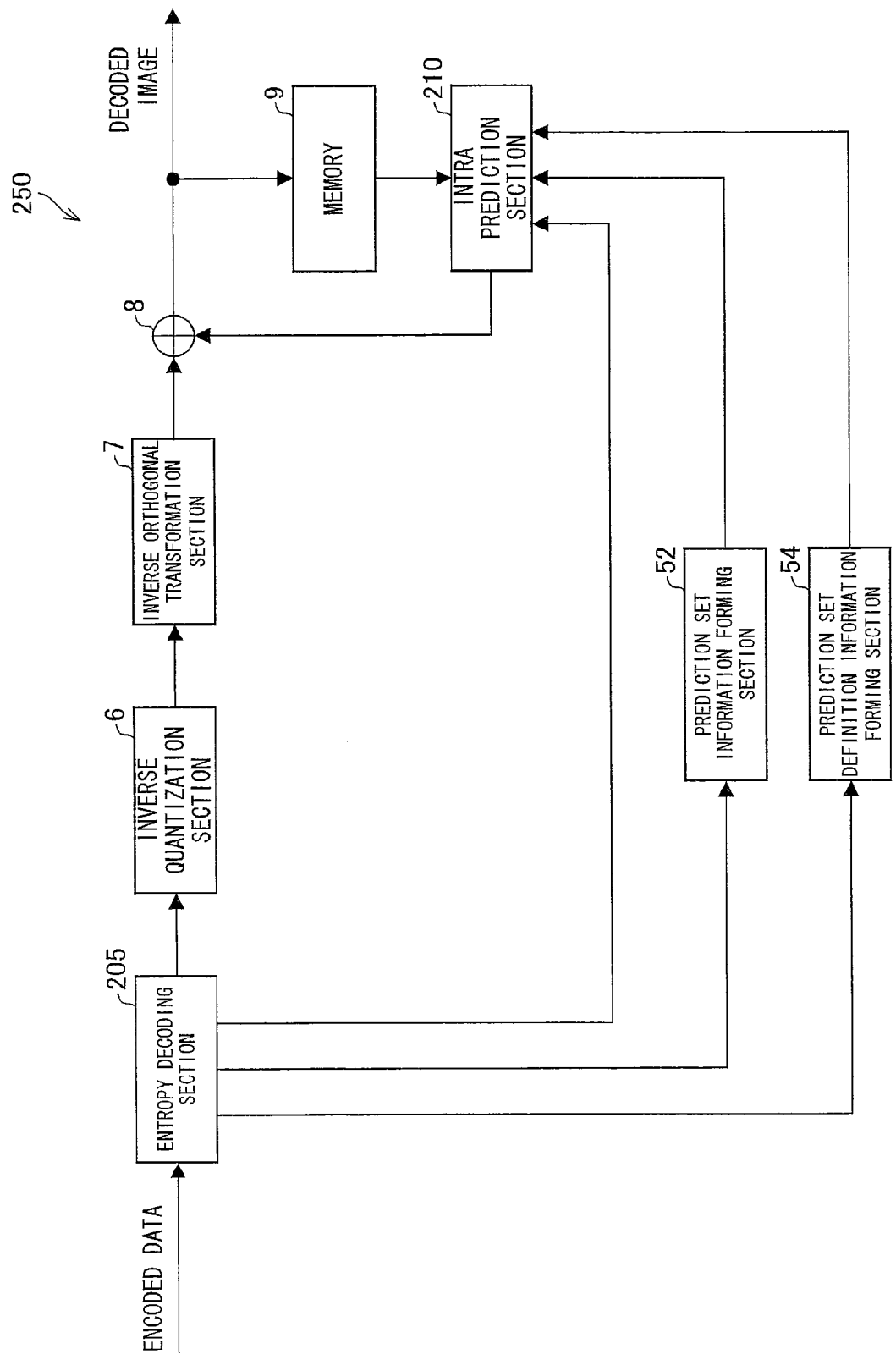
FIG. 26 is a block diagram showing essential part of an arrangement of an image decoding device according to Embodiment 4.

An arrangement of an image decoding device 250 according to Embodiment 4 is explained below with reference to FIG. 26. FIG. 26 is a block diagram showing the arrangement of the image decoding device 250.

As illustrated in FIG. 26, the image decoding device 250 mainly includes an entropy decoding section 205, an inverse quantization section 6, an inverse orthogonal transformation section 7, an addition computing section 8, a memory 9, an intra prediction section 210, a prediction set information forming section 52, and a prediction set definition information forming section 54. The present embodiment only describes the entropy decoding section 205 and the prediction set definition information forming section 54, which have not been described above.

(Entropy Decoding Section 205)

The entropy decoding section 205 has the same function as the entropy decoding section 5 in Embodiment 2, and further has a function of carrying out entropy decoding with respect to encoded data of relative prediction set definition information and outputting the relative prediction set definition information.

(Prediction Set Definition Information Forming Section 54)

The prediction set definition information forming section 54 forms prediction set definition information from the relative prediction set definition information thus entropy-decoded and prediction set definition information that has been already decoded. An arrangement and an operation of the prediction set definition information forming section 54 will be described later.

(Overview of Image Decoding Process)

Figure 27:
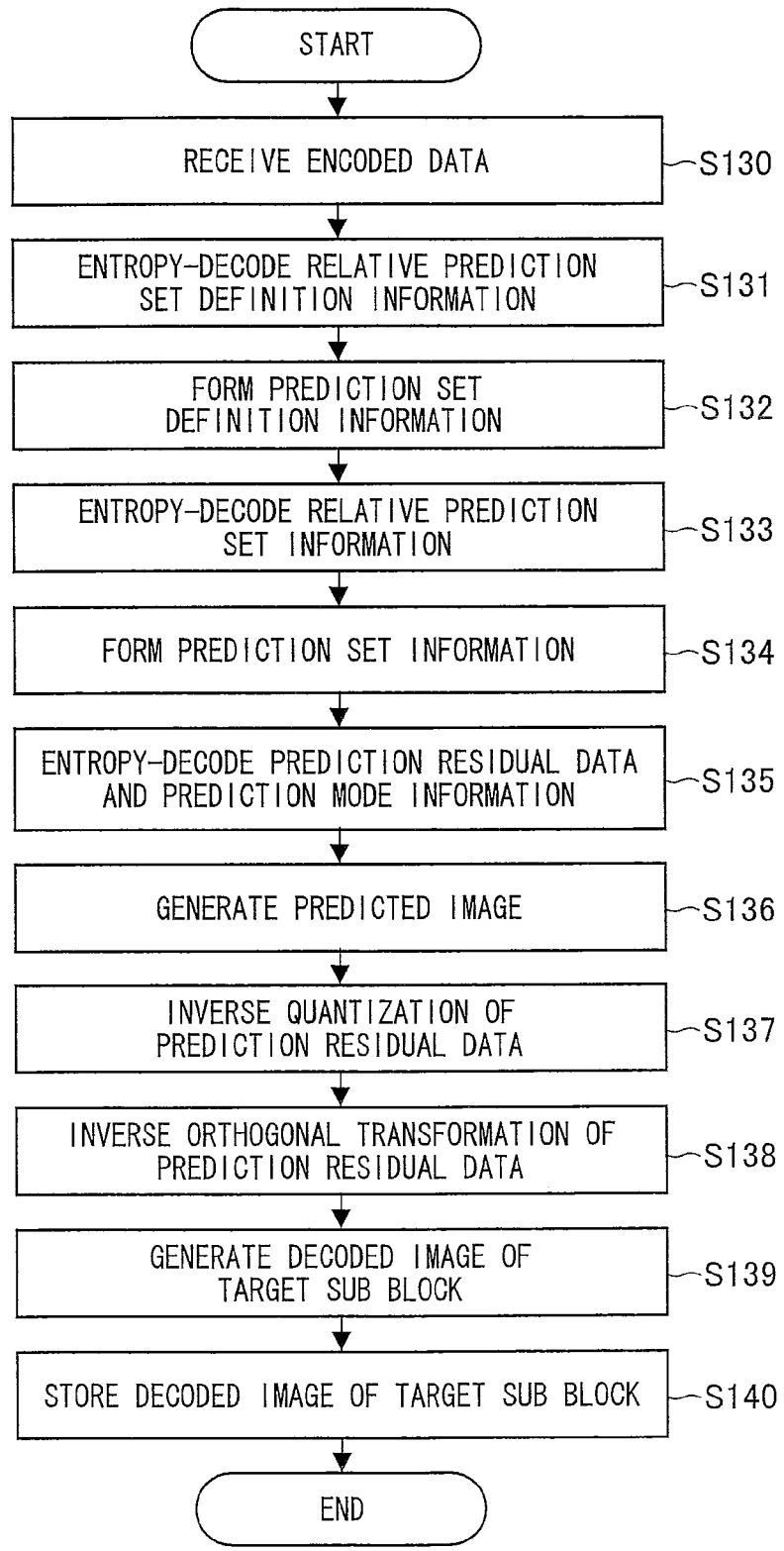
FIG. 27 is a flowchart schematically showing an image decoding process according to Embodiment 4.

The following generally describes an image decoding process in the image decoding device 250, with reference to FIG. 27. FIG. 27 is a flowchart schematically showing the image decoding process in the image decoding device 250.

(Reception of Encoded Data and Formation of Prediction Set Definition Information)

When the image decoding device 250 receives encoded data of a target frame to be decoded (Step S130), the entropy decoding section 205 takes out, from the received encoded data, relative information (relative prediction set definition information) of prediction set definition information indicative of a table (Table 11) of prediction sets and prediction modes, which are to be applied to the target frame to be decoded, and carries out entropy decoding with respect to the relative prediction set definition information thus taken out (Step S131). The prediction set definition information forming section 54 forms prediction set definition information on the basis of the entropy-decoded relative prediction set definition information and prediction set definition information that has been already decoded, and updates the table (Table 11) of the prediction sets and the prediction modes to be applied to the target frame to be decoded. Then, the prediction set definition information forming section 54 supplies the prediction set definition information thus formed to the intra prediction section 210 (Step S132).

How the prediction set definition information forming section 54 carries out a process of forming the prediction set definition information will be described later more specifically.

(Formation of Prediction Set Information)

The entropy decoding section 205 carries out entropy decoding with respect to relative prediction set information on a prediction set to be applied to a target image to be decoded (an M×M pixel block, hereinafter referred to as a target block to be decoded) in the received target frame to be decoded (Step S133). The prediction set information forming section 52 forms prediction set information of the target block to be decoded, from the relative prediction set information thus entropy-decoded and prediction set information that has been already decoded (Step S134). How to form prediction set information in the prediction set information forming section 52 is the same as in Embodiment 1.

(Decoding of Prediction Residual data and Prediction Mode Information)

The entropy decoding section 205 carries out entropy decoding with respect to a quantization value of prediction residual data and prediction mode information of a target sub block to be decoded (Step S135). The target sub block is obtained by subdividing the target block by a predetermined block size (N×N pixel block).

(Generation of Predicted Image)

The intra prediction section 210 carries out intra prediction by use of prediction set definition information and a locally decoded image, stored in the memory 9, of adjacent sub blocks that have been already decoded, so as to generate a predicted image (N×N pixel block) in accordance with a prediction mode to be applied to the target sub block (Step S136). The prediction mode is indicated by the prediction set information and the prediction mode information.

(Inverse Quantization and Inverse Orthogonal Transformation)

The inverse quantization section 6 carries out inverse quantization with respect to the prediction residual data decoded in Step S135, and supplies the prediction residual data to the inverse orthogonal transformation section 7 (Step S137). The inverse orthogonal transformation section 7 carries out inverse orthogonal transformation with respect to the prediction residual data thus inverse-quantized, and supplies the prediction residual data to the addition computing section 8 (Step S138).

(Generation of Decoded Image of Target Sub Block)

The addition computing section 8 adds the predicted image thus generated in Step S136 to the prediction residual data thus supplied in Step S138, and outputs a decoded image (N×N pixel block) of the target sub block (Step S139).

The memory 9 receives and stores the decoded image of the target sub block therein (Step S140).

(Additional Matters)

The image decoding device 250 repeats the processes from Step S135 to Step S140 with respect to all sub blocks (N×N pixel blocks) constituting the target block (M×M pixel block) to be decoded. Further, the image decoding device 250 repeats the processes from Step S133 to Step S140 with respect to all target blocks to be decoded constituting the target frame to be decoded, and also repeats the processes from Step S130 to Step S140 with respect to all frames constituting a target image to be decoded. The processes from S135 to S140 are carried out per sub block unit of an N×N pixel block, but may be carried out per block unit of an M×M pixel block.

(Process of Forming Prediction Set Definition Information)

The following describes how to form the prediction set definition information, more specifically. The prediction set definition information forming section 54 forms the prediction set definition information from entropy-decoded relative prediction set definition information and prediction set definition information that has been already decoded.

(Arrangement of Prediction Set Definition Information Forming Section 54)

Initially explained is an arrangement of the prediction set definition information forming section 54 with reference to FIG. 28. FIG. 28 is a block diagram showing the arrangement of the prediction set definition forming section 54. The prediction set definition information forming section 54 includes a prediction set definition information generation section 541, a prediction set definition information predicting section 532, and a prediction set definition information storing section 533. The following describes the prediction set definition information generation section 541, which has not been described yet.

(Prediction Set Definition Information Generation Section 541)

The prediction set definition information generation section 541 generates prediction set definition information on the basis of (a) relative prediction set definition information entropy-decoded by the entropy decoding section 205 and (b) prediction values determined by the prediction set definition information predicting section 532 based on prediction set definition information that has been already decoded. The prediction set definition information generation section 541 then outputs the prediction set definition information.

(Process of Generating Prediction Set Definition Information)

Figure 29:
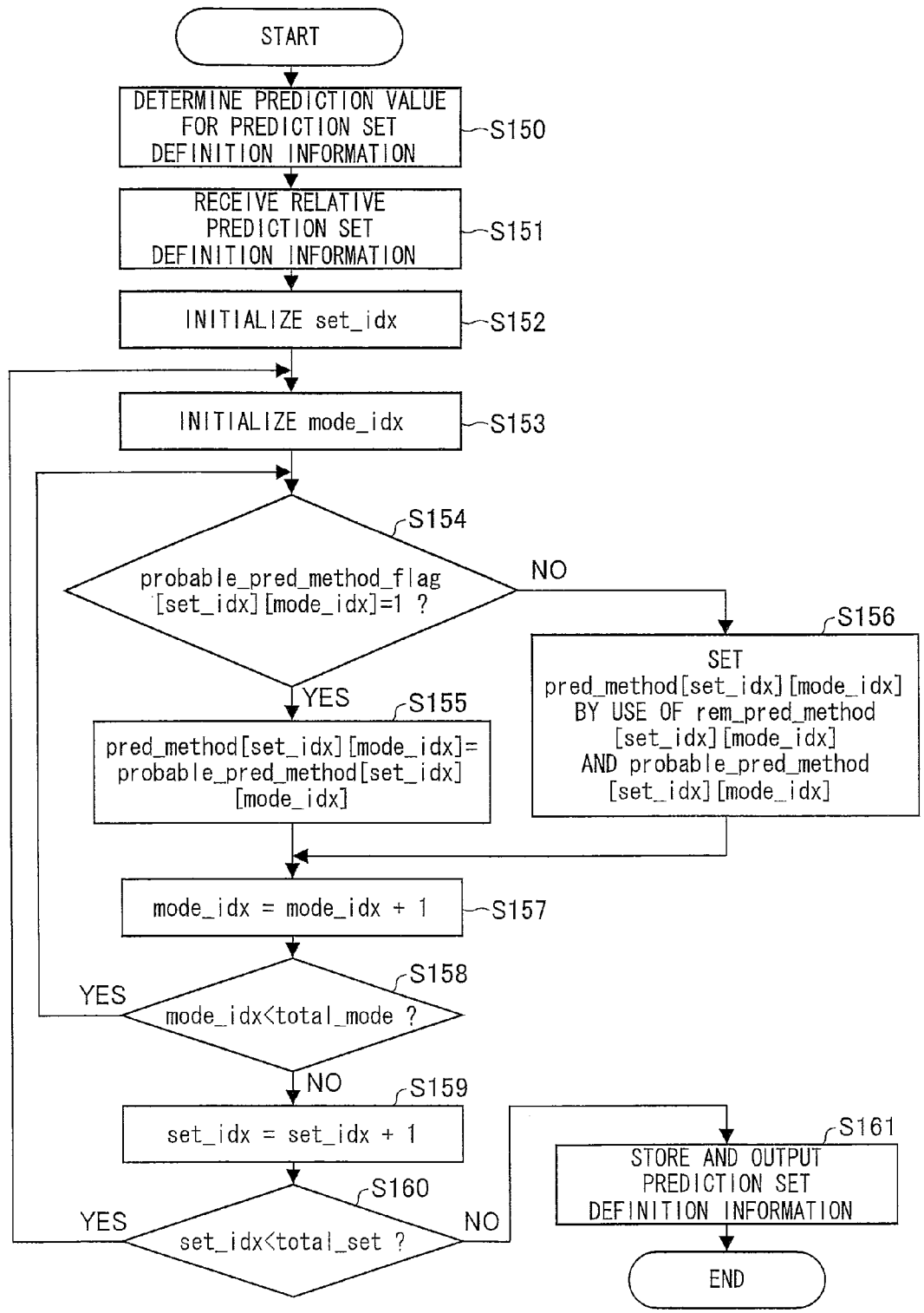
FIG. 29 is a flowchart showing a process of forming prediction set information, in a prediction set definition information forming section.

The following describes a process of generating prediction set definition information, more specifically, with reference to FIG. 29. FIG. 29 is a flowchart specifically showing the process of generating prediction set definition information.

The prediction set definition information predicting section 532 determines prediction values in regard to prediction methods to be assigned to prediction modes in a plurality of prediction sets to be applied to the target frame to be decoded, on the basis of prediction set definition information that has been decoded and stored in the prediction set definition information storing section 533, and then outputs the prediction values thus determined (Step S150). The prediction values in regard to the prediction methods to be assigned to the prediction modes in the plurality of prediction sets to be applied to the target frame to be decoded are determined in the same manner as the method of determining prediction values of prediction set definitions in the image encoding device 200 in Embodiment 3. Therefore, how to determine the prediction values is not explained here. The prediction set definition information forming section 54 receives relative prediction set definition information. The relative prediction set definition information thus received is supplied to the prediction set definition information generation section 541 (Step S151).

The prediction set definition information generation section 541 initializes a counter set_idx indicative of a prediction set number (set_idx=0) (Step S152), and also initializes a counter mode_idx indicative of a prediction mode number (mode_idx=0) (Step S153). Then, the prediction set definition information generation section 541 examines a value of probable_pred_method_flag[set_idx][mode_idx] indicative of whether or not a prediction mode mode_idx in the prediction set set_idx is identical with the prediction value (Step S154).

If the value of the probable_pred_method_flag[set_idx][mode_idx] is "1" (Yes in Step S154), the prediction set definition information generation section 541 sets the prediction value probable_pred_method[set_idx][mode_idx] as the pred_method[set_idx][mode_idx] (Step S155). In this case, the prediction method is set such that pred_method[set_idx][mode_idx]=probable_pred_method[set_idx][mode_idx].

If the value of the probable_pred_method_flag[set_idx][mode_idx] is "0" (No in Step S154), the prediction set definition information generation section 541 sets the pred_method[set_idx][mode_idx] based on rem_pred_method[set_idx][mode_idx] and the prediction value probable_pred_method[set_idx][mode_idx] (Step S156). More specifically, the value of the pred_method[set_idx][mode_idx] is set in accordance with the followings (1) and (2): (1) if the rem_pred_method[set_idx][mode_idx] is smaller than the probable_pred_method[set_idx][mode_idx], the pred_method[set_idx] [mode_idx] is set such that pred_method[set_idx][mode_idx]=rem_pred_method[set_idx][mode_idx]; and (2) if the rem_pred_method[set_idx][mode_idx] is not smaller than the probable_pred_method[set_idx][mode_idx], the pred_method[set_idx][mode_idx] is set such that pred_method[set_idx][mode_idx]=rem_pred_method[set_idx] [mode_idx]+1.

Subsequently, the prediction set definition information generation section 541 increments the counter mode_idx by 1 (Step S157), and compares the counter mode_idx with the number total_mode of prediction modes (Step S158).

If the counter mode_idx is smaller than the number total_mode of prediction modes (Yes in Step S158), the prediction set definition information generation section 541 repeats the processes from Step S154. If the counter mode_idx is not smaller than the number total_mode of prediction modes (No in Step S158), the prediction set definition information generation section 541 increments the counter set_idx by 1 (Step S159), and compares the counter set_idx with the number total_set of prediction sets (Step S160).

If the counter set_idx is smaller than the number total_set of prediction sets (Yes in Step S160), the prediction set definition information generation section 541 repeats the processes from Step S153. If the counter set_idx is not smaller than the number total_set of prediction sets (No in Step S160), prediction set definition information prediction_method_data( ) is stored in the prediction set definition information storing section 533, and then is outputted (Step S161).

In the present embodiment, a decoding unit of the prediction set definition information is a frame unit. However, the decoding unit is not limited to this. For example, a macro block, a slice, a picture (frame), or a GOP (Group Of Picture) may be also used as the decoding unit of the prediction set definition information. If the prediction set definition information is formed per slice unit, for example, it is necessary to decode encoded data related to the prediction set definition information at a headmost part of the slice. The decoding unit may be determined, in advance, between an image encoding device and an image decoding device, or may be designated in a headmost piece of encoded data, a picture, or a GOP header. Alternatively, it is also possible to notify the decoding unit by use of external means.

In Embodiment 4, a prediction set is selected per block unit. However, the prediction set may be selected per macro block unit, per predetermined block unit, or the like, and not particularly limited to per block unit. By setting a unit for selecting a prediction set to be variable, it is possible to select a prediction set more suitable to a characteristic of an image.

Further, in the present embodiment, encoded data of relative prediction set definition information is entropy-decoded. However, instead of the relative prediction set definition information, encoded data of prediction set definition information may be entropy-decoded, so that prediction methods to be assigned to respective prediction modes in a plurality of prediction sets to be applied to a target frame to be decoded may be determined on the basis of the prediction set definition information thus decoded.

Furthermore, in the image decoding device 250, the prediction methods are expressed in a hierarchical manner with the prediction set definition information, the prediction set information, and the prediction mode information. As a result, it is possible to select a prediction method more flexibly than the conventional technique. This improves efficiency in prediction.

(Effects)

As described above, the image decoding device 250 forms prediction set definition information indicative of prediction methods to be assigned to respective prediction modes in a plurality of prediction sets to be applied to a target frame to be decoded, constituting encoded data of an image, on the basis of relative prediction set definition information of the target frame and prediction set definition information that has been already decoded. Further, the image decoding device 250 decodes a prediction set to be applied to each block (M×M pixel block) constituting the target frame to be decoded. Furthermore, the image decoding device 250 carries out intra prediction with respect to each sub block (N×N pixel block) constituting the block, so as to generate a predicted image of the sub block. Thus generated predicted image is combined with decoded prediction residual data of the sub block, thereby reconstructing an image of the sub block.

In the arrangement, in the case where the prediction set definition information indicates a prediction set definition that focuses on predictions in a horizontal direction, it is possible to generate a predicted image from more specified angles with the horizontal direction as a center. Further, in the case where the prediction set definition information indicates a prediction set that focuses on predictions in a vertical direction, it is possible to generate a predicted image from more specified angles with the vertical direction as a center. The arrangement allows the image decoding device 250 to define prediction modes in each of a plurality of prediction sets in conformity to an image, and to carry out prediction optimal for an edge orientation of a target block to be decoded, by use of a corresponding one of the prediction modes thus defined. As a result, it is possible to further improve efficiency in prediction as compared to a case where predetermined prediction sets are used.

Moreover, the prediction methods are expressed in a hierarchical manner by use of the prediction sets and the prediction modes, thereby making it possible to further improve the efficiency in prediction without increasing an encoding amount.

[Embodiment 5]

Another embodiment of the image encoding device according to the present invention is explained below as Embodiment 5 with reference to FIG. 30 through FIG. 37. The same constituent components as in Embodiments 1 through 4 have the same reference signs as in Embodiments 1 through 4, and are not explained here. Embodiment 1 dealt with an image encoding device in which a prediction set to be applied to a target block to be encoded is selected per pixel block unit from a plurality of predetermined prediction sets, so that the image encoding device can carry out more various predictions than the conventional technique. On the other hand, Embodiment 5 deals with an image encoding device which has the same function as the image encoding device of Embodiment 1 and further which estimates a prediction mode to be applied to each sub block (target sub block) in a target block to be encoded, on the basis of (i) a selected prediction set, (ii) a flag indicative of a direction of an adjacent sub block which has been already encoded and which is used for estimating a prediction mode of the target sub block, and (iii) a position of the target sub block. The arrangement allows the image encoding device according to Embodiment 5 to efficiently reduce an encoding amount necessary for a prediction mode and further to improve efficiency in encoding.

(Arrangement of Image Encoding Device 500)

Figure 30:
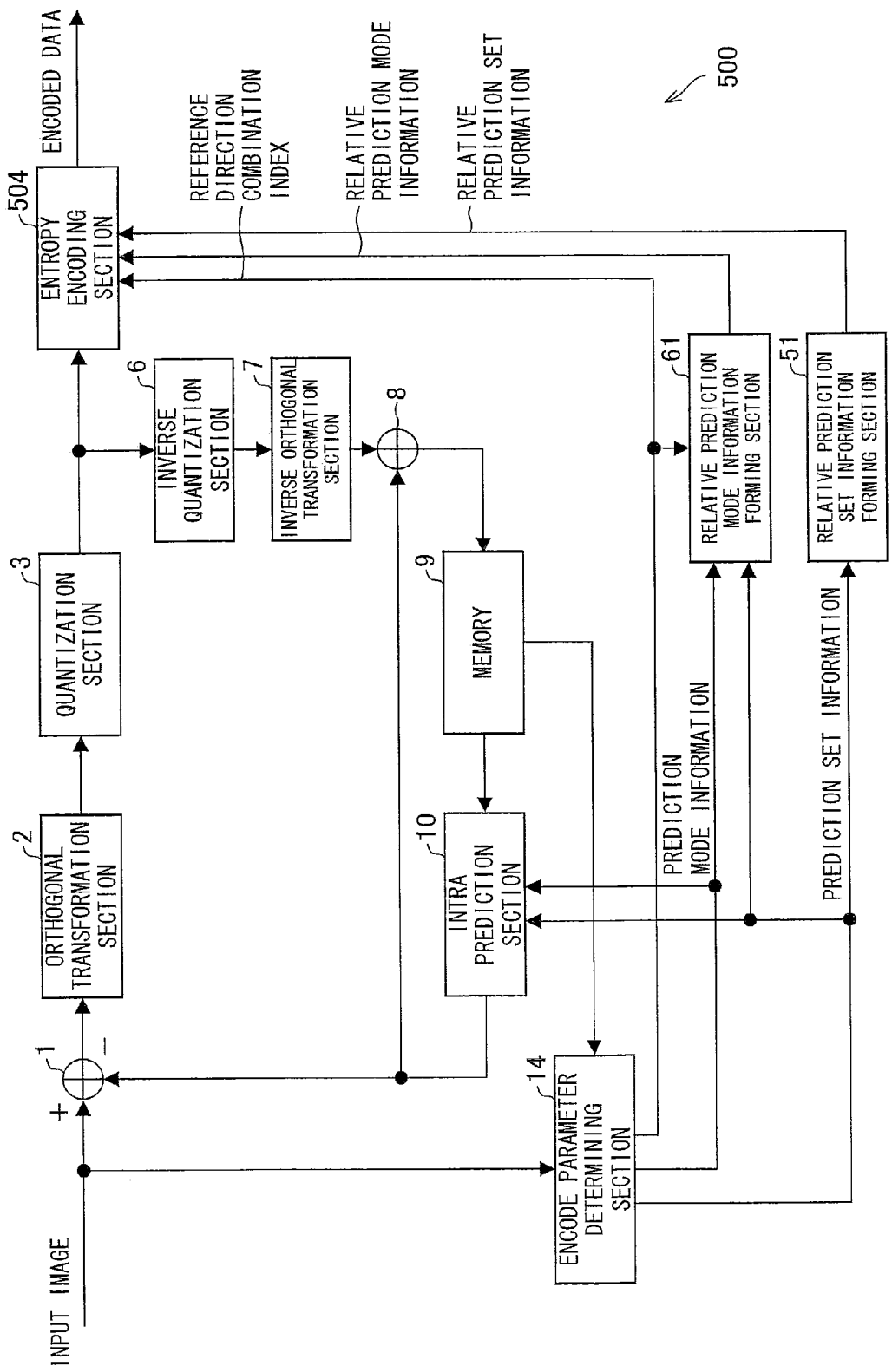
FIG. 30 is a block diagram showing essential part of an arrangement of an image encoding device according to Embodiment 5.

An arrangement of an image encoding device 500 according to the present embodiment is explained below with reference to FIG. 30. FIG. 30 is a block diagram showing the arrangement of the image encoding device 500 according to the present embodiment. The image encoding device 500 includes a difference computing section 1, an orthogonal transformation section 2, a quantization section 3, an entropy encoding section 504, an inverse quantization section 6, an inverse orthogonal transformation section 7, an addition computing section 8, a memory 9, an intra prediction section 10, an encode parameter determining section 14, a relative prediction set information forming section 51, and a relative prediction mode information forming section 61. The following describes the entropy encoding section 504, the relative prediction mode information forming section 61, and the encode parameter determining section 14.

(Encode Parameter Determining Section 14)

The encode parameter determining section 14 determines encode parameters (for example: (a) a prediction set to be applied to a target block to be encoded; (b) information (a reference direction combination index) on a combination of reference sub blocks to be used for estimation of a prediction mode of each sub block in a target block to be encoded; and (c) a prediction mode to be applied to each sub block) based on an inputted original image of the target block to be encoded and a locally decoded image stored in the memory 9. The encode parameter determining section 14 supplies a determined prediction set to the intra prediction section 10, the relative prediction set information forming section 51, and the relative prediction mode information forming section 61.

Further, the encode parameter determining section 14 supplies a determined reference direction combination index to the relative prediction mode information forming section 61 and the entropy encoding section 504. Furthermore, the encode parameter determining section 14 supplies a determined prediction mode of each sub block to the intra prediction section 10 and the relative prediction mode information forming section 61.

(Entropy Encoding Section 504)

The entropy encoding section 504 carries out entropy encoding with respect to prediction residual data, relative prediction mode information, relative prediction set information, and the reference direction combination index, and outputs encoded data thereof.

In the entropy encoding section 504, the reference direction combination index is entropy-encoded into a variable-length code by use of a reference direction combination index code table described below, in consideration of a bias of appearance frequency of reference direction combinations.

More specifically, if possible values that the reference direction combination index may take are in a range of values from 0 to 4 in a reference direction combination table 1 shown in Table 20, a reference direction combination index code table shown in Table 16 is used. Further, if possible values that the reference direction combination index may take are in a range of values from 0 to 1 in a reference direction combination table 2 shown in Table 21, a reference direction combination index code table shown in Table 17 is used. However, the codes for the reference direction combination index are not limited to those in Table 16 and Table 17. For example, the codes for the reference direction combination index may be Golomb codes or fixed-length codes. Further, if arithmetic codes may be used as the codes, the reference direction combination index code table may be used as a conversion table for converting an index into a binary value.

TABLE 16

| Reference Direction Combination Index | Code |
| --- | --- |
| 0 | 1 |
| 1 | 000 |
| 2 | 001 |
| 3 | 010 |
| 4 | 011 |

TABLE 17

| Reference Direction Combination Index | Code |
| --- | --- |
| 0 | 1 |
| 1 | 0 |

(Relative Prediction Mode Information Forming Section 61)

The relative prediction mode information forming section 61 forms relative prediction mode information of a target sub block based on (i) the prediction set information, the prediction mode information, and the reference direction combination index, each received from the encode parameter determining section 14, and (ii) prediction set information and prediction mode information, stored inside the relative prediction mode information forming section 61, of a sub block which is adjacent to the target sub block and which has been already encoded. The relative prediction mode information forming section 61 then outputs the relative prediction mode information of the target sub block.

Figure 31:
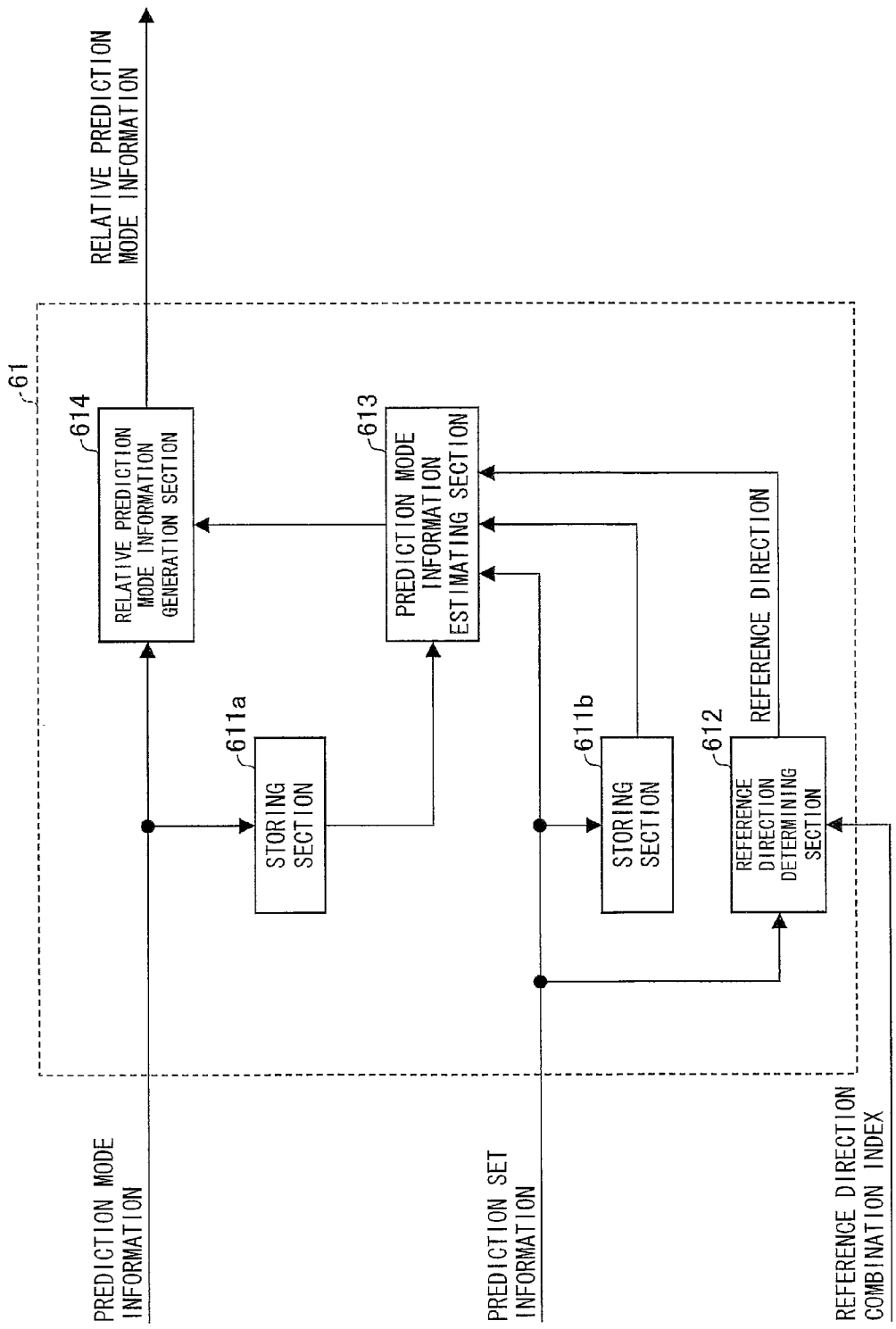
FIG. 31 is a block diagram showing an arrangement of a relative prediction mode information forming section.

An arrangement of the relative prediction mode information forming section 61 is explained below with reference to FIG. 31. FIG. 31 is a block diagram showing the arrangement of the relative prediction mode information forming section 61.

As shown in FIG. 31, the relative prediction mode information forming section 61 includes a storing section 611a, a storing section 611b, a reference direction determining section 612, a prediction mode information estimating section 613, and a relative prediction mode information generation section 614. Each of the constituent members is described below.

(Storing Sections 611a, 611b)

The storing sections 611a and 611b temporarily stores input information therein. The storing section 611a receives and then stores prediction mode information of the target sub block therein. The storing section 611b stores prediction set information of the target sub block therein. The prediction mode information and the prediction set information thus stored are used for estimating prediction mode information of a subsequent sub block that will be encoded after the target sub block is encoded.

(Reference Direction Determining Section 612)

The reference direction determining section 612 determines, according to the reference direction combination table shown in Table 20, a direction (reference direction) of an encoded adjacent sub block (reference sub block) which is referred to at a time of estimating prediction mode information of the target sub block. The reference direction is determined based on the prediction set information thus received, a reference direction combination index, and a position (internally counted) of the target sub block. The reference direction determining section 612 supplies the reference direction thus determined to the prediction mode information estimating section 613.

(Prediction Mode Information Estimating Section 613)

The prediction mode information estimating section 613 determines an estimation value of prediction mode information, which is to be used for the target sub block, by a predetermined method on the basis of (i) the prediction set information thus received, (ii) the reference direction determined by the reference direction determining section 612, (iii) prediction mode information of an encoded adjacent sub block, stored in the storing section 611a, and (iv) prediction set information of the encoded adjacent sub block, stored in the storing section 611b. The prediction mode information estimating section 613 then supplies the estimation value thus determined to the relative prediction mode information generation section 614.

(Relative Prediction Mode Information Generation Section 614)

The relative prediction mode information generation section 614 generates relative information (relative prediction mode information) of the prediction mode of the target sub block with respect to the estimation value, based on the prediction mode information thus received and the estimation value probable_mode of prediction mode information, which estimation value is determined by the prediction mode information estimating section 613. The relative prediction mode information generation section 614 then supplies the relative prediction mode information thus generated to the entropy encoding section 504.

A data structure of the relative prediction mode information relative_mode_data( ) is shown in Table 18. In Table 18, probable_mode_flag in the relative_mode_data( ) is a flag indicating whether or not the prediction mode to be applied to the target sub block is identical with the estimation value determined by the prediction mode information estimating section 613. If a value of the probable_mode_flag is "1", the prediction mode to be applied to the target sub block is identical with the estimation value. If the value of the probable_mode_flag is "0", the prediction mode to be applied to the target sub block is different from the estimation value. In the case where the value of the probable_mode_flag is "0", the relative prediction mode information further includes information rem mode indicative of which one of prediction modes in the prediction set of the target sub block, except for a prediction mode indicated by the estimation value, corresponds to the prediction mode to be applied to the target sub block. The relative prediction mode information may be a difference between the estimation value and the value of the prediction mode to be applied to the target sub block.

TABLE 18

| Parameter | Detail |
| --- | --- |
| relative_mode_data( ){ | Relative Prediction Mode Information |
| probable_mode_flag | Flag Indicative of Whether or not Determined Prediction Mode is Identical with Estimation Value of Prediction Mode |
| if(probable_mode_flag!=1){ | If Determined Prediction Mode is Different from Estimation Value of Prediction Mode, Add Following Information |
| rem_mode | Indicative of Which One of Prediction Modes Except for Estimation Value of Prediction Mode Corresponds to Determined Prediction Mode |
| } | |

(Overview of Image Encoding Process)

Figure 32:
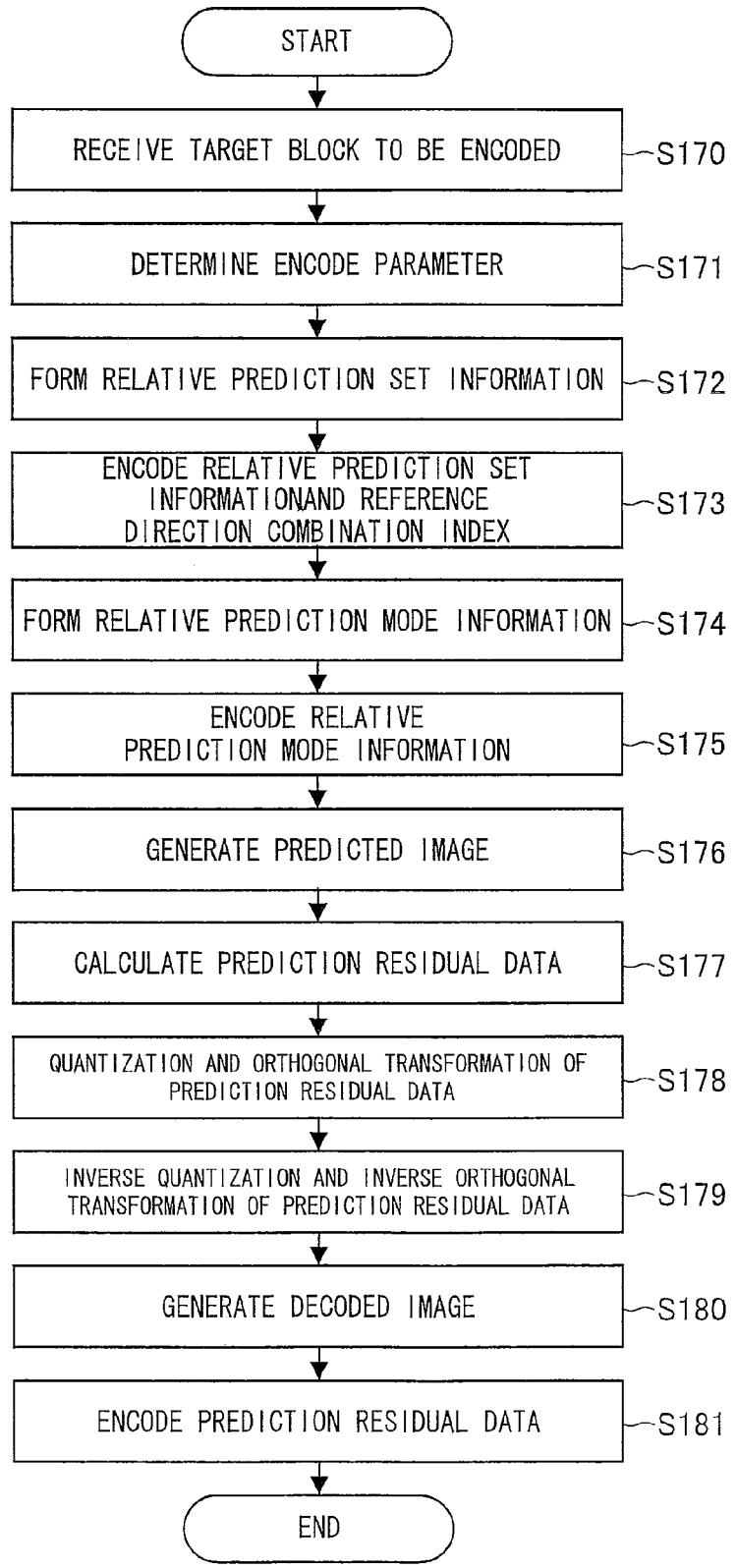
FIG. 32 is a flowchart schematically showing an image encoding process according to Embodiment 5.

The following generally describes an image encoding process in the image encoding device 500, with reference to FIG. 32. FIG. 32 is a flowchart schematically showing the image encoding process in the image encoding device 500.

Initially, the image encoding device 500 receives a target block to be encoded (M×M pixel block) (Step S170).

The encode parameter determining section 14 determines encode parameters (a prediction set, a reference direction combination index, and prediction modes of all sub blocks) by use of the rate distortion optimization method, on the basis of an original image of the target block to be encoded and a locally decoded image stored in the memory 9 (Step S171). The determined prediction set is supplied to the intra prediction section 10, the relative prediction set information forming section 51, and the relative prediction mode information forming section 61. The determined reference direction combination index is supplied to the relative prediction mode information forming section 61 and the entropy encoding section 504. The determined pieces of prediction mode information of all the sub blocks are supplied to the intra prediction section 10 and the relative prediction mode information forming section 61.

Then, the relative prediction set information forming section 51 forms relative prediction set information based on a prediction set that has been already encoded and the prediction set information determined in Step S171, and supplies the relative prediction set information to the entropy encoding section 504 (Step S172).

The entropy encoding section 504 carries out entropy encoding with respect to the relative prediction set information formed in Step S172 and the reference direction combination index determined in Step S171, and outputs encoded data thereof (Step S173).

The relative prediction mode information forming section 61 forms relative prediction mode information for a target sub block to be encoded, based on (i) the prediction set information, the reference direction combination index, and prediction mode information for the target sub block to be encoded, each received from the encode parameter determining section 14, and (ii) prediction set information and prediction mode information of a reference sub block. The relative prediction mode information forming section 61 then outputs the relative prediction mode information (Step S174).

The entropy encoding section 504 carries out entropy encoding with respect to the relative prediction mode information thus formed, and outputs encoded data thereof (Step S175).

The intra prediction section 10 carries out intra prediction defined by the prediction set and the prediction mode each determined in Step S171, by use of a locally decoded image, received from the memory 9, of adjacent sub blocks that have been already encoded, and generates a predicted image of the target sub block to be encoded (Step S176). The generated predicted image of the target sub block to be encoded is supplied to the difference computing section 1 and the addition computing section 8.

The difference computing section 1 calculates prediction residual data of the target sub block to be encoded, which is a difference between the original image of the target sub block to be encoded and the predicted image generated in Step S176, and outputs the prediction residual data (Step S177).

The prediction residual data thus calculated in Step S177 is supplied to the orthogonal transformation section 2 and then to the quantization section 3 so as to be subjected to orthogonal transformation and quantization, respectively. The prediction residual data is then supplied to the entropy encoding section 504 and the inverse quantization section 6 (Step S178).

The prediction residual data thus subjected to the orthogonal transformation and the quantization is supplied to the inverse quantization section 6 and then to the inverse orthogonal transformation section 7 so as to be subjected to inverse quantization and inverse orthogonal transformation, respectively. The prediction residual data is then supplied to the addition computing section 8 (Step S179).

The addition computing section 8 adds the prediction residual data thus subjected to the inverse quantization and the inverse orthogonal transformation in Step S179, to the predicted image generated in Step S176, so as to generate a locally decoded image of the target sub block to be encoded (Step S180). The locally decoded image thus generated is then stored in the memory 9.

The entropy encoding section 504 carries out entropy encoding with respect to the quantized prediction residual data of the target sub block, and outputs encoded data of the prediction residual data (Step S181).

The processes from Step S174 to Step S181 are carried out with respect to all sub blocks constituting the target block to be encoded. Further, the processes from Step S170 to Step S181 are carried out with respect to all blocks constituting a target image to be encoded.

In the present embodiment, the encoding process in the image encoding device 500 is explained sequentially in the order from Step S170 to Step S181. However, the order of the encoding process is not limited to this, and can be altered within a range in which the present invention can be carried out.

(How to Determine Reference Direction)

Next will be explained how to determine the reference direction. Initially, the following explains about a sub-block group, the reference direction, the reference direction combination index, and the reference direction combination table.

Figure 33:
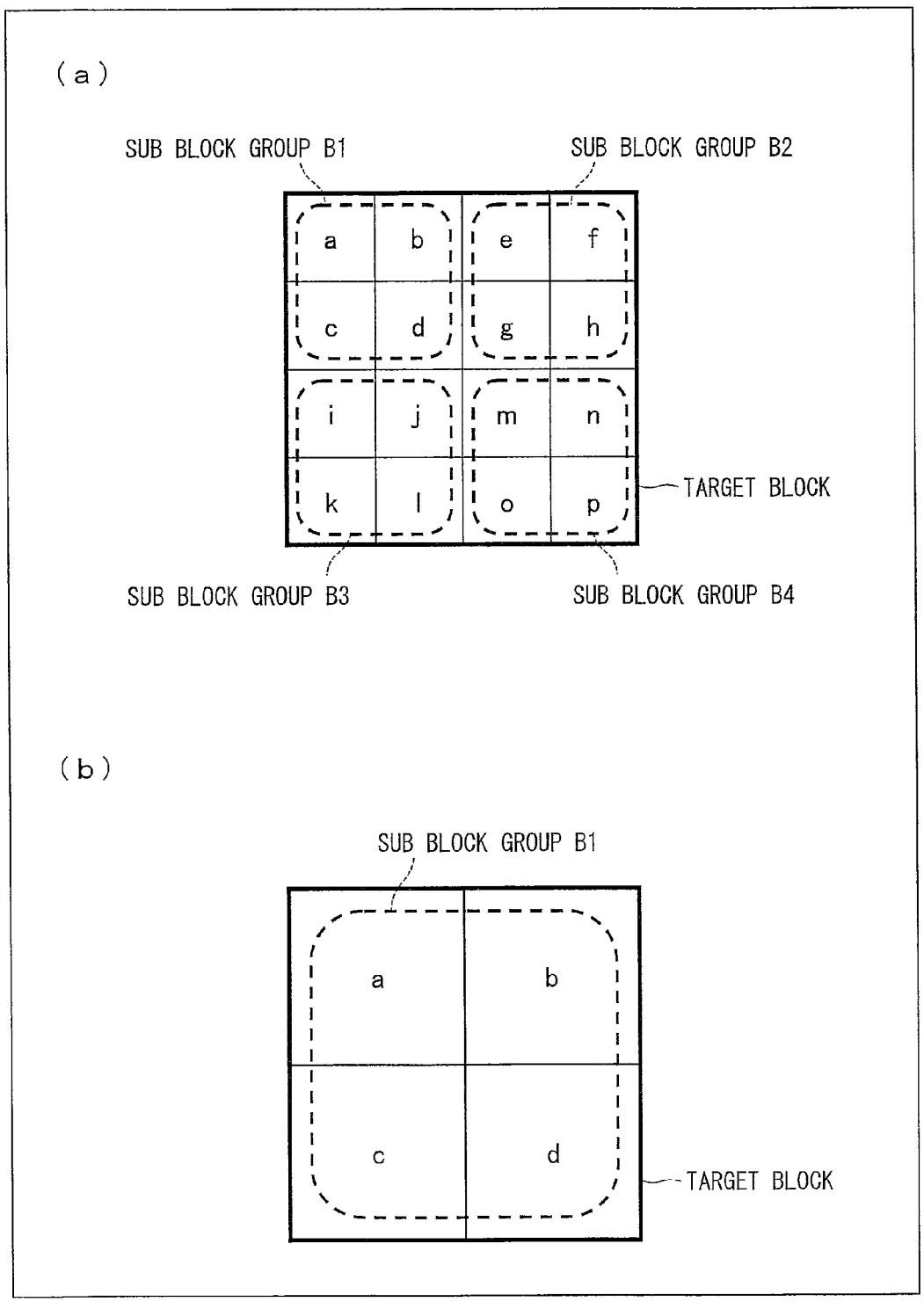
FIG. 33 illustrates explanatory views of sub-block groups. (a) of FIG. 33 illustrates sub-block groups when sizes M and N, respectively of a target block and a sub block, are such that N=M/4, and (b) of FIG. 33 illustrates a sub-block group when sizes M and N, respectively of a target block and a sub block, are such that N=M/2.

The sub-block group is explained below with reference to (a) and (b) of FIG. 33. (a) and (b) of FIG. 33 are views illustrating a sub-block group(s). (a) of FIG. 33 illustrates sub-block groups if a size M of a target block and a size N of a sub block are such that N=M/4. (b) of FIG. 33 illustrates a sub-block group if a size M of a target block and a size N of a sub block are such that N=M/2.

A sub-block group B1 in (a) of FIG. 33 is a group including 4 sub blocks a, b, c, and d. Similarly, a sub-block group B2 is a group including 4 sub blocks e, f, g, and h, a sub-block group B3 is a group including 4 sub blocks i, j, k, and l, and a sub-block group B4 is a group including 4 sub blocks m, n, o, and p. A sub-block group B1 in (b) of FIG. 33 is a group including sub blocks a through d. A combination of sub blocks included in a sub-block group is not limited to these.

The "reference direction" is a common relative position (reference sub block position) of an encoded sub block that is referred to at a time of estimating a prediction mode of a sub block included in a sub-block group. For example, a reference direction "0" indicates that the reference sub block is an encoded sub block that is positioned on the left side of a target sub block. Further, a reference direction "1" indicates that the reference sub block is an encoded sub block that is positioned on the upper side of the target sub block. A value indicated by the reference direction is not limited to a binary value. As shown in Table 19, for example, a reference direction "2" may indicate an encoded adjacent sub block that is positioned on the upper left of the target sub block, and a reference direction "3" may indicate an encoded adjacent sub block that is positioned on the upper right of the target sub block. Correlations between the values of the reference directions and the positions of the reference sub blocks are not limited to those shown in Table 19.

TABLE 19

| Reference Direction | Position of Reference Sub block |
|---|---|
| 0 | Left |
| 1 | Upper Side |
| 2 | Upper Left |
| 3 | Upper Right |

The "reference direction combination index" is an index assigned to a combination of reference directions of the sub-block groups B1 through B4.

The "reference direction combination table" is a table in which a correspondence relation between a reference direction combination index and reference directions of respective reference sub-block groups is predetermined. The reference direction combination table used for determining a reference direction is changed depending on the size of the target sub block. The following describes more details.

(1) At a time when the size of the sub block is N=M/4

Table 20 shows an example of the reference direction combination table used at a time when the size of the sub block is N=M/4. A prediction set flag in Table 20 is such that: for a prediction set flag "0", prediction set information indicates a prediction set that focuses on predictions in a horizontal direction; and for a prediction set flag "1", the prediction set information indicates a prediction set that focuses on predictions in a vertical direction. Further, FIG. 34 illustrates directions of reference sub blocks in the case where the prediction set flag is "0" and the reference direction combination index is "2" in Table 20. In FIG. 34, reference directions in the sub-block groups B1, B2, and B4 are "0", and therefore each sub block in each of the sub-block groups refers to an encoded sub block on the left thereof as the reference sub block (the right arrow in FIG. 34). On the other hand, a reference direction in the sub-block group B3 is "1", and therefore each sub block in the sub-block group B3 refers to an encoded sub block on the upper side thereof as a reference sub block (the down arrow in FIG. 34). A correspondence relation between the reference direction combination index and the reference directions in the respective sub-block groups is changed depending on which direction the prediction set flag puts much weight in, the horizontal direction or the vertical direction.

TABLE 20

| Prediction Set Flag | Reference Direction Combination Index | Reference Direction B1 | B2 | B3 | B4 |
|---|---|---|---|---|---|
| 0 (Mainly Horizontal Direction) | 0 | 0 | 0 | 0 | 0 |
|  | 1 | 0 | 0 | 0 | 1 |
|  | 2 | 0 | 0 | 1 | 0 |
|  | 3 | 0 | 1 | 0 | 0 |
|  | 4 | 1 | 0 | 0 | 0 |
| 1 (Mainly Vertical Direction) | 0 | 1 | 1 | 1 | 1 |
|  | 1 | 1 | 1 | 1 | 0 |
|  | 2 | 1 | 1 | 0 | 1 |
|  | 3 | 1 | 0 | 1 | 1 |
|  | 4 | 0 | 1 | 1 | 1 |

(2) At a time when the size of the sub block is N=M/2 In the case where the size of the sub block is N=M/2, a reference direction combination table shown in Table 21 is used regardless of prediction set information.

TABLE 21

| Reference Direction Combination Index | B1 |
|---|---|
| 0 | 0 |
| 1 | 1 |

As described above, in the case where the size of the target sub block is N=M/4, the reference direction determining section 612 obtains a reference direction of a sub-block group Bi from Table 20, based on the received prediction set information, the received reference direction combination index, and the position of the target sub block (indicative of which sub-block group Bi the target sub block belongs to), and then outputs the reference direction thus obtained.

Further, in the case where the size of the target sub block is N=M/2, the reference direction determining section 612 obtains a reference direction of the sub-block group B1 based on the received reference direction combination index, and outputs the reference direction thus obtained.

(How to Determine Estimation Value for Prediction Mode Information)

Figure 35:
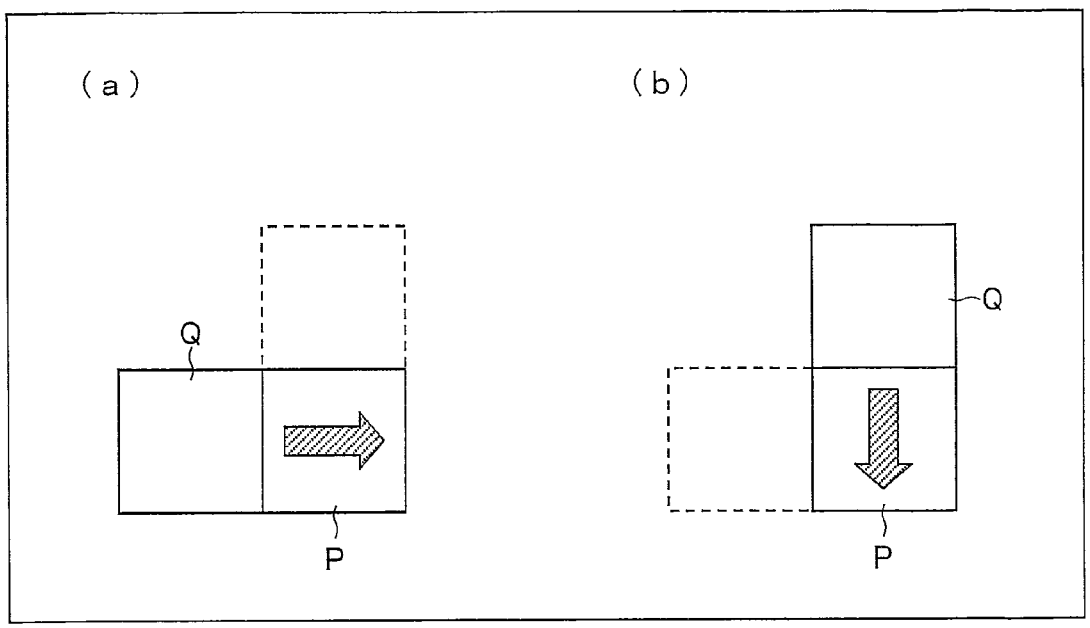
FIG. 35 illustrates a positional relation between a target sub block to be encoded and a reference sub block. (a) of FIG. 35 illustrates a positional relation between a target sub block P to be encoded and a reference sub block Q in a case of a reference direction "0". (b) of FIG. 35 illustrates a positional relation between a target sub block P to be encoded and a reference sub block Q in a case of a reference direction "1".

Subsequently, the following explains about how the prediction mode information estimating section 613 determines an estimation value of prediction mode information. In the present embodiment, a positional relation, indicated by the reference direction, between a target sub block P to be encoded and a reference sub block Q is either case shown in (a) or (b) of FIG. 35, for example. (a) of FIG. 35 illustrates a positional relation between the target sub block to be encoded (P in the figure) and the reference sub block (Q in the figure), where the reference direction is "0". (b) of FIG. 35 illustrates a positional relation between the target sub block P to be encoded and the reference sub block Q, where the reference direction is "1".

The prediction mode information estimating section 613 obtains, based on the reference direction, prediction mode information and prediction set information of the reference sub block Q, respectively from the storing section 611a and the storing section 611b.

Then, the prediction mode information estimating section 613 estimates a prediction mode in accordance with a prediction set of the target sub block P to be encoded and a prediction set of the reference sub block Q, in accordance with either of the following 2 methods.

(1) If the prediction set of the target sub block P is identical with the prediction set of the reference sub block Q, a value of the prediction mode of the reference sub block Q is set as an estimation value of a prediction mode for the target sub block P. However, if the prediction mode information of the reference sub block Q cannot be obtained, a value of a predetermined prediction mode is set as the estimation value of a prediction mode.

(2) If the prediction set of the target sub block P is different from the prediction set of the reference sub block Q, it is found out which prediction mode in the prediction set of the target sub block P corresponds to the prediction mode of the reference sub block Q, by referring to a prediction mode correspondence table, which will be described later. The prediction mode thus found out is set as the estimation value of a prediction mode for the target sub block P. However, if the prediction mode information or the prediction set information of the reference sub block Q cannot be obtained from the storing section 611a or 611b, a predetermined prediction mode is set as the estimation value. Such a case where the prediction mode information or the prediction set information of the reference sub block Q cannot be obtained indicates, for example, a case where the target sub block P is positioned at an end of the target image to be encoded and there is no reference sub block Q.

Table 22 is an example of a prediction mode correspondence table where the prediction set of the reference sub block Q is a prediction set 1 in Table 2 and the prediction set of the target sub block P is a prediction set 0 in Table 2.

TABLE 22

|  | Reference Sub Block Q Prediction Set = 1 | Target Sub Block P Prediction Set = 2 |
|---|---|---|
| Prediction Mode | 0 | 0 |
|  | 1 | 1 |
|  | 2 | 2 |
|  | 3 | 8 |
|  | 4 | 6 |
|  | 5 | 4 |
|  | 6 | 1 |
|  | 7 | 3 |
|  | 8 | 1 |

In the prediction mode correspondence table, it is preferable to set, in advance, (a) values of prediction modes x in a prediction set X applied to the reference sub block Q, and (b) values of prediction modes y in a prediction set Y to be applied to the target sub block P, in such a manner that a prediction mode y that is identical with a prediction mode x (i.e., the same prediction method) or most approximate to the prediction mode x (i.e., an absolute value of a difference between their prediction directions is smallest) is set as a corresponding value to the prediction mode x. For a prediction mode 0 in the prediction set 1 and a prediction mode 0 in the prediction set 2 in Table 2, for example, prediction directions thereof are −90 [deg]. Therefore, the prediction mode 0 in the prediction set 2 is set in the row of the prediction mode 0 in the prediction set 1 in Table 22. Further, for a prediction mode 2 in the prediction set 1 and a prediction mode 2 in the prediction set 2 in Table 2, prediction directions thereof are a DC prediction. Therefore, the prediction mode 2 in the prediction set 2 is set in the row of the prediction mode 2 in the prediction set 1 in Table 22. Moreover, in a case of a prediction mode 3 (prediction direction: −30[deg]) in the prediction set 1, it is found which prediction mode in the prediction set 2 is identical or approximate to the prediction mode 3 in the prediction set 1. In this case, a prediction mode 8 (prediction direction: −30[deg]) in the prediction set 2 is most approximate to the prediction mode 3 in the prediction set 1 (an absolute value of a difference between their prediction directions is 0 [deg], which is smallest). Accordingly, the prediction mode 8 in the prediction set 2 is set in the row of the prediction mode 3 in the prediction set 1 in Table 22.

If there are at least 2 prediction modes y being identical or approximate to a target prediction mode x in the prediction set X, among the prediction modes y in the prediction set Y, a prediction mode y having a smaller value is set. For example, assume a case of finding a prediction mode, in the prediction set 2, identical or approximate to a prediction mode 6 (prediction direction: 15[deg]) in the prediction set 1. In this case, there are approximate prediction modes in the prediction set 2, a prediction mode 1 (prediction direction: 0[deg]) and a prediction mode 6 (prediction direction 30[deg]). In this case, it is preferable that a prediction mode having a smaller value between the 2 prediction modes, that is, the prediction mode 1 is set in the row of the prediction mode 6 in the prediction set 1 in Table 22.

Here, the following describes how to determine an estimation value of a prediction mode for the target sub block with the use of Table 22, more specifically. In the following explanation, the prediction set of the reference sub block Q is 1 and the prediction set of the target sub block P is 2. If the prediction mode of the reference sub block Q is "0", an estimation value of a prediction mode for the target sub block P is set to "0", according to Table 22. Further, if the prediction mode of the reference sub block Q is "6", the estimation value of a prediction mode for the target sub block P is set to "1", according to Table 22.

Even if the prediction set of the target sub block P is different from the prediction set of the reference sub block Q, when the above prediction mode correspondence table is used, the prediction mode of the reference sub block is converted into a most approximate prediction mode in the prediction set of the target sub block P, thereby making it possible to improve accuracy of the estimation value of a prediction mode for the target sub block P.

(Details of Process of Forming Relative Prediction Mode Information)

Next will be described a process of forming relative prediction mode information with reference to FIG. 36. FIG. 36 is a flowchart specifically showing the process of forming relative prediction mode information.

Initially, the storing sections 611a and 611b respectively store prediction set information and prediction mode information therein (Step S190). The reference direction determining section 612 determines a reference direction of a reference sub block which reference direction is used at a time of estimating prediction mode information of a target sub block, according to a reference direction combination table, based on the prediction set information thus received, a reference direction combination index, and a position of the target sub block. The reference direction determining section 612 supplies the determined reference direction to the prediction mode information estimating section 613 (Step S191).

The prediction mode information estimating section 613 obtains: (i) from the storing section 611a, prediction mode information of an encoded adjacent sub block (a reference sub block) that is indicated by the determined reference direction thus received; and (ii) from the storing section 611b, prediction set information of the encoded adjacent sub block (Step S192). The prediction mode information estimating section 613 then determines an estimation value of prediction mode information for the target sub block, according to a prediction mode correspondence table, based on the obtained prediction mode information and prediction set information of the reference sub block, and the prediction set information of the target sub block. Subsequently, the prediction mode information estimating section 613 supplies the determined estimation value to the relative prediction mode information generation section 614 (Step S193).

The relative prediction mode information generation section 614 generates relative prediction mode information of the target sub block based on the prediction mode information of the target sub block and the estimation value of prediction mode information, and outputs the relative prediction mode information (Step S194).

(Details of Determination Process of Encode Parameters)

The following describes how the encode parameter determining section 14 determines encode parameters (s, p, M). In advance of the explanation of how to determine encode parameters, the following describes terms for use in determination of the encode parameters.

s: Prediction Set
p: Reference Direction Combination Index
bk: Sub Block
m(bk): Prediction Mode in Sub Block bk
M: Prediction Modes of All Sub Blocks Included in Target Block to be Encoded
   M=(m(0), m(1), . . . , m(bk), . . . )
W: Target Block to be Encoded
J(s, p, M): Encoding Cost Based on Rate Distortion Optimization Method
Jmin: Minimum Value of Encoding Cost
sbest: Prediction Set Used for Encoding
pbest: Reference Direction Combination Index Used for Encoding
mbest(bk): Prediction Mode Used for Encoding Sub Block bk
Mbest: Prediction Modes Used For All Sub Blocks Included in Target Block to be Encoded
   Mbest=(mbest(0), mbest(1), . . . , mbest(bk), . . . )
Rs(s): Encoding Amount Necessary for Encoding Prediction Set s
Rp(p): Encoding Amount Necessary for Encoding Reference Direction Combination Index p
Rm(s, p, m(bk)): Encoding Amount Necessary for Encoding Prediction Mode m(bk) to be Applied to Sub Block bk Where Prediction Set s and Reference Direction Combination Index p are Applied
Rd(s, p, m(bk)): Encoding Amount of Prediction Residual data, Necessary for Encoding Sub Block bk by use of Prediction Set s, Reference Direction Combination Index p, and Prediction Mode m(bk)
Dd(s, p, m(bk)): Signal Distortion Caused When Sub Block bk is Encoded by use of Prediction Set s, Reference Direction Combination Index p, and Prediction Mode m(bk)
$\lambda$s: Lagrange Multiplier Related to Prediction Set s
$\lambda$p: Lagrange Multiplier Related to Reference Direction Combination Index p
$\lambda$m: Lagrange Multiplier Related to Prediction Mode m(bk)
$\lambda$d: Lagrange Multiplier Related to Signal Distortion When each of the parameters is determined, an encoding cost J(s, p, M) represented by the following equation (30) is calculated with respect to all combinations of prediction sets s, reference direction combination indices p, and prediction modes M=(m(0), m(1), . . . , m(bk), . . . ) of all sub blocks included in a target block to be encoded. Parameters (sbest, pbest, Mbest) that minimize the encoding cost J(s, p, M) are determined as parameters used for encoding the target block.

For calculation of the encoding cost J(s, p, M), it is necessary to calculate an encoding amount of each parameter, and an encoding amount and a signal distortion of the sub block bk. On this account, the encode parameter determining section 14 includes functional blocks that respectively correspond to the difference computing section 1, the orthogonal transformation section 2, the quantization section 3, the entropy encoding section 504, the inverse quantization section 6, the inverse orthogonal transformation section 7, the addition computing section 8, the memory 9, the intra prediction section 10, the relative prediction set information forming section 51, and the relative prediction mode information forming section 61, though the functional blocks are not shown.

Math. 16

$$J(s, p, M) = \lambda_s \cdot R_s(s) + \lambda_p \cdot R_p(p) + \sum_{bk \in W} \{\lambda_m \cdot R_m(s, p, m(bk)) + \lambda_d \cdot R_d(s, p, m(bk)) + D_d(s, p, m(bk))\} \quad (30)$$

The process of determining the encode parameters (s, p, M) is described below with reference to FIG. 37. FIG. 37 is a flowchart showing how the encode parameter determining section 41 determines the encode parameters (s, p, M).

Firstly, the encode parameter determining section 14 initializes a minimum value Jmin of an encoding cost to a sufficiently large value. Further, the encode parameter determining section 14 sets predetermined initial values to encode parameters (s, p, M) (Step S200). The encode parameter determining section 14 calculates an encoding cost J(s, p, M) for a case of encoding all sub blocks included in a target block W with a combination of prediction modes M, by use of a prediction set s and a prediction direction combination index p (Step S201).

Subsequently, the minimum value Jmin of the encoding cost and encode parameters (sbest, pbest, Mbest) at the minimum value Jmin are updated, and then the encode parameters (s, p, M) are updated.

More specifically, in the case of J(s, p, M)<Jmin, the minimum value Jmin of the encoding cost is set to J(s, p, M). Further, values of (s, p, M) at the time are set as values of the encode parameters (sbest, pbest, Mbest). In the case of J(s, p, M)≥Jmin, the Jmin and the encode parameters (sbest, pbset, Mbest) are not updated. Further, a combination of the encode parameters for calculating a subsequent encoding cost is set to (s, p, M)(Step S202).

Subsequently, it is determined whether or not the processes from Step S201 to Step S202 have been carried out with respect to all encode parameters (s, p, M). If encoding costs have been calculated with respect to all combinations of the encode parameters (s, p, M) (Yes in Step S203), Step S204 is carried out. If there is a combination of the encode parameters (s, p, M) to which the encoding cost has not been yet calculated, the processes from Step S201 are carried out with respect to the combination. That is, the processes of Steps S201 and S202 are repeatedly carried out with respect to all the combinations of the prediction sets s, the reference direction combination indices p, and the prediction modes M of all sub blocks included in the target block to be encoded.

Encode parameters (sbest, pbest, Mbest) that give the minimum value Jmin among the encoding costs obtained through the processes from Step S201 to Step S203 are determined as parameters for use in encoding (Step S204). The prediction set sbest thus determined is supplied to the intra prediction section 10, the relative prediction set information forming section 51, and the relative prediction mode information forming section 61. Further, the reference direction combination index pbest thus determined is supplied to the relative prediction mode information forming section 61 and the entropy encoding section 504. Further, the determined prediction modes Mbest of all the sub blocks included in the target block to be encoded are supplied to the intra prediction section 10 and the relative prediction mode information forming section 61.

(Additional Matters)

The present embodiment dealt with Table 20 as an example of the reference direction combination table where a sub block size is N=M/4 in the reference direction determining section 613. However, the reference direction combination table is not limited to this. For example, Table 23 may be used instead of Table 20. For Table 23, it is preferable that the entropy encoding section 504 use a reference direction combination index code table shown in Table 24. Further, the present embodiment uses a reference direction combination table in which the correspondence relation between the reference direction combination index and the respective reference directions of the sub-block groups differs depending on which direction the prediction set information puts much weight in, a horizontal direction or a vertical direction. However, reference direction combination tables shown in Tables 25 and 26 may be also used regardless of the prediction set information. For Table 25, it is preferable that the entropy encoding section 504 use a reference direction combination index code table shown in Table 27. Further, for Table 26, it is preferable that the entropy encoding section 504 use a reference direction combination index code table shown in Table 28.

TABLE 23

| Prediction Set Flag | Reference Direction Combination Index | Reference Direction | | | |
|---|---|---|---|---|---|
| | | B1 | B2 | B3 | B4 |
| 0 (Mainly Horizontal Direction) | 0 | 0 | 0 | 0 | 0 |
| | 1 | 0 | 0 | 0 | 1 |
| | 2 | 0 | 0 | 1 | 0 |
| | 3 | 0 | 1 | 0 | 0 |
| | 4 | 1 | 0 | 0 | 0 |
| | 5 | 0 | 0 | 1 | 1 |
| | 6 | 0 | 1 | 1 | 0 |
| | 7 | 1 | 1 | 0 | 0 |
| | 8 | 1 | 0 | 0 | 1 |
| 1 (Mainly Vertical Direction) | 0 | 1 | 1 | 1 | 1 |
| | 1 | 1 | 1 | 1 | 0 |
| | 2 | 1 | 1 | 0 | 1 |
| | 3 | 1 | 0 | 1 | 1 |
| | 4 | 0 | 1 | 1 | 1 |
| | 5 | 0 | 0 | 1 | 1 |
| | 6 | 0 | 1 | 1 | 0 |
| | 7 | 1 | 1 | 0 | 0 |
| | 8 | 1 | 0 | 0 | 1 |

TABLE 24

| Reference Direction Combination Index | Code |
|---|---|
| 0 | 1 |
| 1 | 0000 |
| 2 | 0001 |
| 3 | 0010 |
| 4 | 0011 |
| 5 | 0100 |
| 6 | 0101 |
| 7 | 0110 |
| 8 | 0111 |

TABLE 25

| Reference Direction Combination Index | Reference Direction | | | |
|---|---|---|---|---|
| | B1 | B2 | B3 | B4 |
| 0 | 0 | 0 | 0 | 0 |
| 1 | 1 | 1 | 1 | 1 |
| 2 | 0 | 0 | 1 | 1 |
| 3 | 0 | 1 | 1 | 0 |
| 4 | 1 | 1 | 0 | 0 |
| 5 | 1 | 0 | 0 | 1 |

TABLE 26

| Reference Direction Combination Index | Reference Direction | | | |
|---|---|---|---|---|
| | B1 | B2 | B3 | B4 |
| 0 | 0 | 0 | 0 | 0 |
| 1 | 1 | 1 | 1 | 1 |
| 2 | 0 | 0 | 1 | 1 |
| 3 | 0 | 1 | 1 | 0 |
| 4 | 1 | 1 | 0 | 0 |
| 5 | 1 | 0 | 0 | 1 |
| 6 | 0 | 0 | 0 | 1 |
| 7 | 1 | 1 | 1 | 0 |
| 8 | 0 | 0 | 1 | 0 |
| 9 | 1 | 1 | 0 | 1 |
| 10 | 0 | 1 | 0 | 0 |
| 11 | 1 | 0 | 1 | 1 |
| 12 | 1 | 0 | 0 | 0 |
| 13 | 0 | 1 | 1 | 1 |

TABLE 27

| Reference Direction Combination Index | Code |
|---|---|
| 0 | 10 |
| 1 | 11 |
| 2 | 000 |
| 3 | 001 |
| 4 | 010 |
| 5 | 011 |

TABLE 28

| Reference Direction Combination Index | Code |
|---|---|
| 0 | 110 |
| 1 | 111 |
| 2 | 0100 |
| 3 | 0101 |
| 4 | 0110 |
| 5 | 0111 |
| 6 | 00000 |

TABLE 28-continued

| Reference Direction Combination Index | Code |
|---|---|
| 7 | 00001 |
| 8 | 00010 |
| 9 | 00011 |
| 10 | 00100 |
| 11 | 00101 |
| 12 | 00110 |
| 13 | 00111 |

In the present embodiment, encoding units of the prediction set and the reference direction combination index is an M×M pixel block. However, the encoding unit is not limited to this. For example, the encoding unit of the prediction set may be a macro block, a slice, a picture (frame), or a GOP (Group Of Picture). In the case where the prediction set and a combination of the reference directions are changed per slice unit, it is necessary to encode information on a selected prediction set, at a headmost part of the slice. The encoding units of the prediction set and the reference direction combination index may be predetermined between an image encoding device and an image decoding device, or may be designated in a headmost piece of encoded data, a picture, or a GOP header. Alternatively, it is also possible to notify the encoding unit by use of external means, not by the image encoding device and the image decoding device.

(Effects)

As described above, the image encoding device 500 determines, based on an encoding cost and per block unit constituting an image, (i) a prediction set to be applied to a target block, (ii) a reference direction in which an encoded adjacent sub block is positioned and which is commonly used for estimation of a prediction mode in a sub-block group including a predetermined number of sub blocks, in the target block, and (iii) all prediction modes of the sub blocks in the target block. Further, the image encoding device 500 estimates a prediction mode for each target sub block constituting the target block, based on (a) the determined prediction set, (b) the determined reference direction, (c) a prediction mode and a prediction set of an encoded sub block adjacent to the target sub block, and (d) a position of the target sub block, and then encodes the prediction mode on the basis of the estimation. The arrangement allows the image encoding device 500 to select a reference sub block to be used for estimating a prediction mode of the target sub block, thereby resulting in that accuracy in estimation of a prediction mode is improved, an encoding amount necessary for the prediction mode is efficiently reduced, and additionally, efficiency in encoding is improved. Furthermore, in the case where the prediction set to be applied to the target sub block is different from a prediction set applied to the reference sub block to be used for estimating a prediction mode, the image encoding device 500 uses the aforementioned prediction mode correspondence table, so that a prediction mode applied to the reference sub block is converted into a most approximate prediction mode in the prediction set to be applied to the target sub block. As a result, the accuracy in estimation of a prediction mode for the target sub block can be improved, the encoding amount necessary for the prediction mode can be efficiently reduced, and additionally, the efficient in encoding can be improved. Further, the image encoding device 500 uses variable length coding with respect to information (reference direction combination index) indicative of a combination of reference directions used for estimation of a prediction mode, according to a bias of the appearance frequency. This makes it possible to restrain an increase in the encoding amount necessary for the reference direction combination index.

[Embodiment 6]

Another embodiment of the image decoding device according to the present invention is explained below as Embodiment 6 with reference to FIG. 38 through FIG. 41. The same constituent components as in Embodiments 1 through 5 have the same reference signs as in Embodiments 1 through 5, and therefore are not explained here.

(Arrangement of Image Decoding Device 550)

Figure 38:
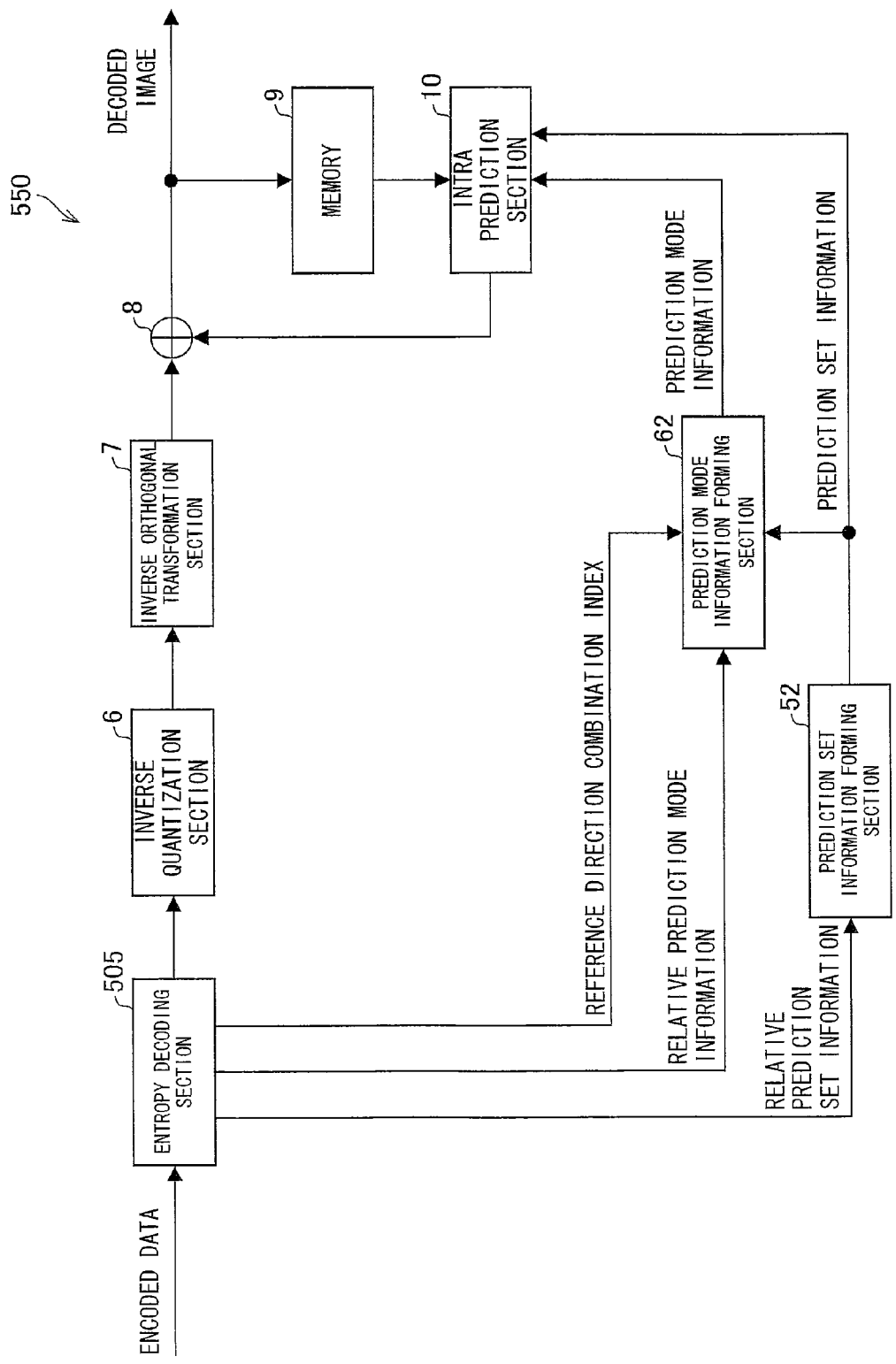
FIG. 38 is a block diagram showing essential part of an arrangement of an image decoding device according to Embodiment 6.

An arrangement of an image decoding device 550 according to Embodiment 6 is explained below with reference to FIG. 38. FIG. 38 is a block diagram showing the arrangement of the image decoding device 550.

As shown in FIG. 38, the image decoding device mainly includes an entropy decoding section 505, an inverse quantization section 6, an inverse orthogonal transformation section 7, an addition computing section 8, a memory 9, an intra prediction section 10, a prediction set information forming section 52, and a prediction mode information forming section 62. The present embodiment deals with only the entropy decoding section 505 and the prediction mode information forming section 62, which have not been described yet.

(Entropy Decoding Section 505)

The entropy decoding section 505 carries out a process reverse to the process carried out by the entropy encoding section 504. More specifically, the entropy decoding section 505 carries out entropy decoding with respect to encoded data of prediction residual data, relative prediction mode information, a reference direction combination index, relative prediction set information, and the like information, and then outputs decoded data thereof.

The entropy decoding section 505 carries out the entropy decoding with respect to encoded data (code) of the reference direction combination index into a reference direction combination index corresponding to the code, by referring to a reference direction combination index code table. The reference direction combination index thus decoded is supplied to the prediction mode information forming section 62. At this time, it is preferable to use the same reference direction combination index code table as that used in the image encoding device 500. Further, a shared reference direction combination index code table may be predetermined between the image encoded device 500 in Embodiment 5 and the image decoding device 550 in the present embodiment, or may be designated by use of external notification means.

(Prediction Mode Information Forming Section 62)

The prediction mode information forming section 62 carries out a process reverse to the process carried out by the relative prediction mode information forming section 61. More specifically, the prediction mode information forming section 62 forms prediction mode information of a target sub block on the basis of prediction set information reconstructed by the prediction set information forming section 52, the entropy-decoded relative prediction mode information and the entropy-decoded reference direction combination, and decoded prediction set information and decoded prediction mode information of an adjacent sub block. The prediction mode information forming section 62 then outputs the prediction mode information thus formed.

Figure 39:
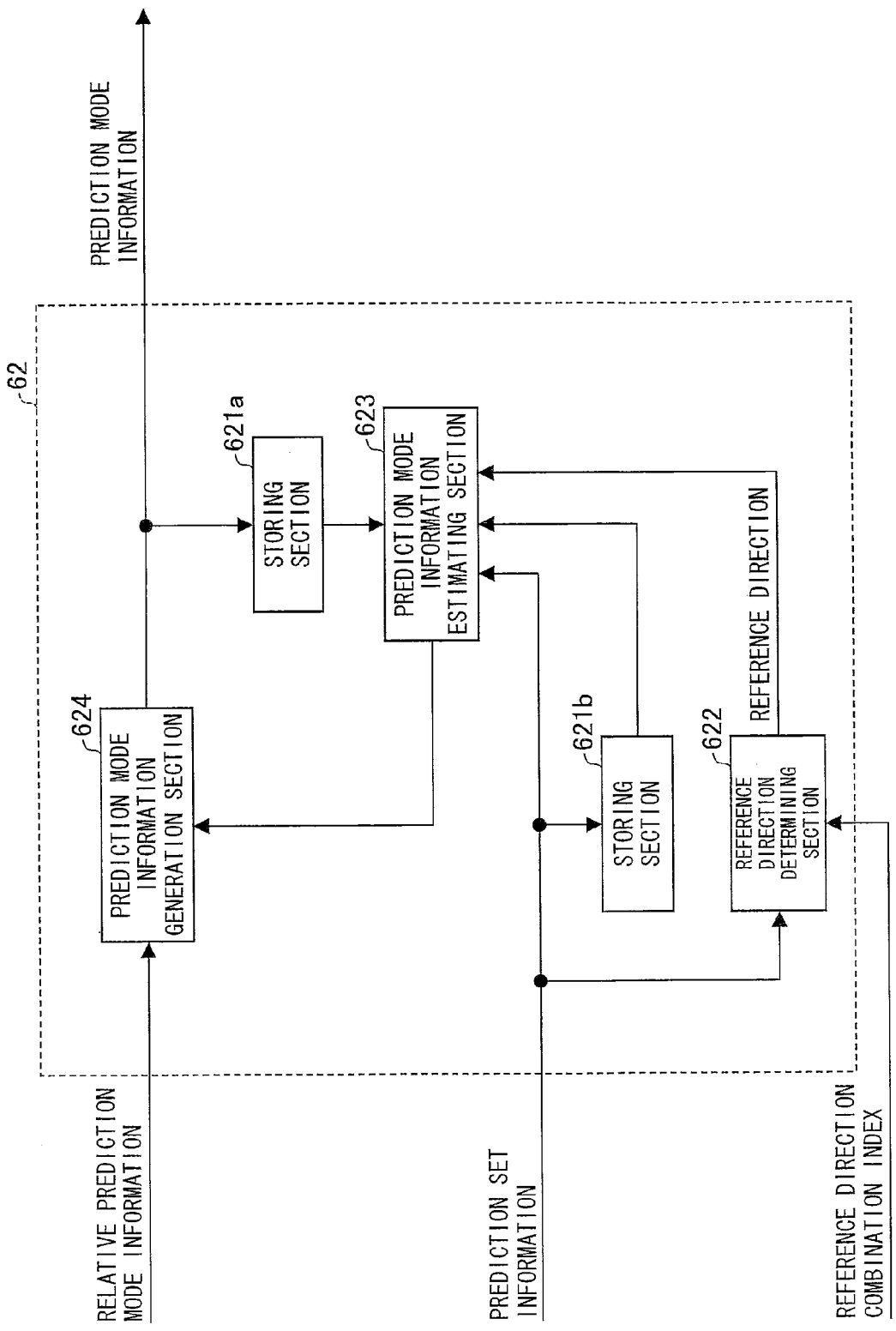
FIG. 39 is a block diagram showing an arrangement of a prediction mode information forming section.

The following explains about an arrangement of the prediction mode information forming section 62. FIG. 39 is a block diagram showing the arrangement of the prediction mode information forming section 62. As shown in FIG. 39, the prediction mode information forming section 62 includes a storing section 621a, a storing section 621b, a reference direction determining section 622, a prediction mode information estimating section 623, and a prediction mode information generation section 624. Each of the members is explained below.

(Storing Sections 621a, 621b)

Similarly to the storing sections 611a and 611b in the relative prediction mode information forming section 61, the storing sections 621a and 621b temporarily store input information therein. The storing section 621a stores prediction mode information of the target sub block, which is generated in the prediction mode information generation section 624. Further, the storing section 621b receives prediction set information and stores it therein. The stored prediction mode information and prediction set information are used for estimating prediction mode information of a subsequent sub block that will be decoded after the target sub block.

(Reference Direction Determining Section 622)

Similarly to the reference direction determining section 612 in the relative prediction mode information forming section 61, the reference direction determining section 622 receives the prediction set information and the reference direction combination index, and supplies, to the prediction mode information estimating section 623, a reference direction in which an encoded adjacent sub block (reference sub block) used for estimating prediction mode information of a target sub block is positioned. The reference direction is determined according to a reference direction combination table, based on the received prediction set information, the received reference direction combination index, and a position (internally counted) of the target sub block. At this time, it is preferable to use the same reference direction combination table as that in the image encoding device 500. Further, a shared reference direction combination table may be predetermined between the image encoding device 500 in Embodiment 5 and the image decoding device 550 in the present embodiment, or may be designated by use of external notification means. How to determine the reference direction is the same as in Embodiment 5, and therefore is not explained here.

(Prediction Mode Information Estimating Section 623)

The prediction mode information estimating section 623 determines an estimation value of prediction mode information, which is to be used for the target sub block, by a predetermined method based on the received prediction set information, the reference direction determined by the reference direction determining section 622, and prediction mode information and prediction set information of a decoded adjacent sub block, respectively stored in the storing sections 621a and 621b. The prediction mode information estimating section 623 then supplies the determined estimation value to the prediction mode information generation section 624. How to determine the estimation value of prediction mode information is the same as in the prediction mode information estimating section 613 in Embodiment 5, and therefore is not explained here.

(Prediction Mode Information Generation Section 624)

The prediction mode information generation section 624 carries out a process reverse to the process carried out by the relative prediction mode information generation section 614. More specifically, the prediction mode information generation section 624 generates prediction mode information to be applied to the target sub block, based on received relative prediction mode information and the estimation value probable_mode of prediction mode information for the target sub block, which estimation value is determined by the prediction mode information estimating section 623. Further, the prediction mode information thus generated is supplied to the storing section 621a and the intra prediction section 10. A data structure of the prediction mode information mode_data( ) is shown in Table 29.

TABLE 29

| Syntax | Detail |
| --- | --- |
| mode_data( ){ <br>   mode <br> } | Prediction Mode Information <br> Indicative of Prediction Mode Used for Intra Prediction, for Target Sub Block |

An image decoding process in the image decoding device 500 is generally described below with reference to FIG. 40. FIG. 40 is a flowchart schematically showing the image decoding process in the image decoding device 550.

The image decoding device 550 receives encoded data of a target block (M×M pixel block) to be decoded (Step S210).

The entropy decoding section 505 carries out entropy decoding with respect to relative prediction set information and a reference direction combination index each of the target block to be decoded, in the received encoded data, and outputs decoded data thereof (Step S211).

The prediction set information forming section 52 forms prediction set information of the target block to be decoded, based on the relative prediction set information entropy-decoded in Step S211 and prediction set information that has been already decoded and stored therein (Step S212).

The entropy decoding section 505 carries out entropy decoding with respect to encoded data of relative prediction mode information, and supplies the relative prediction mode information thus decoded, to the prediction mode information forming section 62 (Step S213).

The prediction mode information forming section 62 forms prediction mode information of a target sub block based on (i) the prediction set information thus formed, (ii) the reference direction combination index, (iii) the relative prediction mode information of the target sub block, and (iv) prediction set information and prediction mode information of a decoded sub block that is adjacent to the target sub block (Step S214).

The entropy decoding section 505 further carries out entropy decoding with respect to a quantization value of prediction residual data of the target sub block (Step S215). Here, the target sub block has a predetermined block size (N×N pixel block) by which the target block is subdivided.

The intra prediction section 10 carries out intra prediction and generates a predicted image (N×N pixel block) according to a prediction mode to be applied to the target sub block, by use of a locally decoded image of decoded adjacent sub blocks, stored in the memory 9 (Step S216). How to generate the predicted image by the intra prediction has been already explained in Embodiment 1, and therefore is not explained here.

The prediction residual data decoded in Step S215 is supplied to the inverse quantization section 6 and then to the inverse orthogonal transformation section 7 so as to be subjected to inverse quantization and inverse orthogonal transformation, respectively. The prediction residual data is then supplied to the addition computing section 8 (Step S217).

The addition computing section 8 adds the predicted image thus generated in Step S216 to the prediction residual data thus subjected to the inverse quantization and the inverse orthogonal transformation in Step S217, so as to form a decoded image (N×N pixel block) of the target sub block. The addition computing section 8 then outputs the decoded image (Step S218).

The memory 9 stores therein the decoded image of the target sub block, generated in Step S218 (Step S219).

The image decoding device 550 repeats the processes from Step S213 to Step S219 with respect to all sub blocks constituting the target block to be decoded. Further, the image decoding device 550 repeats the processes from Step S210 through Step S219 with respect to all blocks constituting a target image to be decoded.

The present embodiment explained about the decoding process in the image decoding device 550 in the order from Step S210 to Step S219. However, the order of the decoding process is not limited to this, and can be altered within a range in which the present invention can be carried out.

(Details of Process of Forming Prediction Mode Information)

A process of forming prediction mode information is explained below with reference to FIG. 41. FIG. 41 is a flowchart specifically showing the process of forming prediction mode information.

Initially, the reference direction determining section 622 receives prediction set information and a reference direction combination index, and determines a reference direction of a reference sub block to be used for estimating prediction mode information, according to the reference direction combination table, based on the prediction set information, the reference direction combination index, and a position of the target sub block (Step S220). The reference direction determining section 622 then supplies the reference direction thus determined to the prediction mode information estimating section 623.

The prediction mode information estimating section 623 obtains prediction mode information and prediction set information of a reference sub block indicated by the received reference direction, respectively from the storing section 621a and the storing section 621b (Step S221). Subsequently, the prediction mode information estimating section 623 determines an estimation value of a prediction mode for the target sub block, according to the prediction mode correspondence table, based on the obtained prediction mode information and prediction set information of the reference sub block, and the prediction set information of the target sub block (Step S222). The determined estimation value is supplied to the prediction mode information generation section 624.

The prediction mode information generation section 624 receives relative prediction mode information and the estimation value of prediction mode information for the target sub block, and then generates prediction mode information of the target sub block based on the relative prediction mode information and the estimation value. The prediction mode information generation section 624 then outputs the prediction mode information (Step S223).

Finally, the storing sections 621a and 621b respectively store the prediction mode information and the prediction set information each of the target sub block therein (Step S224).

In the present embodiment, decoding units of the prediction set and the reference direction combination index are an M×M pixel block. However, the decoding units are not limited to this. For example, the decoding units may be a macro block, a slice, a picture (frame), or a GOP (Group Of Picture). For example, in the case where the prediction set and the combination of reference directions are changed per slice unit, it is necessary to decode information on a selected prediction set and a selected combination of reference directions at a headmost part of the slice. The decoding units of the prediction set and the reference direction combination index may be predetermined between an image encoding device and an image decoding device, or may be designated in a headmost piece of encoded data, a picture, or a GOP header. Alternatively, it is also possible to notify the decoding unit by use of external means, not by the image encoding device and the image decoding device.

(Effects)

As described above, the image decoding device 550 includes a prediction set group constituted by a plurality of prediction sets having different combinations of a plurality of prediction modes corresponding to respective prediction directions different from each other. The image decoding device 550 decodes prediction set information to be applied to a target block to be decoded, which constitutes an image, with the use of relative prediction set information of the target block and prediction set information that has been already decoded. Then, the image decoding device 550 decodes a reference direction combination index indicative of a combination of reference directions to be used for estimating prediction modes of all sub blocks in the target block. Subsequently, the image decoding device 550 determines an estimation value of a prediction mode for a target sub block based on the prediction set information thus decoded, the reference direction combination index thus decoded, and prediction set information and prediction mode information of a decoded sub block adjacent to the target sub block. The image decoding device 550 then decodes prediction mode information based on the estimation value thus determined and relative prediction mode information of the target sub block. The determination of an estimation value and the decoding of prediction mode information are carried out per sub block unit by which the target block is subdivided. This arrangement allows the image decoding device 550 to select a reference sub block to be used for estimating a prediction mode for a target sub block, thereby improving accuracy in estimation of a prediction mode and reducing an encoded amount of the prediction mode, which is to be decoded. Further, in the case where a prediction set of the target sub block is different from a prediction set of the reference sub block to be used for estimation of a prediction mode, the image decoding device 550 uses the aforementioned prediction mode correspondence table, so that a prediction mode applied to the reference sub block is converted into a most approximate prediction mode in the prediction set of the target sub block. As a result, the accuracy in estimation of a prediction mode of the target sub block can be improved, and the encoded amount of the prediction mode, which is to be decoded, can be efficiently reduced. Further, the image decoding device 550 decodes the reference direction combination index, with the use of a variable-length code according to a bias of the appearance frequency. This makes it possible to restrain an increase in the encoded amount of the reference direction combination index, which is to be decoded.

[Embodiment 7]

Another embodiment of the image encoding device according to the present invention is explained below as Embodiment 7 with reference to FIG. 42 through FIG. 49. The same constituent components as in Embodiments 1 through 6 have the same reference signs as in Embodiments 1 through 6, and therefore are not explained here.

Embodiment 5 dealt with a case where prediction set information is used for determining a reference sub block to be used for estimating a prediction mode of a target sub block. The present embodiment explains about an image encoding device which uses, not the prediction set information, but prediction modes of encoded sub blocks positioned around the target sub block to determine the reference sub block to be used for estimating a prediction mode of the target sub block.

(Arrangement of Image Encoding Device 600)

An arrangement of an image encoding device 600 according to the present embodiment is explained below with reference to FIG. 42. FIG. 42 is a block diagram showing the arrangement of the image encoding device 600 according to the present embodiment. The image encoding device 600 includes a difference computing section 1, an orthogonal transformation section 2, a quantization section 3, an entropy encoding section 304, an inverse quantization section 6, an inverse orthogonal transformation section 7, an addition computing section 8, a memory 9, an intra prediction section 310, a prediction mode determining section 311, and a relative prediction mode information forming section 661. The present embodiment explains about the relative prediction mode information forming section 661, which has not been described yet.

(Relative Prediction Mode Information Forming Section 661)

The relative prediction mode information forming section 661 forms relative prediction mode information of a target sub block based on (a) prediction mode information received from the prediction mode determining section 311 and (b) prediction mode information of an encoded sub block that has been already encoded, stored inside the relative prediction mode information forming section 661.

Figure 43:
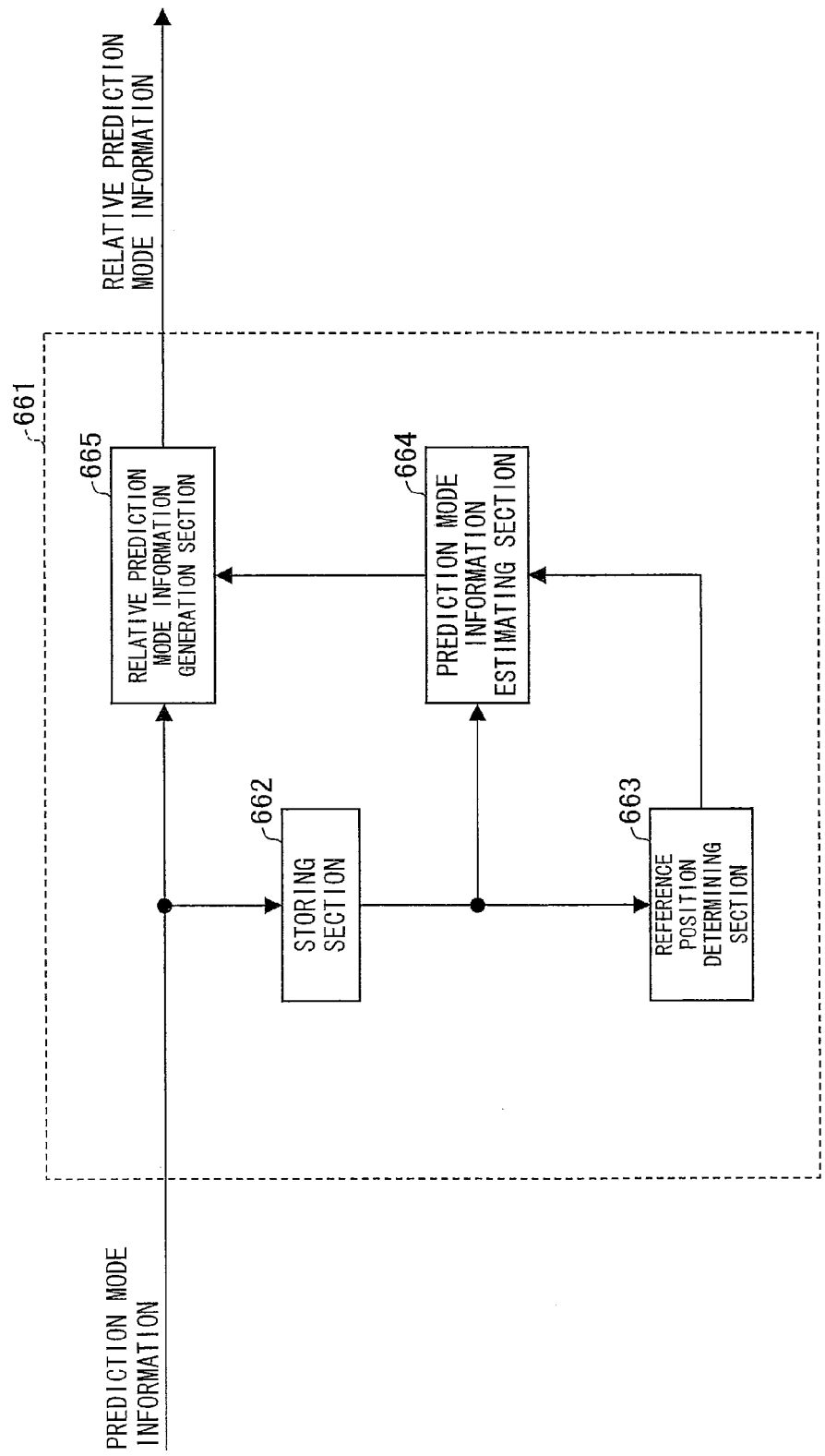
FIG. 43 is a block diagram showing an arrangement of a relative prediction mode information forming section.

An arrangement of the relative prediction mode information forming section 661 is described below with reference to FIG. 43. FIG. 43 is a block diagram showing the arrangement of the relative prediction mode information forming section 661.

The relative prediction mode information forming section 661 includes a storing section 662, a reference position determining section 663, a prediction mode information estimating section 664, and a relative prediction mode information generation section 665, as shown in FIG. 43.

(Storing Section 662)

The storing section 662 stores the received prediction mode information of a target sub block therein. The prediction mode information thus stored is used for estimating prediction mode information of a subsequent sub block that will be encoded after the target sub block is encoded.

(Reference Position Determining Section 663)

The reference position determining section 663 determines a sub block (reference sub block) that is most correlated with the target sub block is determined from 4 sub blocks (adjacent sub blocks A, B, C, and D in FIG. 44) adjacent to the target sub blocks, with the use of pieces of prediction mode information of encoded sub blocks positioned around the target sub block. The reference position determining section 663 supplies position information (reference position information) of the determine reference sub block to the prediction mode information estimating section 664. In the present embodiment, the target sub block is referred to as a target sub block O.

(Prediction Mode Information Estimating Section 664)

The prediction mode information estimating section 664 determines an estimation value of prediction mode information, which is to be used for the target sub block, by a predetermined method on the basis of (a) the reference position information determined by the reference position determining section 663 and (b) prediction mode information of a decoded adjacent sub block, stored in the storing section 662. The prediction mode information estimating section 664 then supplies the determined estimation value to the prediction mode information generation section 665.

(Relative Prediction Mode Information Generation Section 665)

The relative prediction mode information generation section 665 has the same function as the relative prediction mode information generation section 614. More specifically, the relative prediction mode information generation section 665 receives the prediction mode information and the estimation value probable_mode of prediction mode information, determined by the prediction mode information estimating section 664, and generates relative information (relative prediction mode information) of a prediction mode of the target sub block with respect to the estimation value, based on the prediction mode information and the estimation value probable_mode. Further, the relative prediction mode information thus generated is supplied to the entropy encoding section 304. A data structure of the relative prediction mode information relative_mode_data( ) is the same as in Table 18.

(Overview of Image Encoding Process)

An image encoding process in the image encoding device 600 is generally described below with reference to FIG. 45. FIG. 45 is a flowchart schematically showing the image encoding process in the image encoding device 600.

The image encoding device 600 receives a target sub block (N×N pixel block) to be encoded (Step S230).

The prediction mode determining section 311 determines a prediction mode of the target sub block to be encoded based on an original image of the target sub block to be encoded and a locally decoded image (N×N pixel block) stored in the memory 9 (Step S231). Prediction mode information on the determined prediction mode is supplied to the intra prediction section 310 and the relative prediction mode information forming section 661.

The relative prediction mode information forming section 661 forms relative prediction mode information of the target sub block to be encoded based on the prediction mode information of the target sub block, received from the prediction determining section 311, and prediction mode information of a reference sub block. The relative prediction mode information forming section 661 outputs the relative prediction mode information thus formed (Step S232).

The entropy encoding section 304 carries out entropy encoding with respect to the relative prediction mode information and outputs encoded data of the relative prediction mode information (Step S233).

The intra prediction section 310 carries out intra prediction defined by the prediction mode determined in Step S231 with the use of a locally decoded image of encoded adjacent sub blocks, obtained from the memory 9, and generates a predicted image of the target sub block to be encoded (Step S234). The generated predicted image of the target sub block is supplied to the difference computing section 1 and the addition computing section 8. How to generate the predicted image is the same as the conventional technique, and therefore is not explained here.

The difference computing section 1 calculates prediction residual data of the target sub block to be encoded, which is a difference between the inputted original image of the target sub block to be encoded and the predicted image generated in Step S234, and then outputs the prediction residual data (Step S235).

The prediction residual data thus calculated in Step S235 is supplied to the orthogonal transformation section 2 and then to the quantization section 3 so as to be subjected to orthogonal transformation and quantization, respectively. The prediction residual data is then supplied to the entropy encoding section 304 and the inverse quantization section 6 (Step S236).

The prediction residual data thus subjected to the orthogonal transformation and the quantization is supplied to the inverse quantization section 6 and then to the inverse orthogonal transformation section 7 so as to be subjected to inverse quantization and inverse orthogonal transformation, respectively. The prediction residual data is then supplied to the addition computing section 8 (Step S237).

The addition computing section 8 adds the prediction residual data thus subjected to the inverse quantization and the inverse orthogonal transformation in Step S237, to the predicted image generated in Step S234, so as to generate a locally decoded image of the target sub block (Step S238). The locally decoded image thus generated is then stored in the memory 9.

The entropy encoding section 304 carries out entropy encoding with respect to the quantized prediction residual data of the target sub block, and outputs encoded data of the prediction residual data (Step S239).

The image encoding device 600 carries out the processes from Step S230 to Step S239 with respect to all sub blocks constituting a target image to be encoded.

The present embodiment dealt with the encoding process in the image encoding device 600 in the order from Step S230 to Step S239. However, the order of the encoding process is not limited to this, and can be alternated within a range in which the present invention can be carried out.

(Details of How to Determine Reference Sub Block)

Figure 46:
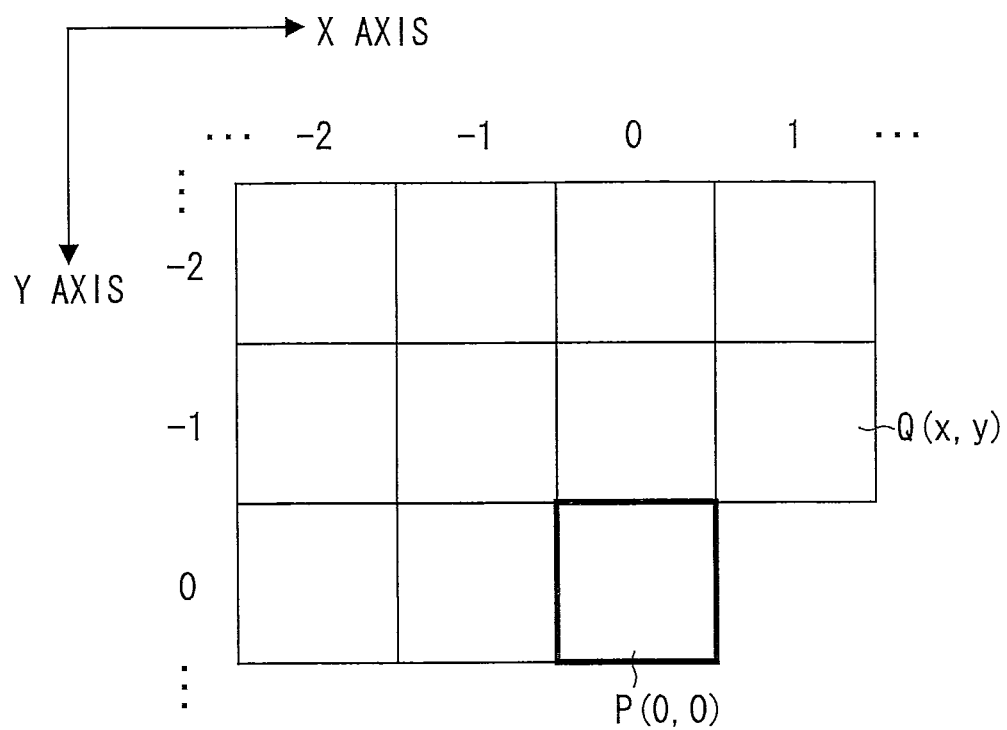
FIG. 46 illustrates a relative position of Q with respect to a target sub block P where the target sub block P is regarded as a basic point (0, 0), a horizontal direction is regarded as an X axis, and a vertical direction is regarded as a Y axis.

The following describes how to determine a reference sub block. Initially explained is a relative position of a sub block Q with respect to a target sub block P. As illustrated in FIG. 46, when a horizontal direction is taken as an X axis (positive numbers are on the right of zero) and a vertical direction is taken as a Y axis (positive numbers are on the downside of zero) where the target sub block P is taken as a base point (0, 0), the relative position of Q with respect to P is expressed as (x, y). For example, relative positions of sub blocks A, B, C, and D each adjacent to the target sub block are expressed as (−1, 0), (0, −1), (−1, −1), and (1, −1), respectively.

A connection degree of the sub block Q positioned at the relative position (x, y) with respect to the target sub block P is defined as Sp(x, y). The connection degree Sp(x, y) is a cost function indicating a degree of correlation between the target sub block P and the sub block Q at the relative position (x, y), and is represented by the following equation (31). As a value of the connection degree Sp(x, y) becomes large, the correlation between the target sub block P and the sub block Q is more strong.

Math. 17

$$S_p(x,y) = w_p \times w_q \times d \quad (31)$$

In the equation (31), wp is a weighting factor indicative of a degree that a prediction mode approximate to a prediction mode mp of the sub block P emerges in the sub block Q. Similarly, wq is a weighing factor indicative of a degree that a prediction mode approximate to a prediction mode mq of the sub block Q emerges in the sub block P.

The weighting factors wp and wq are defined by the prediction modes mp and mq and the relative position (x, y), by referring to Table 30. Weighting factors w1 and w2 in Table 30 have a magnitude relation represented by the following expression (32). As a value of a weighting factor wi becomes larger, an approximate prediction mode emerges with higher probability.

Math. 18

$$0 \leq w_2 \leq w_1 \quad (32)$$

TABLE 30

| | | Relative Position of Sub Block | | | |
|---|---|---|---|---|---|
| | | (−1, 0) | (0, −1) | (−1, −1) | (1, −1) |
| Prediction Mode | 0 | w2 | w1 | w2 | w2 |
| | 1 | w1 | w2 | w2 | w2 |
| | 2 | w2 | w2 | w2 | w2 |
| | 3 | w2 | w2 | w2 | w1 |
| | 4 | w2 | w2 | w1 | w2 |
| | 5 | w2 | w1 | w2 | w2 |
| | 6 | w1 | w2 | w2 | w2 |
| | 7 | w2 | w1 | w2 | w2 |
| | 8 | w1 | w2 | w2 | w2 |

For example, in the case where the prediction mode mp of the target sub block P is a prediction mode 1 (prediction in a horizontal direction), an approximate prediction mode most probably emerges at a sub block positioned on the left of the target sub block P (at a relative position (−1, 0)) among four relative positions. On this account, the weighting factor of the relative position (−1, 0) is set to a larger value w1, and the weighing factors of the other relative positions (0, −1), (−1, −1), and (1, −1) are set to a smaller value w2. The values of the weighting factors are not limited to the 2 types, w1 and w2.

Further, in the equation (31), d is a degree of similarity indicative of how much the prediction mode mp of the target sub block P is approximate to the prediction mode mq of the sub block Q, and is found by use of Table 31. In Table 31, di (i=1, 2, 3, 4, 5) is a predetermined value indicative of the degree of similarity, and values of di have a magnitude relation represented by the following expression (33). As the value of di becomes larger, the degree of similarity becomes higher.

Math. 19

$$0 \leq d_5 \leq d_4 \leq d_3 \leq d_2 \leq d_1 \quad (33)$$

TABLE 31

| | | Prediction Mode mq of Sub Block Q | | | | | | | | |
|---|---|---|---|---|---|---|---|---|---|---|
| | | 0 | 1 | 2 | 3 | 4 | 5 | 6 | 7 | 8 |
| Prediction Mode mp of Target Sub Block P | 0 | d1 | d5 | d3 | d3 | d3 | d2 | d4 | d2 | d4 |
| | 1 | d5 | d1 | d3 | d3 | d3 | d4 | d2 | d4 | d2 |
| | 2 | d3 | d3 | d1 | d3 | d3 | d3 | d3 | d3 | d3 |
| | 3 | d3 | d3 | d3 | d1 | d5 | d4 | d4 | d2 | d2 |
| | 4 | d3 | d3 | d3 | d5 | d1 | d2 | d2 | d4 | d4 |
| | 5 | d2 | d4 | d3 | d4 | d2 | d1 | d3 | d3 | d5 |
| | 6 | d3 | d2 | d3 | d4 | d2 | d3 | d1 | d5 | d3 |
| | 7 | d2 | d4 | d3 | d2 | d4 | d3 | d5 | d1 | d3 |
| | 8 | d4 | d2 | d3 | d2 | d4 | d5 | d3 | d3 | d1 |

In the case where the prediction mode mp is a prediction mode 1 (prediction in a horizontal direction), for example, if the prediction mode mq is also the prediction mode 1, prediction directions of the prediction modes are identical with each other. On this account, the degree of similarity is set to the largest value d1. Further, if mq is a prediction mode 6 or 8, which is most approximate to the prediction mode 1 in FIG. 68, the degree of similarly is set to d2. Further, if mq is a prediction mode 3 or 4, which is second-most approximate to the prediction mode 1 in FIG. 68, the degree of similarity is set to d3. Furthermore, if mq is a prediction mode 5 or 7, which is third-most approximate to the prediction mode 1 in FIG. 68, the degree of similarity is set to d4. Moreover, if mq is a prediction mode 0, which is most different from the prediction mode 1 in FIG. 68, the degree of similarity is set to d5. If mq is a prediction mode 2, the degree of similarity is set to d3, which is an intermediate value among d1 through d5. However, the values of the degree of similarity is not limited to the 5 types, from d1 through d5. The degree of similarity d is preferably set based on a characteristic of how probably a prediction mode more approximate to the prediction mode mp of the target sub block P emerges in an adjacent sub block. For example, it is preferable to set the degree of similarity d based on an initially-calculated appearance probability (simultaneous occurrence probability) of the prediction mode mq with respect to the prediction mode mp.

Subsequently, in each of the sub blocks A, B, C, and D adjacent to the target sub block O, connection degrees $S_p(x, y)$ (p=a, b, c, d) with respect to 4 relative positions $(-1, 0)$, $(0, -1)$, $(-1, -1)$, and $(1, -1)$ are found. For example, for the adjacent sub block A, $S_a(-1, 0)$, $S_a(0, -1)$, $S_a(-1, -1)$, and $S_a(1, -1)$ are found.

Then, connection degrees $S_o(x, y)$ of the target sub block O with respect to its relative positions $(-1, 0)$, $(0, -1)$, $(-1, -1)$ are estimated by use of the following equations (34) through (37), on the basis of thus found connection degrees $S_p(x, y)$ of each of the adjacent sub blocks A, B, C, D. In the following equations (34) through (37), in the case where there is a connection degree $S_p(x, y)$ that cannot be obtained, among the connection degrees $S_p(x, y)$ of the adjacent sub blocks A, B, C, and D (for example, an adjacent sub block is positioned outside the target image to be encoded), it is preferable to substitute a predetermined value for the connection degree.

Math. 20

$$S_0(-1,0)=\{S_a(-1,0)+S_b(-1,0)+S_c(-1,0)+S_d(-1,0)\}/4 \quad (34)$$

$$S_0(0,-1)=\{S_a(0,-1)+S_b(0,-1)+S_c(0,-1)+S_d(0,-1)\}/4 \quad (35)$$

$$S_0(-1,-1)=\{S_a(-1,-1)+S_b(-1,-1)+S_c(-1,-1)+S_d(-1,-1)\}/4 \quad (36)$$

$$S_0(1,-1)=\{S_a(1,-1)+S_b(1,-1)+S_c(1,-1)+S_d(1,-1)\}/4 \quad (37)$$

Among the connection degrees $S_o(x, y)$ estimated according to the above equations (34) through (37), a relative position (x, y) that gives the largest connection degree is determined as a reference sub block of the target sub block O. In the case where there are several connection degrees having the same value, it is preferable to determine a predetermined relative position (x, y) as the reference sub block of the target sub block O.

(Operation Process of Relative Prediction Mode Information Forming Section 661)

The following describes how the relative prediction mode information forming section 661 forms relative prediction mode information, with reference to FIG. 47. FIG. 47 is a flowchart specifically showing a process of generating the relative prediction mode information.

Initially, the storing section 662 receives prediction mode information and stores it therein (Step S240). The reference position determining section 663 estimates correlations between a target sub block and adjacent sub blocks (A, B, C, D) on the basis of pieces of prediction mode information of a plurality of encoded sub blocks positioned around the target sub block (Step S241). The pieces of prediction mode information are supplied from the storing section 662.

Then, the reference position determining section 663 determines, from the adjacent sub blocks A, B, C, and D, a reference sub block to be used for estimating a prediction mode of the target sub block, based on the correlations found in Step S241 (Step S242). Reference position information indicative of a position of the determined reference sub block is supplied to the prediction mode information estimating section 664.

The prediction mode information estimating section 664 obtains prediction mode information of the reference sub block indicated by the reference position information thus received, from the storing section 662 (Step S243). The prediction mode information estimating section 664 determines an estimation value of prediction mode information for the target sub block, based on the obtained prediction mode information of the reference sub block, and supplies the determined estimation value to the relative prediction mode information generation section 665 (Step S244).

The relative prediction mode information generation section 665 generates relative prediction mode information of the target sub block based on the prediction mode information of the target sub block and the estimation value of prediction mode information, and outputs the relative prediction mode information (Step S245).

(Modified Example)

The following describes relative prediction mode information forming section 661*b* as a modified example of Embodiment 7. The relative prediction mode information forming section 661*b* determines a reference sub block by use of locally decoded images of adjacent sub blocks that have been already encoded, instead of using pieces of prediction mode information of the encoded adjacent sub blocks.

The relative prediction mode information forming section 661 in Embodiment 7 exemplifies a case where the reference sub block to be used for estimating a prediction mode of a target sub block to be encoded is determined based on pieces of prediction mode information of adjacent sub blocks that have been already encoded.

(Arrangement of Image Encoding Device 600*b*)

An arrangement of an image encoding device 600*b* employing the relative prediction mode information forming section 661*b* is explained below with reference to FIG. 48. The image encoding device 600*b* mainly includes a difference computing section 1, an orthogonal transformation section 2, a quantization section 3, an entropy encoding section 304, an inverse quantization section 6, an inverse orthogonal transformation section 7, an addition computing section 8, a memory 9, an intra prediction section 310, a prediction mode determining section 331, and a relative prediction mode information forming section 661*b*. The following describes the relative prediction mode information section 661*b*.

(Relative Prediction Mode Information Forming Section 661*b*)

The relative prediction mode information forming section 661*b* forms relative prediction mode information of a target sub block, based on prediction mode information received from the prediction mode determining section 311 and locally decoded images of encoded sub blocks adjacent to the target sub block, stored in the memory 9.

Figure 49:
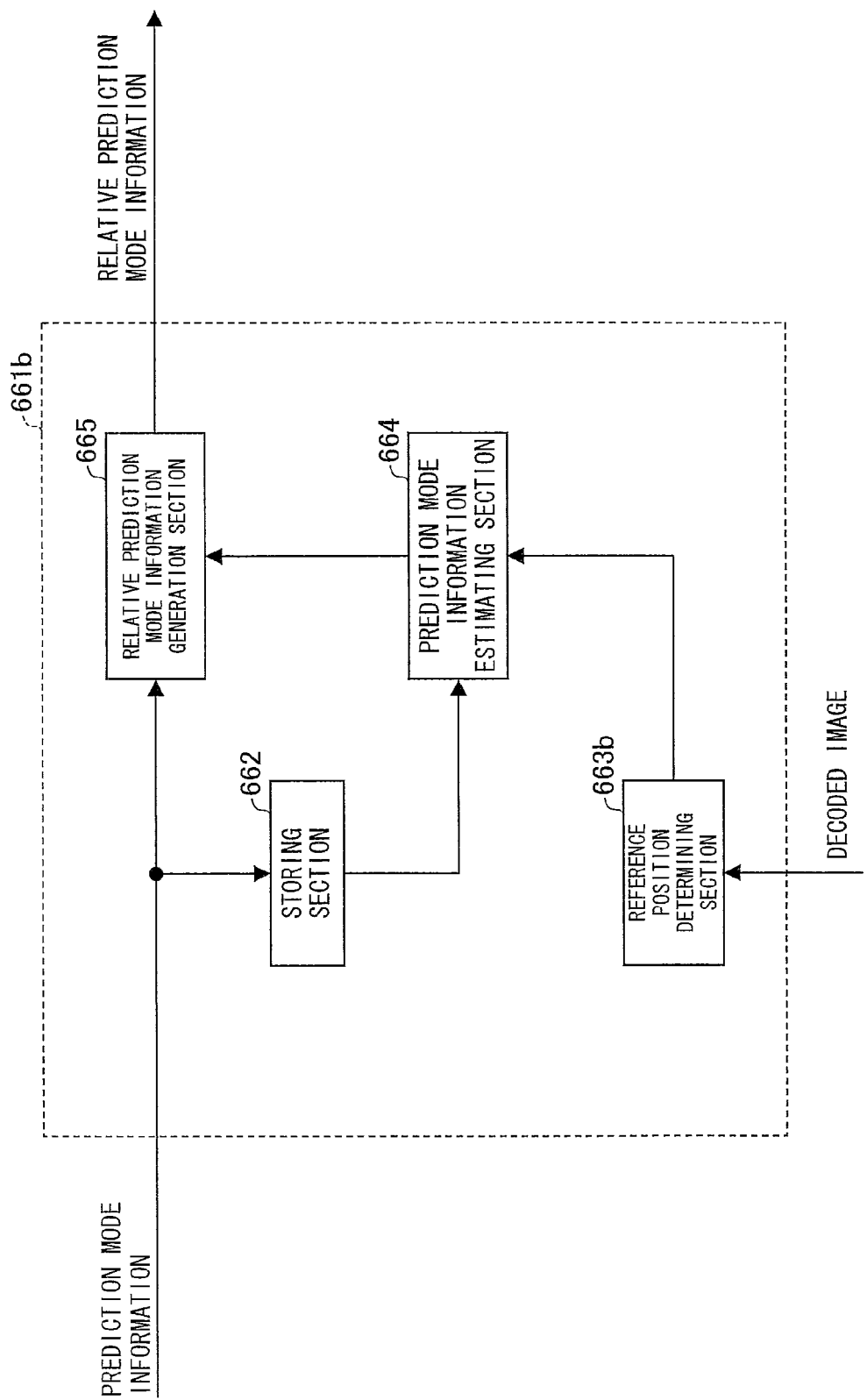
FIG. 49 is a block diagram showing an arrangement of a relative prediction mode information forming section in the modified example.

An arrangement of the relative prediction mode information forming section 661*b* is described below with reference to FIG. 49. FIG. 49 is a block diagram showing the arrangement of the relative prediction mode information forming section 661b.

The relative prediction mode information forming section 661b includes a storing section 662, a reference position determining section 663b, a prediction mode information estimating section 664, and a relative prediction mode information generation section 665, as shown in FIG. 49. The following describes the reference position determining section 663b.

(Reference Position Determining Section 663b)

The reference position determining section 663b determines a sub block (reference sub block) that is most correlated with a target sub block among 4 sub blocks (adjacent sub blocks A, B, C, D in FIG. 44) adjacent to the target sub block, by use of locally decoded images of encoded sub blocks positioned around the target sub block. The reference position determining section 663 then supplies position information (reference position information) of the determined reference sub block to the prediction mode information estimating section 664. In the present embodiment, the target sub block is referred to as a target sub block O.

(Overview of Image Encoding Process)

An image encoding process in the image encoding device 600b is almost the same as the image encoding process in the image encoding device 600, except for Step S232. Therefore, the same steps are not explained here. The following deals with Step S232 in the image encoding process in the image encoding device 600b, which differs from Step S232 in the image encoding process of the image encoding device 600.

The relative prediction mode information forming section 661b forms relative prediction mode information of the target sub block to be encoded, on the basis of (a) prediction mode information of the target sub block, received from the prediction mode determining section 311, and (b) locally decoded images of encoded sub blocks positioned around the target sub block, supplied from the memory 9. The relative prediction mode information forming section 661b then outputs the relative prediction mode information thus formed (Step S232).

(Details of How to Determine Position of Reference Sub Block)

The following describes how to determine a position of a reference sub block with the use of locally decoded images of encoded sub blocks positioned around the target sub block.

The reference position determining section 663 uses a cost function $f(\theta_p, \theta_q, T_p, T_q)$ instead of the connection degree $Sp(x, y)$, to evaluate a correlation between a target sub block and a sub block Q positioned at a relative position $(x, y)$. Variable values $\theta_p$ and $\theta_q$ respectively indicate a dominant edge orientation in the target sub block P and a dominant edge orientation in the sub block Q at the relative position $(x, y)$. Further, $T_p$ and $T_q$ respectively indicate an edge strength of the target sub block P and an edge strength of the sub block Q at the relative position $(x, y)$. How to calculate the edge orientation and the edge strength has been already described in Embodiment 1, and therefore is not explained here.

Examples of the cost function $f(\theta_p, \theta_q, T_p, T_q)$ may be represented by the following equations (38) and (39).

Math. 21

$$f(\theta_p, \theta_q, T_p, T_q) = |\theta_p - \theta_q|^\alpha \times |T_p - T_q|^\beta \quad (38)$$

$$f(\theta_p, \theta_q, T_p, T_q) = \gamma |\theta_p - \theta_q| + \epsilon |T_p - T_q| \quad (39)$$

The equation (38) is a cost function $f(\theta_p, \theta_q, T_p, T_q)$ of a product of an absolute value of a difference between the edge orientations $\theta_p$ and $\theta_q$ and an absolute value of a difference between the edge strengths $T_p$ and $T_q$. Further, the equation (39) is a cost function $f(\theta_p, \theta_q, T_p, T_q)$ of a sum of the absolute value of the difference between the edge orientations $\theta_p$ and $\theta_q$ and the absolute value of the difference between the edge strengths $T_p$ and $T_q$. In the equations (38) and (39), parameters $\alpha$, $\beta$, $\gamma$, and $\epsilon$ are predetermined scaling variables.

In these cost functions $f(\theta_p, \theta_q, T_p, T_q)$ expressed by the equations (38) and (39), as the value becomes smaller, the correlation between the target sub block P and the sub block Q at the relative position $(x, y)$ becomes stronger. In the present embodiment, the cost function $f(\theta_p, \theta_q, T_p, T_q)$ between the target sub block P and the sub block Q positioned at the relative position $(x, y)$ with respect to the target sub block P is referred to as $f_p(x, y)$, for convenience.

Subsequently, in each of the sub blocks A, B, C, and D adjacent to the target sub block O in FIG. 44, cost functions $f_p(x, y)$ with respect to 4 relative positions $(-1, 0)$, $(0, -1)$, $(-1, -1)$, and $(1, -1)$ are found. For example, for the adjacent sub block A, $f_a(-1, 0)$, $f_a(0, -1)$, $f_a(-1, -1)$, and $f_a(1, -1)$ are found.

Then, cost functions $f_o(x, y)$ of the target sub block O with respect to its relative positions $(-1, 0)$, $(0, -1)$, $(-1, -1)$ are estimated in accordance with the following equations (40) through (43), on the basis of thus found cost functions $f_p(x, y)$ of each of the adjacent sub blocks A, B, C, D. In the following equations (40) through (43), in the case where there is a cost function $f_p(x, y)$ that cannot be obtained, among the cost functions $f_p(x, y)$ of the adjacent sub blocks A, B, C, and D, it is preferable to substitute a predetermined value for the cost function.

Math. 22

$$f_o(-1,0) = \{f_a(-1,0) + f_b(-1,0) + f_c(-1,0) + f_d(-1,0)\}/4 \quad (40)$$

$$f_o(0,-1) = \{f_a(0,-1) + f_b(0,-1) + f_c(0,-1) + f_d(0,-1)\}/4 \quad (41)$$

$$f_o(-1,-1) = \{f_a(-1,-1) + f_b(-1,-1) + f_c(-1,-1) + f_d(-1,-1)\}/4 \quad (42)$$

$$f_o(1,-1) = \{f_a(1,-1) + f_b(1,-1) + f_c(1,-1) + f_d(1,-1)\}/4 \quad (43)$$

Among the cost functions $f_o(x, y)$ estimated according to the above equations (40) through (43), a relative position $(x, y)$ that gives the smallest cost is determined as a reference sub block of the target sub block O. In the case where there are several costs having the same value, it is preferable to determine a predetermined relative position $(x, y)$ as the reference sub block of the target sub block O.

(Details of Process of Forming Relative Prediction Mode Information)

A process of forming relative prediction mode information is almost the same as in the process of the relative prediction mode information forming section 661, except for Step S241. Therefore, the same steps are not explained here. The following describes Step S241 in the modified example, which differs from S241 in the process in the relative prediction mode information forming section 661.

The reference position determining section 663b calculates pieces of edge information from locally decoded images of a plurality of encoded sub blocks positioned around the target sub block. The locally decoded images are supplied from the memory 9. The reference position determining section 663b then estimates correlations between the target sub block and adjacent sub blocks (A, B, C, D) based on the pieces of edge information thus calculated (Step S241).

(Additional Matters)

In the present embodiment and the modified example of the present embodiment, a selection unit of a sub block position to be used for estimation of a prediction mode is a sub block unit. However the selection unit is not limited to this. For example, the selection unit of the sub block position may be a macro block, a slice, a picture (frame) or a GOP (Group Of Picture). The selection unit of the sub block position to be used for estimation of a prediction mode may be predetermined between an image encoding device and an image decoding device, or may be designated at a headmost piece of encoded data, a picture, or a GOP header. Alternatively, it is also possible to notify the selection unit by use of external means, not by the image encoding device and the image decoding device. Further, in the present embodiment and the modified example thereof, the adjacent sub blocks used for estimation of a prediction mode are the adjacent sub blocks A, B, C, and D in FIG. 44, but are not limited to these. For example, the adjacent sub blocks to be used for estimation of a prediction mode may be only sub blocks A and B, or encoded sub blocks adjacent to the target sub block in addition to the sub blocks A, B, C, and D.

(Effects)

As described above, the image encoding device 600 according to the present embodiment includes at least one prediction set including a plurality of prediction modes corresponding to respective prediction directions different from each other.

The image encoding device 600 estimates correlations between a target sub block and adjacent sub blocks, by a predetermined method, from pieces of prediction mode information of encoded adjacent sub blocks or from decoded images of encoded adjacent sub blocks. The estimation is carried out per sub block into which a target block to be encoded, constituting an image, is subdivided. Subsequently, the image encoding device 600 selects an encoded adjacent sub block that is most correlated with the target sub block, based on the result of thus estimated correlations, and then estimates a prediction mode for the target sub block from a prediction mode of the encoded adjacent sub block thus selected. The image encoding device 600 encodes the prediction mode on the basis of the estimation.

This arrangement allows the image encoding device 600 to select a sub block that is most correlated with the target sub block, thereby improving accuracy in estimation of a prediction mode of the target sub block, reducing an encoded amount necessary for the prediction mode, and increasing efficiency in encoding.

[Embodiment 8]

Another embodiment of the image decoding device according to the present invention is explained below as Embodiment 8 with reference to FIG. 50 through FIG. 55. The same constituent components as in Embodiments 1 through 7 have the same reference signs as in Embodiments 1 through 7, and therefore are not explained here.

(Arrangement of Image Decoding Device 650)

Figure 50:
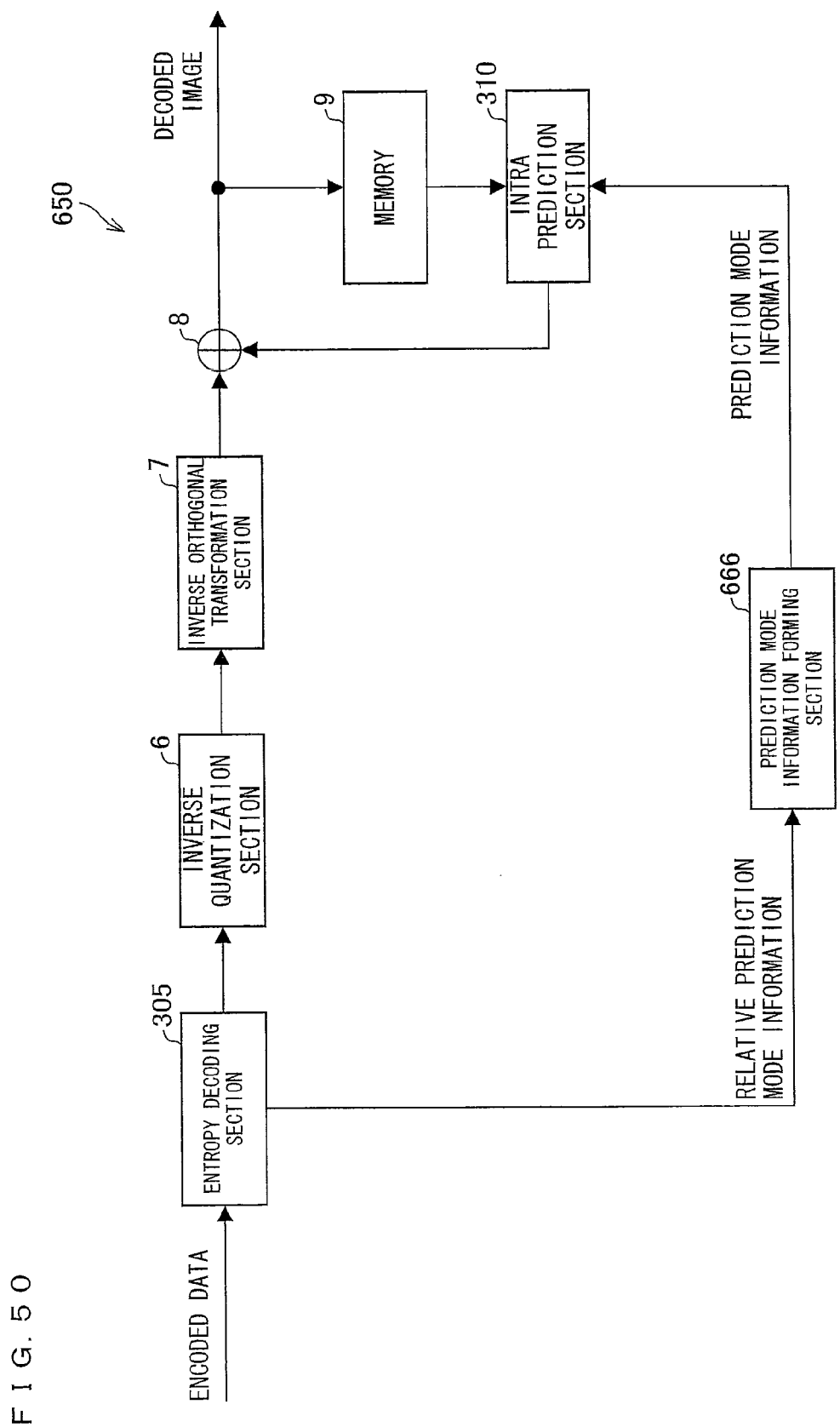
FIG. 50 is a block diagram showing essential part of an arrangement of an image decoding device according to Embodiment 8.

An arrangement of an image decoding device 650 according to Embodiment 8 is described below with reference to FIG. 50. FIG. 50 is a block diagram showing the arrangement of the image decoding device 650.

As shown in FIG. 50, the image decoding device 650 mainly includes an entropy decoding section 305, an inverse quantization section 6, an inverse orthogonal transformation section 7, an addition computing section 8, a memory 9, an intra prediction section 310, and a prediction mode information forming section 666. The present embodiment describes only the prediction mode information forming section 662 below.

(Prediction Mode Information Forming Section 666)

The prediction mode information forming section 666 carries out a process reverse to the process carried out by the relative prediction mode information forming section 661 in Embodiment 7. More specifically, the prediction mode information forming section 666 forms prediction mode information of a target sub block to be decoded, based on (a) entropy-decoded relative prediction mode information of the target sub block and (b) pieces of prediction mode information of decoded sub blocks positioned around the target sub block, stored inside the prediction mode information forming section 666.

Figure 51:
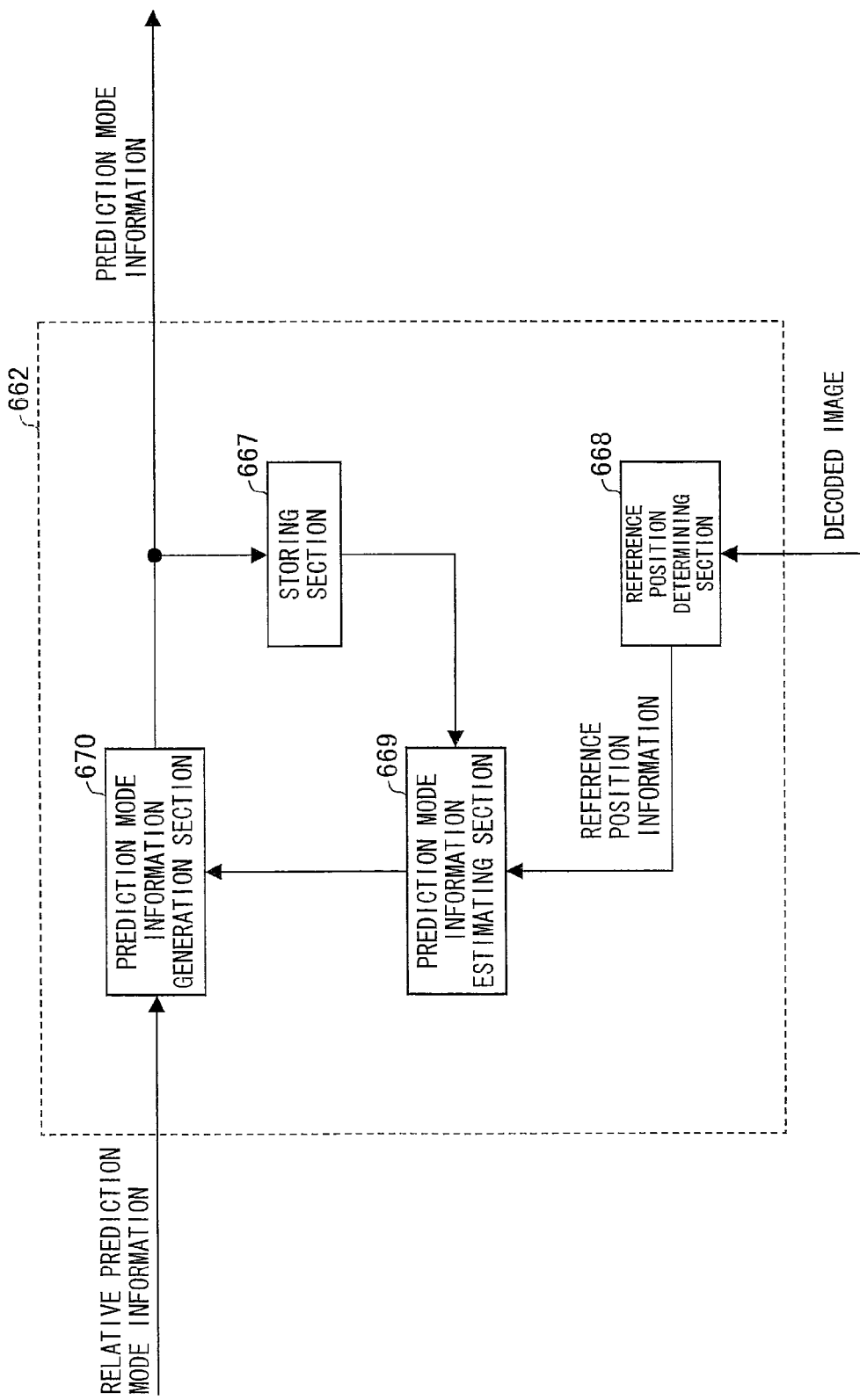
FIG. 51 is a block diagram showing an arrangement of a prediction mode information forming section.

An arrangement of the prediction mode information forming section 666 is described below with reference to FIG. 51. As shown in FIG. 51, the prediction mode information forming section 666 includes a storing section 667, a reference position determining section 668, a prediction mode information estimating section 669, and a prediction mode information generation section 670.

(Storing Section 667)

The storing section 667 has a function similar to the storing section 662 of the relative prediction mode information forming section 661. More specifically, the storing section 667 stores prediction mode information of the target sub block, generated by the prediction mode information generation section 670. The prediction mode information thus stored is used for estimating prediction mode information of a subsequent sub block which will be decoded after the target sub block is decoded.

(Reference Position Determining Section 668)

The reference position determining section 668 has a function similar to the reference position determining section 663 of the relative prediction mode information forming section 661. That is, the reference position determining section 668 determines a sub block (reference sub block) that is most correlated with the target sub block among four sub blocks (adjacent sub blocks A, B, C, D) adjacent to the target sub block, with the use of pieces of prediction mode information of decoded sub blocks positioned around the target sub blocks. The reference position determining section 668 then supplies position information (reference position information) of the determined reference sub block to the prediction mode information estimating section 669. How to determine the reference sub block is the same as in the reference position determining section 663 in Embodiment 7, and therefore is not explained here.

(Prediction Mode Information Estimating Section 669)

The prediction mode information estimating section 669 has a function similar to the prediction mode information estimating section 664 of the relative prediction mode information forming section 661. More specifically, the prediction mode information estimating section 669 determines an estimation value of prediction mode information, which is to be used for the target sub block, by a predetermined method based on the reference position information determined by the reference position determining section 668 and prediction mode information, stored in the storing section 667, of a decoded adjacent sub block. The prediction mode information estimating section 669 then supplies the determined estimation value to the prediction mode information generation section 670.

(Prediction Mode Information Generation Section 670)

The prediction mode information generation section 670 carries out a process reverse to the process carried out by the relative prediction mode information generation section 665. More specifically, the prediction mode information generation section 670 receives relative prediction mode information of the target sub block and the estimation value probable_mode of prediction mode information, determined by the prediction mode information estimating section 669, and generates prediction mode information to be applied to the target sub block on the basis of the relative prediction mode information and the estimation value probable_mode. Further, the prediction mode information thus generated is supplied to the storing section 667 and the intra prediction section 310. A data structure of the prediction mode information mode_data( ) is the same as in Table 29.

(Overview of Image Decoding Process)

Figure 52:
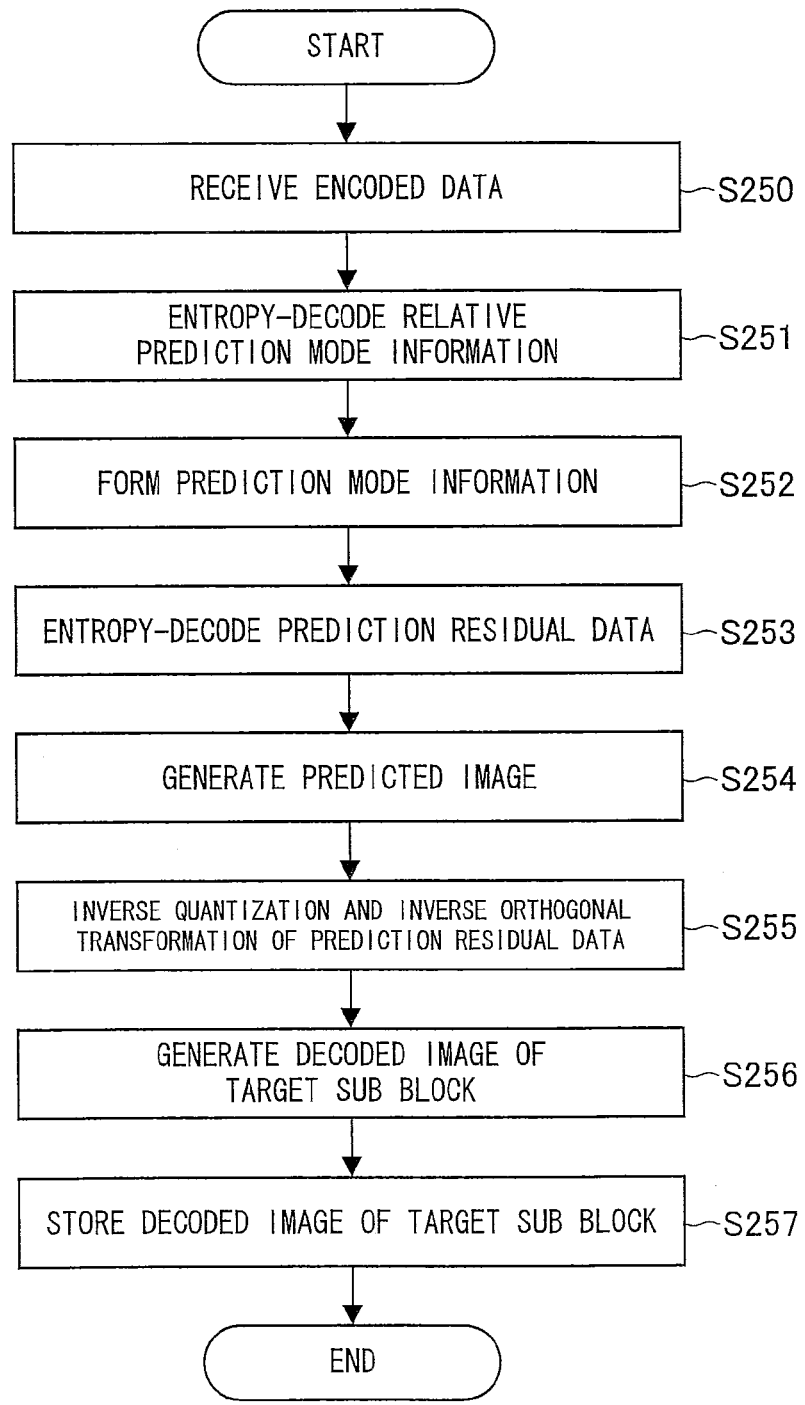
FIG. 52 is a flowchart schematically showing an image decoding process according to Embodiment 8.

An image decoding process in the image decoding device 650 is generally described with reference to FIG. 52. FIG. 52 is a flowchart schematically showing the image decoding process in the image decoding device 650.

The image decoding device 650 receives encoded data of a target sub block (N×N pixel block) to be decoded (Step S250).

The entropy decoding section 305 carries out entropy decoding with respect to encoded data of relative prediction mode information to be applied to the target sub block to be decoded, in the received encoded data, and then supplies the relative prediction mode information to the prediction mode information forming section 666 (Step S251).

The prediction mode information forming section 666 forms prediction mode information of the target sub block based on the received relative prediction mode information of the target sub block and pieces of prediction mode information of decoded sub blocks positioned around the target sub block (Step S252).

The entropy decoding section 305 carries out entropy decoding with respect to encoded data of prediction residual data (Step S253).

The intra prediction section 310 carries out intra prediction according to the decoded prediction mode information with the use of a locally decoded image, stored in the memory 9, of decoded adjacent sub blocks, and generates a predicted image (N×N pixel block) of the target sub block (Step S254). How to generate the predicted image is the same as the conventional technique, and therefore is not explained here.

The prediction residual data decoded in Step S253 is supplied to the inverse quantization section 6 and then to the inverse orthogonal transformation section 7 so as to be subjected to inverse quantization and inverse orthogonal transformation, respectively. The prediction residual data is then supplied to the addition computing section 8 (Step S255).

The addition computing section 8 adds the predicted image generated in Step S254 to the prediction residual data thus subjected to the inverse quantization and the inverse orthogonal transformation in Step S255, so as to generate a decoded image (N×N pixel block) of the target sub block. The addition computing section 8 then outputs the decoded image (Step S256).

The memory 9 receives and stores the generated decoded image of the target sub block (Step S257).

The image decoding device 650 repeats the processes from Step S250 to Step S257 with respect to all sub blocks constituting a target image to be decoded.

The present embodiment described the decoding process in the image decoding device 650 in the order from Step S250 to Step S257. However, the decoding process is not limited to this order, and can be altered within a range in which the present invention can be carried out.

(Operation Process of Prediction Mode Information Forming Section 662)

Figure 53:
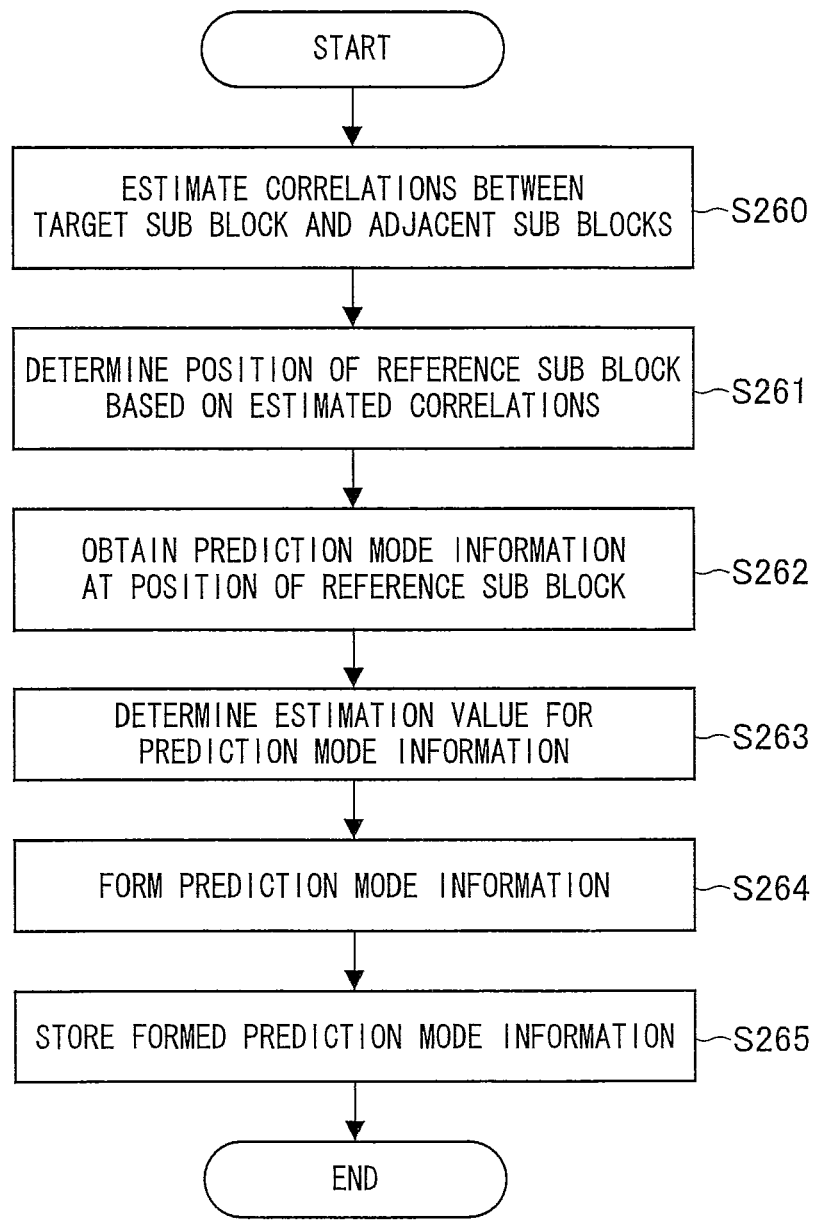
FIG. 53 is a flowchart specifically showing a process of generating prediction mode information.

The following describes a process of forming prediction mode information, more specifically, with reference to FIG. 53. FIG. 53 is a flowchart specifically showing the process of generating prediction mode information.

Initially, the reference position determining section 668 estimates correlations between the target sub block and adjacent sub blocks (A, B, C, D) based on pieces of prediction mode information of a plurality of decoded sub blocks positioned around the target sub block (Step S260). The pieces of prediction mode information are supplied from the storing section 667. The reference position determining section 668 then determines a reference sub block to be used for estimating prediction mode information of the target sub block from the adjacent sub blocks A, B, C, and D, based on the correlations thus found in Step S260. The reference position determining section 668 supplies reference position information indicative of a position of the determined reference sub block, to the information estimating section 669 (Step S261).

The prediction mode information estimating section 669 obtains, from the storing section 667, prediction mode information of the reference sub block indicated by the received reference position information (Step S262). The prediction mode information estimating section 669 then determines an estimation value of prediction mode information for the target sub block based on the obtained prediction mode information of the reference sub block. The determined estimation value is then supplied to the relative prediction mode information generation section 670 (Step S263).

The relative prediction mode information generation section 670 receives relative prediction mode information of the target sub block and the estimation value of prediction mode information, and generates prediction mode information of the target sub block based on the relative prediction mode information and the estimation value. The relative prediction mode information generation section 670 then outputs the prediction mode information thus formed (Step S264).

Finally, the storing section stores the prediction mode information of the target sub block therein (Step S265).

(Modified Example)

The following deals with an image decoding device including a prediction mode information forming section 666b, as a modified example. The prediction mode information forming section 666b determines a reference sub block with the use of locally decoded images of adjacent sub blocks that have been already decoded, instead of using pieces of prediction mode information of the adjacent sub blocks.

The prediction mode information forming section 666b in Embodiment 8 exemplifies a case where a reference sub block to be used for estimating a prediction mode of a target sub block is determined based on pieces of prediction mode information of adjacent sub blocks that have been already decoded.

(Arrangement of Image Decoding Device 650b)

An arrangement of an image encoding device 650b employing the prediction mode information forming section 666b is described below with reference to FIG. 54. FIG. 54 is a block diagram showing the arrangement of the image decoding device 650b.

As shown in FIG. 54, the image decoding device 650b mainly includes an entropy decoding section 305, an inverse quantization section 6, an inverse orthogonal transformation section 7, an addition computing section 8, a memory 9, an intra prediction section 310, and a prediction mode information forming section 666b. The present embodiment describes only the prediction mode information forming section 666b as below.

(Prediction Mode Information Forming Section 666b)

The prediction mode information forming section 666b carries out a process reverse to the process carried out by the relative prediction mode information forming section 661b included in the image encoding device 600b described as the modified example of Embodiment 7. More specifically, the prediction mode information forming section 666b forms prediction mode information of a target sub block to be decoded, based on entropy-decoded relative prediction mode information of the target sub block and locally decoded images, store in the memory 9, of decoded sub blocks adjacent to the target sub block.

Figure 55:
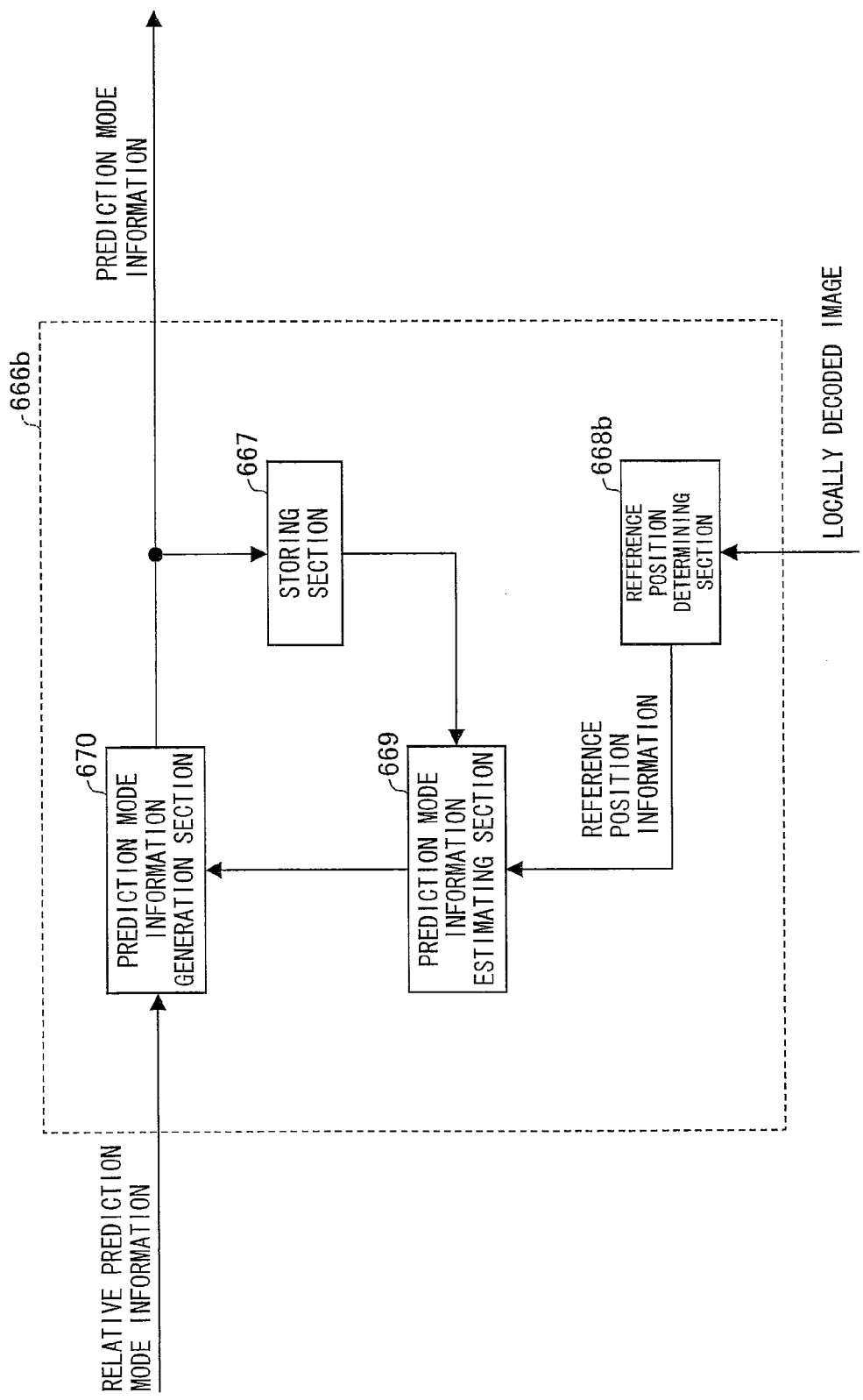
FIG. 55 is a block diagram showing an arrangement of a prediction mode information forming section in the modified example.

An arrangement of the prediction mode information forming section 666b is explained as below. FIG. 55 is a block diagram showing the arrangement of the prediction mode information forming section 666b. As shown in FIG. 55, the prediction mode information forming section 666b includes a storing section 667, a reference position determining section 668b, a prediction mode information estimating section 669, and a prediction mode information generation section 670. The present embodiment describes only the reference position determining section 668b as follows.

(Reference Position Determining Section 668b)

The reference position determining section 668b has a function similar to the reference position determining section 663b in the relative prediction mode information forming section 661b included in the image encoding device 600b. More specifically, the reference position determining section 668b determines a reference sub block from 4 sub blocks (adjacent sub blocks A, B, C, D in FIG. 44) adjacent to the target sub block, by use of locally decoded images of decoded sub blocks positioned around the target sub block. The reference position determining section 668b then supplies reference position information indicative of a position of the determined reference sub block to the prediction mode information estimating section 669. How to determine the reference sub block is the same as in the reference position determining section 663b in Embodiment 7, and therefore is not explained here.

(Overview of Image Decoding Process)

An image decoding process in the image decoding device 650b is almost the same as the image decoding process in the image decoding device 650, except for Step S252. Therefore, the same steps as in the image decoding process in the image decoding device 650 are not explained here. The following deals with only Step S252 in the image decoding process in the image decoding device 650b, which differs from Step S252 in the image decoding process in the image decoding device 650.

The prediction mode information forming section 666b receives relative prediction mode information of a target sub block to be decoded and locally decoded images, stored in the memory 9, of decoded sub blocks positioned around the target sub block, and forms prediction mode information of the target sub block, based on the relative prediction mode information and the locally decoded images (Step S252).

(Details of Process of Forming Prediction Mode Information)

A process of forming prediction mode information is almost the same as the operation process of the relative prediction mode information forming section 661, except for Step S241. Therefore, the same steps as in the operation process of the relative prediction mode information forming section 661 are not explained here. The following deals with only Step S241 in the process of forming prediction mode information in the modified example, which differs from S241 in the operation process of the relative prediction mode information section 661.

The reference position determining section 668b calculates edge information from decodes, stored in the memory 9, of a plurality of decoded sub blocks positioned around the target sub block, and estimates correlations between the target sub block and adjacent sub blocks (A, B, C, D) (Step S241).

(Additional Matters)

In the present embodiment and the modified example of the present embodiment, a selection unit of a sub block position to be used for estimation of a prediction mode is a sub block unit. However the selection unit is not limited to this. For example, the selection unit of the sub block position may be a macro block, a slice, a picture (frame) or a GOP (Group Of Picture). The selection unit of the sub block position to be used for estimation of a prediction mode may be predetermined between an image encoding device and an image decoding device, or may be designated at a headmost piece of encoded data, a picture, or a GOP header. Alternatively, it is also possible to notify the selection unit by use of external means, not by the image encoding device and the image decoding device. Further, in the present embodiment and the modified example thereof, the adjacent sub blocks used for estimation of a prediction mode are the adjacent sub blocks A, B, C, and D in FIG. 44, but are not limited to these. For example, the adjacent sub blocks to be used for estimation of a prediction mode may be only sub blocks A and B, or decoded sub blocks adjacent to the target sub block in addition to the sub blocks A, B, C, and D.

(Effects)

As described above, the image decoding device 650 according to the present embodiment includes at least one prediction set including a plurality of prediction modes corresponding to respective prediction directions different from each other.

The image decoding device 650 estimates correlations between a target sub block to be decoded and adjacent sub blocks, by a predetermined method, from pieces of prediction mode information of decoded adjacent sub blocks or decoded images of decoded adjacent sub blocks. The estimation is carried out per sub block into which a target block to be decoded, constituting an image, is subdivided. The image decoding device 650 then selects a decoded sub block that is most correlated with the target sub block, based on the result of the estimated correlations, estimates a prediction mode of the target sub block from a prediction mode of the decoded sub block thus selected, and decodes prediction mode information of the target sub block based on the estimation result and relative prediction mode information.

Since the image decoding device 650 can select a sub block that is most correlated to the target sub block as such, accuracy in estimating prediction mode information of the target sub block can be improved and an encoded amount of the prediction mode, which is to be decoded can be reduced.

[Embodiment 9]

Another embodiment of the image encoding device according to the present invention is explained below as Embodiment 9 with reference to FIG. 56 through FIG. 60. The same constituent components as in Embodiments 1 through 8 have the same reference sings as in Embodiments 1 through 8, and therefore are not explained here.

The image encoding device 100 according to Embodiment 1 exemplifies a case where one prediction set to be applied to a target block (M×M pixel block) to be encoded is determined from one predetermined prediction set group (for example, Table 2). The present embodiment deals with an image encoding device that selects one prediction set group from a plurality of predetermined prediction set groups per block unit by use of information of an encoded adjacent block (for example, prediction directions in intra predictions that are applied to sub blocks in the encoded adjacent block), and then determines one prediction set to be applied to a target block to be encoded from the selected prediction set group.

(Arrangement of Image Encoding Device 700)

Figure 56:
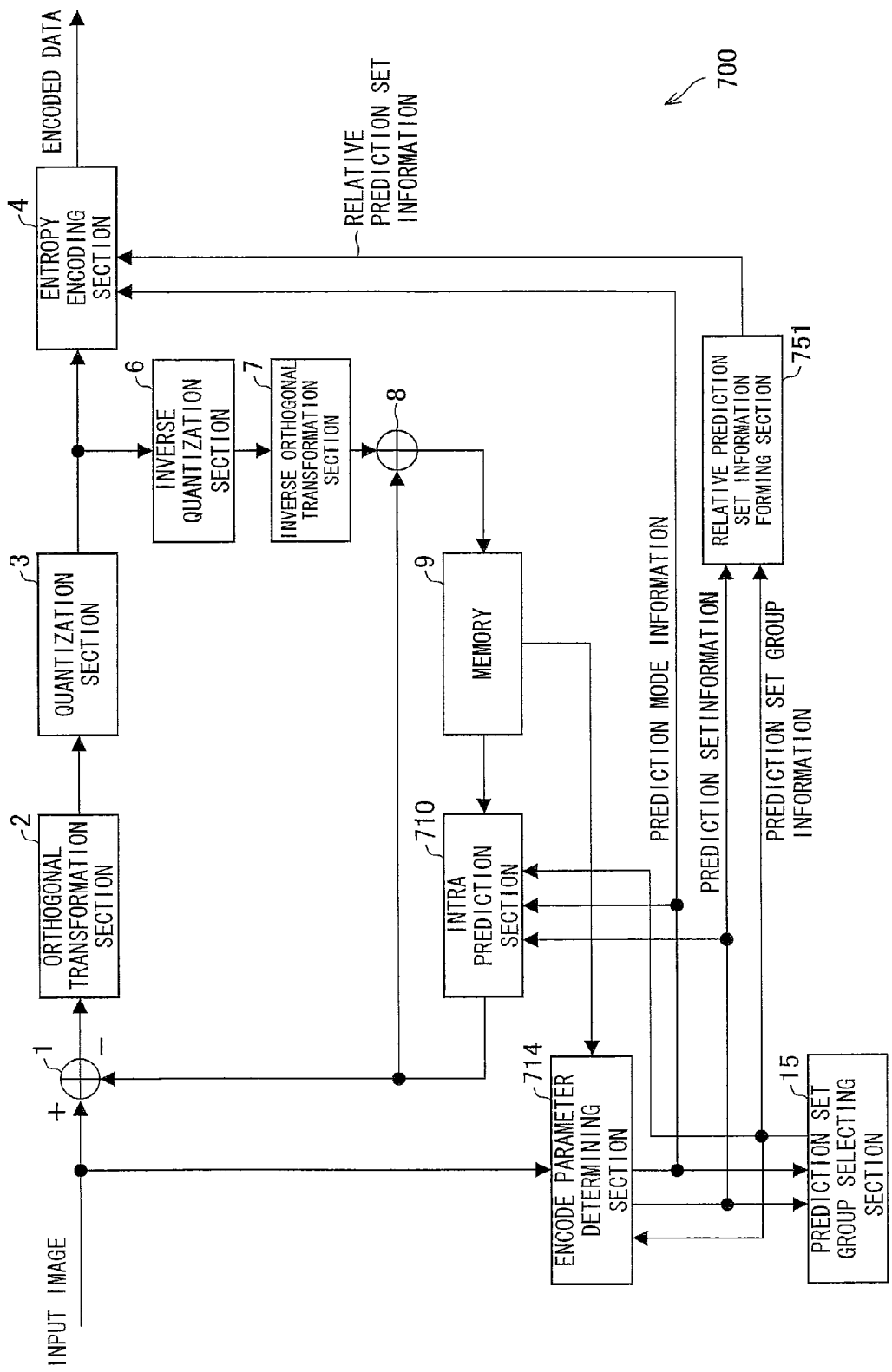
FIG. 56 is a block diagram showing essential part of an arrangement of an image encoding device according to Embodiment 9.

An arrangement of an image encoding device 700 according to the present embodiment is explained below with reference to FIG. 56. FIG. 56 is a block diagram showing the arrangement of the image encoding device 700 according to the present embodiment.

The image encoding device 700 includes a difference computing section 1, an orthogonal transformation section 2, a quantization section 3, an entropy encoding section 4, an inverse quantization section 6, an inverse orthogonal transformation section 7, an addition computing section 8, a memory 9, a prediction set group selecting section 15, an intra prediction section 710, an encode parameter determining section 714, and a relative prediction set information forming section 751. The following deals with the prediction set group selecting section 15, the intra prediction section 710, the encode parameter determining section 714, and the relative prediction set information forming section 751.

(Prediction Set Group Selecting Section 15)

The prediction set group selecting section 15 selects a prediction set group to be applied to a target block to be encoded, from a plurality of predetermined prediction set groups, based on prediction set information of an encoded adjacent block and pieces of prediction mode information of all sub blocks in the encoded adjacent block. The prediction set group selecting section 15 outputs prediction set group information indicative of the selected prediction set group.

The prediction set group selecting section 15 receives the prediction set information of the encoded adjacent block and the pieces of prediction mode information of all the sub blocks in the encoded adjacent block from the encode parameter determining section 714, and stores these pieces of information therein.

(Intra Prediction Section 710)

The intra prediction section 710 carries out intra prediction defined by the prediction set group information, prediction set information, and prediction mode information, by use of a locally decoded image of encoded adjacent sub blocks, stored in the memory 9, and generates a predicted image. How to generate the predicted image is the same as the intra prediction section 10, and therefore is not explained here.

(Encode Parameter Determining Section 714)

The encode parameter determining section 714 receives an original image of the target block to be encoded, the locally decoded image, stored in the memory 9, of the encoded adjacent block, and the prediction set group information selected by the prediction set group selecting section 15. The encode parameter determining section 714 then determines encode parameters, such as a prediction set to be applied to the target block to be encoded and a prediction mode to be applied to each of the sub blocks in the target block to be encoded. The determined prediction set is supplied to the intra prediction section 710, the relative prediction set information forming section 751, and the prediction set group selecting section 15. Further, the prediction mode of each of the sub blocks is supplied to the prediction set group selecting section 15, the intra prediction section 710, and the entropy encoding section 4.

More specifically, the encode parameter determining section 714 determines a prediction set to be applied to the target sub block, from the prediction set group indicated by the prediction set group information selected by the prediction set group selecting section 15, and also determines a prediction mode of each of the sub blocks in the target sub block. For determination of the prediction set and the prediction mode, it is preferable to use the rate distortion optimization method, similarly to the encode parameter determining section 14.

(Relative Prediction Set Information Forming Section 751)

The relative prediction set information forming section 751 forms relative prediction set information from the prediction set information received from the encoded parameter determining section 714, based on the prediction set group information received from the prediction set group selecting section 15 and prediction set information, of an encoded adjacent block, stored inside the relative prediction set information forming section 751. The relative prediction set information forming section 751 then outputs the relative prediction set information.

Figure 57:
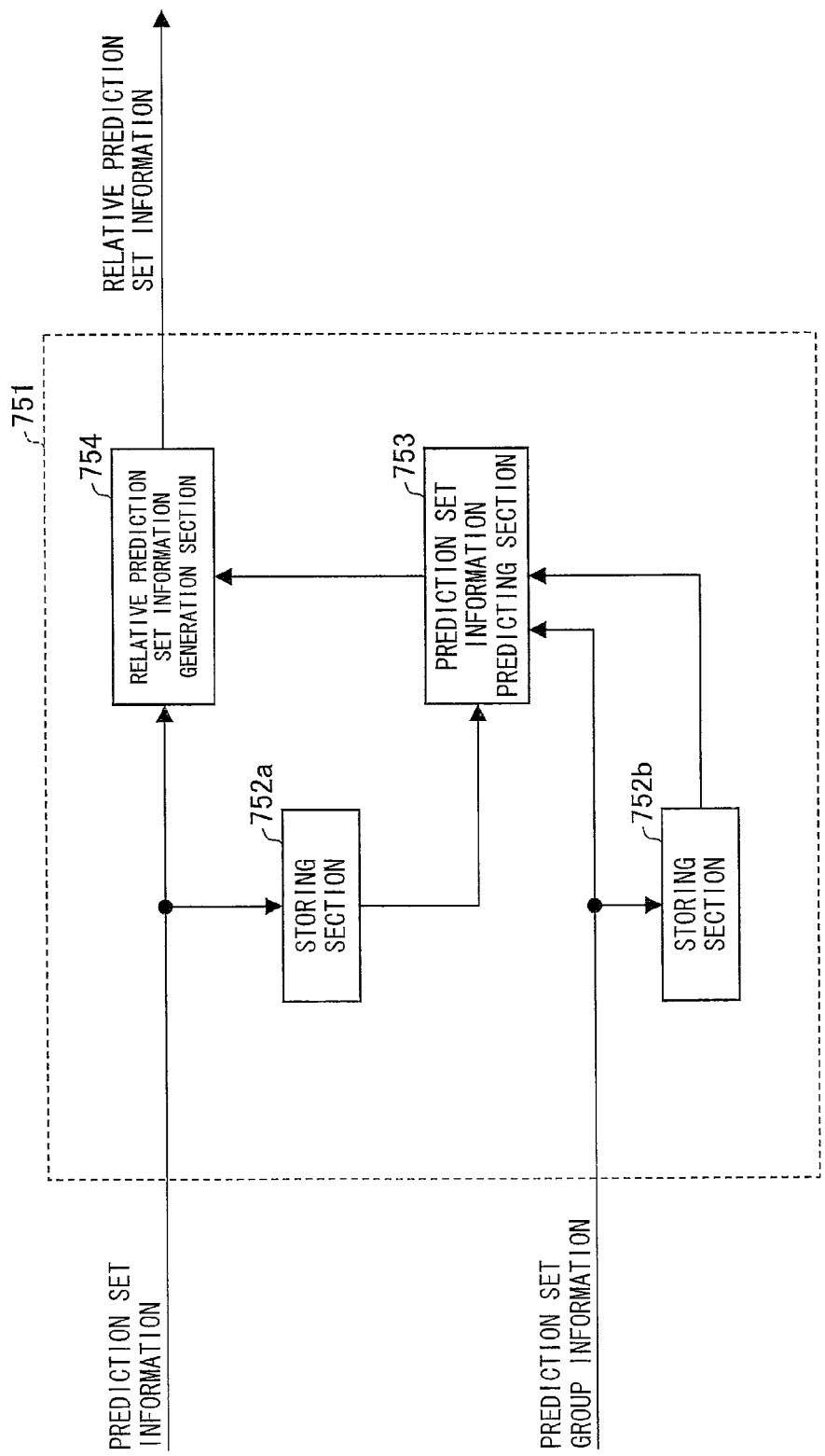
FIG. 57 is a block diagram showing an arrangement of a relative prediction set information forming section.

The relative prediction set information forming section 751 mainly includes a storing section 752a, a storing section 752b, a prediction set information predicting section 753, and a relative prediction set information generation section 754, as shown in FIG. 57. FIG. 57 is a block diagram showing an arrangement of the relative prediction set information forming section 751. Each of the members is explained below.

(Storing Sections 752a, 752b)

The storing sections 752a and 752b temporarily store input information therein. The storing section 752a stores receives prediction set information of the target block and stores it therein. The storing section 752b receives prediction set group information of the target block from the prediction set group selecting section 15, and stores it therein. The prediction set information and prediction set group information thus stored are used for predicting a prediction set of a subsequent block that will be encoded after the target block is encoded.

(Prediction Set Information Predicting Section 753)

The prediction set information predicting section 753 determines a prediction value of a prediction set, to be applied to the target block to be encoded, by a predetermined method, based on (a) the received prediction set group information of the target block and (b) prediction set group information and prediction set information, each of an encoded adjacent block, respectively stored in the storing section 752a and the storing section 752b. The prediction set information predicting section 753 then supplies the determined prediction value to the relative prediction set information generation section 754.

(Relative Prediction Set Information Generation Section 754)

The relative prediction set information generation section 754 has the same function as the relative prediction set information generation section 511 in Embodiment 1. More specifically, the relative prediction set information forming section 754 generates relative prediction set information based on the received prediction set information of the target block and the prediction value of a prediction set, determined by the prediction set information predicting section 753. The relative prediction set information generation section 754 then outputs the relative prediction set information thus generated.

(Overview of Image Encoding Process)

Figure 58:
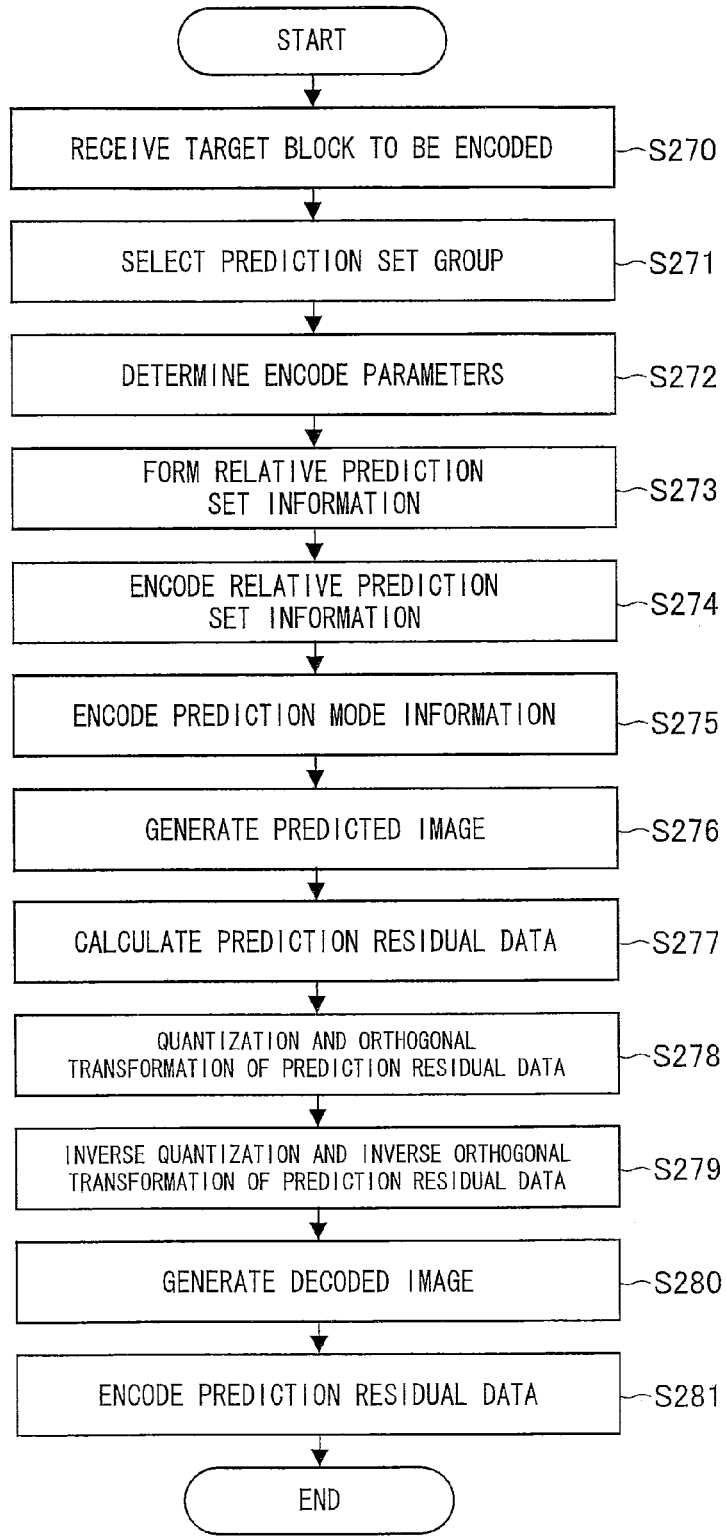
FIG. 58 is a flowchart schematically showing an image encoding process according to Embodiment 9.

An image encoding process in the image encoding device 700 is generally described below with reference to FIG. 58. FIG. 58 is a flowchart schematically showing the image encoding process in the image encoding device 700.

The image encoding device 700 receives a target block to be encoded (Step S270).

The prediction set group selecting section 15 selects a prediction set group to be applied to the target block to be encoded, based on prediction set information of an encoded adjacent block and pieces of prediction mode information of respective sub blocks in the encoded adjacent block (Step S271). The prediction set group selecting section 15 then supplies prediction set group information on the selected prediction group to the encode parameter determining section 714, the relative prediction set information forming section 751, and the intra prediction section 710.

The encode parameter determining section 714 determines a prediction set of the target block to be encoded and prediction modes of all sub blocks in the target block to be encoded, with the use of an original image of the target block to be encoded, a locally decoded image stored in the memory 9, and the prediction set group information thus selected by the prediction set group selecting section 15 (Step S272). The determined prediction set is supplied to the intra prediction section 710, the relative prediction set information forming section 751, and the prediction set group selecting section 15. Further, the determined prediction modes of all the sub blocks are supplied to the intra prediction section 710 and the prediction set group selecting section 15.

The relative prediction set information forming section 751 forms relative prediction set information from the prediction set group information received in Step S271 and the prediction set information received in Step S272, based on prediction set group information and prediction set information each of an encoded adjacent block, and then supplies the relative prediction set information to the entropy encoding section 4 (Step S273).

The entropy encoding section 4 carries out entropy encoding with respect to the relative prediction set information formed in Step S273 and outputs encoded data thereof (Step S274). Further, the entropy encoding section 4 carries out entropy encoding with respect to prediction mode information of a target sub block to be encoded, determined in Step S272, and outputs encoded data of the prediction mode information (Step S275).

The intra prediction section 710 carries out intra prediction defined by the prediction set group selected in Step S271 and the prediction set and prediction mode determined in Step S272, with the use of the locally decoded image, stored in the memory 9, of the encoded adjacent sub block, and generates a predicted image of the target sub block to be encoded (Step S276). The generated predicted image of the target sub block to be encoded is then supplied to the difference computing section 1 and the addition computing section 8.

The difference computing section 1 calculates prediction residual data of the target sub block to be encoded, which is a difference between the inputted original image of the target sub block to be encoded and the predicted image thus generated in Step S276, and outputs the prediction residual data (Step S277).

The prediction residual data calculated in Step S277 is supplied to the orthogonal transformation section 2 and then to the quantization section 3 so as to be subjected to orthogonal transformation and to quantization, respectively. Subsequently, the prediction residual data is supplied to the entropy encoding section 4 and the inverse quantization section 6 (Step S278).

The prediction residual data thus subjected to the orthogonal transformation and the quantization is supplied to the inverse quantization section 6 and then to the inverse orthogonal transformation section 7 so as to be subjected to inverse quantization and inverse orthogonal transformation, respectively. The prediction residual data is then supplied to the addition computing section 8 (Step S279).

The addition computing section 8 adds the prediction residual data thus subjected to the inverse quantization and the inverse orthogonal transformation in Step S279, to the predicted image generated in Step S276, so as to generate a locally decoded image of the target sub block to be encoded (Step S280). The locally decoded image thus generated is then stored in the memory 9.

The entropy encoding section 4 carries out entropy encoding with respect to the quantized prediction residual data of the target sub block, and outputs encoded data of the prediction residual data (Step S281).

The processes from Step S275 to Step S281 are carried out with respect to all sub blocks constituting the target block to be encoded. Further, the processes from Step S270 to Step S281 are carried out with respect to all blocks constituting a target image to be encoded.

The present embodiment described the image encoding process in the image encoding device 700 in the order from Step S270 to Step S281. However, the order of the image encoding process is not limited to this, and can be altered within a range in which the present invention can be carried out.

(Arrangement of Prediction Set Group)

A concrete example of an arrangement of the prediction set group employed in the present embodiment is shown in Table 32 through Table 34, by taking, as an example, a case where the number of prediction set groups is 3.

Table 32 shows a first prediction group including a prediction set 0 (a conventional prediction set) employed in the conventional technique, a prediction set 1 (a first horizontal direction prediction set) that focuses on predictions in a horizontal direction, and a prediction set 2 (a first vertical direction prediction set) that focuses on predictions in a vertical direction. The first prediction set group preferably includes both of the prediction set that focuses on predictions in the horizontal direction and the prediction set that focuses on the vertical direction.

Table 33 shows a second prediction set group including a prediction set group that is the conventional prediction set 0, a prediction set 1 that is the first horizontal direction prediction set, and a prediction set 2 (a second horizontal direction prediction set) that that focuses on predictions in the horizontal direction which predictions differ from those in the first horizontal prediction set.

Table 34 shows a third prediction set group including a prediction set 0 that is the conventional prediction set, a prediction set 1 that is the first vertical direction prediction set, and a prediction set 2 (a second vertical direction prediction set) that focuses on predictions in the vertical direction which predictions differ from those in the first vertical direction prediction set.

TABLE 32

|  |  | Prediction Set | | |
|---|---|---|---|---|
|  |  | 0 | 1 | 2 |
| Prediction Mode | 0 | −90 | −90 | −90 |
|  | 1 | 0 | 0 | 0 |
|  | 2 | DC | DC | DC |
|  | 3 | −45 | −15 | −75 |
|  | 4 | 45 | 15 | 75 |
|  | 5 | 67.5 | −30 | −60 |
|  | 6 | 22.5 | 30 | 60 |
|  | 7 | −67.5 | −60 | −30 |
|  | 8 | −22.5 | 60 | 30 |

TABLE 33

|  |  | Prediction Set | | |
|---|---|---|---|---|
|  |  | 0 | 1 | 2 |
| Prediction Mode | 0 | −90 | −90 | −90 |
|  | 1 | 0 | 0 | 0 |
|  | 2 | DC | DC | DC |
|  | 3 | −45 | −15 | −10 |
|  | 4 | 45 | 15 | 10 |
|  | 5 | 67.5 | −30 | −20 |
|  | 6 | 22.5 | 30 | 20 |
|  | 7 | −67.5 | −60 | −40 |
|  | 8 | −22.5 | 60 | 40 |

TABLE 34

|  |  | Prediction Set | | |
|---|---|---|---|---|
|  |  | 0 | 1 | 2 |
| Prediction Mode | 0 | −90 | −90 | −90 |
|  | 1 | 0 | 0 | 0 |
|  | 2 | DC | DC | DC |
|  | 3 | −45 | −75 | −80 |
|  | 4 | 45 | 75 | 80 |
|  | 5 | 67.5 | −60 | −70 |
|  | 6 | 22.5 | 60 | 70 |
|  | 7 | −67.5 | −30 | −50 |
|  | 8 | −22.5 | 30 | 50 |

Among the first through third prediction set groups, a prediction set group to be applied to the target block to be encoded is determined from intra predictions that are applied to all sub blocks within (a) encoded blocks 60$a$ and 60$c$ each adjacent to the target block 61, (b) encoded blocks 60$a$ through 60$d$, (c) encoded blocks 60$a$ through 60$e$ and an encoded block 60$h$, or (d) encoded blocks 60$a$ through 60$k$, in FIG. 9. The prediction set group is determined by use of the following indices (1) through (6):

(1) Appearance frequency Nh (≥0) of a prediction direction θ (−45 [deg]<θ≤45 [deg]) in the horizontal direction;
(2) Appearance frequency Nv (≤0) of a prediction direction θ (−90 [deg]≤θ≤−45 [deg], 45 [deg]<θ<90 [deg]) in the vertical direction;
(3) A total value Nmax of Nh and Nv (Nmax=Nh+Nv);
(4) A predetermined threshold T0;
(5) A predetermined threshold T1; and
(6) A predetermined threshold T2.

That is, the prediction set group to be applied to the target block to be encoded is calculated according to the following inequations (44) through (47).

Math. 23

$$N_{max} \leq T0 \qquad (44)$$

$$0 \leq N_h < T_1 \qquad (45)$$

$$T_1 \leq N_h \leq T_2 \qquad (46)$$

$$T_2 < N_h \leq N_{max} \qquad (47)$$

More specifically, the prediction set group is determined based on the followings.

(1) If the inequation (44) is satisfied, the prediction set group to be applied to the target block to be encoded is the first prediction set group.

(2) If the inequation (44) is not satisfied, the prediction set group is determined according to the followings:

(2-a) if the inequation (45) is satisfied, it is determined that prediction directions in the horizontal direction will appear more frequently than prediction directions in the vertical direction in the target block to be encoded. Therefore, the second prediction set group is applied to the target block to be encoded;

(2-b) if the inequation (46) is satisfied, it is determined that the appearance frequency of a prediction direction in the horizontal direction and the appearance frequency of a prediction direction in the vertical direction will be comparable with each other. Therefore, the first prediction set group is applied to the target block to be encoded; or (2-c) if the inequation (47) is satisfied, it is determined that prediction directions in the vertical direction will appear more frequently than prediction directions in the horizontal direction in the target block to be encoded. Therefore, the third prediction set group is applied to the target block to be encoded.

The threshold T1 and the threshold T2 may be set such that T1=Nmax/3 and T2=2Nmax/3. The threshold T0 is a predetermined value determined according to the number of sub blocks in encoded adjacent blocks that are referable.

(Operation Process of Selecting Prediction Set Group)

Figure 59:
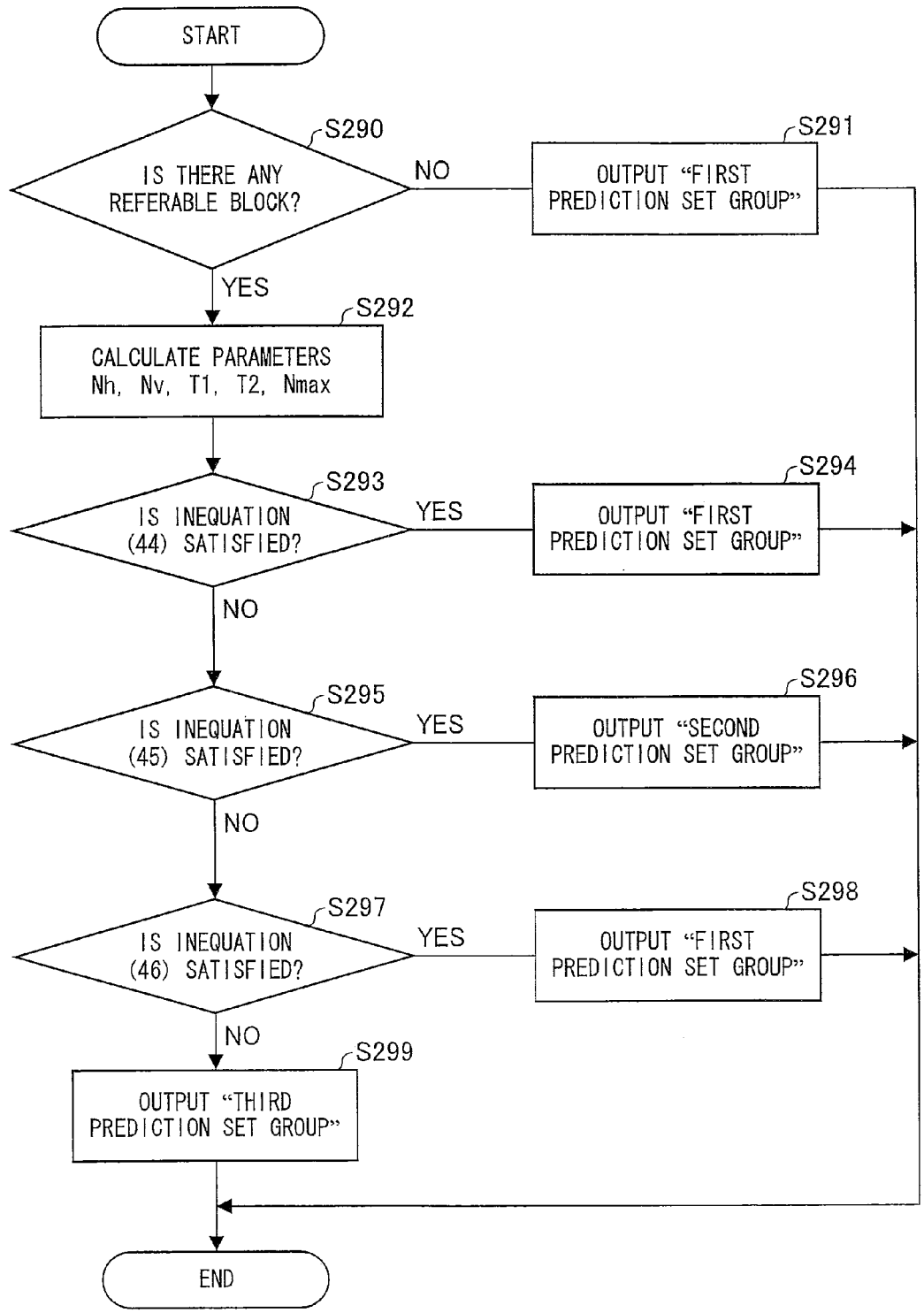
FIG. 59 is a flowchart showing an operation process at a time of selecting a prediction set group.

The following describes an operation process of the prediction set group selecting section 15 at a time of selecting a prediction set group, with reference to FIG. 59. FIG. 59 is a flowchart showing how the prediction set group selecting section 15 operates at a time of selecting a prediction set group.

The prediction set group selecting section 15 determines whether or not there is a referable block in encoded blocks adjacent to a target block to be encoded (Step S290). If there is no referable block (No in Step S290), the prediction set group to be applied to the target block is set to the first prediction set group. The prediction set group selecting section 15 then outputs prediction set group information indicating the "first prediction set group", and completes its operation (Step S291).

If there is a referable block (Yes in Step S290), the prediction set group selecting section 15 calculates parameters Nh, Nv, Nmax, T1, and T2 based on all pieces o prediction set information and all pieces of prediction mode information in the referable encoded adjacent block (Step S292). The prediction set group selecting section 15 then determines a prediction set group to be applied to the target block to be encoded, with the use of the Nh, Nv, Nmax, T1, and T2 thus calculated in Step S292. More specifically, the prediction set group selecting section 15 determines whether the inequation (44) is satisfied or not (Step S293).

If the inequation (44) is satisfied (Yes in Step S293), the first prediction set group is set as the prediction set group to be applied to the target block to be encoded. The prediction set group selecting section 15 then outputs prediction set group information indicative of the "first prediction set group", and completes its operation (Step S294).

If the inequation (44) is not satisfied (No in Step S293), it is determined whether the inequation (45) is satisfied or not (Step S295).

If the inequation (45) is satisfied (Yes in Step S295), the second prediction set group is set as the prediction set group to be applied to the target block to be encoded. Accordingly, the prediction set group selecting section 15 outputs prediction set group information indicative of the "second prediction set group", and completes its operation (Step S296).

If the inequation (45) is not satisfied (No in Step S295), it is further determined whether the inequation (46) is satisfied or not (Step S297).

If the inequation (46) is satisfied (Yes in Step S297), the first prediction set group is set as the prediction set group to be applied to the target block to be encoded. Accordingly, the prediction set group selecting section 15 outputs prediction set group information indicative of the "first prediction set group", and completes its operation (Step S298).

If the inequation (46) is not satisfied (No in Step S297), it is determined that the inequation (47) is satisfied, and the third prediction set group is set as the prediction set group to be applied to the target block to be encoded. Accordingly, the prediction set group selecting section 15 outputs prediction set group information indicative of the "third prediction set group", and completes its operation (Step S299).

The prediction set group selecting section 15 then stores the prediction set group information to be outputted, in a memory provided therein. Further, the operation process of the prediction set group selecting section 15 at a time of selecting a prediction set group is explained in the order from Step S290 to Step S299. However, the order of the operation process is not limited to this order, and can be altered within a range in which the present invention can be carried out.

With the arrangement, the prediction set group selecting section 15 can automatically determine a prediction set group to be applied to the target block to be encoded, based on information of encoded adjacent blocks positioned around the target block to be encoded.

For example, if the prediction directions in the horizontal direction appear more frequently than the prediction directions in the vertical direction in encoded adjacent blocks, a prediction set group including a plurality of prediction sets that focus on predictions in the horizontal direction is applied to the target block to be encoded. Further, if the prediction directions in the vertical direction appear more frequently than the prediction directions in the horizontal direction in the encoded adjacent blocks, a prediction set group including a plurality of prediction sets that focus on predictions in the vertical direction is applied to the target block to be encoded. Moreover, if the prediction directions in the horizontal direction and the prediction directions in the vertical directions appear equally likely, then a prediction set group in which prediction sets that focus on the horizontal direction and prediction sets that focus on the vertical direction are evenly included is selected.

As a result, it is possible to efficiently encode the target block by use of a prediction set group including prediction sets more suitable to predicting an image of the target block.

Furthermore, the prediction set group selecting section 15 is applicable to an image decoding device, similarly. In this case, it is possible to automatically determine a prediction set group to be applied to a target block to be decoded, based on information of decoded adjacent blocks.

(Details of How to Determine Prediction Value of Prediction Set)

The following describes how to determine a prediction value of a prediction set, more specifically.

Initially, the prediction value of a prediction set is temporarily determined by any of the following methods (1) through (3).

(1) A prediction set that appears most among prediction sets applied to blocks (60a through 60k) positioned in the vicinity of the target block 61 to be encoded, in FIG. 9, is set as the prediction value.

(2) A prediction set applied to an encoded block (60a) positioned on the left of the target block 61 to be encoded, in FIG. 9, is set as the prediction value.

(3) A prediction set applied to an encoded block (60c) positioned on the upper side of the target block 61 to be encoded, in FIG. 9, is set as the prediction value.

The determined prediction value of a prediction set for the target block to be encoded indicates "a 'prediction set i' in an 'ith prediction set group'".

Subsequently, the "ith prediction set group" indicated by the determined prediction value of a prediction set for the target block is compared to a "kth prediction set group" indicated by the prediction set group information of the target block to be encoded. If the "ith prediction set group" indicated by the prediction value is identical with the "kth prediction set group" of the target block to be encoded, the determined prediction value is supplied to the relative prediction set information generation section 754.

In the other cases, it is found out "which prediction set in the prediction set group to be applied to the target block to be encoded corresponds to the determined prediction value of a prediction set", by use of the after-mentioned prediction set correspondence table. Then, a corresponding prediction set is determined as a prediction value. The prediction value thus determined is supplied to the relative prediction set information generation section 754.

Exemplary prediction set correspondence tables of the first prediction set group, the second prediction set group, and the third prediction set group, respectively shown in Tables 32, 33, and 34 are shown in Tables 35, 36, and 37, respectively.

A prediction set correspondence table shown in Table 35 shows corresponding prediction sets in the second and third prediction set groups that are approximate to respective prediction sets in the first prediction set group. A prediction set correspondence table shown in Table 36 shows corresponding prediction sets in the first and third prediction set groups that are approximated to respective prediction sets in the second prediction set group. Further, a prediction set correspondence table shown in Table 37 shows corresponding prediction sets in the first and second prediction set groups that are approximated to respective prediction sets in the third prediction set group. More specifically, in Table 35, a prediction set 1 in the first prediction set group is most approximate to a prediction set 1 in the second prediction set group and a prediction set in the third prediction group. It is preferable to set in advance the prediction set correspondence tables by a predetermined method.

TABLE 35

| | First Prediction Set Group | Second Prediction Set Group | Third Prediction Set Group |
|---|---|---|---|
| Prediction Set | 0 | 0 | 0 |
| | 1 | 1 | 0 |
| | 2 | 0 | 2 |

TABLE 36

| | Second Prediction Set Group | First Prediction Set Group | Third Prediction Set Group |
|---|---|---|---|
| Prediction Set | 0 | 0 | 0 |
| | 1 | 1 | 0 |
| | 2 | 1 | 0 |

TABLE 37

| | Third Prediction Set Group | First Prediction Set Group | Second Prediction Set Group |
|---|---|---|---|
| Prediction Set | 0 | 0 | 0 |
| | 1 | 2 | 0 |
| | 2 | 2 | 0 |

(Operation Process of Relative Prediction Set Information Forming Section 751)

Figure 60:
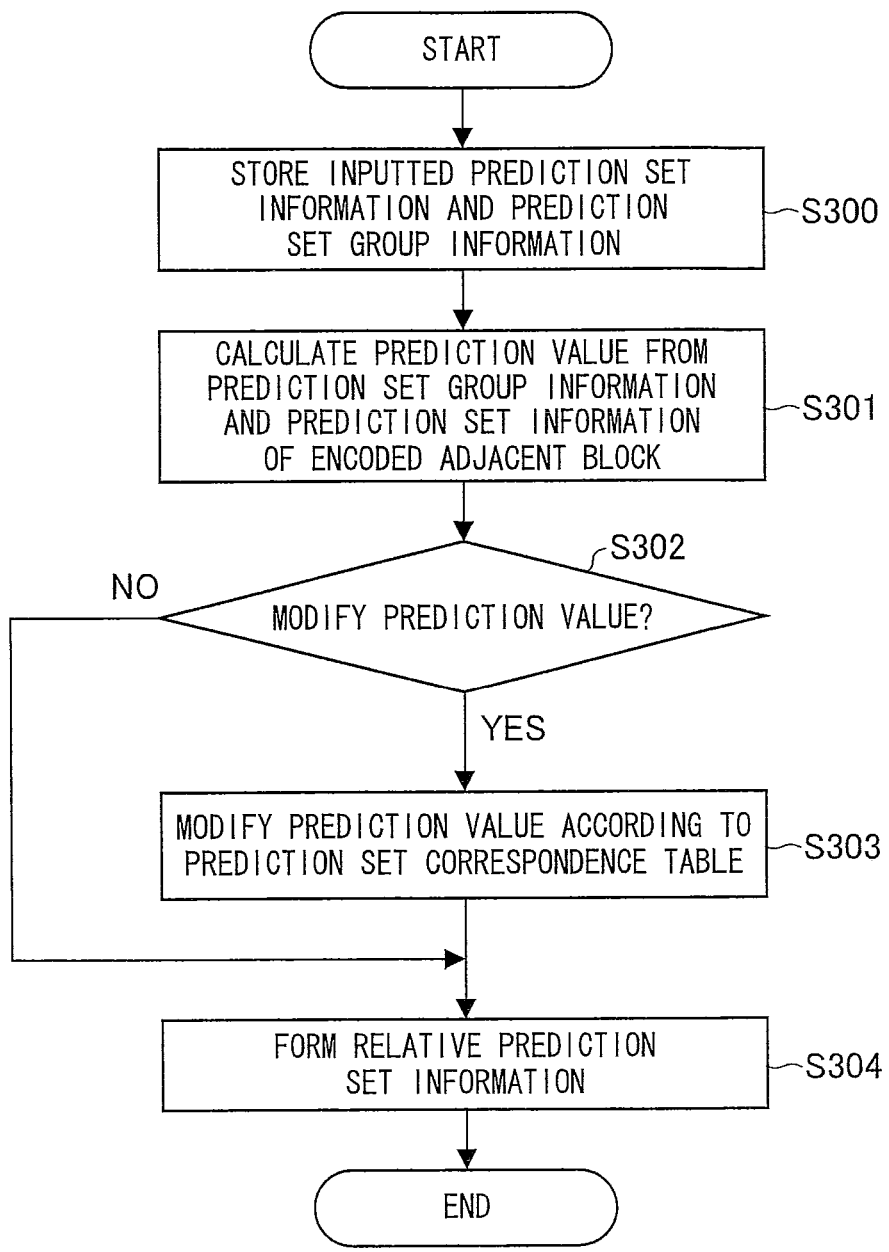
FIG. 60 is a flowchart showing an operation process of a relative prediction set information forming section.

How the relative prediction set information forming section 751 operates is described below with reference to FIG. 60. FIG. 60 is a flowchart showing how the relative prediction set information forming section 751 operates.

Initially, the storing section 752a and the storing section 752b receive and then store, respectively, prediction set information and prediction set group information the target block to be encoded (Step S300).

The prediction set information predicting section 753 calculates a prediction value of a prediction set for the target block to be encoded, from prediction set group information and prediction set information each of an encoded adjacent block (Step S301). The prediction set information predicting section 753 then determines whether or not the prediction value calculated in Step S301 is modified based on the prediction set group of the target block to be encoded (Step S302).

If the prediction value is not modified (No in Step S302), the prediction set information predicting section 753 supplies the prediction value to the relative prediction set information generation section 754. If the prediction value is modified (Yes in Step S302), the prediction set information predicting section 753 modifies the prediction value calculated in Step S301 and then supplies the modified prediction value to the relative prediction set information generation section 754 (Step S303).

The relative prediction set information generation section 754 generates relative prediction set information based on the prediction set information of the target block to be encoded and the prediction value supplied from the prediction set information predicting section 753. The relative prediction set information generation section 754 then outputs the relative prediction set information (Step S304).

As described above, if a prediction set of the target block to be encoded and a prediction value of a prediction set for the target block to be encoded, which prediction value is determined by a predetermined method, belong to different prediction set groups, the prediction set information predict-ing section 753 converts the prediction value into a corresponding prediction set in the prediction set group of the target block to be encoded, according to the aforementioned prediction set correspondence table. This results in that accuracy in predicting a prediction set can be improved and an encoding amount necessary for the prediction set can be reduced.

(Additional Matters)

The present embodiment dealt with a case where an exemplary arrangement of each predetermined prediction set group (the first prediction set group, the second prediction set group, the third prediction set group) is such that the number L of prediction sets is 3, the number Ki of prediction modes is 9 (i=0, 1, 2). However, the arrangement is not limited to this. For example, each of the prediction set groups may be such that the number L of prediction sets may be 5 or 9, or an another natural number. Further, the numbers of prediction sets in the respective prediction set groups may be different from each other. However, in the case where the arrangements of the prediction set group are set differently from each other, it is necessary to define respective prediction set correspondence tables, accordingly.

Further, the prediction set group selecting section 15 in the present embodiment selects a prediction set group based on prediction directions in intra predictions of all sub blocks in encoded adjacent blocks. However, how to select a prediction set group is not limited to the above manner. For example, a prediction set group may be selected based on prediction sets of encoded adjacent blocks around the target block to be encoded. In this case, if the appearance frequency of horizontal direction prediction sets is high, the second prediction set group is selected. If the appearance frequency of vertical direction prediction sets is high, the third prediction set group is selected. Further, if the horizontal direction prediction sets and the vertical direction prediction sets appear equally likely, the first prediction set group is selected. Further, a prediction set group may be selected in such a manner that an edge orientation is calculated according to decoded images around the target block to be encoded and a prediction set group may be selected based on the calculated edge orientation.

In the present embodiment, a unit of changing a prediction set group is an M×M pixel block. However, the unit of changing a prediction set group is not limited to this. For example, the unit of changing a prediction set group may be a macro block, a slice, a picture (frame), or a GOP (Group of Picture). Further, the unit of changing a prediction set group may be predetermined between an image encoding device and an image decoding device. Alternatively, it is also possible to notify the unit by use of external means, not by the image encoding device and the image decoding device.

(Effects)

As described above, the image encoding device 700 calculates appearance frequency of a prediction direction in intra prediction in an adjacent block that has been already encoded, with respect to each block constituting an image. For example, as the frequency of a prediction direction, the appearance frequency of a prediction direction in a horizontal direction and the appearance frequency of a prediction direction in a vertical direction are calculated.

The image encoding device includes a plurality of prediction set groups each including a plurality of prediction sets having different combinations of a plurality of prediction modes corresponding to respective prediction directions different from each other. The image encoding device selects a prediction set group suited for tendency of the appearance frequency of a prediction direction in intra prediction in an encoded adjacent block. For example, if the appearance frequency of a prediction direction in the horizontal direction is high, a prediction set group defining mainly prediction sets that focus on predictions in the horizontal direction is selected. Further, if the appearance frequency of a prediction direction in the vertical direction is high, a prediction group defining mainly prediction sets that focus on predictions in the vertical direction is selected. Furthermore, if the appearance frequency in the horizontal direction and the appearance frequency in the vertical direction are comparable with each other, a prediction set group in which prediction sets that focus on predictions in the horizontal direction and prediction sets that focus on predictions in the vertical direction are evenly defined is selected.

Subsequently, a prediction set suitable to the target block to be encoded is selected from the selected prediction set group. The target block is then encoded with the use of the selected prediction set.

As such, the image encoding device 700 encodes an image with the use of a prediction set optimal to characteristics of the image. The arrangement allows the image encoding device 700 to carry out prediction from more various angles than the conventional technique, thereby reducing an encoding amount of the image and improving image quality.

Further, the image encoding device 700 expresses a prediction method in a hierarchical manner with prediction set information and prediction mode information, thereby allowing more flexibly selecting a prediction method. As a result, it is possible to improve efficiency in prediction while preventing that an encoding amount necessary for the prediction method increases.

Moreover, if a prediction set group indicated by a prediction set of the target block to be encoded is different from a prediction set group indicated by a prediction value of a prediction set for the target block which prediction value is calculated by a predetermined method, the image encoding device 700 converts the prediction value into a prediction set of the prediction set group of the target block according to the aforementioned prediction set correspondence table. This allows improving accuracy in predicting a prediction set and reducing an encoding amount necessary for the prediction set.

[Embodiment 10 ]

Another embodiment of the image decoding device according to the present invention is described below as Embodiment 10 with reference to FIG. 61 through FIG. 64.

An image decoding device 150 according to Embodiment 2 exemplifies a case where one prediction set to be applied to a target block (M×M pixel block) to be decoded is determined, from one predetermined prediction set group (for example, Table 2) based on prediction set information that has been already decoded. The present embodiment deals with an image decoding device that selects one prediction set group, per block unit, from a plurality of predetermined prediction set groups with the use of information on a decoded adjacent block (for example, prediction directions of intra predictions, used for sub blocks included in the decoded adjacent blocks), and then determines one prediction set to be applied to the target block to be decoded from the selected prediction set group; based on decoded prediction set information.

(Arrangement of Image Decoding Device 750)

Figure 61:
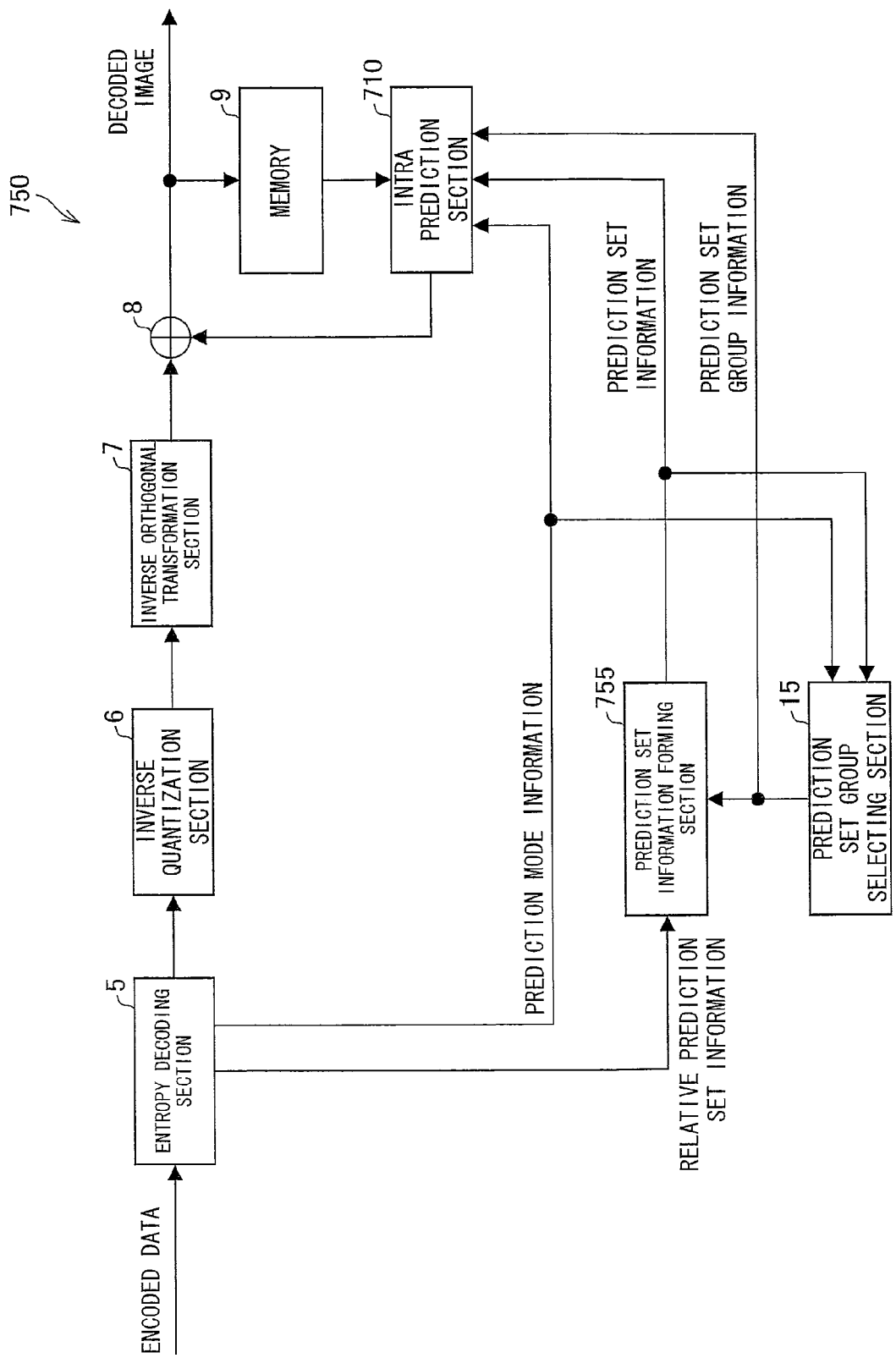
FIG. 61 is a block diagram showing essential part of an arrangement of an image decoding device according to Embodiment 10.

An arrangement of an image decoding device according to the present embodiment is described below with reference to FIG. 61. FIG. 61 is a block diagram showing an arrangement of an image decoding device 750. The image decoding device 750 mainly includes an entropy decoding section 5, an inverse quantization section 6, an inverse orthogonal transformation section 7, an addition computing section 8, a memory 9, a prediction set group selecting section 15, an intra prediction section 710, and a prediction set information forming section 755, as shown in FIG. 61. The present embodiment describes only the prediction set information forming section 755, which has not been described yet.

(Prediction Set Information Forming Section 755)

The prediction set information forming section 755 forms prediction set information of a target block to be decoded, based on (a) relative prediction set information of the target block to be decoded, received from the entropy decoding section 5, (b) prediction set group information of the target block to be decoded, received from the prediction set group selecting section 15, and (c) prediction set group information and prediction set information of a decoded adjacent block, stored inside the prediction set information forming section 755.

Figure 62:
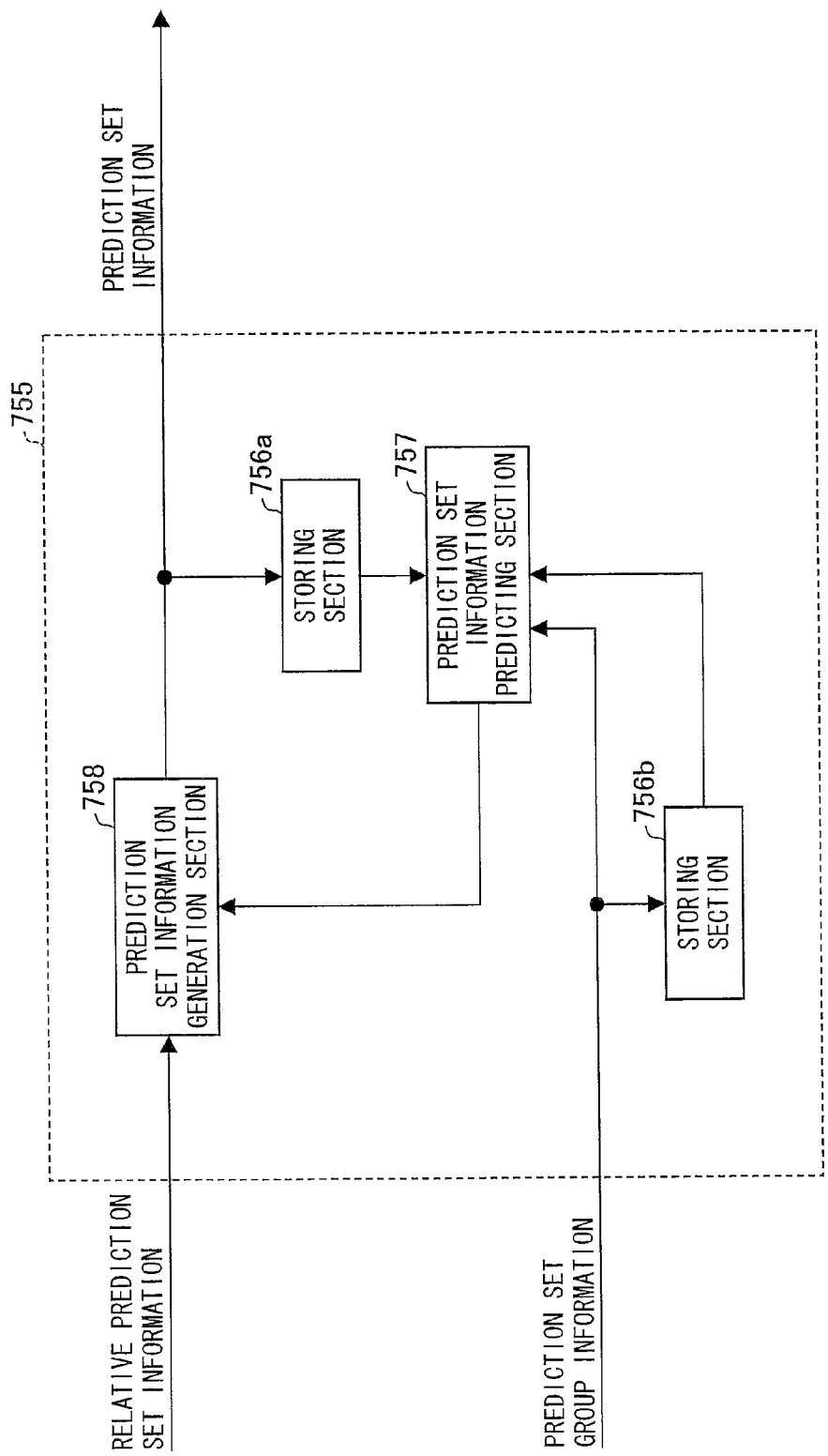
FIG. 62 is a block diagram showing an arrangement of a prediction set information forming section.

An arrangement of the prediction set information forming section 755 is described below with reference to FIG. 62. FIG. 62 is a block diagram showing the arrangement of the prediction set information forming section 755. As shown in FIG. 62, the prediction set information forming section 755 includes a storing section 756*a*, a storing section 756*b*, a prediction set information predicting section 757, and a prediction set information generation section 758. Each of the members is described below.

(Storing Sections 756*a*, 756*b*)

The storing sections 756*a* and 756*b* temporarily store input information. The storing section 756*a* receives prediction set information of the target block to be decoded and stores it therein. Further, the storing section 756*b* receives prediction set group information from the prediction set group selecting section 15, and then stores it therein. The prediction set information and prediction set group information thus stored are used for predicting a prediction set of a subsequent block which will be decoded after the target block is decoded.

(Prediction Set Information Prediction Section 757)

The prediction set information predicting section 757 determines a prediction value of a prediction set, to be applied to the target block to be decoded, by a predetermined method on the basis of (i) the received prediction set group information of the target block, and (ii) prediction set group information and prediction set information of a decoded adjacent block, respectively stored in the storing sections 756*a* and 756*b*. The prediction set information predicting section 757 supplies thus determined prediction value to the prediction set information generation section 758.

How to determined the prediction value of a prediction set for the target block is the same as in the prediction set information predicting section 753, and therefore is not explained here.

(Prediction Set Information Generation Section 758)

The prediction set information generation section 758 has the same function as the prediction set information generation section 521 in Embodiment 2. That is, the prediction set information generation section 758 generates prediction set information based on relative prediction set information and the prediction value of a prediction set, determined by the prediction set information predicting section 757.

(Overview of Image Decoding Process)

Figure 63:
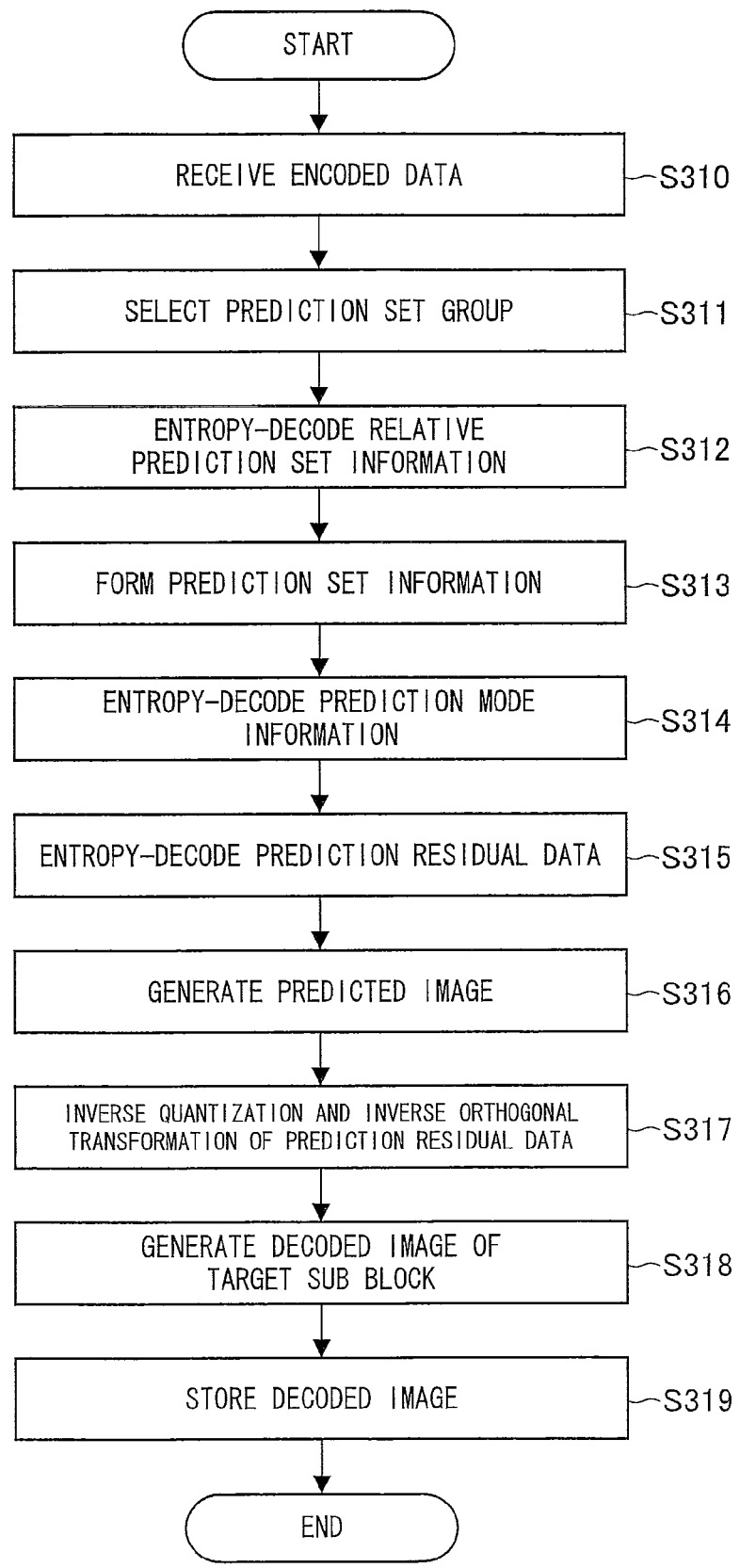
FIG. 63 is a flowchart schematically showing an image decoding process according to Embodiment 10.

An image decoding process in the image decoding device 750 is generally explained as below with reference to FIG. 63. FIG. 63 is a flowchart schematically showing the image decoding process in the image decoding device 750.

Initially, the image decoding device 750 receives encoded data of a target block to be decoded (Step S310).

The prediction set group selecting section 15 selects a prediction set group to be applied to the target block to be encoded, based on a prediction set group of a decoded adjacent block and pieces of prediction mode information of sub blocks included in the decoded adjacent block. The prediction set group selecting section 15 then supplies prediction set group information to the prediction set information forming section 755 and the intra prediction section 710 (Step S311).

The entropy decoding section 5 carries out entropy decoding with respect to relative prediction set information of the target block to be decoded in the received encoded data, and supplies the relative prediction set information to the prediction set information forming section 755 (Step S312).

The prediction set information forming section 755 forms prediction set information of the target block to be decoded, based on: the relative prediction set information thus entropy-decoded in Step S312; the prediction set group information thus selected in Step S311; and prediction set group information and prediction set information of a decoded adjacent block, stored in the prediction set information forming section 755 (Step S313). Thus formed prediction set information of the target block to be decoded is then supplied to the prediction set group selecting section 15.

The entropy decoding section 5 carries out entropy decoding with respect to prediction mode information of a target sub block to be decoded. The target sub block is a sub block obtained by subdividing the target block to be decoded by a predetermined block size (N×N pixel block). The entropy decoding section 5 supplies the entropy-decoded prediction mode information to the intra prediction section 710 (Step S314). Further, the entropy decoding section 5 carries out entropy decoding with respect to a quantization value of prediction residual data of the target sub block to be decoded (Step S315).

The intra prediction section 710 carries out intra prediction defined by the prediction set group selected in Step S311, the prediction set information formed in Step S313, and the prediction mode information thus entropy-decoded in Step S314, with the use of a locally decoded image, store in the memory 9, of decoded adjacent sub blocks, so as to generate a predicted image of the target sub block to be decoded (N×N pixel block) (Step S316).

The prediction residual data entropy-decoded in Step S315 is supplied to the inverse quantization section 6 and then to the inverse orthogonal transformation section 7 so as to be subjected to inverse quantization and inverse orthogonal transformation, respectively. The prediction residual data is then supplied to the addition computing section 8 (Step S317).

The addition computing section 8 adds the predicted image thus generated in Step S316, to the prediction residual data thus subjected to the inverse quantization and the inverse orthogonal transformation in Step S317, so as to generate a decoded image (N×N pixel block) of the target sub block. The addition computing section 8 then outputs the decoded image (Step S318).

Finally, the memory 9 stores therein the decoded image of the target sub block to be decoded, generated in Step S318 (Step S319).

The image decoding device 750 carries out the processes from Step S314 to Step S319 with respect to all sub blocks constituting the target block to be decoded. Further, the image decoding device 750 carries out the processes from Step S310 to Step S319 with respect to all blocks constituting a target image to be decoded.

The present embodiment described the decoding process in the image decoding device 750 in the order from Step S310 to Step S319. However, the order of the decoding process is not limited to this, and can be altered within a range in which the present invention can be carried out.

(Operation Process of Prediction Set Information Forming Section 55)

Figure 64:
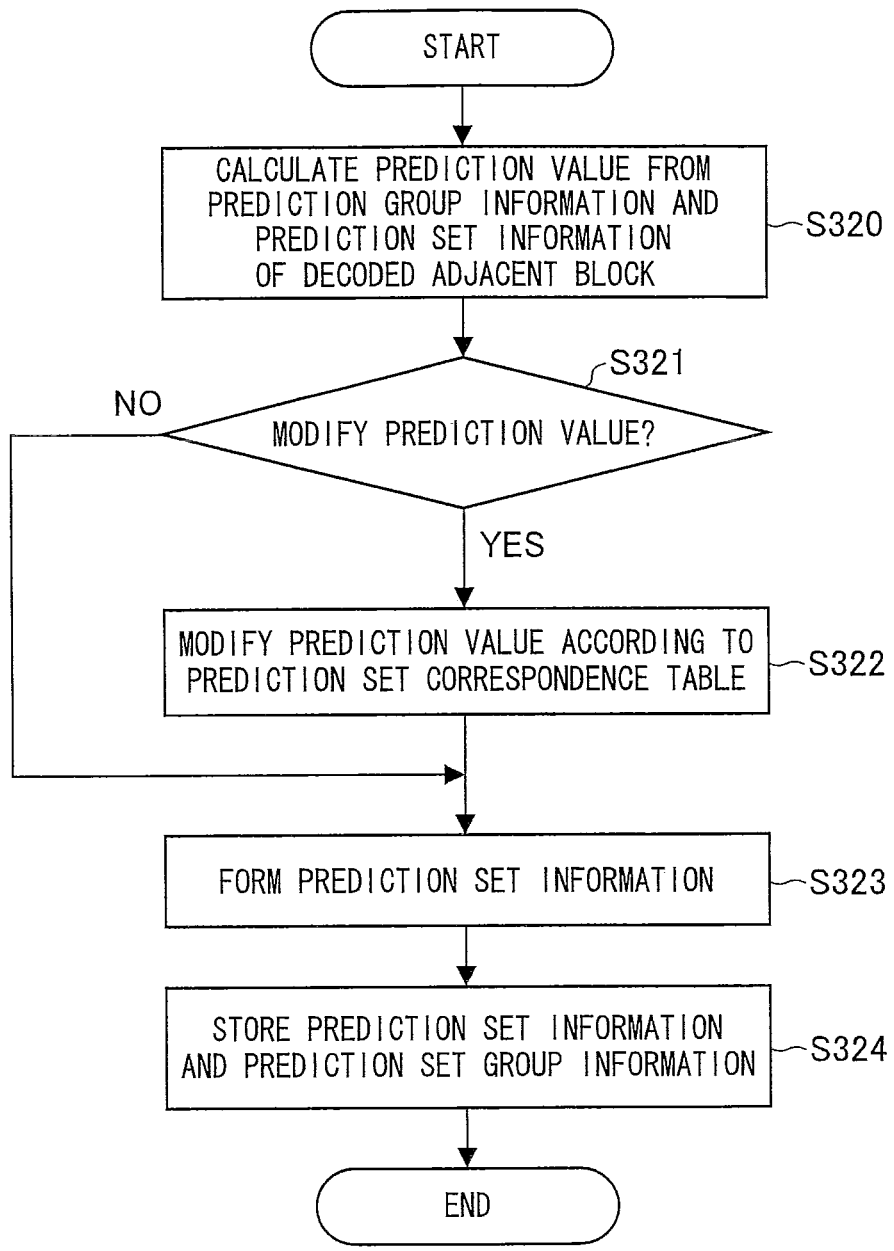
FIG. 64 is a flowchart showing an operation process of a prediction set information forming section.
Figure 65:
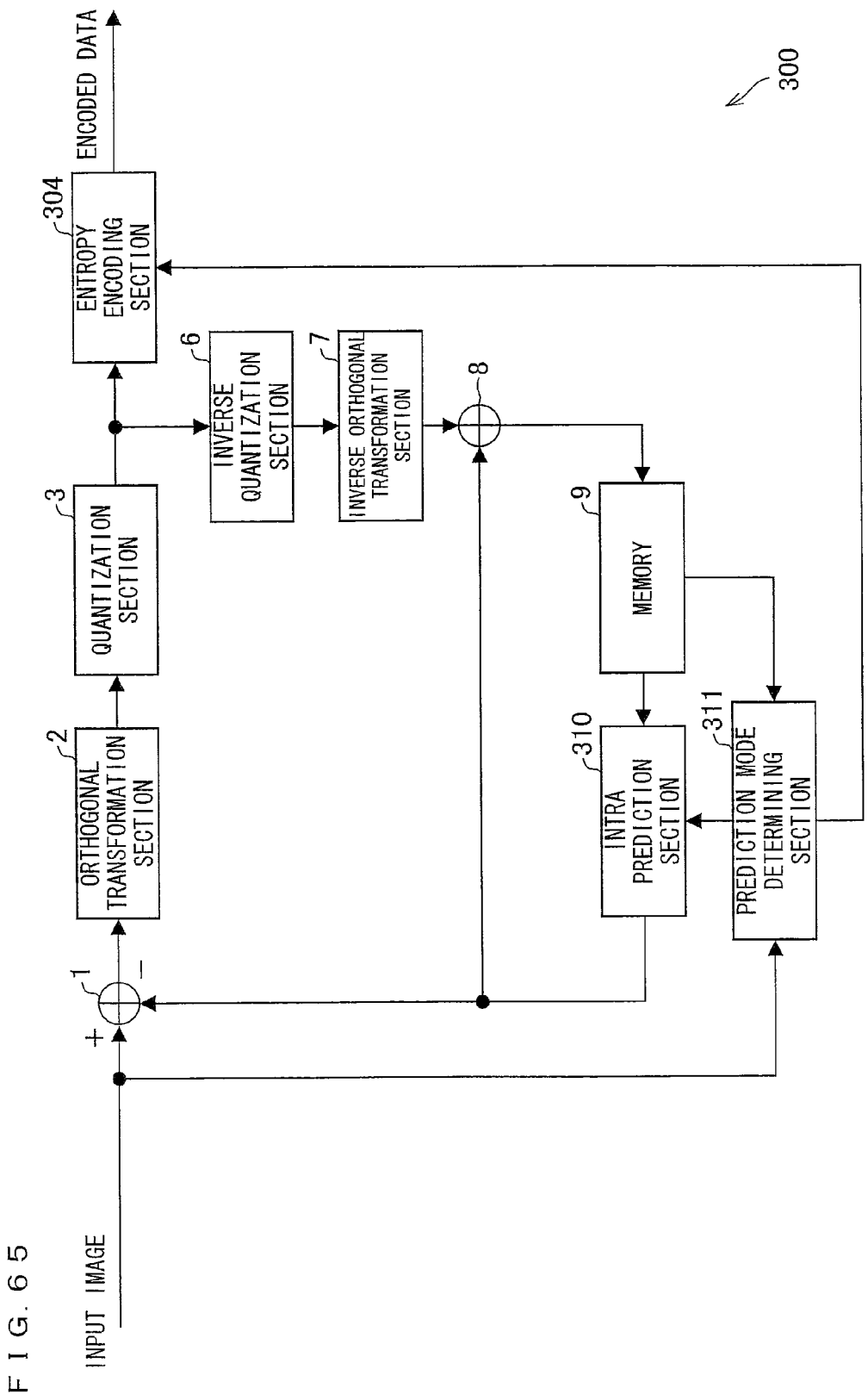
FIG. 65 is a block diagram showing essential part of an arrangement of a conventional image encoding device.
Figure 66:
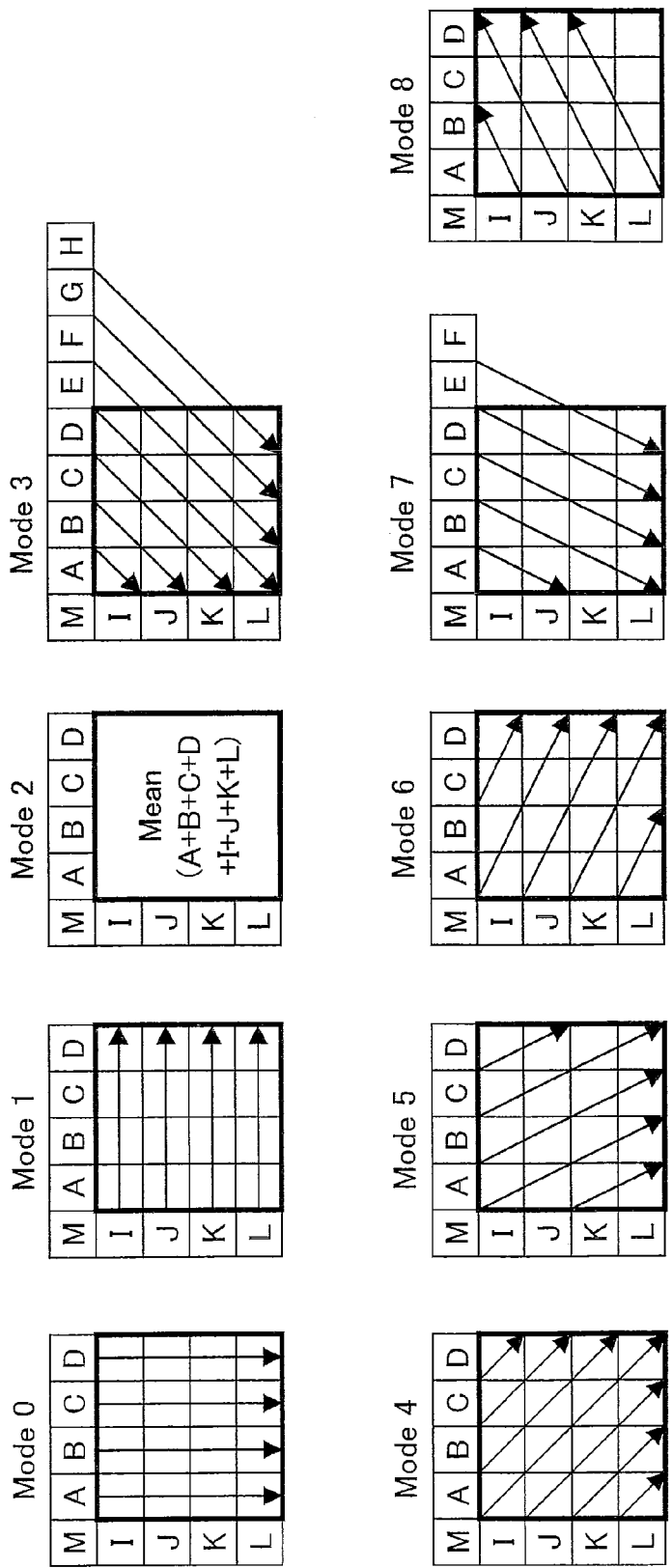
FIG. 66 illustrates an example of prediction modes to be used for intra prediction carried out with respect to a target block to be encoded.
Figure 67:
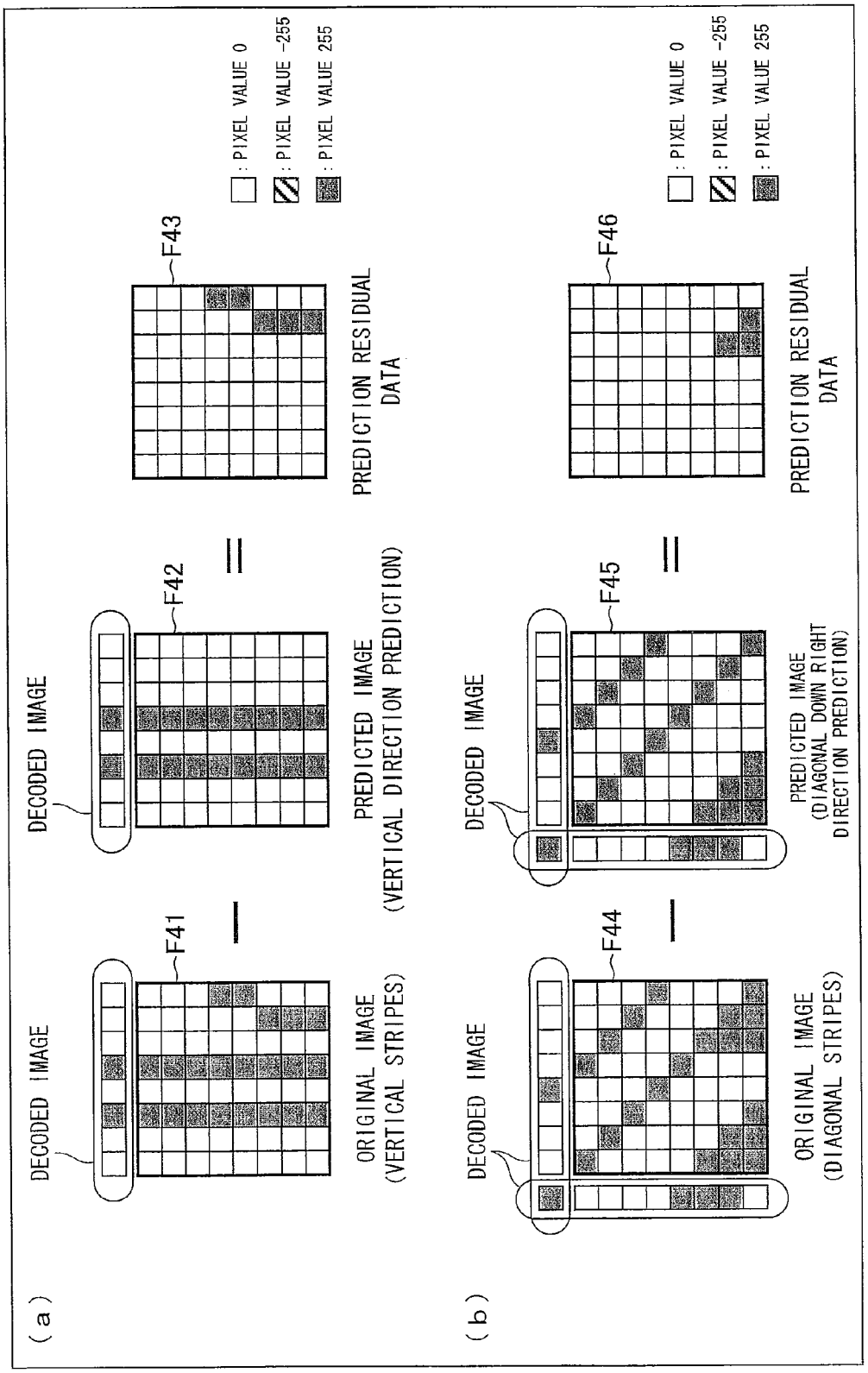
FIG. 67 illustrates concrete examples of intra prediction in a conventional image encoding device. (a) of FIG. 67 illustrates a concrete example in which prediction residual data is obtained from an image having vertical stripes. (b) of FIG. 67 illustrates a concrete example in which prediction residual data is obtained from an image having diagonal stripes.
Figure 71:
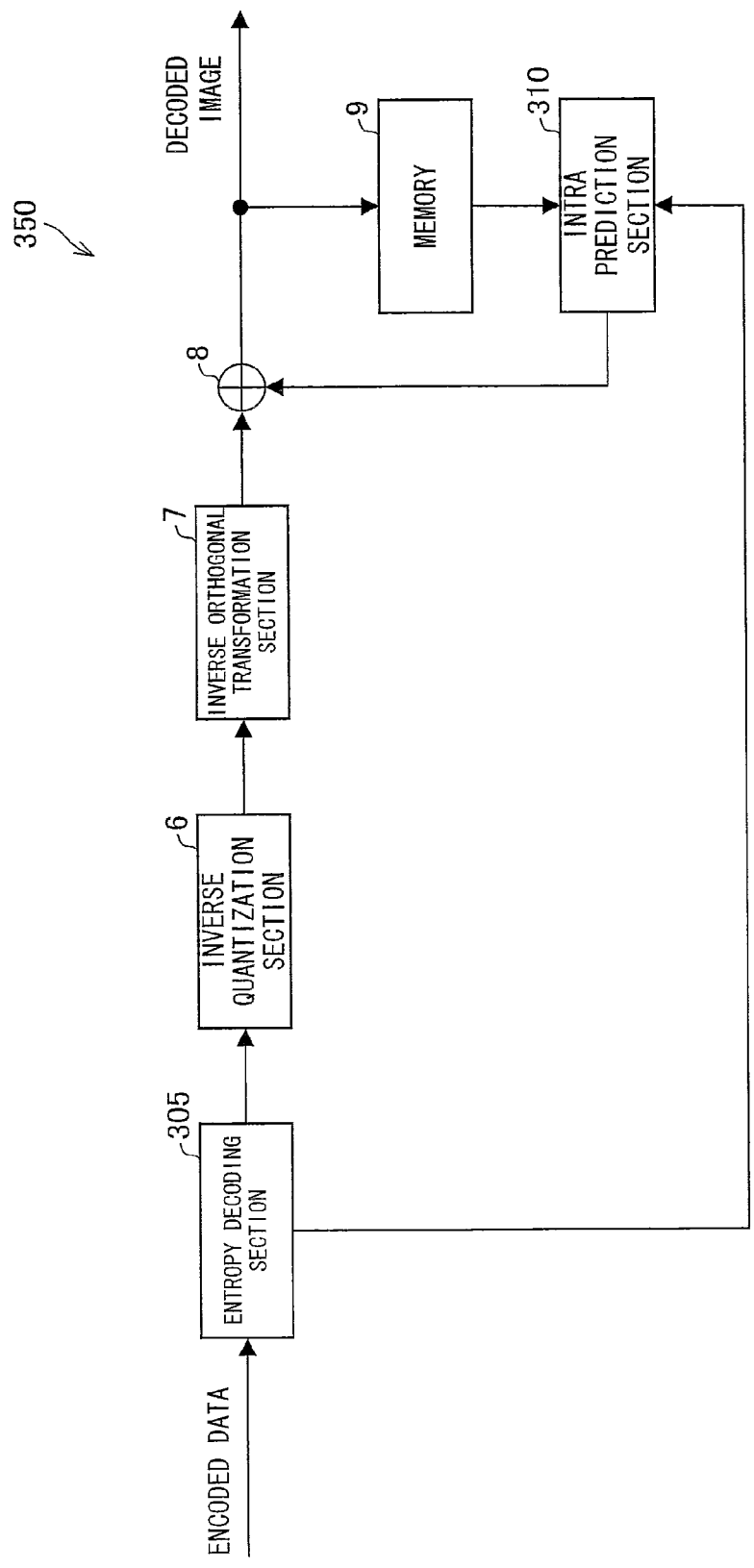
FIG. 71 is a block diagram showing essential part of an arrangement of a conventional image decoding device.
Figure 72:
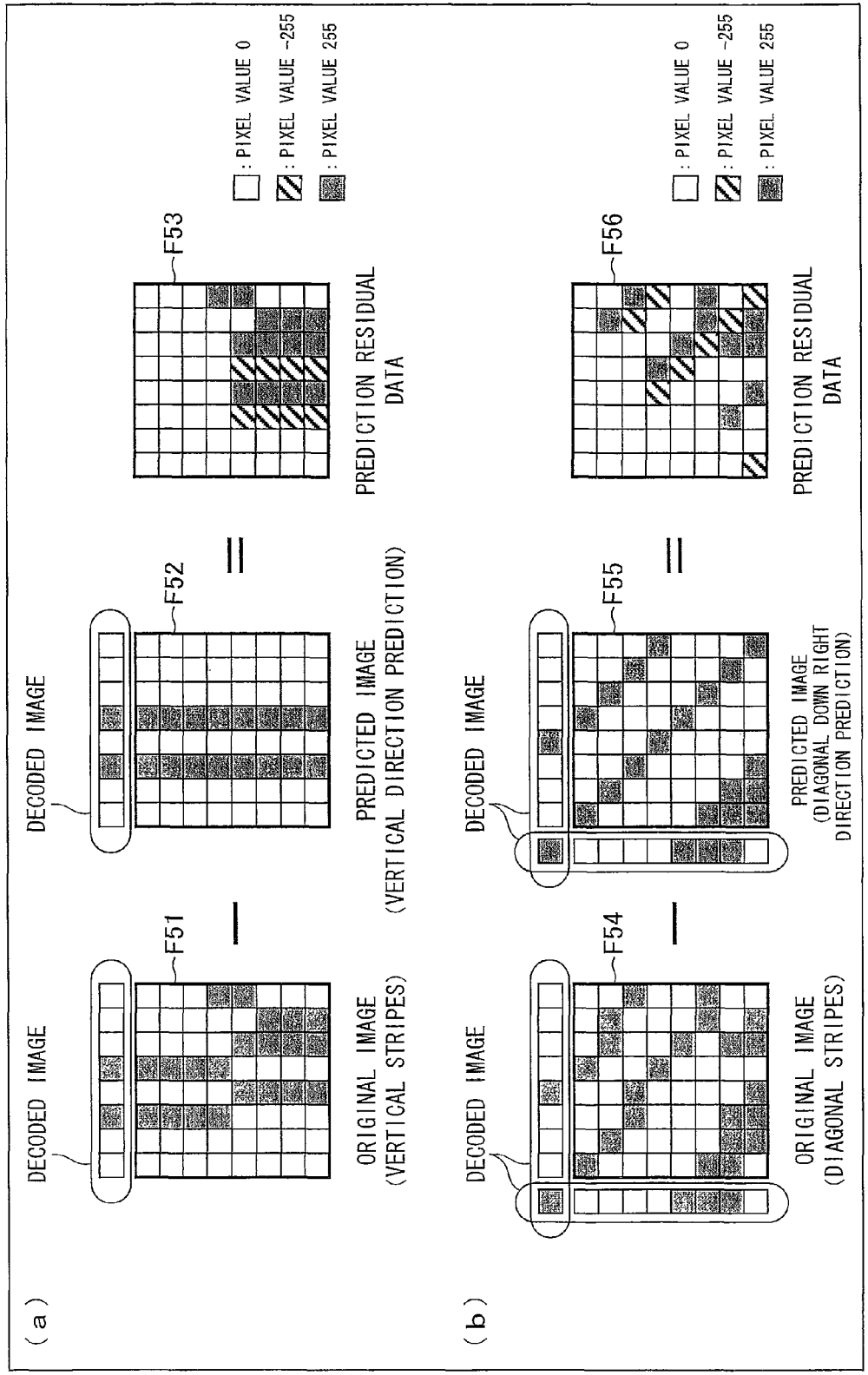
FIG. 72 illustrates other concrete examples of intra prediction in a conventional image encoding device. (a) of FIG. 72 illustrates a concrete example in which prediction residual data is obtained from an image having vertical stripes. (b) of FIG. 72 illustrates a concrete example in which prediction residual data is obtained from an image having diagonal stripes.

The following describes how the prediction set information forming section 755 operates, with reference to FIG. 64. FIG. 64 is a flowchart of how the prediction set information forming section 755 operates.

Initially, the prediction set information predicting section 757 calculates a prediction value of a prediction set for a target block, based on prediction set group information and prediction set information each of a decoded adjacent block (Step S320). Subsequently, the prediction set information predicting section 757 determines whether or not the prediction value thus calculated in Step S320 is modified based on a prediction set group indicated by the prediction value and a prediction set group of the target block to be decoded (Step S321).

If the prediction value is not modified (No in Step S321), the prediction set information predicting section 757 supplies the prediction value to the prediction set information generation section 758. If the prediction value is modified (Yes in Step S321), the prediction set information predicting section 757 modifies the prediction value calculated in Step S320 according to a prediction set correspondence table, and supplies the modified prediction value to the prediction set information generation section 758 (Step S322).

The prediction set information generation section 758 generates prediction set information based on relative prediction set information of the target block to be decoded and the prediction value received from the prediction set information predicting section 757, and outputs the generated prediction set information (Step S323).

Finally, the storing section 756a stores the prediction set information of the target block to be decoded, formed in Step S323, and the storing section 756b stores prediction set group information of the target block to be decoded (Step S324).

As described above, if a prediction set indicated by the prediction set of the target block to be decoded is different from the prediction value, calculated by a predetermined method, for the prediction set of the target block to be decoded, the prediction set information predicting section 757 converts the prediction value into a prediction set in the prediction set group of the target block to be decoded, according to the prediction set correspondence table. This allows improving accuracy in predicting a prediction set and reducing an encoded amount of the prediction set, which is to be decoded.

(Additional Matters)

In the present embodiment, the prediction set group selecting section 15 selects a prediction set group based on prediction directions of intra predictions of all sub blocks included in decoded adjacent blocks. However, how to select a prediction set group is not limited to this. For example, the prediction set group selecting section 15 may select a prediction set group based on prediction sets of decoded adjacent blocks around the target block to be decoded. In this case, if the appearance frequency of horizontal direction prediction sets is high, the second prediction set group is preferably selected. Meanwhile, if the appearance frequency of the vertical direction prediction sets is high, the third prediction set group is preferably selected. Moreover, if the horizontal direction prediction sets and the vertical direction prediction sets appear evenly likely, the first prediction set group is preferably selected. Further, a prediction set group may be selected in such a manner that an edge orientation is calculated according to decoded images around the target block to be decoded and a prediction set group may be selected based on the calculated edge orientation.

Moreover, in the present embodiment, a unit of changing the prediction set group is an M×M pixel block. However, the unit of changing a prediction set group is not limited to this. For example, the unit of changing a prediction set group may be a macro block, a slice, a picture (frame), or a GOP (Group of Picture). Further, the unit of changing a prediction set group may be predetermined between an image encoding device and an image decoding device. Alternatively, it is also possible to notify the unit by use of external means, not by the image encoding device and the image decoding device.

(Effects)

As described above, the image decoding device 750 includes a plurality of prediction set groups each including a plurality of prediction sets having different combinations of a plurality of prediction modes corresponding to respective prediction directions different from each other.

The image decoding device 750 calculates appearance frequency of a prediction direction in intra prediction in an adjacent block that has been already decoded, with respect to each block constituting an image. For example, as the frequency of a prediction direction, the appearance frequency of a prediction direction in the horizontal direction and the appearance frequency of a prediction direction in the vertical direction are calculated.

The image decoding device 750 selects a prediction set group suited for tendency of the appearance frequency of a prediction direction in intra prediction in a decoded adjacent block. For example, if the appearance frequency of a prediction direction in the horizontal direction is high, a prediction set group defining mainly prediction sets that focus on predictions in the horizontal direction is selected. Further, if the appearance frequency of a prediction direction in the vertical direction is high, a prediction set group defining mainly prediction sets that focus on predictions in the vertical direction is selected. Furthermore, if the appearance frequency in the horizontal direction and the appearance frequency in the vertical direction are comparable with each other, a prediction set group in which prediction sets that focus on predictions in the horizontal direction and prediction sets that focus on predictions in the vertical direction are evenly defined is selected.

Subsequently, prediction set information to be applied to the target block to be decoded is decoded with the use of prediction set group information and relative prediction set information of the target block to be decoded, and prediction set information and prediction set group information of a decoded adjacent block. The process is carried out per block constituting an image.

Finally, the image decoding device 750 carries out intra prediction with respect to a target sub block (into which the target block to be decoded is subdivided), with the use of a locally decoded image of a sub block adjacent to the target sub block, so as to generate a predicted image of the target sub block. The image decoding device 750 then combines the generated predicted image and decoded prediction residual data, so as to reconstruct an image of the target sub block.

As a result, in the case where decoded prediction set information indicates a prediction set that focuses on predictions in a horizontal direction, it is possible to generate a predicted image from more specified angles with the horizontal direction as a center. Further, in the case where decoded prediction set information indicates a prediction set that focuses on predictions in a vertical direction, it is possible to generate a predicted image from more specified angles with the vertical direction as a center. Consequently, the image decoding device 750 can carry out a decoding process with the use of predictions from more various angles than the conventional technique, thereby allowing reproducing an edge portion more efficiently. As a result, it is possible to reconstruct an image with improved image quality.

Further, the image decoding device 750 carries out prediction at three stages of a prediction set group, a prediction set, and a prediction mode. This can realize high accuracy in prediction and prevent increase in an encoded amount.

Moreover, in the case where a prediction set group indicated by a prediction set of the target block to be encoded is different from a prediction set group indicated by a prediction value of a prediction set for the target block which prediction value is calculated by a predetermined method, the image decoding device 750 converts the prediction value into a prediction set of the prediction set group of the target block according to the aforementioned prediction set correspondence table. This allows improving accuracy in predicting a prediction set and reducing an encoded amount of the prediction set, which is to be decoded.

(Program and Storage Medium)

Finally, the blocks of the image encoding devices 100, 200, 500, 500*b*, 600, 600*b*, and 700, and the image decoding devices 150, 250, 550, 550*b*, 650, 650*b*, and 750 may be realized by way of hardware or software as executed by a CPU as follows.

The image encoding devices 100, 200, 500, 500*b*, 600, 600*b*, and 700, and the image decoding devices 150, 250, 550, 550*b*, 650, 650*b*, and 750 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the image encoding devices 100, 200, 500, 500*b*, 600, 600*b*, and 700, and the image decoding devices 150, 250, 550, 550*b*, 650, 650*b*, and 750 a computer-readable storage medium containing control program code (executable program, intermediate code program, or source program) for the image encoding devices 100, 200, 500, 500*b*, 600, 600*b*, and 700, and the image decoding devices 150, 250, 550, 550*b*, 650, 650*b*, and 750, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The image encoding devices 100, 200, 500, 500*b*, 600, 600*b*, and 700, and the image decoding devices 150, 250, 550, 550*b*, 650, 650*b*, and 750 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (registered trademark), 802.11 wireless, HDR, mobile telephone network, satellite line, or terrestrial digital network. The present invention encompasses a computer data signal which is embedded into a carrier wave and in which the program code is embodied electronically.

The present invention is not limited to the description of the embodiments above, but may be altered by a skilled person within the scope of the claims. An embodiment based on a proper combination of technical means disclosed in different embodiments is encompassed in the technical scope of the present invention.

(Additional Matters)

The present invention can be also described as follows.

(First Arrangement)

An image encoding device of the first arrangement is an encoding device for encoding an image and includes: calculating means for calculating edge information at least on an edge orientation of an edge per constituent image of the image; selecting means for selecting a prediction set suited for the edge information thus calculated per constituent image, from a prediction set group including a plurality of prediction sets having different combinations of a plurality of prediction modes corresponding to respective prediction directions different from each other; and encoding means for carrying out encoding per constituent image by use of the prediction set thus selected per constituent image.

In the arrangement, the image encoding device calculates edge information at least on an edge orientation of an edge per constituent image of an image to be encoded. As the edge information, an edge orientation and/or an edge strength of a constituent image, or distribution information thereof are/is calculated, for example. The image encoding device selects a prediction set suited for the calculated edge information, from a prediction set group including a plurality of prediction sets having different combinations of a plurality of prediction modes corresponding to respective prediction directions different from each other. The image encoding device then encodes the constituent image by use of the selected prediction set. For example, in the case where the edge information indicates an edge orientation in a horizontal direction, the image encoding device encodes an image by use of a prediction set that focuses on predictions in the horizontal direction. On the other hand, in the case where the edge information indicates an edge orientation in a vertical direction, the image encoding device encodes an image by use of a prediction set that focuses on predictions in the vertical direction.

As such, the image encoding device encodes an image by use of a prediction set optimal to edge information of the image. This allows the image encoding device to carry out predictions from more specific angles than the conventional technique. As a result, it is possible to reduce an encoding amount of prediction residual data of the image and to improve image quality.

(Second Arrangement)

The image encoding device according to the first arrangement further includes dividing means for dividing the image into blocks by a predetermined unit, and the image encoding device is arranged such that the calculating means calculates edge information of a target block, the selecting means selects a prediction set suited for the edge information thus calculated, with respect to the target block, and the encoding means encodes information indicative of the prediction set thus selected per block and also encodes the target block by use of the prediction set thus selected.

In the arrangement, the image encoding device carries out encoding per predetermined unit block constituting an image. At this time, the image encoding device uses a prediction set suited to edge information of a target block. For example, in an image, for a target block having a lot of edges in a horizontal direction, the image encoding device encodes the target block by use of a prediction set that focuses on predictions in the horizontal direction. On the other hand, in the same image, for another target block having a lot of edges in a vertical direction, the image encoding device encodes the another target block by use of a prediction set that focuses on predictions in the vertical direction.

The arrangement can further improve image quality.

(Third Arrangement)

The image encoding device according to the second arrangement further include block-dividing means for subdividing a target block into sub blocks, and the image encoding device is arranged such that the edge information calculates edge information indicative of an edge orientation per sub block in the target block, and the selecting means selects, from the plurality of prediction sets, a prediction set having a smallest degree of similarity between prediction directions indicated by prediction modes in the prediction set and edge orientations of all sub blocks in the target block.

In the arrangement, the image encoding device subdivides each of the blocks constituting an image into a plurality of sub blocks. Further, the image encoding device calculates, per sub block, edge information indicative of an edge orientation of a target sub block. That is, a plurality of edge orientations included in a target block are calculated. Subsequently, the image encoding device selects, from the plurality of prediction sets, a prediction set having a smallest degree of similarity between prediction directions indicated by prediction modes in the prediction set and edge orientations of all sub blocks in the target block.

With the above processes, the image encoding device can find a prediction set optimal for encoding the target block, from the plurality of prediction sets. This results in that an encoding amount of an image can be maximally reduced and image quality can be maximally improved.

(Fourth Arrangement)

An image encoding device of the fourth arrangement is an image encoding device for encoding an image and includes: calculating means for calculating edge information at least on an edge orientation of an edge per constituent image of the image; determining means for determining respective prediction directions corresponding to a plurality of prediction modes in a prediction set, based on the edge information thus calculated per constituent image; and encoding means for carrying out encoding per constituent image by use of the prediction set thus determined per constituent image.

In the arrangement, the image encoding device calculates edge information at least on an edge orientation of an edge of each constituent image of an image to be encoded. As the edge information, an edge orientation and/or an edge strength of a constituent image, or distribution information thereof are/is calculated, for example. The image encoding device determines respective prediction directions of a plurality of prediction modes in a prediction set, on the basis of the edge orientation thus calculated. For example, in the case where the edge information indicates an edge orientation in a horizontal direction, the image encoding device determines prediction directions focusing on predictions in the horizontal direction. Accordingly, the image encoding device encodes an image by use of a prediction set suitable for predictions in the horizontal direction. On the other hand, in the case where the edge information indicates an edge in a vertical direction, the image encoding device carries out encoding by use of a prediction set that defines prediction directions focusing on predictions in the vertical direction. Accordingly, the image encoding device encodes an image by use of the prediction set suitable for predictions in the vertical direction.

As such, the image encoding device encodes an image by use of a prediction set most suited to edge information of the image. The arrangement allows the image encoding device to carry out predictions from more specific angles than the conventional technique. As a result, it is possible to further reduce an encoding amount of an image and to improve image quality.

(Fifth Arrangement)

The image encoding device according to the fourth arrangement further includes dividing means for dividing the image into blocks by a predetermined unit, and the image encoding device is arranged such that the calculating means calculates edge information of a target block, the selecting means determines prediction directions in a prediction set in conformity to the target block, and the encoding means encodes information indicative of the prediction directions in the prediction set and also encodes the target block by use of the prediction set in which the prediction directions are determined in conformity to the target block.

In the arrangement, the image encoding device carries out encoding per predetermined unit block constituting an image. At this time, the image encoding device uses a prediction set suited to edge information of a target block. In an image, for a target block having a lot of edges in a horizontal direction, the image encoding device encodes the target block by use of a prediction set that focuses on predictions in the horizontal direction. On the other hand, for another target block, in the same image, having a lot of edges in a vertical direction, the image encoding device encodes the another target block by use of a prediction set that focuses on predictions in the vertical direction.

The arrangement allows the image encoding device to further improve image quality.

(Sixth Arrangement)

The image encoding device according to the fourth or fifth arrangement is further arranged such that the determining section calculates a histogram indicative of a relationship between an edge orientation and a cumulative probability of the edge orientation, with respect to a plurality of edge orientations included in a target block, and then determines a plurality of edge orientations as prediction directions in a prediction set so that differences between cumulative probabilities of the plurality of orientations are even in the histogram.

In the arrangement, the image encoding device calculates a histogram for a plurality of edge orientations in a target block to be encoded, which histogram indicates a relationship between an edge orientation and a cumulative probability of the edge orientation. The image encoding device then finds several edge orientations whose cumulative probabilities are distanced at even intervals in the calculated histogram, and sets the several edge orientations as prediction directions in a prediction set. With the arrangement, in the case where many edge orientations are in a horizontal direction in a single block, prediction directions are determined so that most of the prediction directions are in the proximity of the horizontal direction. On the other hand, in the case where many edge orientations are in a vertical direction in a single block, prediction directions are determines so that most of the prediction directions are in the proximity of the vertical direction.

The arrangement allows the image encoding device to encode the block by use of a prediction set optimized for predictions of the edge orientations included in the block. As a result, it is possible to maximally reduce an encoding amount of the block and to maximally improve image quality.

(Seventh Arrangement)

An image encoding method of the seventh arrangement is for encoding an image and includes the steps of: calculating edge information at least on an edge orientation of an edge per constituent image of the image; selecting a prediction set suited for the edge information thus calculated per constituent image, from a prediction set group including a plurality of prediction sets having different combinations of a plurality of prediction modes corresponding to respective prediction directions different from each other; and carrying out encoding per constituent image by use of the prediction set thus selected per constituent image.

The arrangement also successfully achieves the same advantageous effects as the first arrangement.

(Eighth Arrangement)

An image encoding method of the eighth arrangement is a method for encoding an image and includes the steps of: calculating edge information at least on an edge orientation of an edge per constituent image of the image; determining respective prediction directions corresponding to a plurality of prediction modes of a prediction set, based on the edge orientation thus calculated per constituent image; and carrying out encoding per constituent image by use of the determined prediction set thus determined per constituent image.

The arrangement also successfully achieves the same advantageous effects as the fourth arrangement.

(Ninth Arrangement)

An image decoding device of the ninth arrangement is an image decoding device for decoding an image encoded by an image encoding device according to any one of the first through sixth arrangements, and includes decoding means for decoding the image by use of a prediction set that the image encoding means used for encoding the image.

In the arrangement, the image decoding device decodes encoded data of an image by use of an encoded prediction set optimal for edge information of the image.

As a result, the image decoding device can obtain an image with improved image quality.

Furthermore, the image decoding device can realize reduction in a processing amount of decoding prediction residual data at a time of decoding an encoded image.

(Tenth Arrangement)

An image decoding method of the tenth arrangement is a method for decoding an image encoded by an image encoding method according to the seventh or eighth arrangement, and includes the step of decoding the image by use of a prediction set used for encoding the image in the encoding step.

The arrangement also successfully achieves the same advantageous effects as the ninth arrangement.

(Eleventh Arrangement)

A program of the eleventh arrangement operates an image encoding device according to any one of the first through sixth arrangements or an image decoding device according to the ninth arrangement, and causes a computer to function as each means described above.

(Twelfth Arrangement)

A computer-readable storage medium of the twelfth arrangement is a storage medium in which a program according to the eleventh arrangement is stored.

An image encoding device of the present invention includes selecting means for selecting a prediction set from a prediction set group including a plurality of prediction sets having different combinations of a plurality of prediction modes corresponding to respective prediction directions different from each other, and encoding means for encoding an image by use of the prediction set thus selected. The arrangement allows the image encoding device of the present invention to carry out prediction from a more specific angle, thereby successfully improving efficiency in prediction and reducing an encoding amount of prediction residual data.

An image encoding device of the present invention includes: selecting means for selecting a prediction mode to be applied to a target sub block from at least one prediction set including a plurality of prediction modes corresponding to different prediction directions; encoding means for encoding an image of the target sub block by use of the prediction mode thus selected; selecting means for selecting an encoded adjacent sub block that is highly correlated with the target sub block, in accordance with pieces of prediction mode information of encoded sub blocks adjacent to the target sub block or decoded images of the encoded sub blocks; and encoding means for encoding the prediction mode thus selected, based on prediction mode information of the encoded sub block thus selected. This makes it advantageously possible to reduce an encoding amount necessary for the prediction mode.

An image decoding device of the present invention includes: decoding means for decoding information on a prediction set to be applied to a target block, from a prediction set group including a plurality of prediction sets having different combinations of a plurality of prediction modes corresponding to different prediction directions; and decoding means for decoding an image of the target block by use of the prediction set thus decoded. The arrangement allows the image decoding device to efficiently reconstruct an edge component of an image in a particular direction, from a more specific angle, thereby advantageously realizing an improvement in image quality.

An image decoding device of the present invention includes: selecting means for selecting a decoded adjacent sub block that is highly correlated with a target sub block, in accordance with pieces of prediction mode information of decoded sub blocks adjacent to the target sub block or decoded images of the decoded sub blocks; decoding means for decoding a prediction mode to be applied to the target sub block from at least one prediction set including a plurality of prediction modes corresponding to different prediction directions, based on prediction mode information of the decoded sub block thus selected; and decoding means for decoding an image of the target sub block by use of the prediction mode thus decoded. The arrangement makes it advantageously possible to reduce an encoded amount of the prediction mode, which is to be decoded.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The image encoding device and the image decoding device according to the present invention can be applied to vide devices such as a digital television, a hard disk recorder, a DVD camera, and a mobile phone that can carry out image processing.

The invention claimed is:

1. An image decoder for decoding encoded data so as to form a decoded image, comprising:
    a decoding circuit configured to decode, from the encoded data,
        (i) an encode parameter including prediction mode information and
        (ii) prediction residual data;
    a first selecting circuit configured to select, from a plurality of prediction sets, one prediction set to be used with respect to each target block to be intra-predicted, wherein the prediction set includes, as prediction mode candidates, a plurality of prediction modes including at least one direction prediction mode, wherein each of the plurality of prediction sets includes the same number of the plurality of prediction modes;
    a second selecting circuit configured to select one prediction mode from the plurality of prediction modes included in the prediction set selected by the first selector;
    a predicting circuit configured to form, on the basis of the prediction mode thus selected, a predicted image of the each target block to be intra-predicted; and
    an adding circuit configured to form a decoded image of the each target block to be intra-predicted by adding the predicted image formed by the predicting circuit and the prediction residual data obtained by decoding the encoded data,
    the predicting circuit referring to a lowermost pixel in a case where a decoded block that is adjacent to the each target block to be intra-predicted is positioned on the top of the each target block to be intra-predicted.

2. An image encoder for encoding an input image, comprising:
    a determining circuit configured to determine a prediction mode to be used for forming a predicted image of a target block to be intra-predicted;
    a selecting circuit configured to select, from a plurality of prediction sets, one prediction set with respect to each target block to be intra-predicted, wherein the prediction set includes, as prediction mode candidates, a plurality of prediction modes including at least one direction prediction mode, wherein each of the plurality of prediction sets includes the same number of the plurality of prediction modes;
    a prediction mode encoder configured to encode, with respect to the each target block to be intra-predicted and by use of the prediction set thus selected by the selector, the prediction mode thus determined;
    a predicting circuit configured to form, on the basis of the prediction mode thus determined, a predicted image of the each target block to be intra-predicted; and a residual data encoding circuit configured to encode
residual data between the input image and the predicted
image, the predicting circuit referring to a lowermost pixel in a case where an encoded block that is adjacent to the each target block to be intra-predicted is positioned on the top of the each target block to be intra-predicted.

* * * * *